US011537976B2

(12) United States Patent
Gravelle et al.

(10) Patent No.: US 11,537,976 B2
(45) Date of Patent: Dec. 27, 2022

(54) MULTI-NODAL SUPPLY CHAIN SYSTEM AND METHOD FOR SUPPLY CHAIN WORKFLOW EXECUTION USING TRANSPORTABLE AND CONTINUOUSLY TRACKABLE STORAGE BINS

(71) Applicant: ATTABOTICS INC, Calgary (CA)

(72) Inventors: Scott Gravelle, Calgary (CA); Douglas Langen, Calgary (CA); Bradley Dean Simpson, Calgary (CA)

(73) Assignee: ATTABOTICS INC, Calgary (CA)

( * ) Notice: Subject to any disclaimer, the term of this patent is extended or adjusted under 35 U.S.C. 154(b) by 480 days.

(21) Appl. No.: 16/805,810

(22) Filed: Mar. 1, 2020

(65) Prior Publication Data

US 2020/0279217 A1    Sep. 3, 2020

Related U.S. Application Data

(60) Provisional application No. 62/812,822, filed on Mar. 1, 2019, provisional application No. 62/818,419, filed
(Continued)

(51) Int. Cl.
*G06Q 10/08* (2012.01)
*G06Q 10/06* (2012.01)
*B65G 1/137* (2006.01)

(52) U.S. Cl.
CPC ....... *G06Q 10/0833* (2013.01); *B65G 1/1373* (2013.01); *G06Q 10/06316* (2013.01); *G06Q 10/0835* (2013.01); *G06Q 10/0875* (2013.01)

(58) Field of Classification Search
CPC .. G06Q 10/08; G06Q 10/083; G06Q 10/0832; G06Q 10/0833; G06Q 10/0835; G06Q 10/0837; G06Q 10/0838
See application file for complete search history.

(56) References Cited

U.S. PATENT DOCUMENTS 6,148,291 A    11/2000  Radican
6,974,928 B2   12/2005  Bloom
(Continued)

FOREIGN PATENT DOCUMENTS

GB    2461722 A     10/2012
GB    2565883 A1    2/2019
(Continued)

OTHER PUBLICATIONS

Vogt, Raphael, et al. "Explorative investigation of application scenarios for smart bin systems." Knowledge valorisation in the age of digitalization: International Conference on Competitive Manufacturing (COMA 19): Proceedings, Jan. 30, 2019-Feb. 1, 2019, Stellenbosch, South Africa. (Year: 2019).*
(Continued)

*Primary Examiner* — Emmett K. Walsh
(74) *Attorney, Agent, or Firm* — Barry Choobin; Patent 360 LLC

(57) ABSTRACT

A multi-nodal supply chain system including multiple interconnected entities and a method for executing a supply chain workflow using transportable and continuously trackable, standardized storage bins is provided. The entities include a network of node facilities distributed throughout a geographical region, inter-nodal transport vehicles (INTVs), storage bins storable in indexed storage locations within the node facilities and the INTVs, and a computerized system. The computerized system stores bin identifiers of the storage bins and location identifiers of the indexed storage locations and dynamic storage locations of the storage bins. The computerized system also updates the location identifiers as the storage bins are transferred between the node facilities and the INTVs. The node facilities, the INTVs, and the storage bins, in communication with the computerized system, provide a complete traceability of one or more eaches
(Continued)

of inventory items from their input into the supply chain system to fulfillment of orders.

42 Claims, 46 Drawing Sheets

Related U.S. Application Data on Mar. 14, 2019, provisional application No. 62/818,444, filed on Mar. 14, 2019, provisional application No. 62/818,506, filed on Mar. 14, 2019, provisional application No. 62/836,863, filed on Apr. 22, 2019, provisional application No. 62/846,295, filed on May 10, 2019, provisional application No. 62/891,549, filed on Aug. 26, 2019.

(56) References Cited

U.S. PATENT DOCUMENTS

| | | |
|---|---|---|
| 8,527,373 B1 | 9/2013 | Ricci et al. |
| 8,972,045 B1 | 3/2015 | Mountz et al. |
| 9,202,194 B1 | 12/2015 | Mistry |
| 9,218,585 B2 | 12/2015 | Gupta et al. |
| 9,533,828 B1 | 1/2017 | Dwarakanath et al. |
| 9,551,987 B1 | 1/2017 | Mountz et al. |
| 10,062,047 B2 | 8/2018 | Kadaba et al. |
| 10,345,818 B2 | 7/2019 | Sibley |
| 2016/0283898 A1 | 9/2016 | Reuther et al. |
| 2017/0313514 A1 | 11/2017 | Lert, Jr et al. |
| 2017/0323250 A1 | 11/2017 | Lindbo et al. |
| 2018/0093828 A1 | 4/2018 | Lindbo et al. |
| 2018/0150793 A1 | 5/2018 | Lert, Jr. et al. |
| 2018/0218320 A1 | 8/2018 | Lee et al. |
| 2018/0247257 A1 | 8/2018 | Lert, Jr et al. |
| 2019/0233213 A1 | 8/2019 | Phan-Quiroga et al. |

FOREIGN PATENT DOCUMENTS

| | | |
|---|---|---|
| WO | 200068859 A2 | 11/2000 |
| WO | 200360752 A1 | 7/2003 |
| WO | 2016130222 A1 | 8/2016 |

OTHER PUBLICATIONS

Knut Alicke et al., "Supply Chain 4.0—The Next-Generation Digital Supply Chain", McKinsey & Company.
Adam Robinson, "How Supply Chain Systems Integration is a Game Changer", Industry Week, Jul. 3, 2018.
Stefan Schrauf and Philipp Berttram, "How Digitization Makes the Supply Chain More Efficient, Agile, and Customer-Focused", Strategy&.

* cited by examiner

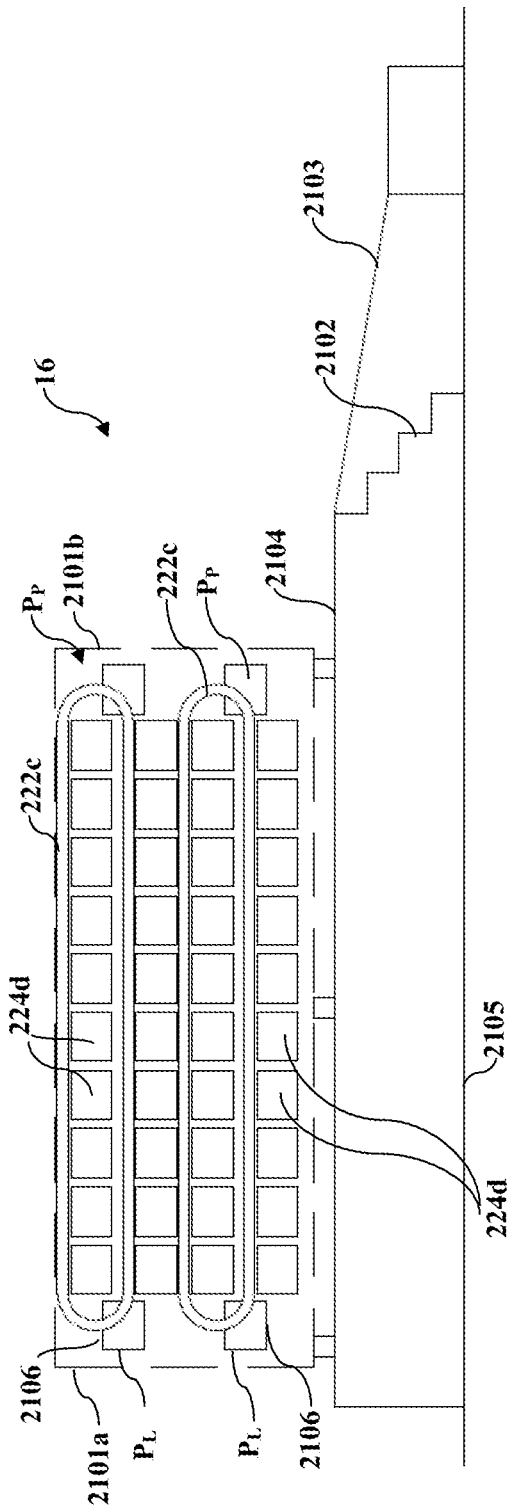
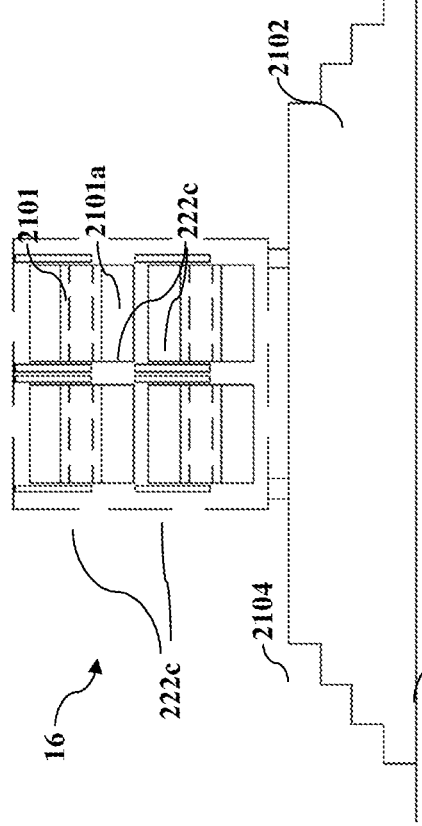
FIG. 21B
FIG. 21C

MULTI-NODAL SUPPLY CHAIN SYSTEM AND METHOD FOR SUPPLY CHAIN WORKFLOW EXECUTION USING TRANSPORTABLE AND CONTINUOUSLY TRACKABLE STORAGE BINS

CROSS-REFERENCE TO RELATED APPLICATIONS

This application claims priority to and the benefit of the following provisional patent applications, the specifications of which are incorporated herein by reference in their entirety:
1. Provisional patent application titled "Supply Chain Facility and Vehicle Network, and Distribution and Order Fulfillment Services using same", application No. 62/812,822, filed in the United States Patent and Trademark Office (USPTO) on Mar. 1, 2019;
2. Provisional patent application titled "Filling, Tracking and Handling of Storage Bins in a Supply Chain, Distribution or Order Fulfillment Ecosystem", application No. 62/818,419, filed in the USPTO on Mar. 14, 2019;
3. Provisional patent application titled "Two-way Logistics using Transportable Storage Bins in a Supply Chain, Distribution or Order Fulfillment Ecosystem", application No. 62/818,444, filed in the USPTO on Mar. 14, 2019;
4. Provisional patent application titled "Multi-vendor Inventory Management using Storage Bin Assignment & Reassignment in a Supply Chain, Distribution or Order Fulfillment Ecosystem", application No. 62/818,506, filed in the USPTO on Mar. 14, 2019;
5. Provisional patent application titled "Multi-vendor Inventory Management using Storage Bin & Product Reassignment in a Supply Chain, Distribution or Order Fulfillment Ecosystem", application No. 62/836,863, filed in the USPTO on Apr. 22, 2019;
6. Provisional patent application titled "Space Efficient Order Fulfillment Facility using ASRS Structure and Robotic Vehicles thereof for Workflow Between Service Areas", application No. 62/846,295, filed in the USPTO on May 10, 2019; and
7. Provisional patent application titled "Multi-zone ASRA Structure, and Auto-induction Processes Employing Bin Consolidation and Bin Exchange Techniques", application No. 62/891,549, filed in the USPTO on Aug. 26, 2019.

BACKGROUND

Technical Field

The embodiments herein, in general, relate to supply chains, distribution channels, order fulfillment, and inventory management. More particularly, the embodiments herein relate to a multi-nodal supply chain system comprising multiple interconnected entities and a method for executing a supply chain workflow using transportable and continuously trackable storage bins.

Description of the Related Art

A conventional supply chain comprises a series of discrete transactional entities, for example, manufacturers, producers, suppliers, vendors, warehouses, transportation companies, distribution centers, order fulfillment centers, retailers, etc. Supply chain management allows sourcing and delivery of inventory from manufacturers and producers to end customers and end users. Supply chain management typically involves the management of flow of inventory from the origin of the inventory to fulfilment of customer orders and last mile delivery to and consumption by the end customers and the end users. Logistics constitutes a part of the supply chain and involves control of the movement and storage of inventory from a point of origin of the inventory to a final destination. Several technologies have emerged that are altering conventional methods of managing a supply chain. Customer demand for individualized products and stronger granularization of orders are growing. Digitization of the supply chain allows businesses to address the growing expectations of customers.

As electronic commerce (e-commerce) continues to grow at a significant rate and overtake conventional brick and mortar retail practices, many businesses are facing notable challenges of maintaining or gaining relevance in an online marketplace and being able to compete with prominent players in the space. Accordingly, there is a need for solutions by which vendors can shift away from, or supplement, conventional supply chain and distribution practices in order to re-focus on direct-to-customer order fulfillment. E-commerce has changed the way customers purchase items. While ordering and purchasing items online or via the internet are widespread and convenient, the items are typically delivered to customers in cardboard boxes. These cardboard boxes and related dunnage store and protect the contained ordered items as they excessively move through supply chain systems using jarring parcel sortation equipment. Carrier services have reported that they move millions of cardboard boxes per day. Due to the lack of infrastructure to manage and recycle the massive volume of cardboard boxes used for delivery in e-commerce, these cardboard boxes need to be shipped to different countries for recycling purposes. Most of these cardboard boxes end up in landfills, thereby supplementing the piles of waste and severely impacting the environment. Therefore, there is a need for eliminating the use of cardboard boxes to deliver customer orders from order fulfilment centers to a last mile pickup point.

Moreover, to lower last mile delivery costs, inventory must be located as close to the end customer as possible in micro-fulfillment facilities. Real estate costs of space in the back of retail stores or in dark warehouses near end customers is much higher than rural settings of most distribution centres. To make micro-fulfillment feasible, a large variety of goods must be available at each facility, but not at excessive levels that would drastically increase storage requirements. As a result, there is a need to handle all inventory items sold within the supply chain at an "each" level and replenished with "just enough" inventory, rather than replenishing at the case level in a conventional supply chain approach.

Furthermore, a conventional supply chain does not incorporate material handling equipment in all its entities for performing various supply chain activities and inventory exchanges between the entities. Some solutions roll out a mat within a transport vehicle to allow robots to navigate within the transport vehicle, but do not incorporate material handling equipment that is compatible with storage units to handle shelving within the transport vehicle. Some solutions handle interactions and inventory exchanges between two entities without any awareness of other entities in a supply chain. There is a need for a system and a method in which all the interconnected entities in the supply chain are configured to handle and transport standardized storage units, for example, storage bins, having a single form factor and structure for interfacing with standard, complaint robotics and the transport vehicles throughout the supply chain.

For overall improvements in inventory management, there is a need for better collaboration with multiple vendors in the supply chain. Most conventional supply chain systems do not account for multi-tenancy with respect to orders from multiple vendors. There is a need for combining multi-vendor inventory within a single storage unit while still tracking physical location and ownership of inventory items. Moreover, there is a need for moving multi-vendor inventory between network nodes and tracking multi-vendor inventory through the supply chain.

Some supply chain systems automate shipping and receiving of inventory items at an entity level, where discrete transactional entities are constantly receiving and discharging the inventory, thereby requiring staging areas for checking storage units in and out of facilities or transport vehicles. Tracking the location of inventory items within the supply chain is a tedious operation as storage units containing the inventory items need to be constantly scanned at each entity. Moreover, as most storage units are randomly stacked in transport vehicles, their exact positions in the transport vehicles are difficult to track. Storage units containing inventory items are typically checked-in and checked-out of facilities to track their whereabouts in the supply chain. There is a need for continuous and real-time tracking of storage bins without dependency on positioning equipment, radio frequency identification (RFID) tags positioned on the storage bins, etc. Furthermore, there is a need for continuous tracking of storage bins containing the inventory items within a supply chain to relieve the need to ship and receive the inventory items between the facilities and to provide a complete traceability of the storage bins at all times.

Conventional supply chain systems typically fulfill customer orders from multiple endpoints, which increases costs and involves chaotic inventory management. There is a need for fulfilling customer orders from the closest endpoint to a destination address. Moreover, these supply chain systems perform shipping and receiving among entities in a chaotic manner with limited predictability. There is a need for an autonomous, orderly approach where storage units are exchanged in a one-to-one correspondence at each facility, including an endpoint, to increase predictability and optimize inventory management. Furthermore, conventional solutions implement a top-down, centralized control approach for governing supply chain actions and controlling inventory and storage units that move through the supply chain. In these solutions, a central server controls all aspects of the storage units' journey through a facility. Furthermore, these centralized approaches do not have the ability to effectively react to changing conditions in a supply chain. There is a need for multi-agent-based control where standardized storage units dictate their own actions and control their own journey through the supply chain with the facilities acting as enablers to the commands of the storage units.

Hence, there is a long-felt need for a multi-nodal supply chain system comprising multiple interconnected entities and an orderly method for executing a supply chain workflow using transportable and continuously trackable storage bins, that address the above-recited problems associated with the related art.

SUMMARY

This summary is provided to introduce a selection of concepts in a simplified form that are further disclosed in the detailed description. This summary is not intended to determine the scope of the claimed subject matter.

The system and the method disclosed herein address the above-recited needs for a multi-nodal supply chain system comprising a plurality of interconnected entities and an orderly method for executing a supply chain workflow using transportable and continuously trackable storage bins. In various embodiments, the multi-nodal supply chain system employs semi-automated and fully automated systems and methods for induction, storage, distribution, and tracking of inventory from multiple vendors, in addition to fulfillment, storage, distribution, and tracking of customer orders. The multi-nodal supply chain system establishes a supply chain ecosystem that distributes inventory, not from a central hub but throughout the supply chain ecosystem to optimally balance resources and bring them closer to customers. The multi-nodal supply chain system disclosed herein is a multi-tenant fulfillment network in which all its entities, for example, facilities, transport vehicles, etc., incorporate specifically designed material handling equipment configured to accommodate and move smart, standardized storage units, herein referred to as "storage bins", through the supply chain ecosystem.

The entities in the multi-nodal supply chain system incorporate specifically configured equipment that is compatible with the storage bins for performing various supply chain activities and inventory exchanges between the entities. The interconnected entities in the multi-nodal supply chain system are configured to handle and transport the smart, standardized storage bins having a single form factor and structure for interfacing with standard, compliant robotics and transport vehicles throughout the supply chain ecosystem. Once inventory items are filled in the storage bins, the multi-nodal supply chain system allows completely autonomous movement of the inventory contained in the storage bins throughout the entire network. Moreover, in an embodiment, the multi-nodal supply chain system facilitates continuous and real-time tracking of the storage bins without dependency on positioning equipment, radio frequency identification (RFID) tags positioned on the storage bins, etc. The continuous tracking of the storage bins during all transfers and exchanges within the multi-nodal supply chain system relieves the need to ship and receive between facilities and provides a complete traceability of the storage bins at all times.

The interconnected entities of the multi-nodal supply chain system disclosed herein comprise a network of node facilities, a fleet of inter-nodal transport vehicles, a plurality of storage bins, and a computerized supply chain management system (CSCMS). The network of node facilities is distributed throughout a geographical region. Each of the node facilities comprises a facility-based array of indexed storage locations. The fleet of inter-nodal transport vehicles transport multiple inventory items contained in storage bins between the node facilities. Each of the inter-nodal transport vehicles comprises a vehicle-based array of indexed storage locations. In an embodiment, the fleet of inter-nodal transport vehicles comprises dedicated-service transport vehicles, each respectively assigned to service a specific pair of the node facilities, and/or service a limited subset of the node facilities, and/or service a limited service area containing two or more of the node facilities.

The storage bins are storable within the network of node facilities and transportable between the node facilities by the inter-nodal transport vehicles. Each of the storage bins is of a standardized size and is configured to receive one or more of a plurality of eaches of the inventory items. Moreover, each of the storage bins is of a configuration compatible with the facility-based array of indexed storage locations and the vehicle-based array of indexed storage locations for selective storage and continuous tracking of any one of the storage bins at any one of the node facilities, in any one of the inter-nodal transport vehicles, and between any one of the node facilities and any one of the inter-nodal transport vehicles. In an embodiment, each of the storage bins is continuously trackable at any one of the node facilities, in any one of the inter-nodal transport vehicles, and between any one of the node facilities and any one of the inter-nodal transport vehicles in real time or near real time. In an embodiment, the storage bins are configured to contain one or more of a plurality of inventory items owned by one or more of a plurality of vendors.

In an embodiment, the storage bins are categorized into first category storage bins containing unmixed inventory items of a matching item type, second category storage bins containing mixed inventory items of a non-matching item type, and third category storage bins configured as order bins for fulfilling the orders. Moreover, in an embodiment, the network of node facilities is a hierarchical network comprising at least one mega facility, at least one macro facility, and at least one micro facility. The mega facility is configured to store the first category storage bins. The macro facility is configured to receive one or more of the first category storage bins transported from the mega facility. The macro facility is further configured to fill a predefined number of the second category storage bins with different inventory items from the received first category storage bins to meet actual inventory needs and/or predictive inventory needs of another one or more of the node facilities. The micro facility is configured to receive one or more of the second category storage bins transported from at least one macro facility. The micro facility is further configured to fill a predefined number of the order bins with the different inventory items from the received second category storage bins to fulfill the orders. In an embodiment, the network of node facilities further comprises at least one nano facility configured to receive one or more of the order bins filled with the orders for pickup by customers and/or delivery personnel. In an embodiment, the micro facility is configured to fulfill the orders based on proximity of the micro facility to at least one nano facility and/or a customer preference of at least one nano facility. In other embodiments, the functions of the mega facility and the macro facility are combined in one facility.

In an embodiment, the order bins comprise picked-order bins of the same standardized size and configuration as the storage bins. The picked-order bins are filled with one or more of the inventory items of multiple orders at the micro facility and are inducted into the facility-based array of the micro facility. In another embodiment, the order bins comprise finished-order bins. The finished-order bins are of a different standardized size and configuration from other of the storage bins and are filled with one or more of the inventory items of individual orders after extraction thereof from the facility-based array of at least one micro facility. The finished-order bins of the different standardized size and configuration are configured to be compatible with the facility-based array of indexed storage locations of at least one nano facility and with the vehicle-based array of indexed storage locations in a node-to-terminal transport vehicle. In an embodiment, the inventory items owned by the vendors are packed into respective vendor-branded packages, for example, vendor-branded bags, and the respective vendor-branded packages are filled in the finished-order bins. The orders are fulfilled at the macro facility and/or the micro facility.

In an embodiment, a mobile data storage device with a computer-readable memory is operably coupled to each of the storage bins. The mobile data storage device is configured to store a unique bin identifier of a respective storage bin and the bin data associated with the inventory items contained in the respective storage bin. In another embodiment, at least one sensor is operably coupled to each of the storage bins. The sensor is configured to detect movement of each of the storage bins, and in response to the detected movement, initiate positional tracking of each of the storage bins through the multi-nodal supply chain system. In another embodiment, a mobile indoor positioning device is operably coupled to each of the storage bins and an indoor positioning system is installed at each of the node facilities. The mobile indoor positioning device is configured to operably communicate with the indoor positioning system to determine and report a position of each of the storage bins within each of the node facilities for real-time tracking of each of the storage bins.

In an embodiment, at least one of the node facilities comprises a plurality of environmentally distinct storage zones among which the facility-based array of indexed storage locations is distributed. The storage bins are selectively deposited into the facility-based array of indexed storage locations among the environmentally distinct storage zones based on environmental data. The environmental data is retrieved from respective mobile data storage devices of the storage bins and/or the CSCMS.

The CSCMS is communicatively coupled to the network of node facilities, the fleet of inter-nodal transport vehicles, and the storage bins. The CSCMS comprises at least one processor and non-transitory, computer-readable storage media communicatively coupled to the processor(s). The CSCMS comprises one or more databases configured to store bin data comprising bin identifiers assigned to the storage bins. The database(s) of the CSCMS is further configured to store location identifiers of the indexed storage locations of the storage bins within the facility-based array and the vehicle-based array and dynamic storage locations of the storage bins. The CSCMS is further configured to update the location identifiers as the storage bins are transferred between the indexed storage locations of the facility-based array and the vehicle-based array while traversing the network of node facilities and the fleet of inter-nodal transport vehicles of the multi-nodal supply chain system. In an embodiment, the multi-nodal supply chain system further comprises one or more robotic handlers operable at each of the node facilities. Each of the robotic handlers is configured to navigate any one of the storage bins through the facility-based array of indexed storage locations and selectively deposit any one of the storage bins thereto and extract any one of the storage bins therefrom. In an embodiment, each of the robotic handlers is further configured to provide a dynamic storage location to each of the storage bins. In an embodiment, each of the robotic handlers is assigned a unique identifier configured to indicate one of the dynamic storage locations of the storage bins and to allow real-time tracking of the storage bins. The network of node facilities, the fleet of inter-nodal transport vehicles, the storage bins, and in an embodiment, the robotic handlers, in operable communication with the CSCMS, are configured to provide a complete traceability of one or more of the eaches from their input into the multi-nodal supply chain system to fulfillment of orders.

The CSCMS also automatically records and links the bin identifiers of the storage bins to the location identifiers of the indexed storage locations in the facility-based array and the vehicle-based array and the dynamic storage locations, to item identifiers of the inventory items contained in the storage bins, and to vendor identifiers of a plurality of vendors whose inventory items are contained in the storage bins in the database(s). In another embodiment, any one or more of the storage bins comprises a plurality of compartments configured to accommodate the inventory items of a plurality of vendors in any one or more of the storage bins. Each of the compartments is identified by a compartment identifier and configured to accommodate one or more of the inventory items owned by a corresponding one of the vendors. The CSCMS is further configured to automatically record and link the compartment identifier of a respective one of the compartments to the item identifiers of one or more of the inventory items contained in any one or more of the storage bins and to the vendor identifiers of the vendors whose inventory items are contained in any one or more of the storage bins. The multi-nodal supply chain system combines multi-vendor inventory within a single storage bin while still tracking physical location and ownership of the inventory items. The multi-nodal supply chain system moves multi-vendor inventory between the nodes facilities and the transport vehicles and tracks multi-vendor inventory through the supply chain ecosystem.

The bin data associated with the storage bins comprises at least one of: an inventory catalogue; inventory item data comprising an item identifier, a quantity, and attributes of each of the inventory items contained in each of the storage bins; destination data associated with a destination of the contained inventory items; timing data associated with a timeline within which and an urgency with which the inventory items contained in each of the storage bins are to be conveyed through the multi-nodal supply chain system toward the destination; inventory customization data associated with value-added service actions to be performed on the inventory items contained in each of the storage bins; inventory handling data associated with routing, handling, and/or packing requirements for the inventory items contained in each of the storage bins; and environmental data associated with environmental requirements for the inventory items contained in each of the storage bins.

The CSCMS receives and processes the bin data and commands from each of the storage bins while each of the storage bins traverses the network of node facilities and the fleet of inter-nodal transport vehicles of the multi-nodal supply chain system in a forward direction and a reverse direction. The CSCMS also generates task-based instructions for facilitating filling actions and order fulfillment actions at one or more of the node facilities based on the bin data. Furthermore, the CSCMS generates task-based instructions for triggering loading actions and unloading actions at one or more of the node facilities based on the bin data. In an embodiment, incoming storage bins are unloaded from any one of the inter-nodal transport vehicles into any one of the node facilities and outgoing storage bins are reloaded from any one of the node facilities to any one of the inter-nodal transport vehicles. The incoming storage bins and the outgoing storage bins are exchanged in a one-to-one (1:1) correspondence between any one of the inter-nodal transport vehicles and any one of the node facilities to allow an equivalent flow of the storage bins in the forward direction and the reverse direction through the multi-nodal supply chain system. A unique bin identifier of each of the outgoing storage bins loaded from any one of the node facilities onto any one of the inter-nodal transport vehicles is read and one or more databases of the CSCMS are updated with the unique bin identifier to record a transfer of each of the outgoing storage bins to any one of the inter-nodal transport vehicles. The unique bin identifier of each of the incoming storage bins unloaded from any one of the inter-nodal transport vehicles into any one of the node facilities is read and one or more databases of the CSCMS is updated with the unique bin identifier to record a transfer of each of the incoming storage bins to any one of the node facilities. In an embodiment, at least one of the outgoing storage bins is an empty storage bin. In another embodiment, at least one of the outgoing storage bins is a non-empty storage bin containing at least one of the inventory items. In another embodiment, the non-empty storage bin contains required inventory items or customer returns. In another embodiment, the incoming storage bins and the outgoing storage bins are of the same standardized size and configuration as the storage bins.

In an embodiment, the CSCMS further comprises respective facility management subsystems at the node facilities communicatively coupled to each other. The respective facility management subsystems are configured to communicate with respective mobile data storage devices of the storage bins for at least one of: reading the bin data stored thereon; updating the bin data stored thereon; generating commands for actions to be performed on the storage bins based at least partly on the bin data; controlling handling equipment at the node facilities based at least partly on the generated commands; providing worker guidance instructions for directing performance of the actions; and executing transfer of the storage bins to environmentally distinct storage zones in the facility-based array based on environmental data read from the respective mobile data storage devices of the storage bins. In an embodiment, the CSCMS further comprises respective vehicle management subsystems at the inter-nodal transport vehicles. The respective vehicle management subsystems are configured to communicate with the respective facility management subsystems at the node facilities and the respective mobile data storage devices of the storage bins for recording transfers of the storage bins from the node facilities to the inter-nodal transport vehicles and vice versa.

In another embodiment, a positioning unit and a wireless communications unit are operably coupled to each of the inter-nodal transport vehicles. The positioning unit is configured to determine a location of each of the inter-nodal transport vehicles and in turn determine a location of any one of the storage bins being transported in each of the inter-nodal transport vehicles. The wireless communications unit is configured to communicate the location of each of the inter-nodal transport vehicles and the location of any one of the storage bins to the CSCMS during transport of the storage bins between the node facilities.

The multi-nodal supply chain system disclosed herein eliminates the use of cardboard boxes, reduces the last mile costs, eliminates about 80% of air cargo, provides a complete traceability, for example, about a 100% traceability of the storage bins at all times, and delivers the inventory to the customers, for example, within a two-hour to an eight-hour time horizon. Moreover, the multi-nodal supply chain system lowers the costs incurred by retailers to increase e-commerce profitability, while reducing the environmental impact. Furthermore, the multi-nodal supply chain system disclosed herein invariably delivers fulfilled customer orders to end customers from the closest endpoint. If inventory items from other facilities are needed, the multi-nodal supply chain system sends a request up the hierarchy first and then ships the fulfilled customer orders to the nearest facility. The multi-nodal supply chain system disclosed herein allows accommodation and movement of multi-vendor inventory in a single storage bin in a single compartment or in multiple compartments of the storage bin throughout the supply chain ecosystem. The standardized storage bins in the multi-nodal supply chain system disclosed herein dictate their own actions, course, and journey through the supply chain ecosystem with the facilities, the transport vehicles, the robotic handlers, etc., acting as enablers to the commands of the respective storage bins.

In one or more embodiments, related systems comprise circuitry and/or programming for executing the methods disclosed herein. The circuitry and/or programming are of any combination of hardware, software, and/or firmware configured to execute the methods disclosed herein depending upon the design choices of a system designer. In an embodiment, various structural elements are employed depending on the design choices of the system designer.

BRIEF DESCRIPTION OF THE DRAWINGS

The foregoing summary, as well as the following detailed description, is better understood when read in conjunction with the appended drawings. For illustrating the embodiments herein, exemplary constructions of the embodiments are shown in the drawings. However, the embodiments herein are not limited to the specific structures, components, and methods disclosed herein. The description of a structure, or a component, or a method step referenced by a numeral in a drawing is applicable to the description of that structure, component, or method step shown by that same numeral in any subsequent drawing herein.

FIGS. 21A-21C illustrate a top plan view, a side elevation view, and a rear elevation view of a nano facility of the multi-nodal supply chain system respectively, according to an embodiment herein.

DETAILED DESCRIPTION

Figure 1A:
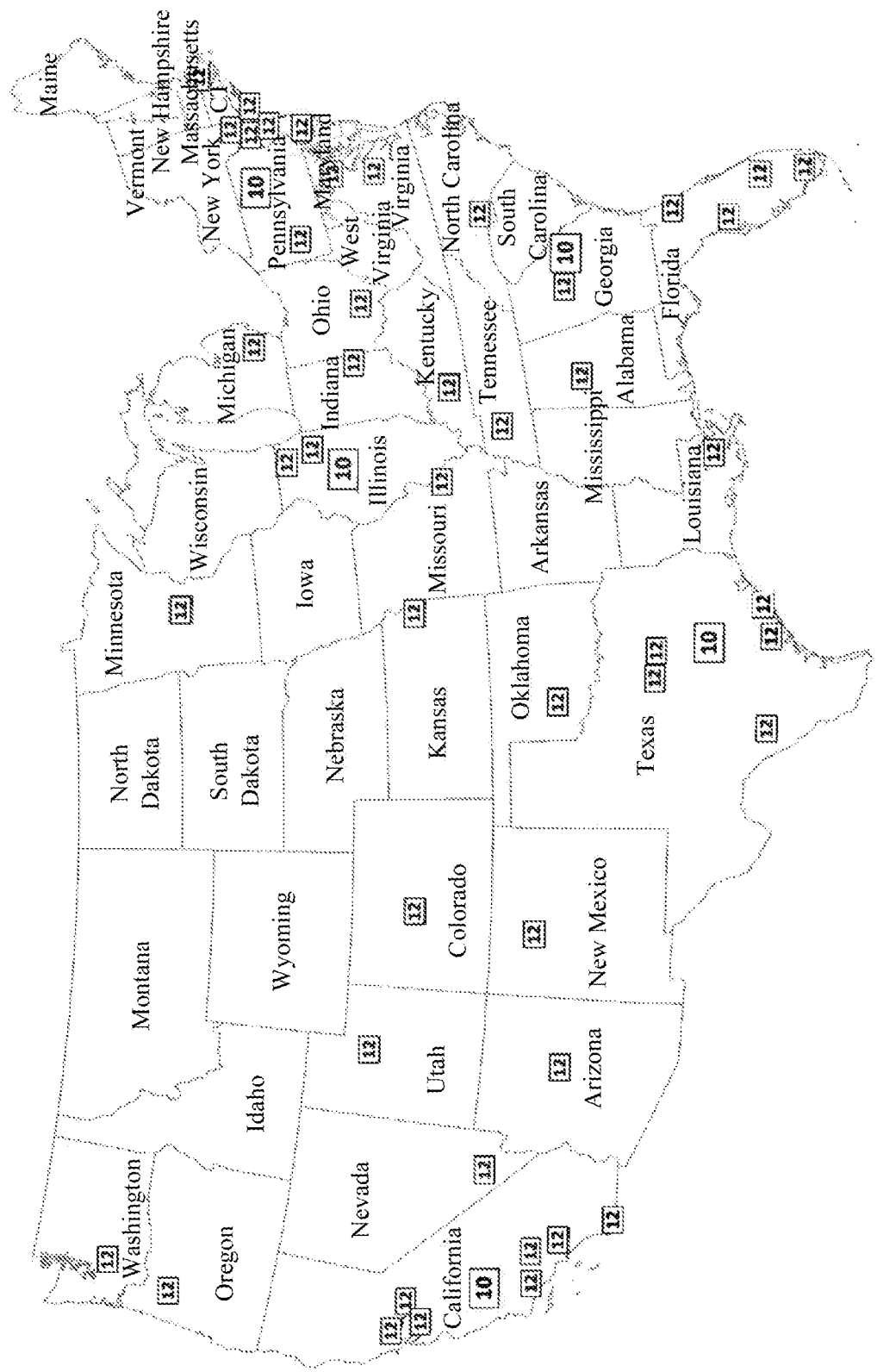
FIG. 1A illustrates distribution, on a national scale, of mega and macro facilities of a multi-nodal supply chain system, according to an embodiment herein.

Various aspects of the present disclosure may be embodied as a system of components and/or structures, a method, and/or non-transitory, computer-readable storage media having one or more computer-readable program codes stored thereon. Accordingly, various embodiments of the present disclosure may take the form of a combination of hardware and software embodiments comprising, for example, mechanical structures along with electronic components, computing components, circuits, microcode, firmware, software, etc.

FIGS. 1A-1D illustrate a national supply chain ecosystem comprising a four-tiered hierarchical network of facilities of different types or categories, according to an embodiment herein. The national supply chain ecosystem implements a multi-nodal supply chain system comprising a network of multiple interconnected entities configured to execute a supply chain workflow using transportable and continuously trackable storage bins. In an embodiment, the multi-nodal supply chain system is implemented as a continuous and contiguous fulfilment as a service (FaaS) network. The multi-nodal supply chain system disclosed herein is a predictive and prescriptive, collaborative network that implements class-based, proximity-based fulfilment where inventory items or products are fulfilled from the closest endpoint to a destination address. The interconnected entities comprise a network of node facilities, a fleet of inter-nodal transport vehicles, and multiple storage bins storable within the network of node facilities, transportable between the node facilities, and continuously trackable in real-time throughout the multi-nodal supply chain system as disclosed in the detailed descriptions of FIGS. 2A-2B. The multi-nodal supply chain system disclosed herein is implemented as a single continuous organism with a variety of differing, connected, purpose-built organs or components, rather than discrete transactional entities.

As used herein, "storage bins" refer to smart, standardized storage units configured to contain, store, and transport inventory and customer orders through the multi-nodal supply chain system. The storage bins comprising, for example, downstream-headed and upstream-headed single-compartment storage (SCS) bins, multi-compartment storage (MCS) bins, order bins such as picked-order (PO) bins, finished-order (FO) bins, etc., are all smart storage bins as disclosed below. The multi-nodal supply chain system is configured for compatibility, storage, transport, and movement of the storage bins. The storage bins disclosed herein act as a master to the other interconnected entities, for example, the node facilities, the fleet of inter-nodal transport vehicles, robotic handlers, etc., of the multi-nodal supply chain system. The storage bins associate their respective bin identifiers to logistics instructions, for example, destination locations, and process level instructions, for example, environmental requirements, packing instructions, etc. In an embodiment, the storage bins disclosed herein have a single form factor and structure for interfacing with standard, compliant robotics and the inter-nodal transport vehicles throughout the multi-nodal supply chain system. The storage bins dictate and control their own actions, course, and journey through the multi-nodal supply chain system with the facilities, the robotic handlers, and the inter-nodal transport vehicles acting as enablers to the commands of the storage bins. That is, all the interconnected entities within the multi-nodal supply chain system incorporate material handling equipment specifically configured to manage the storage bins.

Figure 1B:
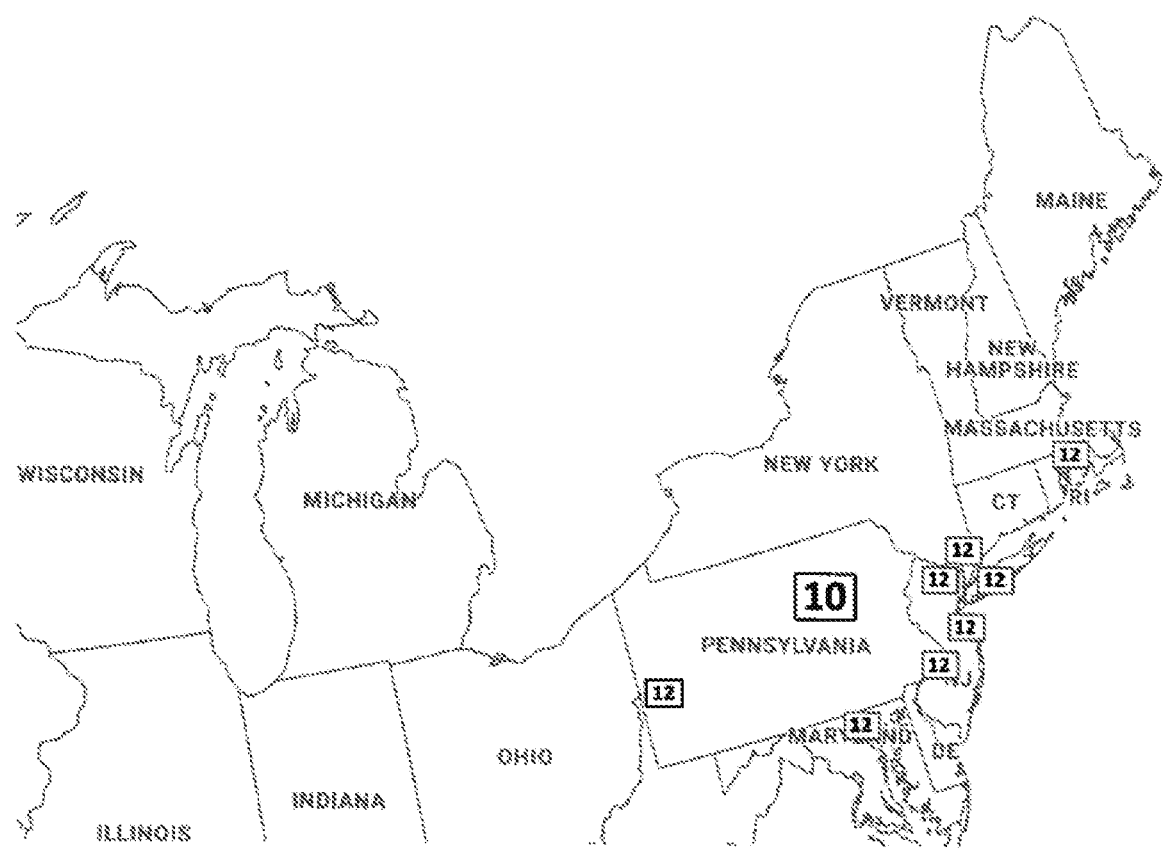
FIG. 1B illustrates distribution, on a regional level, of the mega and macro facilities of the multi-nodal supply chain system, according to an embodiment herein.
Figure 1C:
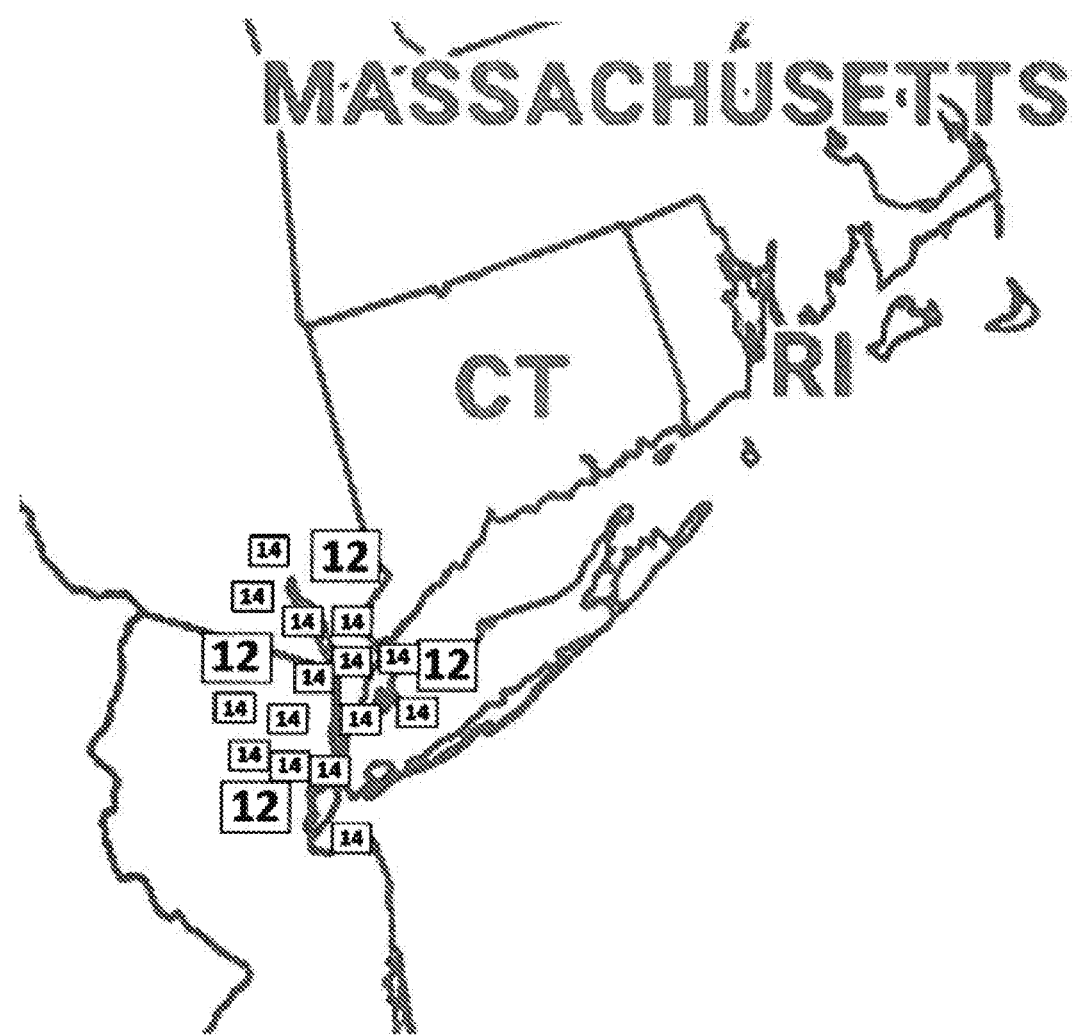
FIG. 1C illustrates distribution, on a civic level, of macro and micro facilities of the multi-nodal supply chain system, according to an embodiment herein.
Figure 1D:
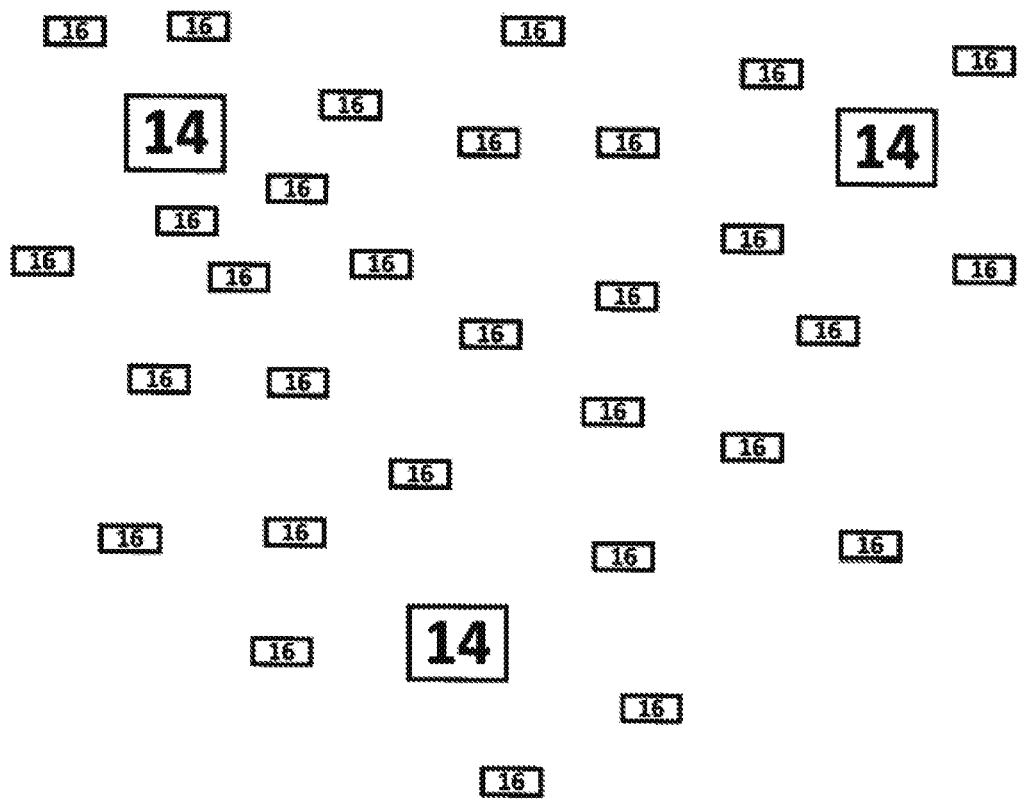
FIG. 1D illustrates distribution, on a divisional level, of micro and nano facilities of the multi-nodal supply chain system, according to an embodiment herein.

As illustrated in FIGS. 1A-1D, the network of node facilities comprises mega facilities 10, macro facilities 12, micro facilities 14, and nano facilities 16. FIG. 1A illustrates distribution, on a national scale, of the mega facilities 10 and the macro facilities 12 of the multi-nodal supply chain system, according to an embodiment herein. In an embodiment, the multi-nodal supply chain system is configured as a national supply chain network. FIG. 1B illustrates distribution, on a regional level, of the mega facilities 10 and the macro facilities 12 of the multi-nodal supply chain system, according to an embodiment herein. FIG. 1C illustrates distribution, on a civic level, of the macro facilities 12 and the micro facilities 14 of the multi-nodal supply chain system, according to an embodiment herein. FIG. 1D illustrates distribution, on a divisional level, of the micro facilities 14 and the nano facilities 16 of the multi-nodal supply chain system, according to an embodiment herein. In this ordered, multi-nodal supply chain system, the quantity of node facilities in each category increases from one category to the next, while the individual size of each facility reduces from one category to the next. That is, there are fewer mega facilities 10 than macro facilities 12, fewer macro facilities 12 than micro facilities 14, and fewer micro facilities 14 than nano facilities 16. The macro facilities 12 are smaller than the mega facilities 10, the micro facilities 14 are smaller than the macro facilities 12, and the nano facilities 16 are smaller than the micro facilities 14. In an embodiment, the mega facilities 10 form entry points at which inventory items or products from manufacturers or suppliers first enter the network of node facilities, while the nano facilities 16 form exit points from which inventory items or products depart the network of node facilities. In other embodiments, the inventory items may enter and depart the network of node facilities at various points. Unless otherwise disclosed, the terms "inventory items" and "products" are used interchangeably herein.

The network of node facilities, along with the inter-nodal transport vehicles used for transporting inventory items between the node facilities, collectively form a supply chain ecosystem that may be owned and operated by a singular operating entity, under whose control and responsibility the inventory items remain from their initial receipt from external suppliers to their final release to customers or an outside last mile or last leg delivery service. In an embodiment, the operating entity is contracted to manage inventory and order fulfillment on behalf of other external entities, for example, vendors, that sell to customers or other businesses. In an embodiment, the operating entity's supply chain ecosystem is supplemented by like-equipped supply chain or distribution channel facilities and/or transport vehicles of one or more larger vendors that partner with or contract the operating entity to exploit the large collective supply chain ecosystem cooperatively formed therebetween.

For purposes of illustration, the multi-nodal supply chain system disclosed herein is implemented in a national supply chain ecosystem as illustrated in FIGS. 1A-1D; however, the particular geographic area over which the network of node facilities of the multi-nodal supply chain system is distributed is not limited to one of national scope and may expand beyond national boundaries, or may be limited to a sub-region of lesser expanse, regardless of whether such sub-region spans across one or more international borders. In an embodiment, at least some of the mega facilities 10 are located in coastal regions near major shipping ports, thereby accommodating arrival of incoming manufacturer or supply shipments via ocean freight. In an embodiment, the macro facilities 12 are located in or proximate to large population centers, for example, metropolitan areas and/or major shipping hubs, in a quantity of one macro facility 12 per such population center or shipping hub. In an embodiment, at least one micro facility 14, and in another embodiment, a plurality of micro facilities 14 are also included at these large population centers. Smaller cities have macro facilities 12, though typically at a ratio of one macro facility 12 per such city, or one macro facility 12 shared between cities of notable proximity. Each city has a plurality of micro facilities 14 exceeding the quantity macro facilities 12 found in or near such city, and a plurality of nano facilities 16 of even greater quantity than the micro facilities 14.

The mega facilities 10, the macro facilities 12, and the micro facilities 14, each comprises at least one loading dock, and in an embodiment, multiple loading docks, particularly at the mega facilities 10 and the macro facilities 12, for allowing simultaneous loading and unloading of multiple transport vehicles, and/or cross-docking operations between transport vehicles at inbound and outbound loading docks. In the multi-nodal supply chain system disclosed herein, each node facility in the network of node facilities from the mega facilities 10 to the nano facilities 16 comprises a respective array of indexed storage locations, herein referred to as an "indexed storage array". In an embodiment, at each of the mega facilities 10, the macro facilities 12, and the micro facilities 14, the indexed storage array is defined at least partially by one or more three-dimensional gridded storage structures of the type illustrated in FIG. 8, which is served by a fleet of robotic storage and retrieval vehicles, herein referred to as "robotic handlers" operable to traverse the gridded storage structure in three dimensions to deposit and extract storage bins to and from the three-dimensional gridded storage structure. Such three-dimensional gridded storage structures, robotic storage and retrieval vehicles and compatible storage bins are disclosed in Applicant's U.S. patent application Ser. Nos. 15/568,646; 16/374,123, 16/374,143; and Ser. No. 16/354,539; each of which is incorporated herein by reference in its entirety.

Figure 2A:
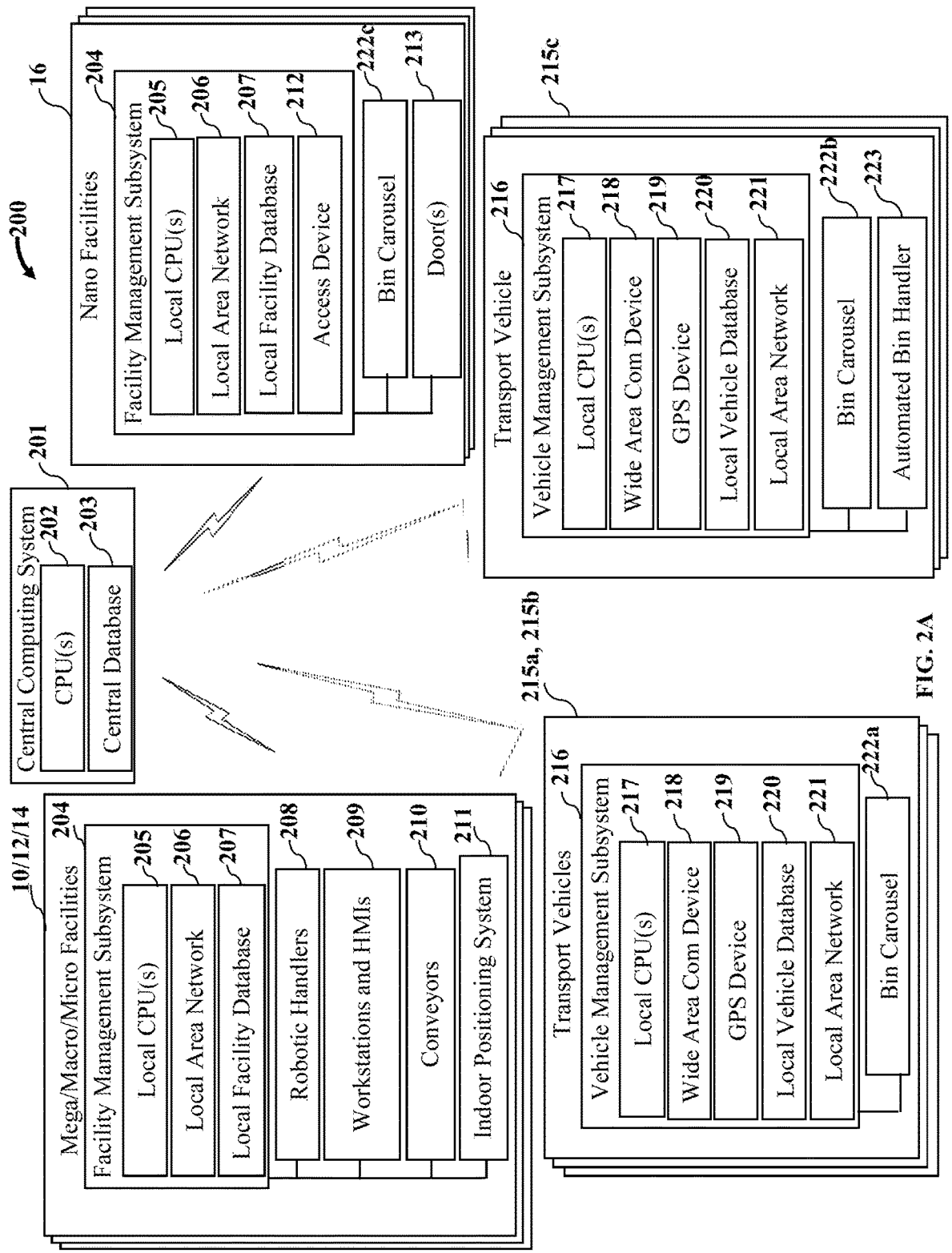
FIG. 2A illustrates a functional block diagram of the multi-nodal supply chain system for executing a supply chain workflow using transportable and continuously trackable storage bins, according to an embodiment herein.

FIG. 2A illustrates a functional block diagram of the multi-nodal supply chain system 200 for executing a supply chain workflow using transportable storage bins, according to an embodiment herein. The multi-nodal supply chain system 200 comprises a computerized supply chain management system (CSCMS) 201, 204, and 216 for monitoring and controlling movement of storage bins and order bins throughout the multi-nodal supply chain system 200. The CSCMS controls and monitors induction, storage, transport, and tracking of inventory contained in the storage bins and fulfillment of customer orders therefrom, within the multi-nodal supply chain system 200. The CSCMS comprises multiple computer systems that are programmable using high-level computer programming languages. In an embodiment as illustrated in FIG. 2A, the CSCMS is a combination of a central computing system 201, a computerized facility management subsystem 204 configured at each of the mega facilities 10, the macro facilities 12, the micro facilities 14, and the nano facilities 16, and a computerized vehicle management subsystem 216 configured in each of the inter-nodal transport vehicles 215a, 215b, and 215c. The CSCMS is implemented using programmed and purposeful hardware.

The central computing system 201 comprises one or more computers comprising one or more processors, for example, central processing units (CPUs) 202 connected to a network interface coupled to a communication network, for example, the internet or other wide area network, and one or more data storage devices comprising non-transitory, computer-readable storage media or memory among which there is stored executable software for execution by the processors to execute multiple processes disclosed herein. As used herein, "non-transitory, computer-readable storage media" refers to all computer-readable media, for example, non-volatile media, volatile media, and transmission media, except for a transitory, propagating signal. Non-volatile media comprise, for example, solid state drives, optical discs or magnetic disks, flash memory cards, a read-only memory (ROM), etc. Volatile media comprise, for example, a register memory, a processor cache, a random-access memory (RAM), etc. Transmission media comprise, for example, coaxial cables, copper wire, fiber optic cables, modems, etc., including wires that constitute a system bus coupled to a processor. The data storage devices comprise one or more databases, for example, a central database 203 in which, among other data disclosed below, stores unique bin identifiers (Bin_IDs)

of all the storage bins and order bins 224a-224d in the multi-nodal supply chain system 200 illustrated in FIGS. 3E-3F and FIGS. 4A-4B, unique identifiers (Vendor_IDs) of multiple vendors who have contracted or subscribed to the services of the operating entity for the purpose of inventory storage and order fulfillment within the multi-nodal supply chain system 200; and respective inventory catalogues of inventory items or products that are offered by the vendors to their customers, and are stored or storable within the multi-nodal supply chain system 200. As used herein, the term "central" in relation to the central computing system 201 and the central database 203 hosted thereby merely denotes its status as a shared resource operably connected to each of the node facilities 10, 12, 14 and 16 and each of the inter-nodal transport vehicles 215a, 215b, and 215c of the multi-nodal supply chain system 200, and does not denote that its components must all reside at a common location.

As used herein, "communication network" refers, for example, to one of the internet, a wireless network, a communication network that implements Bluetooth of Bluetooth Sig, Inc., a network that implements Wi-Fi® of Wi-Fi Alliance Corporation, an ultra-wideband (UWB) communication network, a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks. The communication network allows the facility management subsystems 204 to communicate with each other and with the central computing system 201.

In an embodiment, the CSCMS 201, 204, and 216 is implemented in a cloud computing environment. As used herein, "cloud computing environment" refers to a processing environment comprising configurable computing physical and logical resources, for example, networks, servers, storage media, virtual machines, applications, services, etc., and data distributed over a communication network. The cloud computing environment provides an on-demand network access to a shared pool of the configurable computing physical and logical resources. The CSCMS 201, 204, and 216 is a cloud computing-based platform implemented as a service for executing a supply chain workflow with two-way logistics using transportable storage bins. In this embodiment, the central computing system 201 and the central database 203 are herein referred to as a cloud-based computer platform and a cloud database respectively. In an embodiment, the facility management subsystem 204 is implemented as an on-premise software installed and run on computers on the premises of each of the node facilities 10, 12, 14, and 16. In an embodiment, the vehicle management subsystem 216 is implemented as an on-premise software installed and run on computers on the premises of each of the inter-nodal transport vehicles 215a, 215b, and 215c.

The computerized facility management subsystem 204 is respectively installed at each of the node facilities 10, 12, 14, and 16 in the multi-nodal supply chain system 200. Each facility management subsystem 204 comprises one or more local computers comprising one or more processors, for example, central processing units (CPUs) 205 connected to a network interface coupled to the communication network, for example, the internet or other wide area network, and one or more data storage devices comprising non-transitory, computer-readable storage media in which there is stored executable software for execution by one more processors to execute multiple processes disclosed herein. The data storage devices comprise one or more databases, for example, a respective local facility database 207 for storing data pertinent to the respective facility. In addition to their connection to the wide area network, the local computers of the facility management subsystem 204 are installed in one or more local area networks 206, for example, local wireless networks, of the facility, by which at least one of the local computers are communicable with automated bin handling equipment of the facility. The automated bin handling equipment comprises, for example, the robotic handlers 208 at the mega facilities 10, the macro facilities 12, and the micro facilities 14, and various conveyors 210 and other handling equipment disclosed below in select embodiments. Over the local area networks 206, at least one of the local computers of the facility management subsystem 204 also communicates with workstations and other equipment and devices comprising, for example, stationary and/or mobile human-machine interfaces (HMIs) 209 for guiding performance of various tasks by human workers, conveyors 210, and the storage bins of the multi-nodal supply chain system 200. In an embodiment, the multi-nodal supply chain system 200 further comprises an indoor positioning system 211 in operable communication with the facility management subsystem 204 of each of the node facilities 10, 12, 14, and 16 for real-time tracking of each of the storage bins as disclosed in the detailed description of FIG. 2B. In an embodiment, the facility management subsystem 204 is operably and communicatively coupled to bin handling equipment, for example, bin carousels 222c and doors 213, for example, openable delivery doors and openable pickup doors at each of the nano facilities 16 as disclosed in the detailed descriptions of FIGS. 21A-21C.

The computerized vehicle management subsystem 216 is respectively installed in each of the inter-nodal transport vehicles 215a, 215b, and 215c of the multi-nodal supply chain system 200. Each vehicle management subsystem 216 comprises one or more local computers comprising one or more processors, for example, central processing units (CPUs) 217 connected to one or more data storage devices comprising non-transitory, computer-readable storage media in which there is stored executable software for execution by the processors to execute multiple processes disclosed herein. The data storage devices comprise a respective local vehicle database 220 that stores data pertinent to that particular transport vehicle and the transported contents thereof. In an embodiment, a wireless communications unit is operably coupled to each of the inter-nodal transport vehicles 215a, 215b, and 215c. The wireless communications unit, for example, a wide area communication device 218, is configured to communicate the location of each of the inter-nodal transport vehicles 215a, 215b, and 215c and the location of any one of the storage bins to the CSCMS during transport of the storage bins between the node facilities 10, 12, 14, 16. For example, the processors of the vehicle management subsystem 216 are connected to a wireless wide area communications device 218, for example, a cellular communications device, for mobile communication with the central computing system 201 over a wireless wide area network, for example, a cellular network. In an embodiment, a positioning unit, for example, a global positioning system (GPS) device 219 is operably coupled to each of the inter-nodal transport vehicles 215a, 215b, and 215c. The positioning unit is configured to determine a location of each of the inter-nodal transport vehicles 215a, 215b, and 215c and in turn determine a location of any one of the storage bins being transported in each of the inter-nodal transport vehicles 215a, 215b, and 215c. The GPS device 219 is also connected to at least one processor of at least one of the local computers of each transport vehicle 215a, 215b, and 215c for tracking the movement of the respective transport vehicles 215a, 215b, and 215c via the GPS and sharing the calculated GPS coordinates of the respective transport vehicles 215a, 215b, and 215c to the respective local computers for communication onward to the central computing system 201. In an embodiment, the GPS device 219 of each of the transport vehicles 215a, 215b, and 215c communicates directly with the central computing system 201 to report the GPS coordinates thereto, independent of the local computers of the vehicle management subsystem 216. In an embodiment, the local computers of the vehicle management subsystem 216 are installed in a local area network 221 by which at least one of the local computers is communicable with the storage bins of the multi-nodal supply chain system 200. In an embodiment, the vehicle management subsystem 216 is operably and communicatively coupled to bin handling equipment, for example, bin carousels 222a and 222b installed in the transport vehicles 215a, 215b, and 215c. In an embodiment, the vehicle management subsystem 216 is operably and communicatively coupled to one or more automated bin handlers 223 installed in a small-scale transport vehicle 215c that transports order bins to the nano facilities 16.

The processors disclosed above refer to any one or more microprocessors, CPU devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. In an embodiment, each of the processors is implemented as a processor set comprising, for example, a programmed microprocessor and a math or graphics co-processor. The CSCMS is not limited to employing processors. In an embodiment, the CSCMS employs controllers or microcontrollers.

The network interfaces disclosed above are, for example, one or more of infrared interfaces, interfaces implementing Wi-Fi® of Wi-Fi Alliance Corporation, universal serial bus interfaces, FireWire® interfaces of Apple Inc., Ethernet interfaces, frame relay interfaces, cable interfaces, digital subscriber line interfaces, token ring interfaces, peripheral controller interconnect interfaces, local area network interfaces, wide area network interfaces, interfaces using serial protocols, interfaces using parallel protocols, Ethernet communication interfaces, asynchronous transfer mode interfaces, high speed serial interfaces, fiber distributed data interfaces, interfaces based on transmission control protocol/internet protocol, interfaces based on wireless communications technology such as satellite technology, radio frequency technology, near field communication, etc.

The databases of the multi-nodal supply chain system 200, for example, the central database 203, the local facility databases 207, and the local vehicle databases 220 refer to any storage area or media that can be used for storing data and files. The databases can be, for example, any of a structured query language (SQL) data store or a not only SQL (NoSQL) data store such as the Microsoft® SQL Server®, the Oracle® servers, the MySQL® database of MySQL AB Limited Company, the mongoDB® of MongoDB, Inc., the Neo4j graph database of Neo Technology Corporation, the Cassandra database of the Apache Software Foundation, the HBase® database of the Apache Software Foundation, etc. In an embodiment, the databases can also be locations on file system. In another embodiment, the databases can be remotely accessed by the CSCMS 201, 204, and 216 via the communication network. In another embodiment, the databases are configured as cloud-based databases implemented in a cloud computing environment, where computing resources are delivered as a service over the communication network.

Figure 2B:
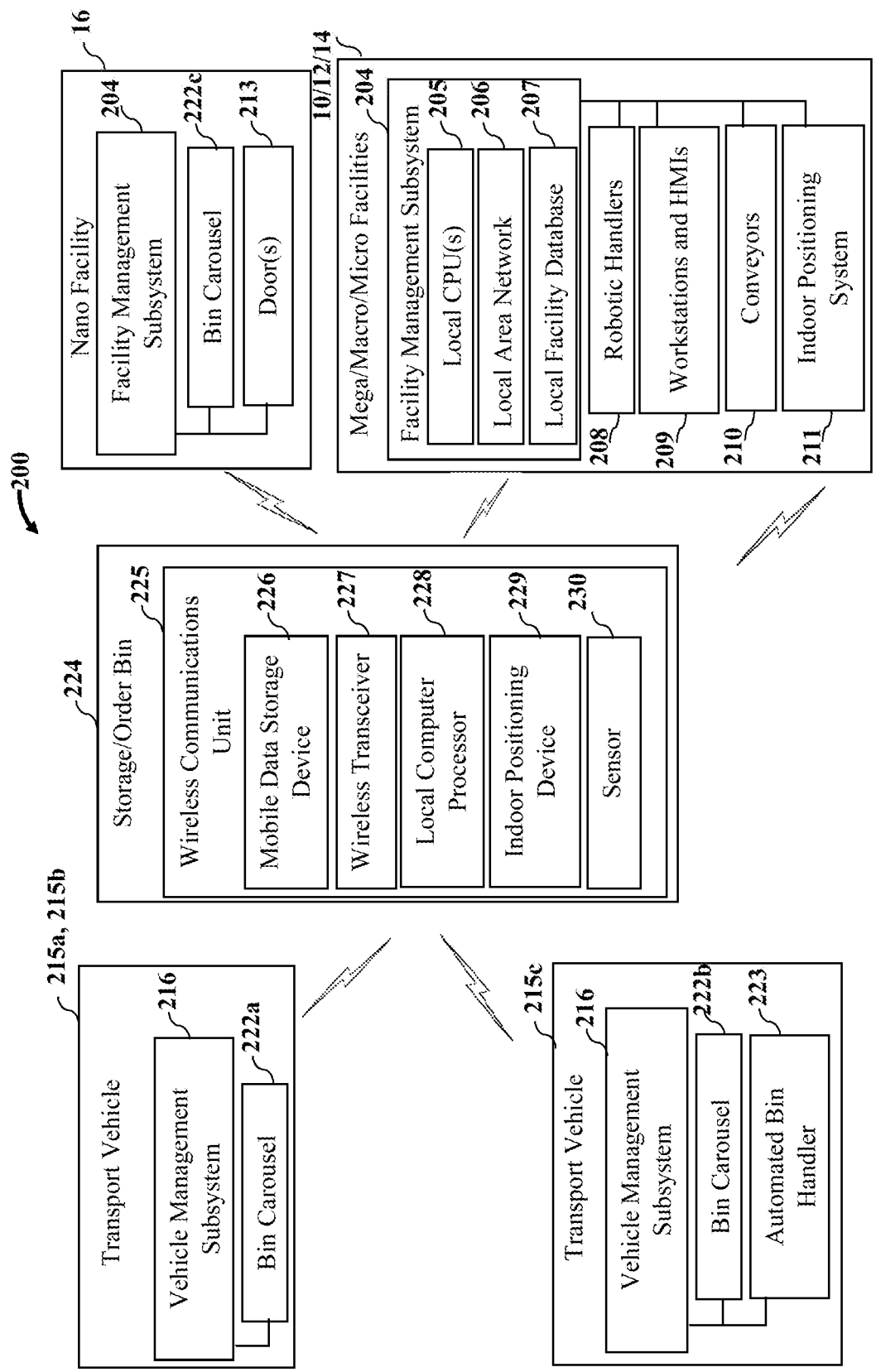
FIG. 2B illustrates a functional block diagram showing configuration and use of storage bins for containing, storing, and transporting inventory and customer orders within the multi-nodal supply chain system, according to an embodiment herein.

FIG. 2B illustrates a functional block diagram showing configuration and use of storage bins 224 for containing, storing, and transporting inventory and customer orders within the multi-nodal supply chain system 200, according to an embodiment herein. The storage bins 224 are in operable communication with the node facilities 10, 12, 14, and 16 and the transport vehicles 215a, 215b, and 215c for executing a supply chain workflow with two-way logistics. In an embodiment, the storage bins 224 are of a predetermined size and configuration compatible with the arrays of indexed storage locations at the mega facilities 10, the macro facilities 12, and the micro facilities 14. Some of the storage bins 224 are configured as order bins for compatibility with bin handling equipment, for example, bin carousels 222a and 222b of the transport vehicles 215a, 215b, and 215c travelling between the node facilities 10, 12, 14, and 16. In an embodiment, the storage bins 224 are divided into the following categories: storage bins for holding inventory items of multiple vendors therein, picked-order bins (PO bins) for holding of picked-order inventory items therein, and finished-order bins (FO bins) for holding finished orders.

In an embodiment, the storage bins 224 are further categorized into the following storage bin subcategories: single-compartment storage bins (SCS bins) and multi-compartment storage bins (MCS bins). Each SCS bin comprises a single undivided internal storage space and thus configured to hold either a singular item or an "each" of vendor inventory therein, or multiple items or "eaches" of vendor inventory that are of a matching item type to one another. The internal storage space of each MCS bin is subdivided into multiple compartments and thus configured to hold mixed inventory items of different item types, optionally organized on a compartmental basis. The MCS bin is used for separately storing inventory items of different item types in different respective compartments, or separately storing inventory items owned by different vendors in different respective compartments. In an embodiment, the PO bins are multi-compartment bins with subdivided interior spaces, similar to the MCS bins, whereby each PO bin is configured to receive the contents of multiple customer orders therein, with the respective content of each customer order being placed in a different subset of the PO bin's compartments to maintain physical isolation of the customer orders from one another. For example, for small customer orders, each individual customer order occupies one respective compartment of the PO bin, while in the case of large customer orders, an individual customer order occupies multiple, or even all, compartments of the PO bin.

In the second category of order bins, the FO bins are differently sized and optionally differently configured, from the other types of storage bins. This second category of order bins is particularly sized and configured for compatibility with the indexed storage array of each nano facility 16, and with the indexed storage array of the transport vehicles 215c that specifically travels between the micro facilities 14 and the nano facilities 16. In an embodiment, the FO bin is a single compartment bin configured to receive only the contents of a single individual finished order therein, that has been appropriately packaged and packed into a finished state for pickup by a customer or by delivery personnel, or for a last mile delivery to the end customer.

The storage bins 224 of different categories disclosed above are electronic, smart bins capable of exchanging data with the facility management subsystems 204 and the vehicle management subsystems 216 to execute intelligent, bin-driven navigation of the storage bins 224 throughout the multi-nodal supply chain system 200. In an embodiment as illustrated in FIG. 2B, each of the storage bins 224 in the multi-nodal supply chain system 200 comprises a mobile data storage device 226 operably coupled to each of the storage bins 224. The mobile data storage device 226 comprises a non-transitory, computer-readable storage medium configured to store a unique bin identifier of a respective storage bin 224 and the bin data associated with the inventory items contained in respective storage bins 224. For example, the mobile data storage device 226 comprises a computer-readable memory configured to store a static Bin_ID of the storage bin 224 along with other variable data concerning the contents carried in the storage bin 224 at any given time. In an embodiment, the mobile data storage device 226 on each storage bin 224 is part of a wireless communications unit 225. In an embodiment, the wireless communications unit 225 further comprises a wireless transceiver 227 and a local computer processor 228 that is connected to the mobile data storage device 226 and to the wireless transceiver 227, whereby reading and writing of data to and from the mobile data storage unit 226 of the storage bin 224 by the facility management subsystem 204 or the vehicle management subsystem 216 at any of the node facilities 10, 12, 14, and 16 or any of the transport vehicles 215a, 215b, and 215c is performed wirelessly, for example, using the local area network 206 of the facility management subsystem 204 or the local area network 221 of the vehicle management subsystem 216.

In an embodiment where the node facilities 10, 12, and 14 employ robotic handlers 208 to serve their respective arrays of indexed storage locations, the same wireless network, for example, the local area network 206, is used by one or more computers of the facility management subsystem 204 to wirelessly control the robotic handlers 208. In an embodiment, each storage bin 224 further comprises an indoor positioning device 229 for co-operable wireless communication with the indoor positioning system 211 of each of the node facilities 10, 12, 14 illustrated in FIG. 2A, to track movement and location of the storage bins 224 within the node facilities 10, 12, 14, even when the storage bins 224 are positioned or moving outside the arrays of the indexed storage locations therewithin. The indoor positioning device 229 is operably coupled to each of the storage bins 224 and to the indoor positioning system 211 installed at each of the node facilities 10, 12, 14. The indoor positioning device 229 in each of the storage bins 224 is configured to operably communicate with the indoor positioning system 211 to determine and report a position of each of the storage bins 224 within each of the node facilities 10, 12, 14 for real-time tracking of each of the storage bins 224. In an embodiment, at least one sensor 230 is operably coupled to each storage bin 224 for detecting movement of the storage bin 224, and in response to the detected movement, initiating positional tracking of the storage bin 224 through the multi-nodal supply chain system 200. The sensor 230 operably coupled to the storage bin 224 tracks the contents of the storage bin 224, inter-facility transfers of the storage bin 224, and allows determination of processing required for the storage bin 224 and its contents. In an embodiment, the sensor 230 is an active internet-of-things (IoT) sensor that dictates its own actions, course, and journey through the multi-nodal supply chain system 200 with the node facilities 10, 12, 14, and 16, the robotic handlers 208, and the inter-nodal transport vehicles 215a, 215b, and 215c acting as enablers to the commands of the storage bin 224.

Figure 3A:
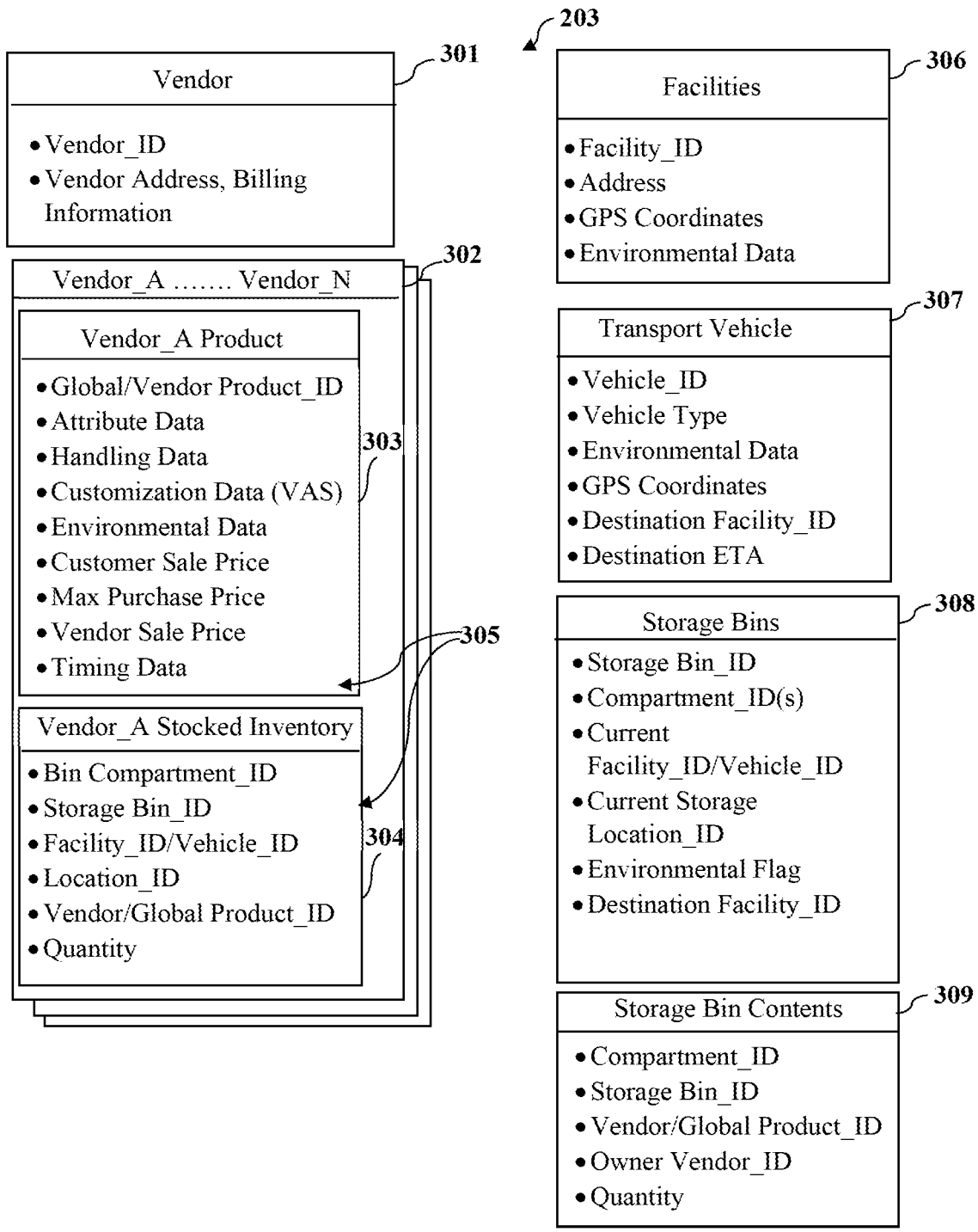
FIGS. 3A-3B illustrate a central database of the multi-nodal supply chain system, according to an embodiment herein.
Figure 3B:
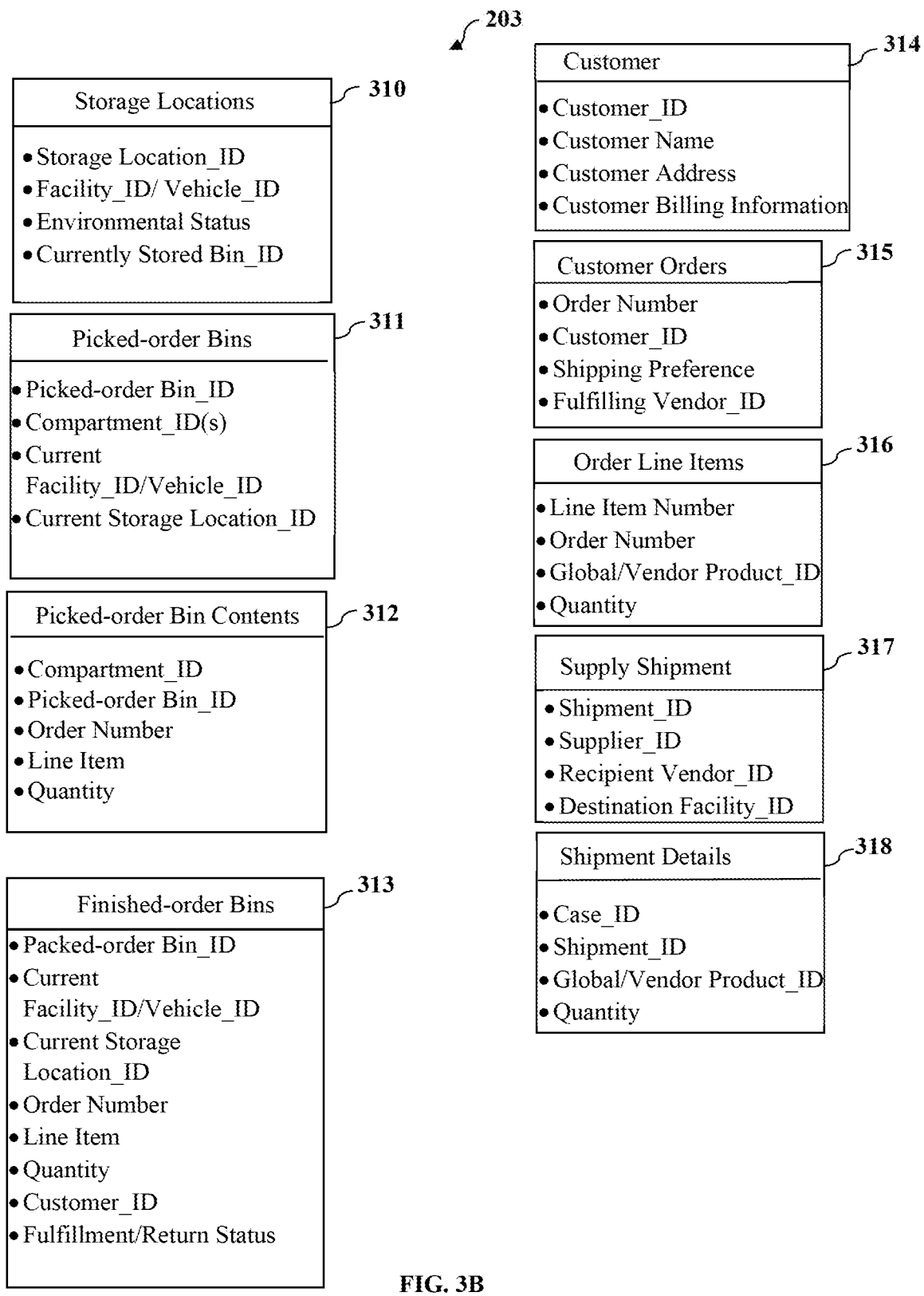

FIGS. 3A-3B illustrate the central database 203 of the multi-nodal supply chain system 200 shown in FIG. 2A, according to an embodiment herein. In an embodiment of an organizational scheme of the central database 203, the central database 203 comprises a vendor table 301, a vendor's product table 303, a vendor's stocked inventory table 304, a facilities table 306, a transport vehicle table 307, a storage bins table 308, a storage bin contents table 309, a storage locations table 310, a picked-order bins table 311, a picker-order (PO) bin contents table 312, a finished-order (FO) bins table 313, a customer table 314, a customer order table 315, an order line items table 316, a supply shipment table 317, and a shipment details table 318. The vendor table 301 contains vendor identifiers (Vendor_IDs) and other details of subscribing vendors 302, for example, their official corporate names, addresses, and billing information. For each vendor identified in the vendor table 301, a respective vendor's product table 303 and vendor's stocked inventory table 304 co-operably define a vendor's product catalogue 305 for that particular vendor in the central database 203. For each product type carried by that vendor, a respective record in the vendor's product table 303 contains at least one unique product identifier (Product_ID) of that particular product type. The unique product identifier comprises at least one global product identifier (Global Product_ID), for example, a universal product code (UPC), by which the product type is recognizable to all subscribing vendors 302 for purposes that will become apparent further below with respect to particular embodiments. In an embodiment, a vendor-specific product identifier (Vendor Product_ID), for example, a stock keeping unit (SKU) code, is stored in each record of the vendor's product table 303. In embodiments not requiring shared identifiability of products among the different subscribing vendors 302, an SKU code or another Vendor Product_ID is used alone, without an accompanying Global Product_ID of a standardized format readable by the other subscribing vendors 302.

In an embodiment, each product record in the vendor's product table 303 comprises one or more product attributes of the product concerned, for example, size, color, etc.; vendor-specific product handling data that defines particular actions or conditions that must be fulfilled for that product type while the product moves within the multi-nodal supply chain system 200; vendor-specific customization data that defines performance of one or more modifications to the product by the operating entity based on value-added services (VAS), for example, re-packaging, labeling, price tagging, security tagging, etc., offered thereby; environmental data concerning controlled-environment requirements, or a lack thereof, for the particular product, for example, as may be necessitated by the nature of the product itself to prevent damage, leakage, or spoilage thereof or avoid, prevent, and/or minimize hazards presented thereby, etc.

Examples of the product handling data comprise flags, codes, or instructions relating to: product packing requirements such as placement of heavy or leak-prone items at the bottom of a multi-item order, placement of light or fragile items at the top of a multi-order item, grouping or separation of items by product category, etc.; and packaging requirements concerning selection and application of particular packaging types for a particular product, such as wrapping of products in tissue, bubble wrap, gift wrap, or other wrapping material, placement of products in bags, boxes or other containers, and selection from among differently branded, stylized, sized, or gauged wrapping materials, bags, boxes or containers, etc. Other examples of product handling data comprise flags, codes, or instructions relating to storage and/or handing of volatile, flammable or otherwise hazardous items requiring particular routing to, or processing or handling in, specially equipped facilities, facility zones, facility workstations, or transport vehicles; and flags, codes or instructions for allergenically-safe handling of food items to avoid cross-contamination. Examples of the environmental data comprise an indication of a freezer-storage requirement for frozen food items, an indication of a refrigeration-storage requirement for chilled but non-frozen food items, an indication of ambient-storage acceptability for general items requiring no particular controlled-environment conditions, etc. In an embodiment, the CSCMS uses the environmental data to determine and control placement of a product in various environmentally distinct or environmentally-controlled storage zones or areas in the node facilities and the transport vehicles of the multi-nodal supply chain system 200.

Any one or more of the product handling data, customization data, and environmental data are categorized according to different stages in the multi-nodal supply chain system 200 at which the flagged precautions and prescribed instructions are to be noted or followed, for example, for differentiating between actions to be taken while the product is grouped with matching products and conveyed in a single-compartment storage (SCS) bin such that the same customization tasks or VAS actions are carried out on the matching products of a vendor's inventory prior to picking thereof for order fulfillment, versus other actions to be taken further downstream, such as packaging and packing flags, codes or instructions applicable to final packaging and packing of a completed customer order.

In an embodiment, each product record in the vendor's product table 303 further comprises a customer sale price at which the product is intended to be sold to customers of the vendor, a maximum purchase price, and a vendor sale price at which the product may be offered for sale to other vendors, for example, to fulfill inventory shortfalls thereof. In an embodiment, each product record in the vendor's product table 303 comprises timing data concerning any timing restraints on the inventory. The vendor's stocked inventory table 304 of each vendor's respective product catalogue 305 is populated with sufficient data for identifying, whether directly or through relation to the other tables of the central database 203, the particular product quantities and whereabouts of in-stock products currently inventoried in the supply chain ecosystem on behalf of the vendor. Each stock record in the vendor's stocked inventory table 304 contains some or all of the following: a compartment identifier (Compartment_ID) of a particular compartment of a storage bin in which one or more in-stock products of the vendor are currently stored; the respective Bin_ID of that storage bin to which the compartment belongs; a unique facility identifier (Facility_ID) of a particular facility at which the storage bin currently resides or a unique vehicle identifier (Vehicle_ID) of a particular transport vehicle on which the storage bin currently resides; the vendor and/or global Product_ID of one or more in-stock products in the compartment of the storage bin; the quantity of one or more in-stock products in the compartment of the storage bin; and a unique location identifier (Location_ID) of a particular storage location at which the storage bin resides in the array of indexed storage locations of the facility or the transport vehicle, if currently stowed in an array of indexed storage locations. In embodiments employing subdivided multi-compartment storage (MCS) bins, each stock record in the vendor's stocked inventory table 304 contains, at minimum, the Product_ID(s) and the Compartment_ID, from which the other optional record contents disclosed above can be derived through relation with the other tables illustrated in FIGS. 3A-3B. In embodiments where no subdivided MCS bins are used, then the Compartment_ID field can be omitted and substituted by inclusion of the Bin_ID with the Product_ID(s) to fulfill the equivalent functional purpose.

In FIG. 3A, the Facility_ID/Vehicle_ID, Location_ID, and Bin_ID are included in the vendor's stocked inventory table 304 to illustrate the various data than can be pulled from the central database 203 in response to a query for a particular Product_ID. In an embodiment, the data is pulled through a relation to the other tables without having to redundantly include such data in the vendor's stocked inventory table 304. Likewise, it will be appreciated that the illustration of redundant data among the other tables disclosed herein is for a similar explanatory purpose, and that a more normalized database structure may be implemented in practice to reduce such data redundancies.

As illustrated in FIG. 3A, the facilities table 306 of the central database 203 comprises records, each containing a static field with the Facility_ID of a respective facility, and additional relevant information concerning that facility, such as a street address and/or global positioning system (GPS) coordinates thereof, and in an embodiment, environmental data for identifying whether the facility has environmentally controlled storage capabilities, for example, refrigeration storage zones and/or freezer storage zones, or only ambient storage zones. In an embodiment, if all facilities throughout the multi-nodal supply chain system 200 are equipped with an equal variety of environmentally distinct storage zones, then this environmental data is omitted from the facilities table 306. The transport vehicle table 307 of the central database 203 comprises records, each containing at least a static field with the Vehicle_ID of a respective transport vehicle of the multi-nodal supply chain system 200 and a variable destination field for the Facility_ID of a facility to which the transport vehicle is subsequently destined to travel. In an embodiment, a field for environmental data related to the environmentally controlled storage capabilities of the transport vehicle. In an embodiment, if all the transport vehicles throughout the multi-nodal supply chain system 200 are equipped with an equal variety of environmentally distinct storage zones, then this environmental data is omitted from the transport vehicle table 307. In an embodiment, the transport vehicle table 307 comprises the type of the transport vehicle, the current or last recorded GPS coordinates of the transport vehicle, and/or an estimated time of arrival (ETA) at the destination facility.

The storage bins table 308 of the central database 203 stores the Bin_IDs of all the storage bins of the multi-nodal supply chain system 200, each in a respective record that also contains the Facility_ID of the facility at which the respective storage bin currently resides or the Vehicle_ID of the transport vehicle on which the respective storage bin currently resides; and the Location_ID of a particular storage location at which the storage bin resides in the indexed storage array of the facility or the transport vehicle, if the storage bin is currently stowed in one of the indexed storage arrays, or of a dynamic storage location on a robotic handler or a conveyor on which the storage bin is placed and is being moved within or out of the facility. In an embodiment where the storage bins are configured as multi-compartment storage (MCS) bins, each storage bin record also comprises compartment fields for storing a respective compartment identifier (Compartment_ID) of each of the MCS bin's compartments. In embodiments where only SCS bins are used, the storage bin record does not contain compartment fields. In an embodiment, the storage bins table 308 stores an environmental flag indicating the environmental condition or requirements of the contents of the storage bin.

In an embodiment, the storage bin contents table 309 of the central database 203 contains and allows tracking of the contents of each compartment of each storage bin. Each record in the storage bin contents table 309 comprises the Compartment_ID of a particular storage bin compartment; the Bin_ID of the storage bin to which that particular compartment belongs; the Product_ID(s) of one or more products found in the compartment of the storage bin; the quantity of the products in the compartment of the storage bin; and the Vendor_ID of the vendor who owns the products. The use of a Compartment_ID field is omitted in embodiments where the MCS bins are not employed and only SCS bins are used. In these embodiments, the other data fields of the storage bin contents table 309 illustrated in FIG. 3A, are stored directly in the storage bins table 308, since the Bin_ID of each bin can be used for tracking the location of the vendor's in-stock inventory.

The global storage locations table 310 of the central database 203 lists all the indexed storage locations of the indexed storage arrays of all the facilities and the transport vehicles. Each record in this global storage locations table 310, therefore, comprises the Location_ID of a respective storage location in the multi-nodal supply chain system 200, the Facility_ID of the facility at which the storage location resides, or the Vehicle_ID of the transport vehicle on which the storage location resides, an environmental status indicator reflecting the environmental control category to which that storage location belongs, and the Bin_ID of a storage or order bin currently stored at that storage location, if any. The environmental status indicator denotes residence of the storage location in an ambient storage zone, a refrigeration storage zone, or a freezer storage zone of a given facility or transport vehicle.

The indexed storage arrays of all facilities and all transport vehicles are, therefore, fully indexed for global mapping of stored bin locations throughout the multi-nodal supply chain system 200, as each individual indexed storage location throughout the multi-nodal supply chain system 200 has a footprint specifically sized and shaped to accommodate placement and storage of a respective singular storage bin therein, and has a respective location identifier or address (Location_ID) in the records of the central database 203 by which the exact whereabouts of any storage bin stowed in any indexed storage array is identifiable at any time, even during transit between the facilities due to the inclusion of such indexed storage arrays in the transport vehicles. Through the combination of the vendor's stocked inventory table 304, the facilities table 306, the transport vehicle table 307, the storage bins table 308, the storage bin contents table 309, and the global storage locations table 310, the locations of all inventory placed into the storage bins and inducted into any of the indexed storage arrays compatible with the storage bins are thus recorded and tracked. In an embodiment where the multi-nodal supply chain system 200 employs only ambient storage with no environmentally controlled storage environments comprising, for example, refrigeration storage zones and/or freezer storage zones, then the environmental data is omitted from the vendor's product table 303 and the facilities table 306, along with the environmental status being omitted from the global storage locations table 310.

In addition to the storage bins for holding vendor inventory, the multi-nodal supply chain system 200 also employs PO bins of the same standardized size and configuration as the storage bins, so that picked orders placed in these PO bins are likewise storable in the indexed storage locations found in the mega facilities, the macro facilities, and the micro facilities, and on the transport vehicles travelling therebetween, on a 1:1 bin-to-location basis. Accordingly, the PO bins table 311 of the central database 203 is of a structure similar to the storage bins table 308. Each record of the PO bins table 311 thus contains a static field, that is, the Bin_ID of a respective PO bin; the variable Facility_ID of the facility at which the respective PO bin currently resides or the Vehicle_ID of the transport vehicle on which the respective PO bin currently resides; and the Location_ID of a particular storage location at which the PO bin resides in the indexed storage array of the facility or the transport vehicle, if the PO bin is currently stowed in one of the indexed storage arrays, or of a dynamic storage location on a robotic handler or a conveyor on which the PO bin is placed and is being moved within or out of the facility.

In an embodiment, the PO bins are MCS bins capable of holding multiple customer orders therein. Accordingly, each PO bin record of the PO bins table 311 comprises static fields containing the Compartment_IDs of the respective PO bin. In this embodiment, the separate PO bin contents table 312 of the central database 203 tracks the contents of each compartment of each PO bin. Each record in the PO bin contents table 312 thus comprises the Compartment_ID of a respective PO bin compartment; the Bin_ID of the PO bin to which that compartment belongs; the order number of a particular customer order of which one or more ordered products reside in that compartment; a line item number of the particular customer order that is fully or partially fulfilled by one or more ordered products in that compartment; and the quantity of the ordered products in that compartment. Inclusion of the line item and quantity in the PO bin contents table 312 accounts for distribution of the contents of larger orders among multiple compartments, and even among multiple PO bins. In embodiments where the PO bins are not subdivided into multiple compartments, the use of Compartment_IDs for the PO bins is omitted, as each order bin will have only a singular compartment, in which case the Bin_ID is used to identify the whereabouts of a picked order. In these embodiments, the PO bin contents table 312 is omitted entirely, with the order numbers, line item numbers, and quantities instead being recorded directly in the PO bins table 311.

The order numbers recorded in the PO bin contents table 312 are retrieved and assigned from a separate customer orders table 315, each record of which contains the order number of a respective customer order, a unique identifier (Customer_ID) of a customer for whom that customer order is to be fulfilled, a unique identifier (Vendor_ID) of the vendor who fulfills the customer order, and any shipping preferences applied to that customer order during creation thereof. In a related order line items table 316, each record contains a line item number, the order number of the customer order to which that line item belongs, the Product_ID(s) of a product type required to fulfill that line item of the customer order, and a quantity of that product type to be fulfilled for that line item. The Customer_ID of each customer is also stored in a separate customer table 314 along with all other customer account information, including the name, address, and billing information of each customer.

In addition to the multi-compartment PO bins in which picked orders are placed, in an embodiment, the multi-nodal supply chain system 200 also employs single-compartment FO bins in which individual customer orders are packed once packaged into a finished state ready for pickup by, or delivery to, the customer. In an embodiment, the FO bins are of a different smaller standardized size than the storage and PO bins, and are, for example, about half the size of those other bins. The smaller FO bins are not compatible with the indexed storage arrays of the mega facilities, the macro facilities, and the micro facilities or the transport vehicles travelling therebetween, and are instead sized and configured for a different type of indexed storage array used at the nano facilities.

Each record of the FO bins table 313 of the central database 203 comprises a static field containing the Bin_ID of a respective one of the FO bins, the order number of a particular customer order of which one or more ordered products reside in the FO bin; the Facility_ID of the facility at which the respective FO bin currently resides or the Vehicle_ID of the transport vehicle on which the respective FO bin currently resides; and the Location_ID of a particular storage location at which the FO bin resides in the indexed storage array of the facility or the transport vehicle, if the FO bin is currently stowed in one of the indexed storage arrays, or of a dynamic storage location on a robotic handler or a conveyor on which the storage bin is placed and is being moved within or out of the facility. To accommodate distribution of the large orders among the multiple FO bins, in an embodiment, each record in the FO bins table 313 further comprises a line item number of the particular customer order that is fully or partially fulfilled by one or more ordered products in that FO bin, and the quantity of the ordered products in that FO bin. In an embodiment, the FO bins table 313 further stores the unique identifier of the customer (Customer_ID) and a status of fulfilment and/or returns of the customer orders.

The supply shipment table 317 of the central database 203 is populated with expected inventory supply shipments scheduled to deliver new inventory to the multi-nodal supply chain system 200, typically at the mega facilities thereof. Each record of the supply shipment table 317 contains a unique identifier of the expected supply shipment (Shipment_ID), a unique identifier of a supplier from which the supply shipment originates (Supplier_ID); the Vendor_ID of a recipient vendor on behalf of whom the shipment is being received by the operating entity, that is, the vendor that owns the newly arriving inventory; and the Facility_ID of the facility to which the supply shipment is scheduled for delivery. The contents of the supply shipments are itemized in a separate shipment details table 318, each record of which comprises a unique identifier (Case_ID) for each case of product in the expected supply shipment, the Shipment_ID of the shipment to which the case belongs, the Product_ID(s) of a product type contained in the case, and a quantity of the product type found in the case.

Figure 3C:
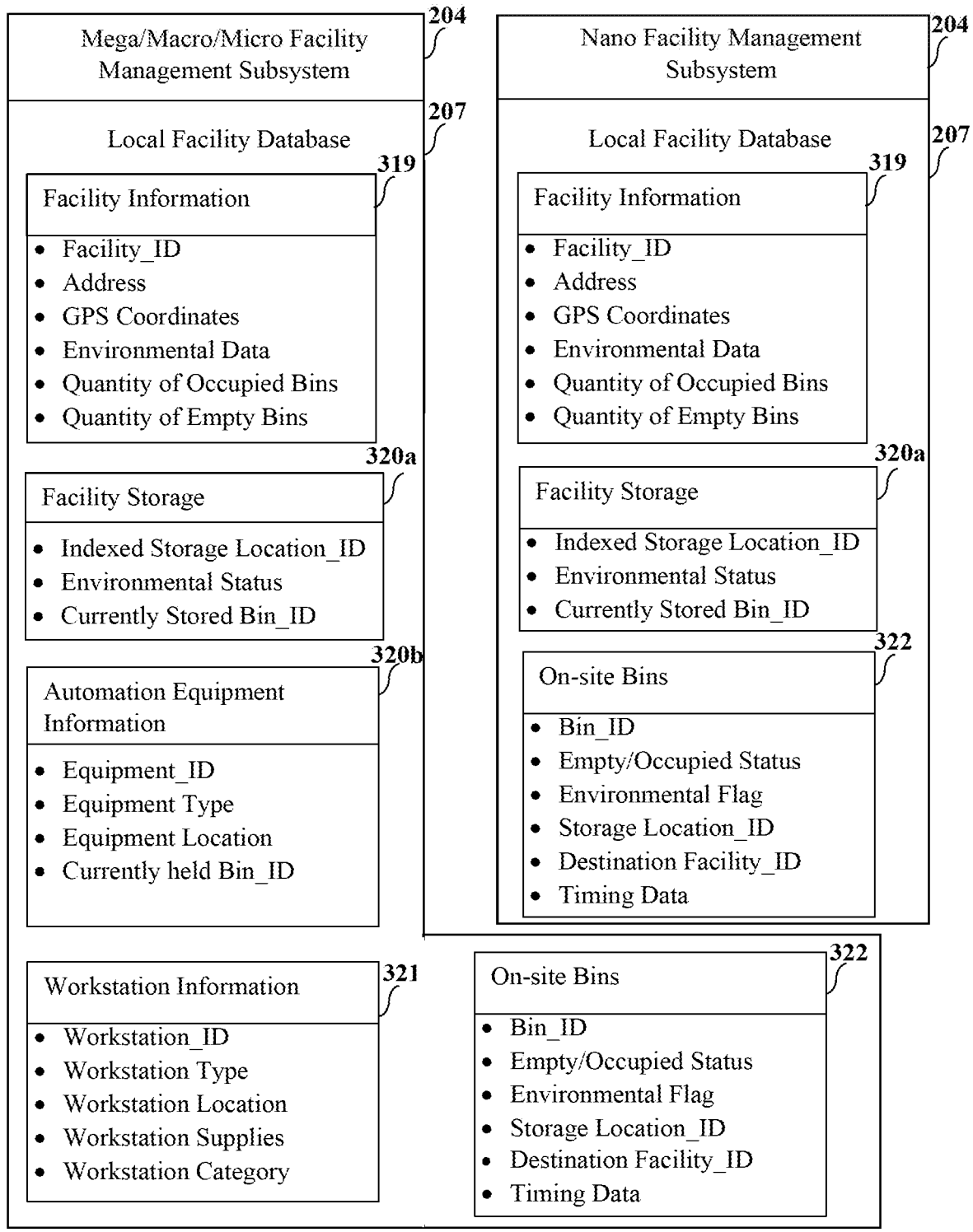
FIGS. 3C-3D illustrate local facility databases and local vehicle databases of the multi-nodal supply chain system, according to an embodiment herein.
Figure 3D:
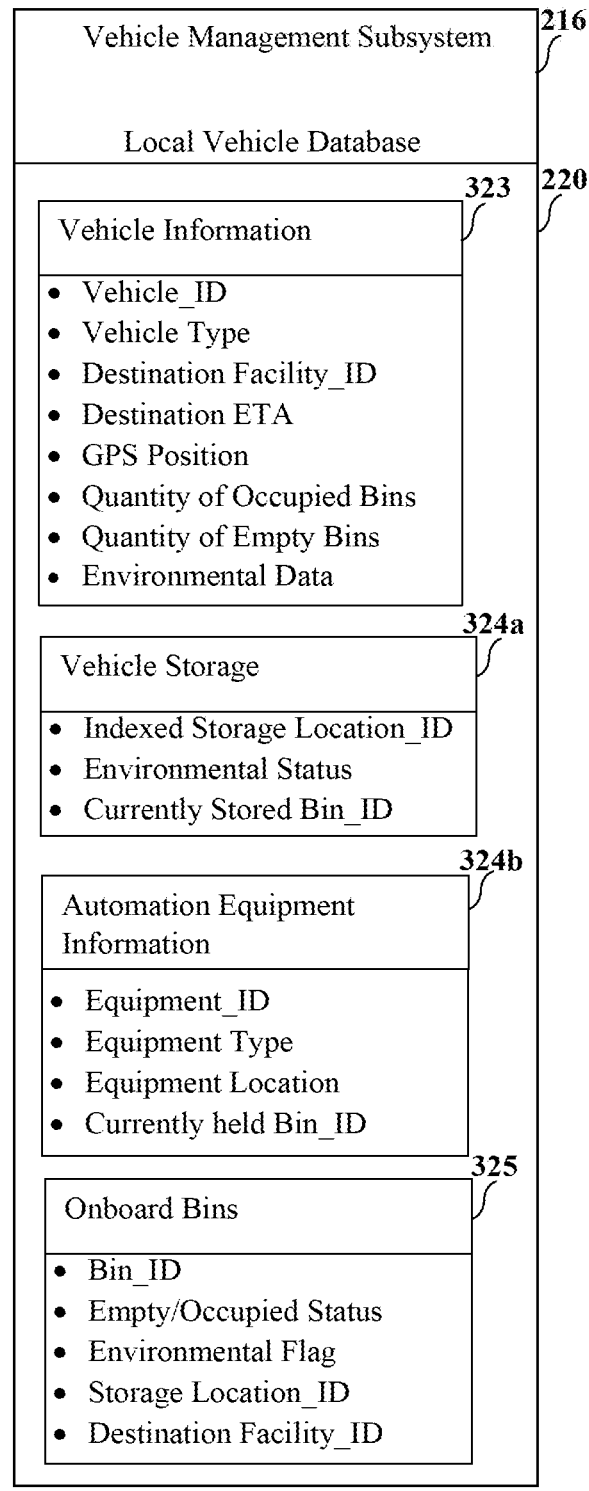

FIGS. 3C-3D illustrate local facility databases 207 and local vehicle databases 220 of the multi-nodal supply chain system 200 shown in FIGS. 2A-2B, according to an embodiment herein. In an embodiment of an organizational scheme of the local facility databases 207 of the multi-nodal supply chain system 200, the local facility database 207 comprises a facility storage table 320a, in which only the respective storage locations of that particular facility's storage array are indexed, as opposed to the global storage locations table 310 of the central database 203 illustrated in FIG. 3B, which instead provides a global index of all the storage locations throughout the entire multi-nodal supply chain system 200. Similar to the global storage locations table 310, each record of the facility storage table 320a comprises a static field for the Location_ID of a respective storage location, an environmental status indicator reflecting the environmental control category, for example, ambient storage zone, refrigeration storage zone, or freezer storage zone, to which that storage location belongs, and the Bin_ID of a storage bin currently stored at that location, if any.

The local facility database 207 further comprises an automation equipment information table 320b comprising a static field for a unique identifier (Equipment_ID) of each piece of automation equipment, for example, a robotic handler or a conveyor operable at a particular facility. The robotic handler is indexed and defines a dynamic storage location for placing and locating a storage bin while moving the storage bin within or out of the facility. In an embodiment, the conveyor also defines a storage location onto which the storage bin is being transferred within the facility or from the facility to the transport vehicle and vice versa. The Equipment_ID is used as the Location_ID of the storage bin when the storage bin is being navigated by a robotic handler or a conveyor within or out of the facility, to allow continuous tracking of the storage bin. The automation equipment information table 320b further comprises a variable field for the Bin_ID of a storage bin that is currently held on and moved by a particular robotic handler or conveyor within and out of the facility. The automation equipment information table 320b also stores other information such as equipment type, for example, a robotic handler or a conveyor, real-time location of the automation equipment, etc. In another embodiment, manual operations equipment, for example, a forklift, is also mapped to an Equipment_ID and defines a dynamic storage location. In this embodiment, the Equipment_ID of the manual operations equipment is used as the Location_ID of the storage bin when the storage bin is being manually operated on by the manual operations equipment within the facility to allow continuous tracking of the storage bin.

The local facility database 207 further comprises one or more on-site bins tables 322 that list the Bin_IDs of all storage bins and/or order bins currently on location at that particular facility. In an embodiment, the on-site bins table 322 of the local facility database 207 comprises fields for storing an empty/occupied status of each storage bin, an environmental flag, a Location_ID of a respective storage location, a destination Facility_ID, and timing data. For facilities having multiple bin types, in an embodiment, each bin type has its own respective on-site bins table 322 in the local facility database 207. The local facility database 207 further comprises a workstation information table 321 containing unique identifiers (Workstation_IDs) of different workstations situated at that particular facility; and for each such workstation, a workstation type denoting the type of work operations performed at that workstation, for example, an induction workstation, a value-added service (VAS) workstation, a kitting workstation, a picking workstation, a packing workstation, etc.; a location of the workstation in the facility, for example, in an addressed format configured to command travel of robotic handlers thereto, and/or carrying or conveyance of storage bins thereto by conveyors or other automated bin handling equipment; identification of particular work supplies stocked at that workstation, for example, packaging, labelling, and tagging supplies; and in an embodiment, one or more workstation category fields designating any specialized operating characteristics or capabilities provided at that workstation that distinguish the workstation from other workstations of the same type, for example, category fields denoting compatibility or incompatibility with particular classes of product such as food-grade workstations maintained to greater sanitary standards for exposed food handling: allergen-safe workstations at which allergenic products are prohibited, optionally organized by subcategory, for example, peanut-free, tree nut-free, gluten-free, shellfish-free, dairy-free, etc.; and hazardous goods workstations specifically for hazardous goods forbidden at other workstation categories. In an embodiment, the categorization is on a flagged basis, where only specialized workstations are flagged with a special categorization, and the lack of any such flag denotes a general-goods workstation where anything other than controlled-product classes, for example, hazardous goods, exposed food products, etc., are acceptable, regardless of potential allergen content. The local facility database 207 further comprises a facility information table 319 for storing the same or similar content to the respective record in the facilities table 306 of the central database 203 illustrated in FIG. 3A. In an embodiment, the facility information table 319 optionally stores bin quantity data identifying the quantities of empty and occupied storage bins currently residing in that facility.

As illustrated in FIG. 3D, each local vehicle database 220 comprises a vehicle storage table 324, in which only the respective storage locations of that particular transport vehicle's storage array are indexed. Similar to the facility storage table 320a of each local facility database 207, each record of the vehicle storage table 324 comprises static fields for the Location_ID of a respective storage location in the transport vehicle's indexed storage array, an environmental status indicator reflecting the environmental control category, for example, ambient storage zone, refrigeration storage zone, or freezer storage zone, to which that storage location belongs, and the Bin_ID of a storage bin currently stored at that location, if any. In an embodiment, the local vehicle database 220 further comprises an automation equipment information table 324b similar to the automation equipment information table 320b illustrated in FIG. 3C, for storing of the automation equipment installed in the transport vehicle. The local vehicle database 220 further comprises one or more onboard bins tables 325 that lists the Bin_IDs of all storage bins and/or order bins currently onboard that transport vehicle. The local vehicle database 220 further comprises a vehicle information table 323 for storing the same or similar content to the respective record in the transport vehicle table 307 of the central database 203 illustrated in FIG. 3A. In an embodiment, the vehicle information table 323 optionally stores bin quantity data identifying the quantities of empty and occupied storage bins and/or order bins currently onboard that transport vehicle.

Figure 3E:
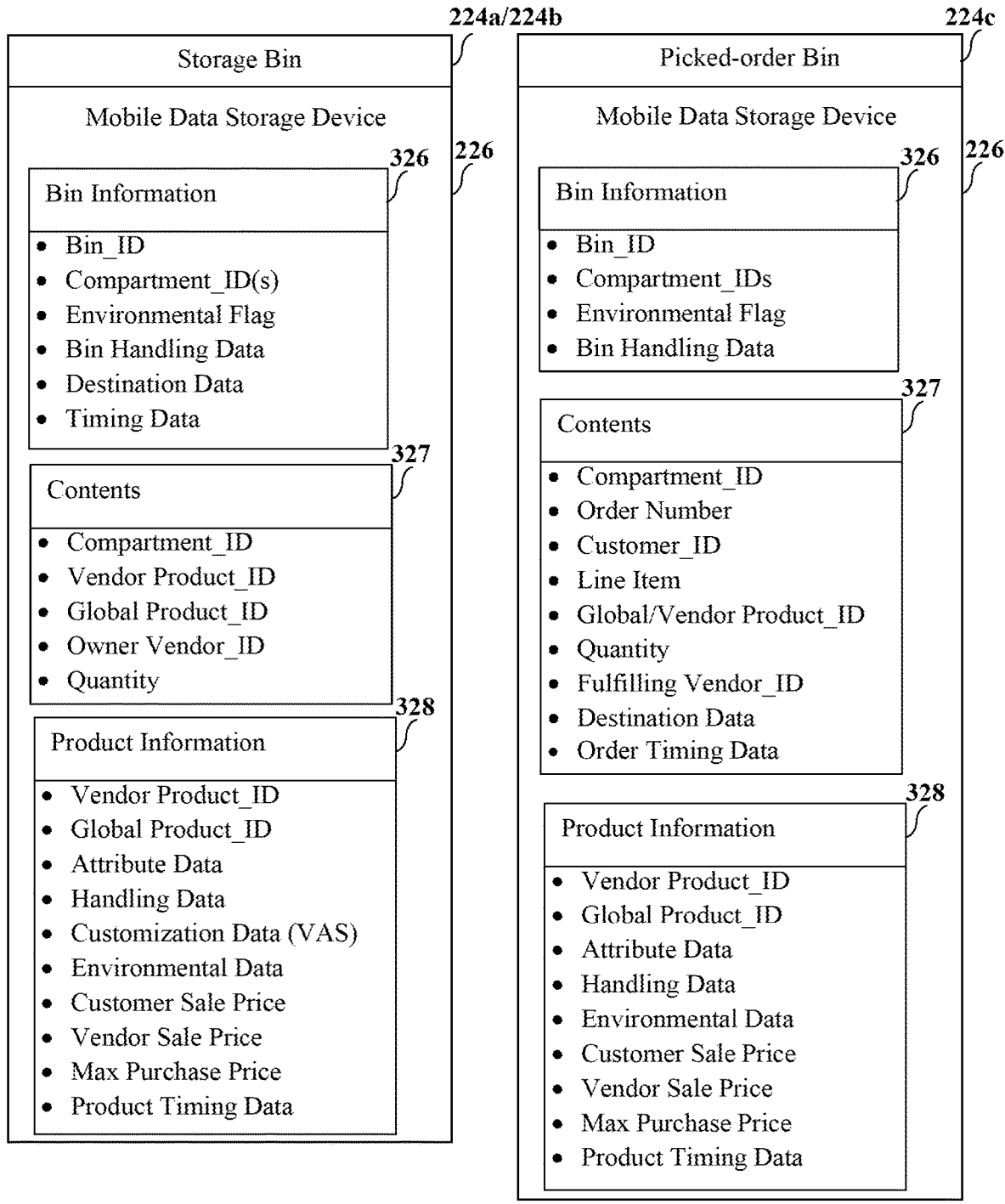
FIGS. 3E-3F illustrate local data stored on storage bins of different categories, according to an embodiment herein.
Figure 3F:
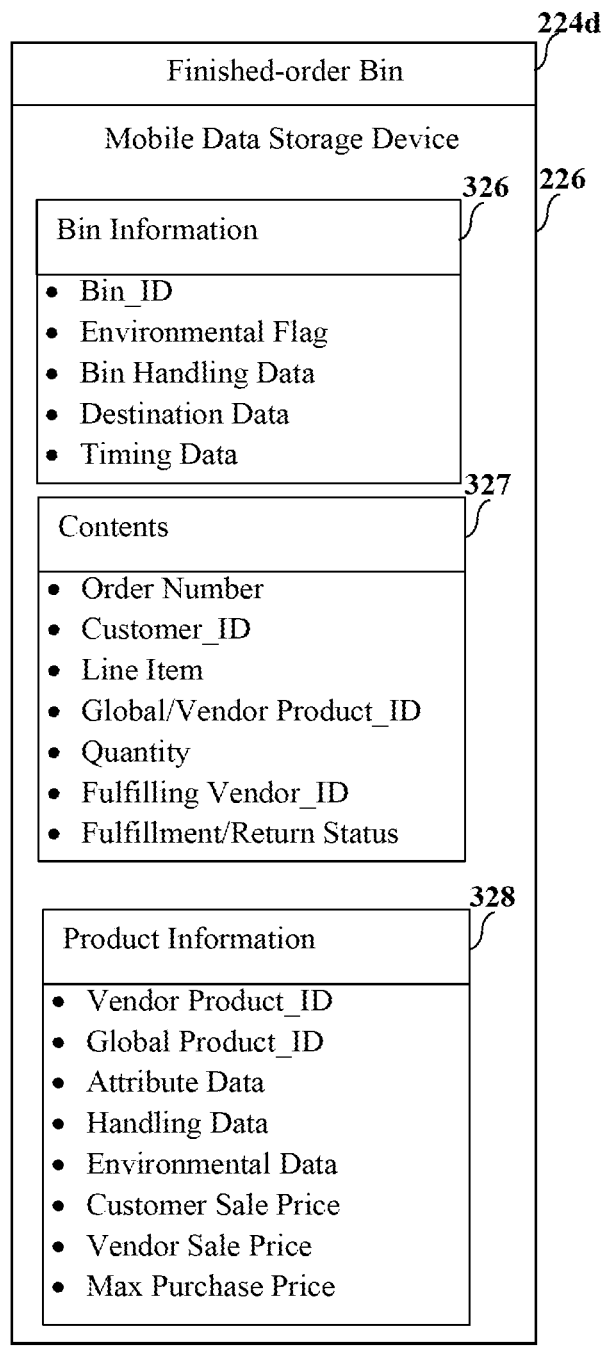

FIGS. 3E-3F illustrate local data stored on storage bins 224a, 224b, 224c, and 224d of different categories, according to an embodiment herein. The data is stored on the mobile data storage devices 226 of the storage bins 224a, 224b, 224c, and 224d, for example, in a tabular database format similar to those employed in the central database 203 of the central computing system 201, the local facility databases 207 of the facility management subsystems 204, and the local vehicle databases 220 of the vehicle management subsystems 216 illustrated in FIG. 2A. On the mobile data storage devices 226 of the storage bins 224a and 224b that hold vendor inventory, a bin information table 326 stores the storage bin's static Bin_ID; the Compartment_IDs of the storage bin; and an environmental flag designating compatibility of the storage bin or a lack thereof, with the different environmentally controlled storage zones of the facilities and transport vehicles, at least in embodiments where environmentally specific storage bins are used, for example, employing a different material or composition of a storage bin for cold versus ambient storage, and/or between different classes of cold storage such as refrigeration versus freezer. In an embodiment, the bin information table 326 further comprises bin handling data, for example, useful in selection of a particular storage bin for a given product type by comparison of the bin handling data against the product handling data from the vendor's product table 303 illustrated in FIG. 3A, to check whether the storage bin is compatible with the product handling requirements; destination data identifying a particular facility, geographic region or other destination to or toward which the storage bin is to be transported through the multi-nodal supply chain system 200 illustrated in FIGS. 2A-2B; and timing data concerning any timing restraints on the delivery of the storage bin to its intended destination. One example of bin handling data in the bin information table 326 is a designation of the particular storage bin as an allergenic-safe storage bin in which one or more particular allergenic product categories, for example, peanuts, tree nuts, gluten, shellfish, dairy, etc., are not to be placed.

Moreover, on the mobile data storage devices 226 of the storage bins 224a and 224b that hold vendor inventory, a contents table 327 documents the variable contents of the storage bin at any given time. Each record of this contents table 327 contains the Compartment_ID of a respective compartment of the storage bin, the Product_ID(s) of a product type stored in the compartment of the storage bin; the quantity of the product type stored in the compartment of the storage bin, and the Vendor_ID of a particular vendor to whom the quantity of the respective product type belongs. In an embodiment where single-compartment storage (SCS) bins 224a are employed, the inclusion of the Compartment_ID in the bin information table 326 and the contents table 327 is optional and may be omitted. Furthermore, on the mobile data storage devices 226 of the storage bins 224a and 224b that hold vendor inventory, a product information table 328 is populated from fields of the vendor's product table(s) 303 of one or more vendors whose products are contained in one or more compartments of that storage bin. Each record in the product information tables 328 of the storage bins 224a and 224b thus contains a respective vendor and/or global Product_ID from the contents table 327, and a copy of all or some fields from the corresponding product record in the vendor's product table 303 of that vendor, for example, including the handling data, the customization data, and the environmental data that will be used to guide handing and customization within one or more of the facilities, and environmental placement within both the facilities and the transport vehicles.

Moreover, the contents of the mobile data storage device 226 of a multi-compartment PO bin 224c is similar to that of a multi-compartment storage (MCS) bin 224b, for example, optionally being fully or substantially identical in terms of content of the bin information table 326 and the product information table 328, though optionally with an omission of the customization data, and differing in terms of the contents table 327, where bin content is identified by a customer order since the PO bin 224*c* is for holding picked customer orders, not as yet unpicked vendor inventory. For the PO bins 224*c*, each record in the contents table 327 comprises the Compartment_ID of a respective compartment of the PO bin 224*c*, the order number of a particular customer order that has a picked product type in the compartment, the Customer_ID of the particular customer for whom that customer order is being fulfilled, a line item number identifying a respective line item in the customer order that is fulfilled by the picked product type in the compartment, the Product_ID(s) of the picked product type, the quantity of the picked product type in the compartment, and the Vendor_ID of the particular vendor from whose inventory the picked product type was picked. In an embodiment, each record in the contents table 327 stored in the mobile data storage device 226 of the PO bins 224*c* comprises destination data and order timing data.

Furthermore, the contents of the mobile data storage device 226 of a single-compartment FO bin 224*d* is similar to that of a multi-compartment PO bin 224*c*, for example, optionally being fully or substantially identical in terms of content of the bin information table 326, the bin contents table 327, and the product information table 328, though with an optional omission of the FO bin's 224*d* singular Compartment_ID. It will be appreciated that the specifically illustrated and described layout and organization of the data in the central database 203, the local facility database 207, and the local vehicle database 220 illustrated in FIGS. 3A-3D, and in the mobile data storage devices 226 of the various storage bins 224*a*-224*d* illustrated in FIGS. 3E-3F, and the particular selection of specific fields to include in the various records thereof, is provided merely for the purposes of example, as is not intended to be limiting on the scope of the embodiments disclosed herein. The particular fields identified generally pertain particularly to the operational details of a variety of embodiments detailed herein, while other embodiments may employ additional data for added or unrelated functionality, or omit optional data unnecessary for other embodiments featuring a subset of the features and functions set out in the particularly detailed embodiments.

Figure 4A:
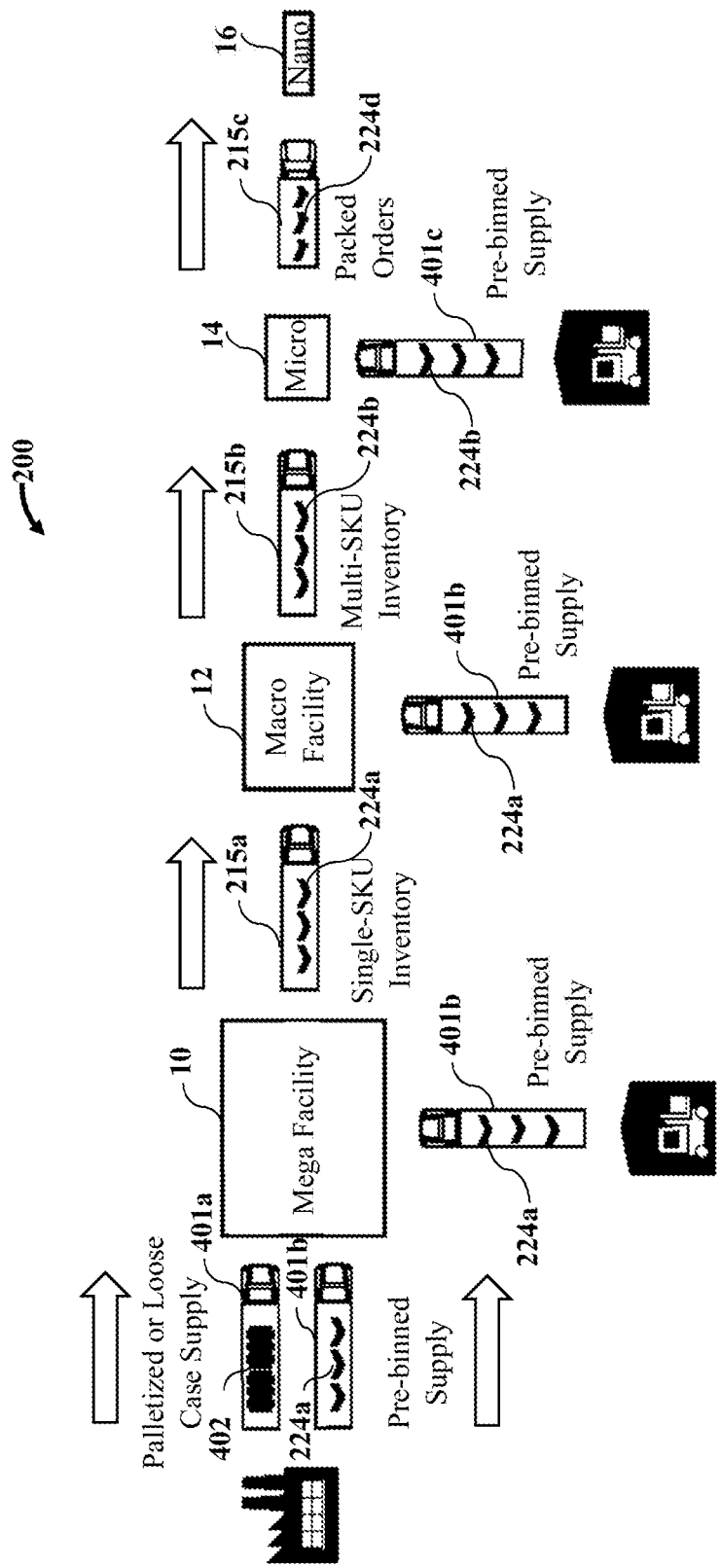
FIG. 4A illustrates a workflow of supply, inventory and order-filled storage bins in a forward or downstream direction through the multi-nodal supply chain system, according to an embodiment herein.

FIG. 4A illustrates a workflow of supply, inventory and order-filled storage bins in a forward or downstream direction through the multi-nodal supply chain system 200, according to an embodiment herein. FIG. 4A illustrates inbound and outbound transport among a string of mega, macro and micro facilities 10, 12 and 14, starting with receipt, at a mega facility 10, of incoming supply shipments 401*a*, 401*b* from manufacturers, suppliers, and/or distribution centers operated by external, partnered or contracting entities, herein referred to as "suppliers". The multi-nodal supply chain system 200 manages the individual node facilities 10, 12, 14, and 16 and the workflow therein and therebetween in relation to supply shipments, product inventory, customer orders, and the storage and order bins used to store and transport the same throughout the multi-nodal supply chain system 200. At least some of the incoming supply shipments arriving at the mega facility 10 will typically be full-case shipments 401*a*, of which each case, for example, a cardboard box, a reusable tote, or other container, contains only one product type, that is, products with a matching Product_ID. As used herein, the term "stock keeping unit (SKU)" is used to denote a unique product identifier, that is, a global product identifier or a vendor-specific product identifier. Therefore, a single-SKU case or a single-SKU bin refers to a case or a bin containing products of the same type, whether the equivalency of these products is based on a matching SKU, a matching universal product code (UPC), or another matching global or vendor-specific product identifier shared by those products. Full-case shipments 401*a* often arrive in a palletized form, that is, as pallets 402, from suppliers into the mega facility 10. Each mega facility 10, therefore, comprises at least one depalletization station for depalletizing the full-case shipments 401*a*. Other incoming full-case shipments 401*a* may be loose-case shipments rather than palletized shipments, in which case depalletization is not required, and the depalletization station(s) in the mega facility 10 may be omitted or bypassed.

In addition or alternative to the full-case shipments 401*a* received in conventional product packaging, for example, in cardboard boxes or shipping totes, whether palletized or loose, the incoming supply shipments may optionally include pre-binned shipments 401*b*, 401*c* in which the products are delivered from the supplier using the storage bins 224*a*, 224*b* compatible with the indexed storage arrays of the mega, macro and micro facilities 10, 12 and 14 respectively. In such instances, these incoming storage bins 224*a* arriving at the mega facility 10 in a preloaded condition from the supplier may be single-compartment storage (SCS) bins 224*a*, each containing only products of a matching product type that can be inducted directly into the indexed storage array of the mega facility 10 without having to perform a singulation step of transferring products from the SCS bins 224*a* they arrived in into other SCS bins 224*a*.

The SCS bins 224*a* filled at the mega facility 10 or received via pre-binned shipments 401*b*, also referred to as "single-SKU bins", are loaded from the mega facility 10 onto a large transport vehicle 215*a*, for example, a semi-trailer truck, for downstream transport to one of the macro facilities 12. At the macro facility 12, the SCS bins 224*a* are used for filling kit-filled, downstream-headed multi-compartment storage (DMCS) bins 224*b* at the macro facility 12. The DMCS bins 224*b*, also referred to as "multi-SKU bins" are loaded from the macro facility 12 onto a large transport vehicle 215*b*, for example, a semi-trailer truck, for downstream transport to one of the micro facilities 14. In an embodiment, the micro facility 14 also receives DMCS bins 224*b* from pre-binned shipments 401*c*. The storage bins at the micro facility 14 comprise finished-order (FO) bins 224*d* that are of a different smaller standardized size and footprint than the other storage bins 224*a*. 224*b*. In an embodiment, these FO bins 224*d* are about half the size and footprint of the other storage bins 224*a*, 224*b*, and are each intended to contain only a singular customer order, and accordingly need not have their interiors subdivided like the DMCS bins 224*b*. In this embodiment, these smaller FO bins 224*d* are not compatible with the indexed storage arrays and robotic handlers 208 of the mega facilities 10, the macro facilities 12, and the micro facilities 14 illustrated in FIGS. 2A-2B, or with the bin carousels 222*a* of the transport vehicles 215*a*. 215*b* illustrated in FIGS. 2A-2B, and are instead specifically sized and configured for a different type of indexed storage array used at the nano facilities 16 and on the transport vehicles 215*c*.

Figure 4B:
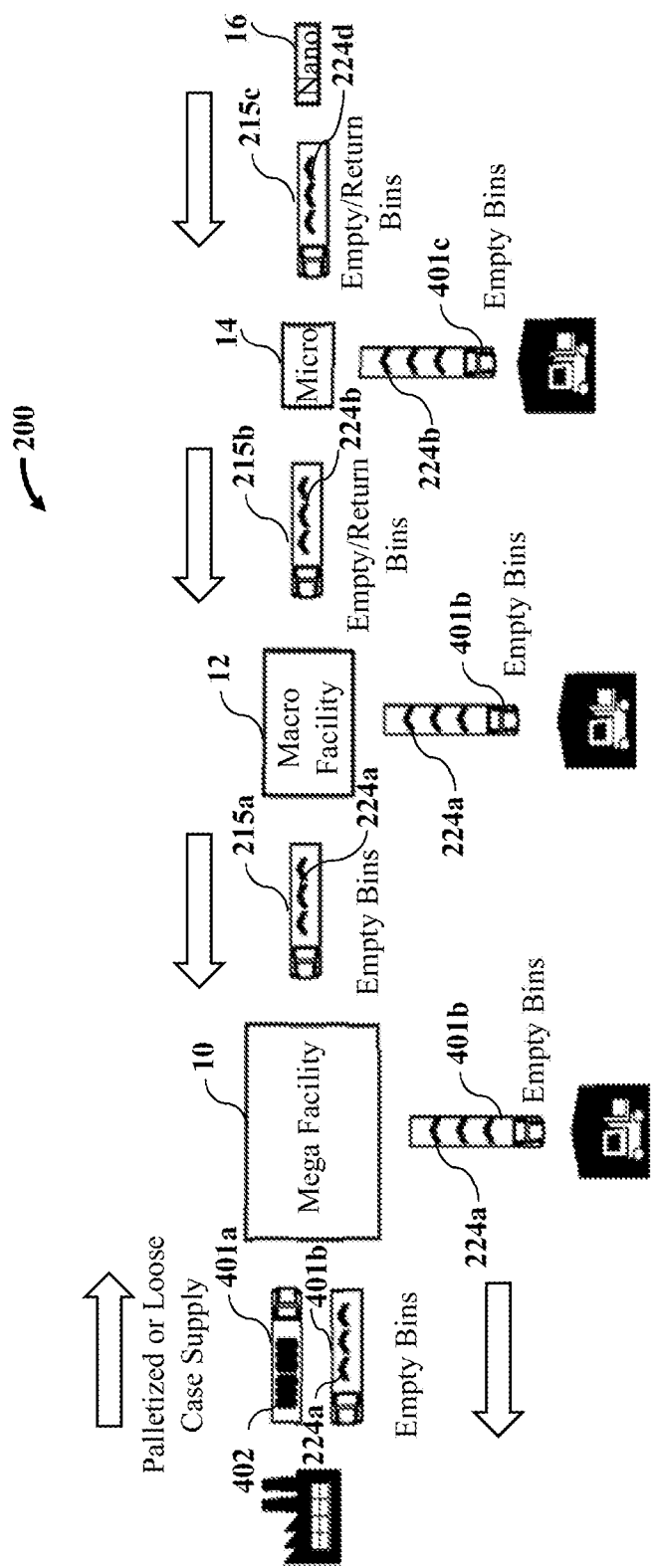
FIG. 4B illustrates a workflow of empty and customer-return storage bins in a reverse or upstream direction through the multi-nodal supply chain system, according to an embodiment herein.

FIG. 4B illustrates a workflow of empty and customer-return storage bins 224*a*, 224*b*, 224*d* in a reverse or upstream direction through the multi-nodal supply chain system 200, according to an embodiment herein. The multi-nodal supply chain system 200 disclosed herein implements an autonomous, orderly management of the supply chain workflow where the storage bins 224*a*. 224*b*, 224*d* are exchanged in a one-to-one correspondence, that is, 1:1, at each of the node facilities 10, 12, 14, 16 including the endpoint, to allow an equivalent and continuous flow of the storage bins 224*a*, 224*b*, 224*d* in the forward direction and the reverse direction through the multi-nodal supply chain system 200. The multi-nodal supply chain system 200, therefore, allows 1:1 transactions at each of the node facilities 10, 12, 14, 16 and the corresponding transport vehicles 215a, 215b, 215c, thereby allowing the reverse flow of the storage bins 224a, 224b, 224d illustrated in FIG. 4B to be the same as the forward flow illustrated in FIG. 4A, thereby making the multi-nodal supply chain system 200 orderly.

Figure 5:
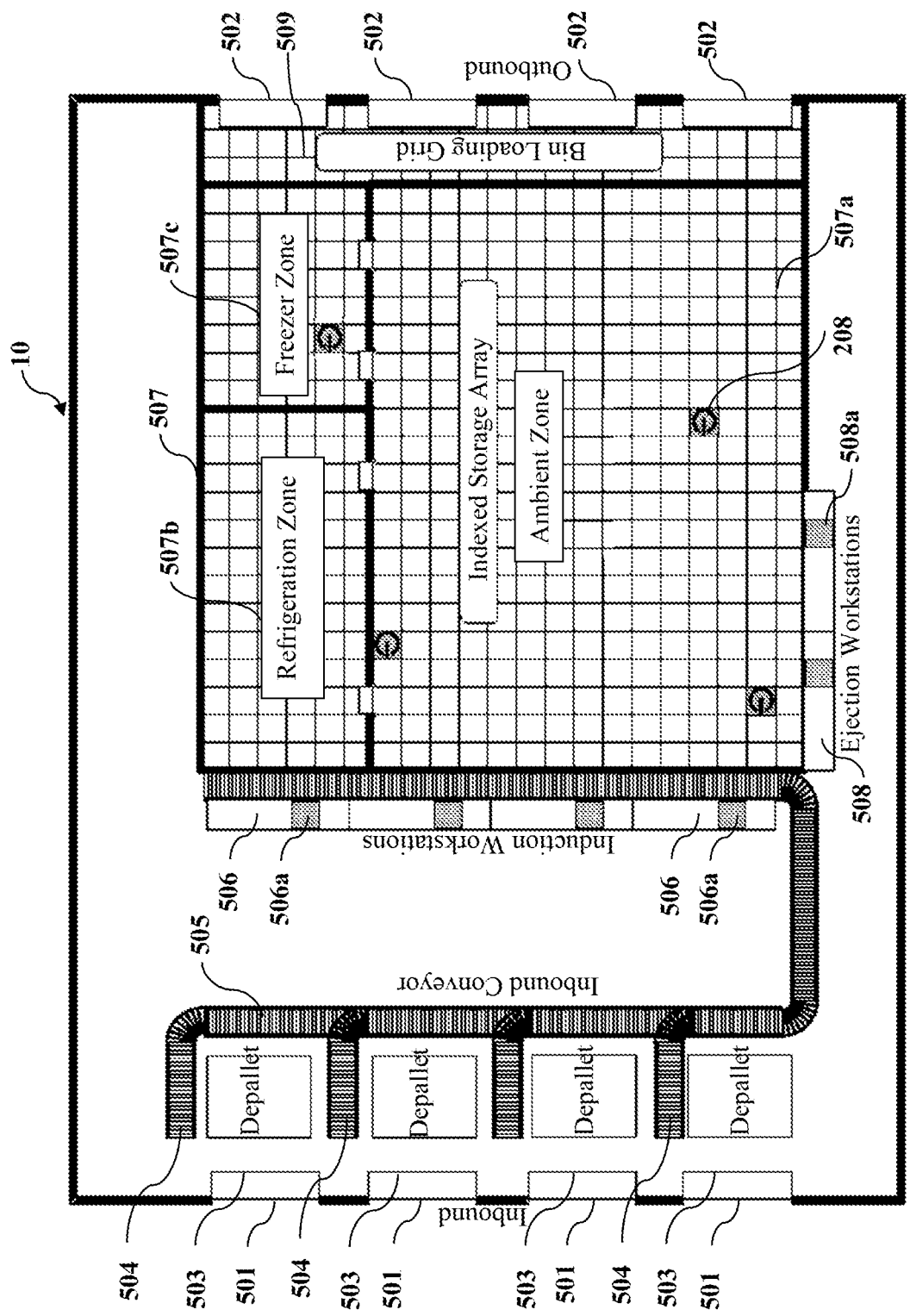
FIG. 5 illustrates a top plan view of a layout of a mega facility of the multi-nodal supply chain system, according to an embodiment herein.

FIG. 5 illustrates a top plan view of a layout of a mega facility 10 of the multi-nodal supply chain system 200 shown in FIGS. 2A-2B and FIGS. 4A-4B, according to an embodiment herein. The mega facility 10 comprises inbound loading docks 501, outbound loading docks 502, and an indexed storage array having a gridded storage structure 507. In an embodiment, the inbound loading docks 501 and outbound loading docks 502 are positioned at opposing perimeter sides or ends of the mega facility 10. In an embodiment, the gridded storage structure 507 is of the type illustrated in FIG. 8 and disclosed in the detailed description of FIG. 8. In this embodiment, the gridded storage structure 507 is subdivided into environmentally distinct storage zones, for example, a main ambient zone 507a, a small refrigeration zone 507b, and a smaller freezer zone 507c. In an embodiment, the number of environmentally distinct storage zones and their relative proportions and positions in the gridded storage structure 507 can vary. Through such subdivision of the gridded storage structure 507 into environmentally distinct storage zones 507a, 507b, and 507c, the environmentally distinct storage zones 507a, 507b, and 507c of the mega facility 10 are served by the same shared fleet of robotic handlers 208 operating on the gridded storage structure 507. The structure and operation of a subdivided multi-zone storage structure of this type is disclosed in Applicant's U.S. Provisional Patent Application No. 62/891,549, the entirety of which is incorporated herein by reference. In another embodiment, smaller separate storage structures in different environmentally controlled subsections of the mega facility 10 are employed as an alternative to a singular gridded storage structure 507 subdivided into environmentally isolated and distinct storage zones.

Adjacent the inbound loading docks 501 are a series of respective depalletization stations 503 neighboured by respective feed conveyors 504. The depalletization stations 503 allow human workers or robotic workers or other automated equipment to break down or depalletize full-case shipments that arrive palletized from suppliers into individual cases. If loose-case shipments rather than palletized shipments arrive at the mega facility 10, depalletization is not required, and the depalletization station(s) 503 may be omitted or bypassed. The feed conveyors 504 feed into a shared inbound conveyor 505, which in turn leads to a series of induction workstations 506. Each of the induction workstations 506 resides in an adjacently neighbouring relation to a lower track layout of the gridded storage structure 507, whereby inventory placed into storage bins at the induction workstations 506 are inducted into the indexed storage array by the fleet of robotic handlers 208 operating on the gridded storage structure 507. In an embodiment, to facilitate a fully or partially automated transfer of storage bins to the outbound loading docks 502, and fully or partially automated loading of the storage bins onto outbound transport vehicles at the outbound loading docks 502, the outbound loading docks 502 are neighboured by a loading grid structure 509 that is directly connected to one of the track layouts, for example, the lower track layout of the gridded storage structure 507, thereby forming an extension of the gridded storage structure 507 on which the same fleet of robotic handlers 208 can depart the gridded storage structure 507 and travel to any one of the outbound loading docks 502. In an embodiment, the loading grid structure 509 is a three-dimensional structure comprising one or more vertical shafts on which the robotic handlers 208 are capable of ascending and descending to a suitable elevation at the outbound loading dock 502 to serve the storage bins to and from the outbound transport vehicles parked thereat at varying elevations relative to trailers of the outbound transport vehicles.

In an embodiment, the loading grid structure 509 is positioned across the gridded storage structure 507 from the induction workstations 506, which reside on the same side of the gridded storage structure 507 as the inbound loading docks 501 and the depalletization stations 503 as illustrated in FIG. 5. In an embodiment, the mega facility 10 comprises additional ejection workstations 508 that, similar to the induction workstations 506, adjacently neighbour the lower track layout of the gridded storage structure 507 for direct serving of the ejection workstations 508 by the robotic handlers 208 that traverse the gridded storage structure 507. These ejection workstations 508 are useful for extracting the storage bins from the gridded storage structure 507 for multiple purposes in addition to delivery of the storage bins by the robotic handlers 208 to the outbound transport vehicles via the loading grid structure 509.

In an embodiment, each of the induction workstations 506 and the ejection workstations 508 is a type through which the robotic handlers 208 travel on an extension track of the lower track layout of the gridded storage structure 507, whereby the robotic handlers 208 carry the storage bins through these workstations 506 and 508. In this method, the same fleet of robotic handlers 208 is responsible for movement of the storage bins between points of worker-interactions at the workstations 506 and 508 and storage locations in the gridded storage structure 507 to or from which the storage bins are deposited or extracted. In an embodiment, each of the workstations 506 and 508 comprises an open port 506a and 508a respectively, positioned in a countertop worksurface of the respective workstations 506 and 508, which defines the point at which a human or robotic worker at the respective workstation 506, 508 can interact with the robotically carried storage bin to place product therein or extract product therefrom. The open ports 506a of the induction workstations 506 are herein referred to as "put ports", since product is typically put into the storage bins at the induction workstations 506, while the open ports 508a of the ejection workstations 508 are herein referred to as "pick ports", since product is typically picked from the storage bins at the ejection workstations 508. While each of the induction workstations 506 and the ejection workstations 508 is of a similar countertop type configured to provide a horizontal worksurface for use by any human worker attending such workstations 506 and 508 and using openings in these worksurfaces to access the storage bins being carried or conveyed beneath these countertop worksurfaces, the terms "pick port" and "put port", except where otherwise specified, are used herein in a general sense to denote any interaction point at which a storage bin is appropriately positioned and oriented for access thereto by a human or robotic worker installed at or attending to the workstations 506 and 508, whether or not such access is made by reaching through a port or opening delimited by a countertop or other surrounding structure.

Figure 6:
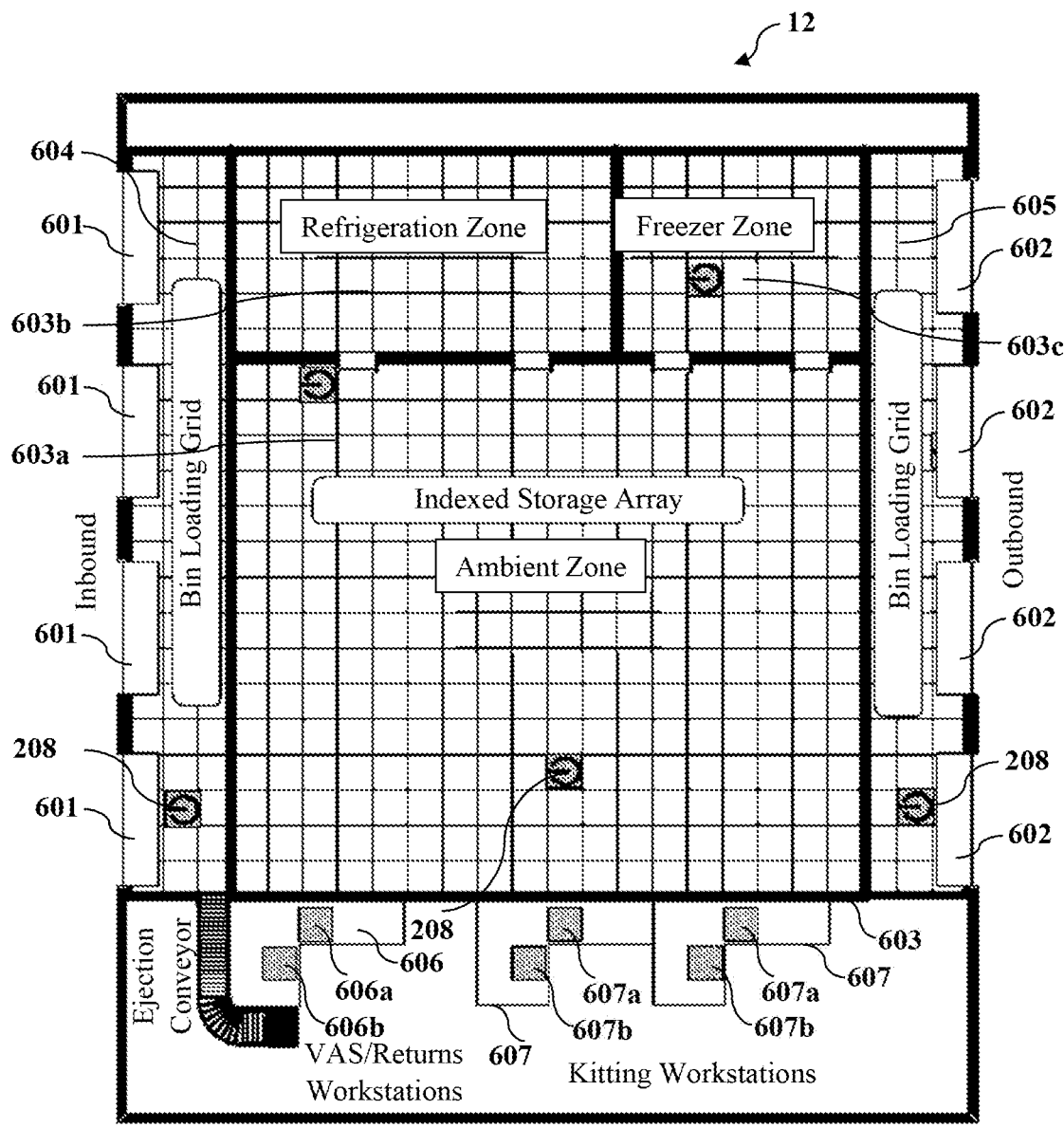
FIG. 6 illustrates a top plan view of a layout of a macro facility of the multi-nodal supply chain system, according to an embodiment herein.

FIG. 6 illustrates a top plan view of a layout of a macro facility 12 of the multi-nodal supply chain system 200 shown in FIGS. 2A-2B and FIGS. 4A-4B, according to an embodiment herein. The macro facility 12 comprises inbound loading docks 601, outbound loading docks 602, and an indexed storage array having a gridded storage structure 603 similar to that of the mega facility 10. The inbound loading docks 601 and the outbound loading docks 602 are positioned at opposing perimeter sides or ends of the macro facility 12. In an embodiment, the gridded storage structure 603 of the macro facility 12 is of a smaller scale than that of the mega facility 10. In an embodiment, the gridded storage structure 603 of the macro facility 12 is a subdivided storage structure comprising environmentally distinct storage zones, for example, an ambient zone 603*a*, a refrigeration zone 603*b*, and a freezer zone 603*c*. In an embodiment, both the inbound loading docks 601 and the outbound loading docks 602 are each neighboured by a respective loading grid structure 604, 605. In an embodiment, the loading grid structures 604 and 605 of the macro facility 12 are similar to the loading grid structure 509 of the outbound loading docks 502 of the mega facility 10 illustrated in FIG. 5.

Similar to the mega facility 10, the macro facility 12 comprises two different types of workstations residing in connected and adjacent relation to a lower track layout of the gridded storage structure 603 to allow direct serving of these workstations by the robotic handlers 208 of the gridded storage structure 603. The macro facility 12 comprises one or more value-added service (VAS) workstations 606 and one or more kitting workstations 607. In an embodiment, the VAS workstations 606 are multipurpose workstations used for both value-added services and other purposes, for example, inspection and processing of customer returns. These workstations are therefore referred to herein as VAS/Returns workstations 606 as illustrated in FIG. 6. In embodiments where multipurpose functionality is not mandatory, these workstations operate as VAS workstations 606. The VAS/Returns workstations 606 and the kitting workstations 607, each comprises two open access ports 606*a*, 606*b* and 607*a*, 607*b* respectively, in a countertop worksurface of the respective workstations 606 and 607 through which a human or robotic worker of the respective workstations 606 and 607 interacts with storage bins from the gridded storage structure 603. In an embodiment, at least one of the two ports 606*a* or 606*b* and 607*a* or 607*b* of the respective VAS workstations 606 and kitting workstations 607 is served by an extension track of the lower track layout of the gridded storage structure 603, whereby the robotic handlers 208 travel through the VAS workstations 606 and the kitting workstations 607 to carry the storage bins to and from this at least one port 606*a* or 606*b* and 607*a* or 607*b*. In this embodiment, the other port is served by an internal conveyor of the respective VAS workstations 606 and kitting workstations 607, on which the storage bins are dropped off by the robotic handlers 208 of the gridded storage structure 603, and subsequently picked thereby after having been conveyed to, and then subsequently from, an accessible position under the respective conveyor-served port of the respective VAS workstations 606 and kitting workstations 607. The details of such workstations 606 and 607 served by a combination of robotic handlers 208 travelling on a track-based drive-through travel path passing by one access port and a conveyor-based travel path on which other storage bins are conveyed past the other access port, are disclosed in Applicant's U.S. Provisional Patent Application 62/846,295 filed on May 10, 2019, the entirety of which is incorporated herein by reference.

Figure 7:
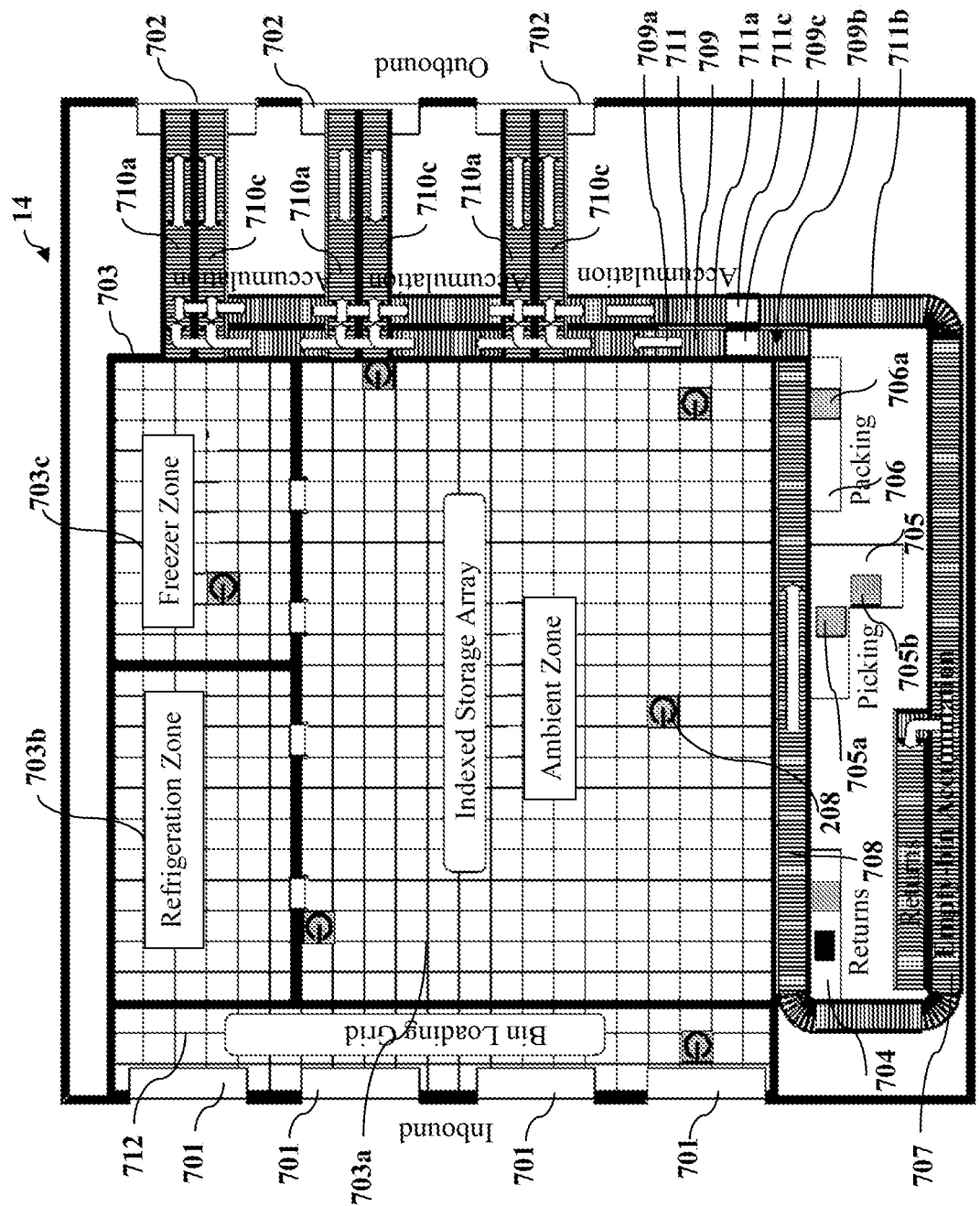
FIG. 7 illustrates a top plan view of a layout of a micro facility of the multi-nodal supply chain system, according to an embodiment herein.

FIG. 7 illustrates a top plan view of a layout of a micro facility 14 of the multi-nodal supply chain system 200 shown in FIGS. 2A-2B and FIGS. 4A-4B, according to an embodiment herein. The micro facility 14 comprises inbound loading docks 701, outbound loading docks 702, and an indexed storage array having a gridded storage structure 703 of the same type as the macro facility 12 illustrated in FIG. 6. In an embodiment, the inbound loading docks 701 and the outbound loading docks 702 are positioned at opposing perimeter sides or ends of the micro facility 14. In an embodiment, the micro facility 14 is of a smaller scale when compared to the macro facility 12. In an embodiment, the gridded storage structure 703 of the macro facility 12 is a subdivided storage structure having environmentally distinct storage zones, for example, an ambient zone 703*a*, a refrigeration zone 703*b*, and a freezer zone 703*c*. In an embodiment, the inbound loading docks 701 are neighboured by a loading grid structure 712 of the same type employed at the outbound loading docks 502 of the mega facility 10 illustrated in FIG. 5 and at both the inbound loading docks 601 and the outbound loading docks 602 of the macro facility 12 illustrated in FIG. 6.

In an embodiment, the micro facility 14 comprises workstations of different types residing in connected and adjacent relation to a lower track layout of the gridded storage structure 703 for direct serving of these workstations by the robotic handlers 208 thereof. The workstations comprise at least one returns workstation 704, at least one order-picking workstation 705, and at least one order-packing workstation 706. The first multi-order picking stage of the order preparation process is performed at the order-picking work station(s) 705, where product-filled multi-compartment storage (MCS) bins 224*b* illustrated in FIG. 4A, are received from either the gridded storage structure 703 of the indexed storage array of the micro facility 14, if previously inducted thereto, or directly from the inbound loading dock(s) 701 at which an MCS bin 224*b* arrived based on a decision by the facility management subsystem 204 of the micro facility 14 illustrated in FIGS. 2A-2B, to bypass storage, for example, based on determination that a product in the arriving MCS bin 224*b* is the last remaining product needed to fulfill a customer order that was otherwise fulfillable by other products already at the micro facility 14. Each order-picking workstation 705 is also served with a supply of the picked-order (PO) bins, which in an embodiment, is stored in the gridded storage structure 703 of the indexed storage array of the micro facility 14 and retrieved therefrom and delivered to the multi-order processing stage by the robotic handlers 208 of the indexed storage array, for example, by extension tracks leading out from a gridded lower track layout of the gridded storage structure 703 of the type shown in FIG. 8. In an embodiment, the order-picking workstation(s) 705 and the order-packing workstation(s) 706 are of the same type as the VAS/Returns workstation 606 and/or the kitting workstation 607 of the macro facilities 12 illustrated in FIG. 6. In an embodiment, the order-picking workstation(s) 705 comprises two open access ports 705*a*, 705*b* in a countertop worksurface of the order-picking workstation(s) 705 through which a human or robotic worker of the order-picking workstation(s) 705 interacts with storage bins from the gridded storage structure 703. In an embodiment, the order-packing workstation(s) 706 comprises a single open access port 706*a* in the countertop worksurface of the order-packing workstation(s) 706 through which a human or robotic worker of the order-packing workstation(s) 706 interacts with storage bins from the gridded storage structure 703.

Instead of the outbound loading docks 702 of the micro facility 14 being served by the robotic handlers 208 on a loading grid structure, in an embodiment, the micro facility 14 comprises one or more outbound conveyors running from the order-packing workstation(s) 706 toward the outbound loading docks 702. In an embodiment, a shared outbound conveyor run 709 runs to all the outbound loading docks 702 and comprises an upper outbound conveyor 709a disposed in elevated relation over a matching lower outbound conveyor 709b. A respective set of loading/unloading conveyors 710a-710d runs between the shared outbound conveyor run 709 and each outbound loading dock 702. Of this set, two upper loading/unloading conveyors 710a, 710c link up with the upper outbound conveyor 709a, and two lower loading/conveyors 710b, 710d positioned beneath the upper loading/unloading conveyors 710a, 710c, and therefore, obstructed from view in FIG. 7, but visible in FIG. 19C, link up with the lower outbound conveyor 709b.

In an embodiment, one or more return conveyors are also included to move upstream-headed storage bins from the outbound loading docks 702 in an upstream direction that is reverse to a downstream direction in which downstream-headed storage bins are conveyed by the outbound conveyor run 709. In an embodiment, a shared inbound conveyor run 711 is fed from each set of loading/unloading conveyors 710a-710d and runs alongside the outbound conveyor run 709 at the same side of the gridded storage structure 703 facing the outbound loading docks 702, and similarly comprises an upper return conveyor 711a and an underlying lower return conveyor 711b. At each outbound loading dock 702, the upper return conveyor 711a is linked to the upper loading/unloading conveyors 710a, 710c, and the lower return conveyor 711b is linked to the lower loading/unloading conveyors 710b, 710d. The upper return conveyor 711a terminates at a vertical elevator 711c of the return elevator run 711, from which the lower return conveyor 711b continues onward and runs along a neighbouring side of the gridded storage structure 703 where the returns workstation(s) 704, the order-picking workstation(s) 705, and the order-packing workstations 706 are positioned, on a side of these workstations 704, 705, and 706 opposite the gridded storage structure 703. This return conveyor 711 then connects up with a feed conveyor 708 that similarly runs past the returns workstation(s) 704, the order-picking workstation(s) 705, and the order-packing workstations 706, for example, between these workstations 704, 705, and 706 and the respective side of the gridded storage structure 703, before connecting up to the starting end of the outbound conveyor run 709. In various embodiments, different workstations are situated at various locations on different sides of the gridded storage structure 703, with a different arrangement of outbound and return conveyors to serve both a downstream flow of storage bins from the workstations 704, 705, 706 to the outbound loading docks 702, and an upstream flow of storage bins from the outbound loading docks 702 to all, or a subset of, the various workstations 704, 705, and 706.

Figure 8:
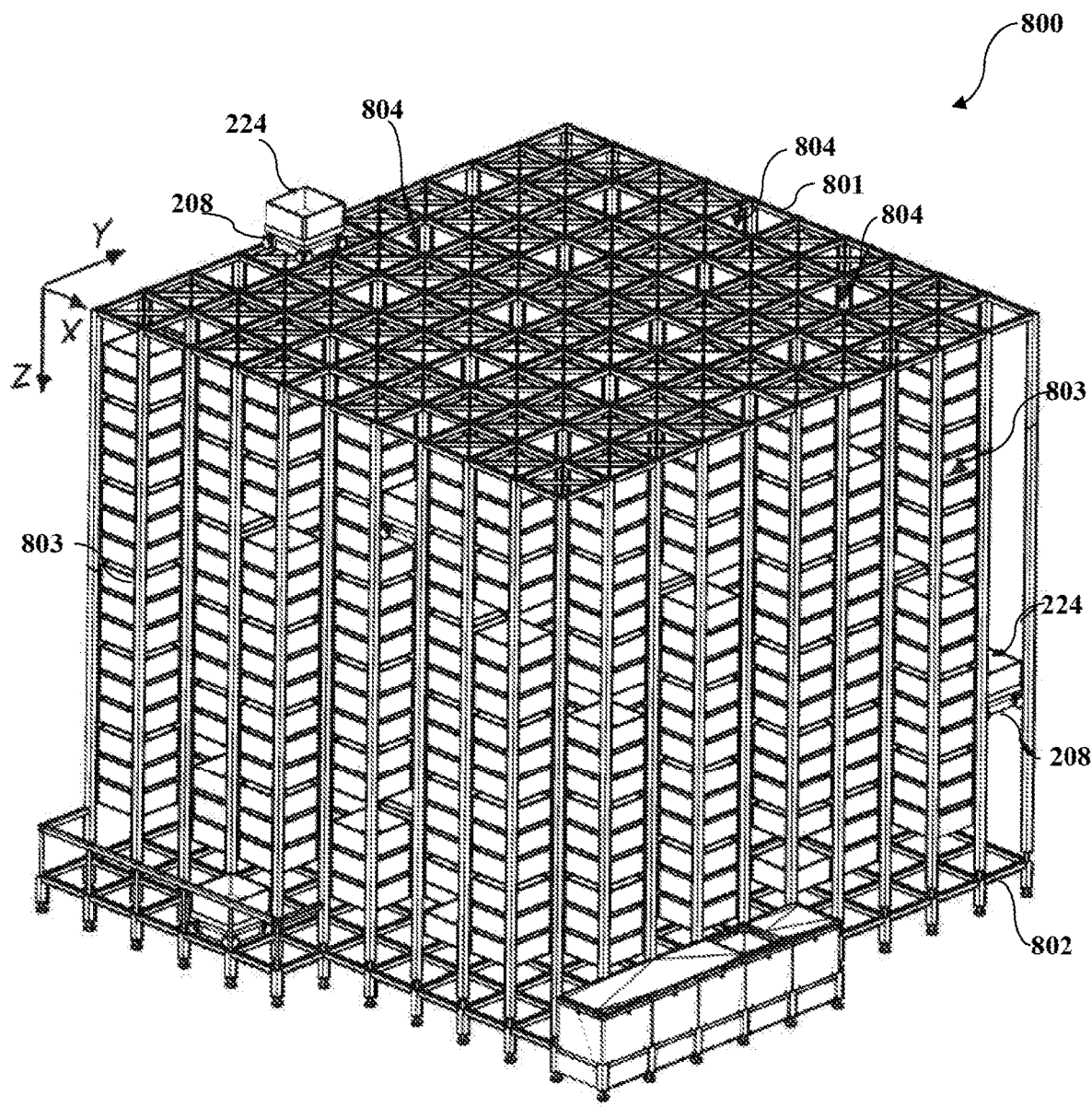
FIG. 8 illustrates a three-dimensional gridded storage structure configured to fully or partly define a three-dimensional array of indexed storage locations within each of the mega, macro and micro facilities of the multi-nodal supply chain system, according to an embodiment herein.

FIG. 8 illustrates a three-dimensional gridded storage structure 800 configured to fully or partly define a three-dimensional array of indexed storage locations within each of the mega, macro and micro facilities of the multi-nodal supply chain system 200 shown in FIGS. 2A-2B and FIGS. 4A-4B, according to an embodiment herein. As illustrated in FIG. 8, the three-dimensional gridded storage structure 800 comprises a gridded upper track layout 801 positioned in an elevated horizontal plane above a matching and aligned gridded lower track layout 802 positioned in a lower horizontal plane proximal to a ground level. Between these aligned gridded upper and lower track layouts 801 and 802 is a three-dimensional array of shelved storage locations, each capable of holding a respective storage bin 224 therein. The storage locations are arranged in vertical columns 803, in which storage locations of an equal square footprint are aligned over one another. Each such vertical column 803 is neighboured by a vertically upright shaft 804 that is absent of any shelving and storage bins 224 to enable vertical travel of the robotic handlers 208 therethrough, whereby the storage locations of the neighbouring storage column are accessible by the robotic handlers 208 from this open vertically upright shaft 804. The fleet of robotic handlers 208 is configured to horizontally traverse each track layout 801 and 802 in two dimensions and traverse vertically between the two track layouts 801 and 802 via the open vertically upright shafts 804.

Each of the track layouts 801 and 802 comprises a set of X-direction rails lying in the X-direction of the respective horizontal plane, and a set of Y-direction rails perpendicularly crossing the X-direction rails in the Y-direction of the same horizontal plane. The crossing rails define a horizontal reference grid of a storage system, where each horizontal grid row is delimited between an adjacent pair of the X-direction rails and each horizontal grid column is delimited between an adjacent pair of the Y-direction rails. Each intersection point between one of the horizontal grid columns and one of the horizontal grid rows denotes the position of a respective vertical column 803 or a respective upright shaft 804. That is, each vertical column 803 and each upright shaft 804 reside at a respective Cartesian coordinate point of the reference grid at a respective area bound between two of the X-direction rails and two of the Y-direction rails. Each such area bound between four rails in either track layout is also referred to herein as a respective "spot" of the track layout. The three-dimensional addressing of each storage location in the gridded storage structure 800 is completed by the given vertical level at which the given storage location resides within the respective storage column. That is, a three-dimensional address of each storage location is dictated by the horizontal grid row, the horizontal grid column, and the vertical column level of the storage location in the three-dimensional gridded storage structure 800. The gridded storage structure 800, therefore, defines an indexed three-dimensional array of storage locations, each identifiable by its respective Cartesian address in the gridded storage structure 800. In an embodiment, extension tracks and other grid structures are coupled to the gridded storage structure 800 to lead to and serve other areas, for example, workstations, loading docks, etc., of a facility, thereby enabling carrying of the storage bins 224 between the gridded storage structure 800 and such other areas, and within such other areas.

In various embodiments, instead of the use of this particular type of gridded storage structure 800 and robotic handler 208 at the mega, macro and micro facilities 10, 12 and 14 illustrated in FIGS. 5-7, other types of indexed storage arrays and cooperating robotic handlers similarly capable of receiving, storing, and extracting standardized storage bins 224 of a predetermined size and configuration at each facility are used. As used herein, with respect to the gridded storage structure 800 and corresponding robotic handlers 208, the predetermined size of the standardized storage bins 224 refers to a size and a footprint that are configured to fit atop an upper platform of the robotic handler 208, and also within the footprint and confines of each shelved storage location in the gridded storage structure 800. The configuration of the storage bin 224 refers to appropriate features thereon for engagement by an extendable/retractable arm of the robotic handler 208 that is operable to pull the storage bin 224 out of a storage location onto the robotic handler 208, and to push the storage bin 224 off the robotic handler 208 into a storage location. Where other types of storage arrays and robotic handlers are used, the predetermined size and configuration of the standardized storage bins 224 are defined by the particular details of the storage array structure/environment, and the cooperative robotic handlers operating in the structure/environment.

In an embodiment, each facility comprises both an ambient storage area at an ambient room temperature, and one or more environmentally controlled storage areas, for example, comprising one or more cold storage areas such as a refrigeration area of a less-than-ambient temperature and a freezer area of an even lesser temperature, for environmentally sensitive inventory. In an embodiment, each such environmentally distinct storage area contains a respective portion of the overall indexed storage array of the facility, for example, with a separate gridded storage structure in each of these environmentally distinct storage areas to define a respective subset of the storage locations of the overall array. In another embodiment, the environmentally distinct storage areas are environmentally isolated zones of a shared singular storage structure as disclosed below for the embodiment illustrated herein. In other embodiments, only a subset of the facilities has multiple environmentally distinct storage areas of varying environmental conditions. For example, all facilities at the larger upper tiers of the multi-nodal supply chain system 200 illustrated in FIGS. 4A-4B, for example, the mega facilities 10 and the macro facilities 12, each comprise multiple environmentally distinct storage areas, while only partial subsets of the lower tier micro facilities 14 and nano facilities 16 comprise environmentally controlled storage areas, with other facilities at these lower tiers optionally being dedicated to ambient storage only.

Figure 9A:
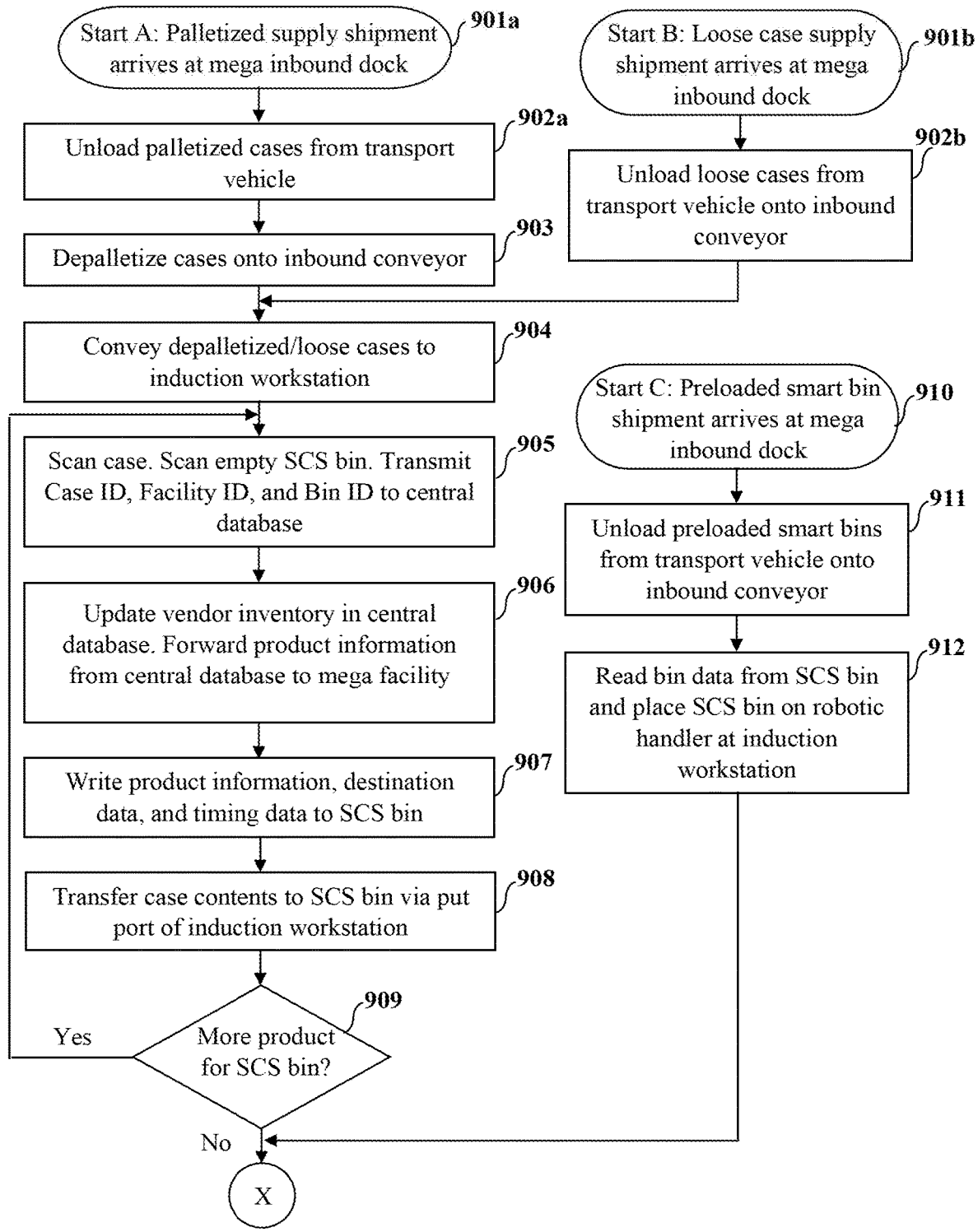
FIGS. 9A-9B illustrate a flowchart of a computer-implemented method for managing unloading of supply shipments at an inbound loading dock of a mega facility and induction of inventory items therefrom into the multi-nodal supply chain system in storage bins, according to an embodiment herein.
Figure 9B:
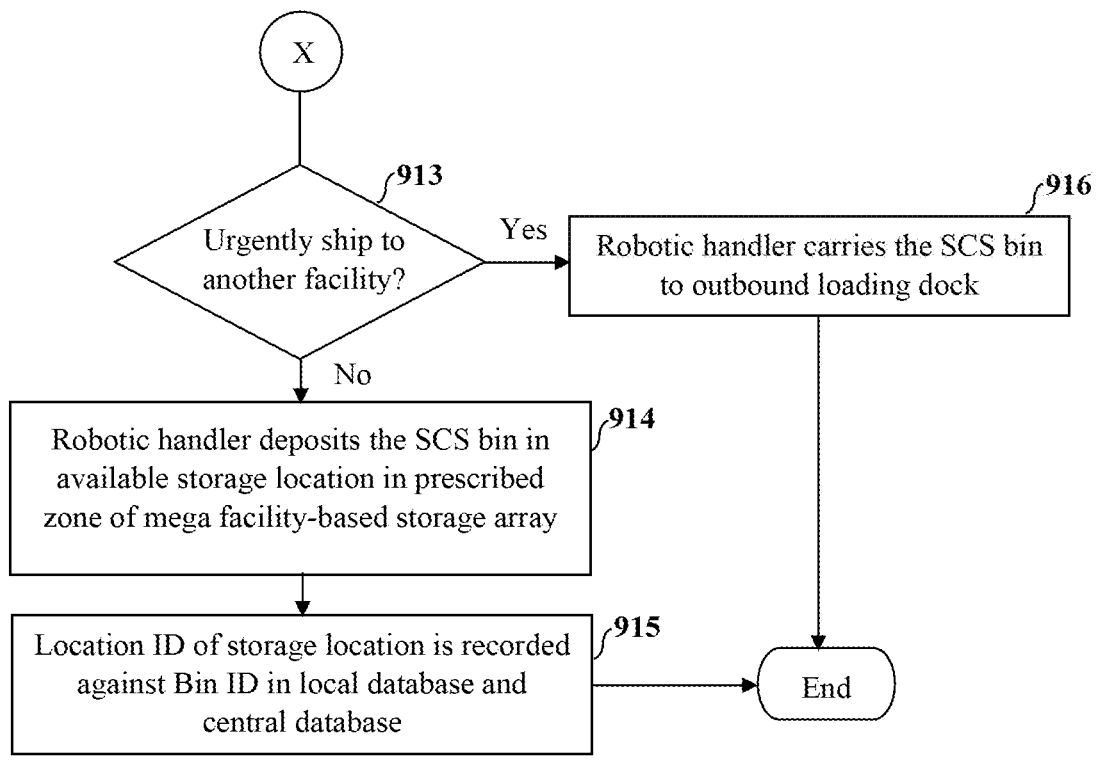

FIGS. 9A-9B illustrate a flowchart of a computer-implemented method for managing unloading of supply shipments at an inbound loading dock 501 of a mega facility 10 illustrated in FIGS. 2A-2B, FIGS. 4A-4B, and FIG. 5, and induction of inventory items therefrom into the multi-nodal supply chain system 200 in storage bins, according to an embodiment herein. The flowchart comprises the steps of governing receipt of an incoming supply shipment 401a and induction of new inventory contained therein into the indexed storage array of the mega facility 10. When a transport vehicle, for example, a truck or another delivery vehicle containing palletized supply shipment arrives 901a at an inbound loading dock 501 of the mega facility 10, at step 902a, palletized cases or pallets of the supply shipment 401a are unloaded from the transport vehicle. At step 903, the palletized cases are depalletized and transferred onto an inbound conveyor 505, whether placed directly thereon or fed thereto by a feed conveyor 504. In an embodiment, at step 901b, where a loose case supply shipment 401a arrives at an inbound loading dock 501 of the mega facility 10, loose cases from the transport vehicle are unloaded from the transport vehicle onto the inbound conveyor 505 at step 902b. At step 904, the inbound conveyor 505 conveys the individual cases to the induction workstations 506. Upon or after arrival at an induction workstation 506, or during approach thereto on the inbound conveyor 505, at step 905, a case from the supply shipment has its Case_ID detected or inputted to the facility management subsystem 204, for example, by using an automated scanner or a worker-operated scanner to scan a code, for example, a license plate number (LPN) barcode on the case in which the Case_ID is encoded. Meanwhile, an empty single-compartment storage (SCS) bin 224a is delivered to the put port 506a of the induction workstation 506 by one of the robotic handlers 208 from the gridded storage structure 507 illustrated in FIG. 5, to accept placement therein of new product inventory from the scanned case of the supply shipment.

Furthermore, at step 905 of FIG. 9A, the facility management subsystem 204 forwards the scanned Case_ID and the Bin_ID of the empty SCS bin 224a to the central computing system 201. The central computing system 201 queries the shipment details table 318 for the Case_ID, and thereby identifies the Shipment_ID of the shipment to which the case belongs, and derives therefrom the Vendor_ID of the recipient vendor of that shipment from the supply shipment table 317. In an embodiment where multi-compartment storage (MCS) bins 224b are stored in the same storage bins table 308 as the SCS bins 224a, the central computing system 201 looks up the singular compartment ID of the empty SCS bin 224a in the storage bins table 308 using the received Bin_ID. Using this information, at step 906, the central computing system 201 updates the vendor's stocked inventory table 304 of the identified vendor by adding a record therein that contains the received Bin_ID and/or an identified Compartment_ID of the empty SCS bin 224a; the Product_ID(s) of the product type supplied in the scanned case and the quantity thereof, as identified from the shipment details table 318 using the scanned Case_ID; and the Facility_ID received from the facility management subsystem 204. Accordingly, the vendor's stocked inventory table 304 is automatically updated to add the product contents of that case thereto, and to identify the SCS bin 224a in which those products are found, and the facility at which that SCS bin 224a resides.

In an embodiment, before this updating of the vendor's stocked inventory table 304, an environmental check is optionally first performed to assess whether the environmental flag of the SCS bin 224a matches the prescribed environmental data for the Product_ID concerned, that is, to ensure that a refrigeration or freezer requiring product type from the supply shipment is placed only in a refrigeration or freezer compatible SCS bin. In the event of a positive environmental match, the facility management subsystem 204 commands initiation of an automated transfer of the products from the case to the SCS bin 224a by a robotic worker of the induction workstation 506, or instead signal a human worker at the induction workstation 506 to initiate a manual transfer, for example, via audible and/or visual instructions conveyed to the human worker by a human-machine interface (HMI) that is installed at the induction workstation 506 or is borne by the human worker, for example, via a head mounted display. Absent a positive environmental match between the new inventory product type and the SCS bin 224a currently at the put port 506a of the induction workstation 506, the facility management subsystem 204 commands a robotic handler 208 to retrieve from the gridded storage structure 507, a different empty SCS bin 224a having a matching environmental flag to the environmental data of the Product_ID concerned, and to deliver the empty environmentally compatible SCS bin 224a to the put port 506a of the induction workstation 506, and in the meantime commands departure, from the put port 506a, of the robotic handler 208 on which the original environmentally incompatible SCS bin 224a is carried.

In another embodiment, if empty SCS bins 224a are stored outside the robotically served gridded storage structure 507, the absence of a positive environmental match notifies the human worker of the environmental incompatibility, and conveys audible and/or visual instructions via the human-machine interface directing the worker to set aside the incompatible SCS bin 224a and retrieve a different SCS bin 224*a* of the suitable environmental type matching the product concerned. As opposed to performing an environmental compatibility check on a previously retrieved empty SCS bin 224*a*, in an embodiment, the facility management subsystem 204 is configured to command automated or human selection and retrieval of an environmentally compatible SCS bin 224*a* on an on-demand basis, where only once the case from the supply shipment has been scanned, and the environmental data of the product concerned thus retrieved from the central database 203, does the facility management subsystem 204 command automated retrieval or human selection and retrieval of an on-site SCS bin 224*a* that is both empty and environmentally compatible. In this embodiment, the facility management subsystem 204 queries the on-site bins table 322 for empty SCS bins 224*a* having the appropriate environmental flag, and then commands a robotic handler 208 to retrieve an identified empty and compatible SCS bin 224*a* from the gridded storage structure 507 and deliver same to the put port 506*a* of the induction workstation 506.

In addition to this environmental compatibility check between the product type being transferred from the case of the supply shipment and the SCS bin to which the product type is being transferred, in an embodiment, the facility management subsystem 204 performs a handling compatibility check therebetween. In this embodiment, when querying the shipment details table 318 for an answer to a receipt of the Case_ID and the Bin_ID from the facility management subsystem 204, the central computing system 201 uses the Product_ID returned from that query to also query the vendor's product table 303 and check the handling data of the product type concerned for any handling codes or flags denoting a requirement that the product type can only be placed in certain compatible storage bins. If such bin-related handling data is found, then the central computing system 201 sends the bin-related handling data back to the facility management subsystem 204 with the environmental data so that the facility management subsystem 204 can perform a handling-compatibility check in the same manner as the disclosed environmental compatibility check. One example of bin-related handling data is an allergenic code or flag, of which there are multiple categories such as peanut free, tree nut free, gluten free, shellfish free, dairy free, etc., denoting that the product can only be placed in storage bins that have been designated allergenic-safe for the same category, as denoted by storage of a matching flag or code in the handling data of the bin information table 326 of the storage bin. In an embodiment, this same handling-compatibility check is likewise performed in combination with the environmental compatibility check anytime a storage bin is being selected for placement of product therein, consistently throughout all the product, order and bin handling processes disclosed herein.

In addition to the updating of the vendor's inventory records, step 906 also includes the central computing system's 201 use of the Product_ID(s) from the shipment details record to look up the corresponding product record of the vendor's product table 303. The central computing system 201 forwards the Vendor_ID, a copy of the product record, and the retrieved product quantity to the facility management subsystem 204, which then at step 907, communicates all this data onto the mobile data storage device 226 of the SCS bin 224*a* at the induction workstation 506, for example, over the local wireless network 206 of the mega facility 10, thereby populating the SCS bin's contents table 327 and the product information table 328. Where environmental and/or handling compatibility checks are performed in advance to ensure selection of an appropriately compatible SCS bin, then the entire product record from the vendor's product table 303 is forwarded by the central computing system 201 to the facility management subsystem 204 in a singular communication in response to the receipt of the Case_ID, thereby providing the facility management subsystem 204 with all the data needed to complete the environmental and handling compatibility checks for appropriate bin selection, in addition to the subsequent population of data onto the mobile data storage device 226 of the selected SCS bin 224*a*.

Other data written to the SCS bin's 224*a* mobile data storage device 226 at step 907 includes updating of fields in the bin information table 326, for example, the destination data and the timing data fields that govern whether the SCS bin 224*a* needs to be delivered to another facility, and whether there is a particular timeline within, or urgency with which, such delivery must take place. In an embodiment, the destination data is defined based on vendor-specified details previously stored in the central database 203, for example, a destination specified by the vendor during placement of their supply shipment order to a supplier, and stored in the supply shipment table 317 or the supply shipment details table 318. In an embodiment, the destination data written to the SCS bin's 224*a* mobile data storage device 226 is based on a real-time assessment by the computerized supply chain management system of the vendor's inventory levels of the given product at various facilities 10, 12, and 14 in the multi-nodal supply chain system 200, as queried from the vendor's stocked inventory table 304; or based on a pending customer order in the customer orders table 315, that is awaiting arrival of that product; or based on predictive customer demand from historical order fulfillment records stored in the customer orders table 315 or in a separate historical order archive stored elsewhere in the central database 203. In an embodiment, the timing data concerning the urgency with which the product is to be conveyed through the network toward the destination is based on a priority status or a targeted delivery date for a pending customer order for that product, as identified from the shipping preferences in the customer orders table 315; or based on the nature of the product itself, for example, urgent transport of consumables with short expiration dates such as meat, dairy, etc., or other products likewise having a short shelf life, in which case the vendor's product table 303 includes a timing data field in which short-expiration products are flagged.

At step 908, whether performed after, during or before steps 905 to 907, a human or robotic worker attending the induction workstation 506 places the products from the scanned supply shipment case into the empty SCS bin 224*a* through the put port 506*a* of the induction workstation 506. At step 909, it is checked whether more of the same product can be placed in the same SCS bin 224*a*, for example, based on human or machine-performed identification of additional remaining capacity in the SCS bin, and determination from a scanning of another arrived or approaching supply shipment case at the induction workstation 506 that this other case also contains the same product type intended for the same recipient vendor, as determined using the scanned Case_ID in the same manner disclosed above. If there is both available capacity in the SCS bin 224*a* and further supply of the same product in the next case of the supply shipment, then steps 905 to 908 are repeated. If either further bin capacity or further supply is answered in the negative, then the SCS bin 224a is ready to be transported away from the induction workstation 506 to another destination in the mega facility 10.

As illustrated in FIG. 9A, for each single-SKU case of the depalletized or loose case shipment, multiple eaches of the particular product in that case are deposited into one of the standardized SCS bins 224a compatible with the indexed storage array of the mega facility 10. The example above presumes that the entire contents of a case will fit within a singular SCS bin and hence uses the product quantity read from the Case_ID record in the shipment details table 318 as the quantity to add to the vendor's stocked inventory table 304 and to populate the record in the SCS bin's contents table 327. In an embodiment, the process defers the assignment of a quantity value to the vendor's stocked inventory table 304 and the SCS bin's onboard contents table 327 until actual physical placement of product from the case into the SCS bin has taken place up to the point of the storage bin's maximum capacity, and only then recording the actual quantity placed in the SCS bin in the vendor's stocked inventory table 304 and the SCS bin's onboard contents table 327.

The filled SCS bin 224a is typically stored in the gridded storage structure 507 by one of the robotic handlers 208, unless alternative routing of the SCS bin is particularly justified, for example, due to urgent downstream demand for that particular product elsewhere in the multi-nodal supply chain system 200, in combination with the presence or expected imminent arrival of a transport vehicle at the outbound loading docks 502 of the mega facility 10, that is scheduled to travel downstream to or toward that particular product's intended destination. In such circumstances, one or more of the SCS bins 224a containing that product may be cross docked for urgent transport to another facility on that waiting or expected transport vehicle 215a. Accordingly, at step 913, once the SCS bin 224a is filled and ready to be carried away, for example, by the same robotic handler 208 that brought the SCS bin 224a to the induction workstation 506 and on which the SCS bin 224a still resides, the facility management subsystem 204 commands travel of the robotic handler 208 to an appropriate destination in the mega facility 10 based on the same destination, timing, handling and customization data that was written to the mobile data storage device 226 of the SCS bin 224a in the preceding steps. In an example, if the destination and timing data dictate that the contents of the SCS bin 224a are urgently required at another facility, then the robotic handler 208 carries the SCS bin 224a directly to the outbound loading docks 502, at step 916, for example, by traveling horizontally across the gridded storage structure 507 on the lower track layout thereof from the induction workstation 506 to the bin loading grid structure 509, where the robotic handler 208 loads the SCS bin 224a onto the waiting or arriving transport vehicle 215a at the outbound loading docks 502.

On the other hand, if the destination data and the timing data do not dictate urgent cross-docking of the SCS bin 224a at step 913, then at step 914, the facility management subsystem 204 commands the robotic handler 208 to instead deposit the SCS bin 224a into an available storage location in the gridded storage structure 507. The zone of such available storage location is subject to confirmation that the environmental status indicator recorded for that storage location in the global storage locations table 310 or the facility storage table 320a matches the environmental flag in the bin information table 326 of the SCS bin 224a, which based on the prior cross-checking of the environmental data from the vendor's product table 303 against the SCS bin's environmental flag denotes that the storage location is environmentally compatible with the product type placed in that SCS bin 224a. Upon confirmed placement of the SCS bin 224a in the available storage location by the robotic handler 208, then at step 915, the facility management subsystem 204 records the Bin_ID of that SCS bin 224a against the Location_ID of the storage location in the facility storage table 320a of the local facility database 207, and/or records the Location_ID of that storage location in the on-site bins table 322 of the local facility database 207. Furthermore, in step 915, the facility management subsystem 204 forwards the same Location_ID and Bin_ID to the central computing system 201 for recordal of this Location_ID against the Bin_ID of the deposited SCS bin 224a in the global storage bins table 308, and optionally also in the vendor's stocked inventory table 304 of the vendor if the Location_ID field is duplicated therein. Using this recorded data, the database software, responsive to the query of the vendor's stocked inventory table 304 for the product type inducted in that SCS bin, is configured to look up the Bin_ID of each SCS bin in which the product type is found, and return the quantity of the product type in the SCS bin, the Facility_ID of the facility at which the SCS bin is found, and the particular storage location in which the SCS bin resides in the facility if currently stowed in the indexed storage array thereof.

Regardless of the format of each incoming supply shipment 401a, 401b, for example, full case versus mixed case; palleted versus loose case, etc., the same general process of decanting product or products from the incoming supply shipment cases at the induction workstations 506 into SCS bins 224a on a single-SKU basis of only one product type per SCS bin is performed at the mega facility 10. Some or all incoming supply shipments 401a, 401b are decanted on a singulated basis, in which individual eaches of the new inventory products are placed into SCS bins 224a and inducted into the indexed storage array of the mega facility 10. In other instances, instead of singulating the new inventory products, one or more full cases of a given product type are transferred into an SCS bin 224a if the relative dimensions of the cases and the SCS bins allow decanting at the case level rather than the singulated level. Regardless, during the initial loading of the new inventory products from the incoming supply shipment 401a into the SCS bins 224a, the memory of the mobile data storage device 226 of each SCS bin 224a is loaded with data populating its contents table 327, for example, with the Product_ID(s) and quantity of the particular product type being placed within that SCS bin 224a, and also populating the SCS bin's product information table 328 with the corresponding record for that product type from the vendor's product table 303. While in an embodiment, the decanting procedure and uploading of data to the SCS bin 224a are performed at the induction workstations 506 at which the loaded SCS bins 224a are then inducted into the gridded storage structure 507 by the robotic handlers 208, or carried directly to the loading grid structure 509 at the outbound loading docks 502, in another embodiment, the decanting process can be performed upstream of the induction workstations 506, for example, at the depalletization stations 503 or at separate decanting stations (not shown) situated between the depalletization stations 503 and the induction workstations 506.

While the forgoing example of a full-case shipment uses a Case_ID to look up the shipment in the central database 203 and thereby identify both the vendor to whose inventory the shipment belongs and the product type and quantity found in that full case; other embodiments accommodating for mixed-case supply shipments employ such initial scanning of the Case_ID from the LPN barcode, followed by subsequent scanning or other inputting of the vendor or global Product_ID from the individual eaches found in the mixed case, for example, by scanning a universal product code (UPC) or a stock keeping unit (SKU) code on the eaches as they are placed in the SCS bin 224a, and updating the contents table 327 of the SCS bin 224a and the stocked inventory table 304 in the central database 203 based on the Product_IDs of the scanned eaches and the quantity of each Product_ID scanned, while also populating the SCS bin's product information table 328 with the corresponding record (s) from the vendor's products table 303 in the central database 203. In any event, the SCS bin 224a has a dedicated onboard accounting of its contents, and the vendor's product catalogue 305 in the central database 203 is updated to include those contents and the Bin_ID of the SCS bin in which they are stored, whereby subsequent querying of the vendor's stocked inventory table 304 in the central database 203 for any catalogued product decanted from a supply shipment in the forgoing manner will report the Bin_IDs of any SCS bins 224a holding that product, the quantity of product in each such SCS bin 224a, the facility at which that SCS bin 224a resides, and the storage location in which that SCS bin 224a resides if currently stowed in the indexed storage array of the mega facility 10.

This same uploading of Product_ID, owner Vendor_ID, product quantity, some or all product information, destination data, and timing data, collectively referred herein as "bin data", to the mobile data storage device 226 of an SCS bin 224a during initial loading thereof from a supply shipment can be employed not only at the mega facility 10, but also at any other facility where new incoming product inventory is being introduced to the overall supply chain system 200, or anywhere products are being transferred from one storage bin to another, whether an SCS bin or otherwise, as disclosed below. In an embodiment, the uploading of the bin data to the storage bins is employed regardless of whether the storage bin being loaded is being loaded on a single-SKU or multi-SKU basis. That is, while an SCS bin 224a loaded with only a singular product type owned by a singular vendor will have only a singular record in its contents table 327 and a singular record in its product information table 328, in an embodiment, the contents table 327 and the product information table 328 on the mobile data storage device 226 of a storage bin are optionally loaded with multiple records, each having a respective data set describing a respective product type being deposited in that storage bin, for example, multiple products in the same vendor's product catalogue 305 that share a same final or intermediate destination in the multi-nodal supply chain system 200 as recorded in the destination data field of the bin information table 326. Examples of such multi-SKU loading operations involving placement of multiple products of different types in the same storage bin are disclosed below at other points in the supply chain workflow.

As illustrated in FIG. 4A, in addition or alternative to supply shipments 401a received in conventional product packaging, for example, cardboard boxes or shipping totes; whether palletized or loose, supply shipments optionally comprise pre-binned shipments 401b in which the products are delivered from the supplier using smart storage bins 224a, 224b compatible with the indexed storage arrays of the mega, macro and micro facilities 10, 12 and 14 respectively. In an embodiment, these incoming storage bins arriving at the mega facility 10 in a preloaded condition from the supplier are SCS bins 224a, each containing only products of a matching type that can be inducted directly into the indexed storage array of the mega facility 10 without having to perform a singulation step where products from the storage bins they arrived in are transferred into other SCS bins.

The preloaded storage bins from the supplier may have their mobile data storage devices 226 preloaded with the aforementioned bin data by the supplier before shipment to the mega facility 10 of the multi-nodal supply chain system 200. In an embodiment, the facility management subsystem 204 receives the preloaded bin data from the arriving preloaded storage bins at the mega facility 10, for example, after placement thereof on the inbound conveyor 505 and conveyance thereby to the induction workstations 506, as disclosed at step 911 of FIG. 9A. At step 912, the receipt of the preloaded bin data is accompanied by placement of the preloaded storage bin onto a robotic handler 208 at the put port 506a of the induction workstation 506, whereupon subsequent handling of the preloaded storage bin follows the process disclosed above for step 913 onward. Accordingly, at step 913, the destination and timing data from the preloaded bin data is used to select between induction into a storage location of the indexed storage array of the mega facility 10 in the appropriate environmental zone thereof prescribed by the preloaded bin data, versus a cross-docking operation involving commandment of the robotic handler 208 on which the preloaded storage bin was placed to travel directly to the loading grid structure 509 at the outbound loading docks 502 for urgent transport of the preloaded storage bin to another facility. Therefore, whether the bin data is being pulled from the central database 203 by the facility management subsystem 204 for loading of the bin data onto the mobile data storage device 226 of a previously empty SCS bin 224a during decanting of new inventory from an incoming palletized or loose case supply shipment, or is being pulled from the mobile data storage device(s) 226 of a pre-binned supply shipment 401b, the bin data is nonetheless used to make automated decisions regarding appropriate routing, for example, storage induction versus cross-docking of the arriving product within the mega facility 10.

On entry of a storage bin 224a, 224b to any of the facilities 10, 12, 14, and 16, the wireless communications unit 225 on the storage bin 224a, 224b establishes a wireless communication with the local area network 206 of the facility, and reports its Bin_ID to the facility management subsystem 204, which in turn communicates with the central computing system 201 to store the Facility_ID of that facility in the respective record of the storage bins table 308 in the central database 203, and optionally also in the stocked inventory table 304 of any vendor that has product in that storage bin, if the Facility_ID field is duplicated in the stocked inventory table 304. Either way, the Facility_ID is stored in association with the Bin_ID or the Compartment_ID stored in the stocked inventory table 304 of the vendor whose product is contained in that storage bin 224a, 224b, whereby querying of the vendor's product catalogue 305 for the particular product stored in that storage bin 224a. 224b will report the Facility_ID of the facility at which the storage bin 224a, 224b and product currently reside.

In an embodiment, each storage bin 224a, 224b and order bin 224c, 224d comprises an indoor positioning device 229 integrated into or connected to the wireless communications unit 225, for example, sharing the computer-readable memory, the wireless transceiver 227, and the local computer processor 228 used for the aforementioned wireless communication and data exchange. The indoor positioning system 211 at each of the mega, macro and micro facilities 10, 12 and 14 respectively, comprises components for wirelessly cooperating with the indoor positioning devices 229 on the storage bins 224a, 224b and the order bins 224c, 224d to determine the current co-ordinate position of any storage bin currently located within that facility 10, 12, or 14. In an embodiment, acoustic beacons are used for indoor navigation of the storage bins within each of the facilities 10, 12, 14. In an embodiment, these facility-based positioning components are reference devices or initiator devices and reference devices. While these devices use a combination of high-speed radio frequency (RF) signals and lower speed acoustic signals for optimal positioning accuracy, in an embodiment, other indoor positioning technology is employed to enable determination of storage bin locations within the facilities 10, 12, 14, and 16 of the multi-nodal supply chain system 200.

Through the combination of the wireless communications unit 225 and the indoor positioning device 229, each storage bin not only identifies itself to the facility management subsystem 204 of a facility at which it arrives, but also identifies its current location within that facility, thereby providing optimal, high resolution tracking of inventory contained in the storage bins. In an embodiment, the indoor positioning devices 229 and the wireless communications units 225 on the storage bins are programmed to continually or periodically determine the positions of the storage bins, and communicate the calculated positions to the facility management subsystem 204, which in turn updates the stored positions in the central database 203 of the central computing system 201 configured, for example, as a cloud-based computing platform, or in an embodiment, stores the updated information only locally at the facility, until the Bin_ID is queried from the central computing system 201.

In an embodiment, the indoor positioning device 229 and the wireless communications unit 225 are configured to default to a reduced-functionality sleep mode, only periodically awaking to re-determine the position of the storage bin and report the position to the facility management subsystem 204 or the central computing system 201, for example, at timed intervals or in response to a status query signal emitted by the facility's local area network 206. In an embodiment, the indoor positioning device 229 further comprises one or more motion sensors, for example, accelerometer(s) and/or gyroscope(s)) operable to detect movement of the storage bin in a three-dimensional space, and to trigger awakening of the storage bin's electronics from the aforementioned sleep mode. This reduces energy consumption by the storage bin's electronics when sitting in a static position, for example, at a storage location in the indexed storage array of a facility, to maximize the lifespan of an onboard battery-based power supply of the storage bin's data storage, communication and indoor positioning components, and to ensure continuous or periodic reporting of the storage bin's position when the storage bin is known to be moving through the facility, whether by a human worker, a robotic handler 208, or a conveyor.

Figure 10A:
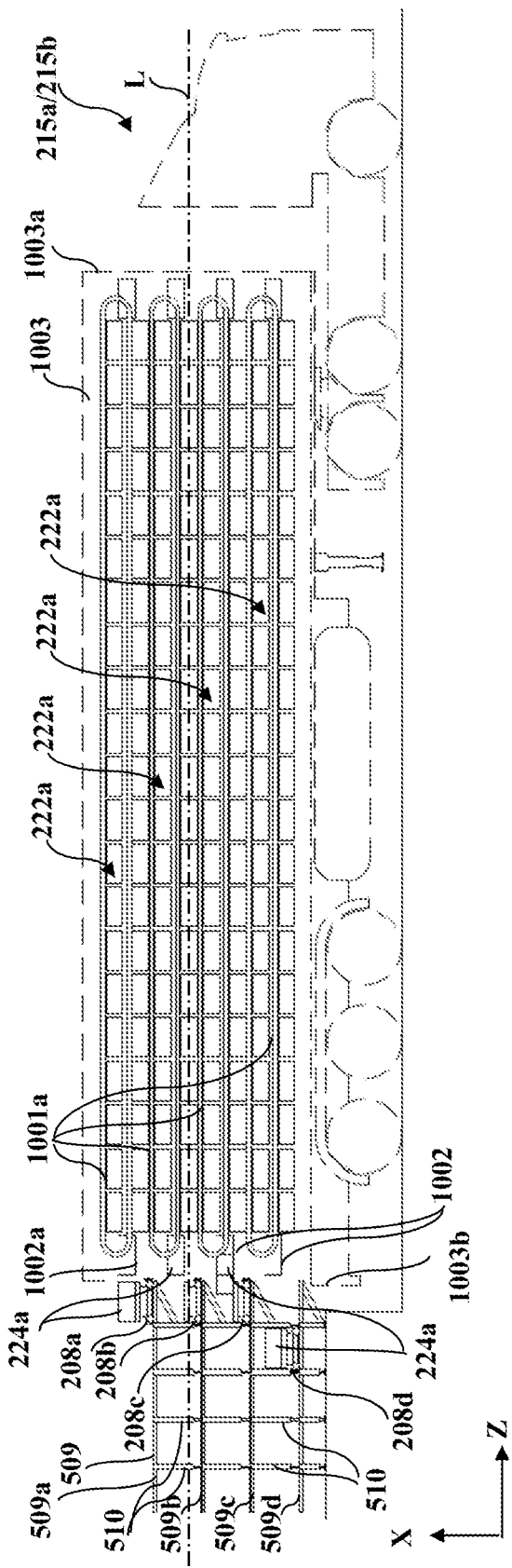
FIGS. 10A-10B illustrate a side elevation view and a top plan view of a large-scale transport vehicle respectively, for transporting storage bins between the mega, macro and micro facilities of the multi-nodal supply chain system, and a cooperating loading grid structure provided at loading docks of the facilities for facilitating automated loading and unloading of the large-scale transport vehicle by robotic handlers on the loading grid structure, according to an embodiment herein.
Figure 10B:
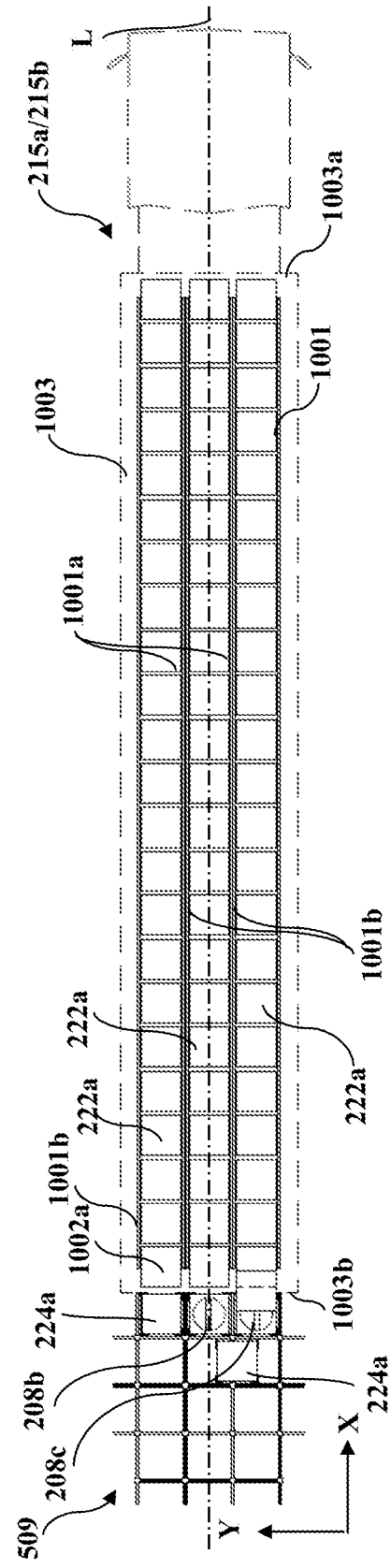
Figure 10C:
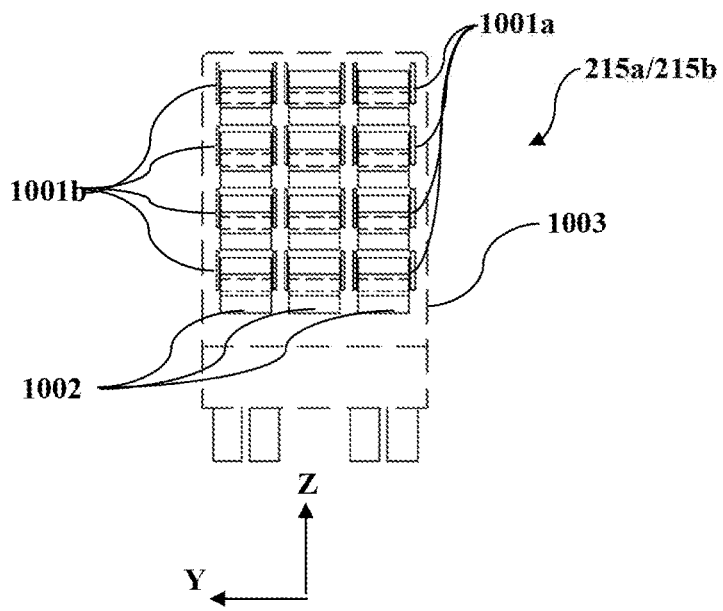
FIG. 10C illustrates a rear elevation view of the large-scale transport vehicle shown in FIGS. 10A-10B, according to an embodiment herein.

FIGS. 10A-10B illustrate a side elevation view and a top plan view of a large-scale transport vehicle 215a, 215b respectively, for transporting storage bins between the mega, macro and micro facilities 10, 12 and 14 of the multi-nodal supply chain system 200 shown in FIGS. 4A-4B, and a cooperating loading grid structure 509 provided at loading docks of the facilities 10, 12 and 14 for facilitating automated loading and unloading of the large-scale transport vehicle 215a, 215b by robotic handlers 208 on the loading grid structure 509 illustrated in FIG. 5, according to an embodiment herein. FIG. 10C illustrates a rear elevation view of the large-scale transport vehicle 215a, 215b shown in FIGS. 10A-10B, according to an embodiment herein. As illustrated in FIG. 4A, filled SCS bins 224a from the mega facility 10 are loaded onto a large transport vehicle 215a, for example, a semi-trailer truck, for downstream transport to one of the macro facilities 12. As illustrated in FIGS. 10A-10C, a trailer 1003 or other cargo space of the transport vehicle 215a, 215b features a respective array of indexed storage locations, each sized and configured for compatibility with the same storage bins 224a, 224b as the indexed storage arrays of the mega, macro and micro facilities 10, 12 and 14. The terms "facility-based array" and "vehicle-based array" are used herein to distinguish between the storage arrays in the static facilities 10, 12, 14, 16 and the storage arrays in the transport vehicles 215a, 215b. As illustrated in FIGS. 10A-10C, the vehicle-based array of the large transport vehicle 215a, 215b is of a different type than the robot-traversed gridded storage structure 800 illustrated in FIG. 8 used in the mega, macro and micro facilities 10, 12 and 14.

Figure 11A:
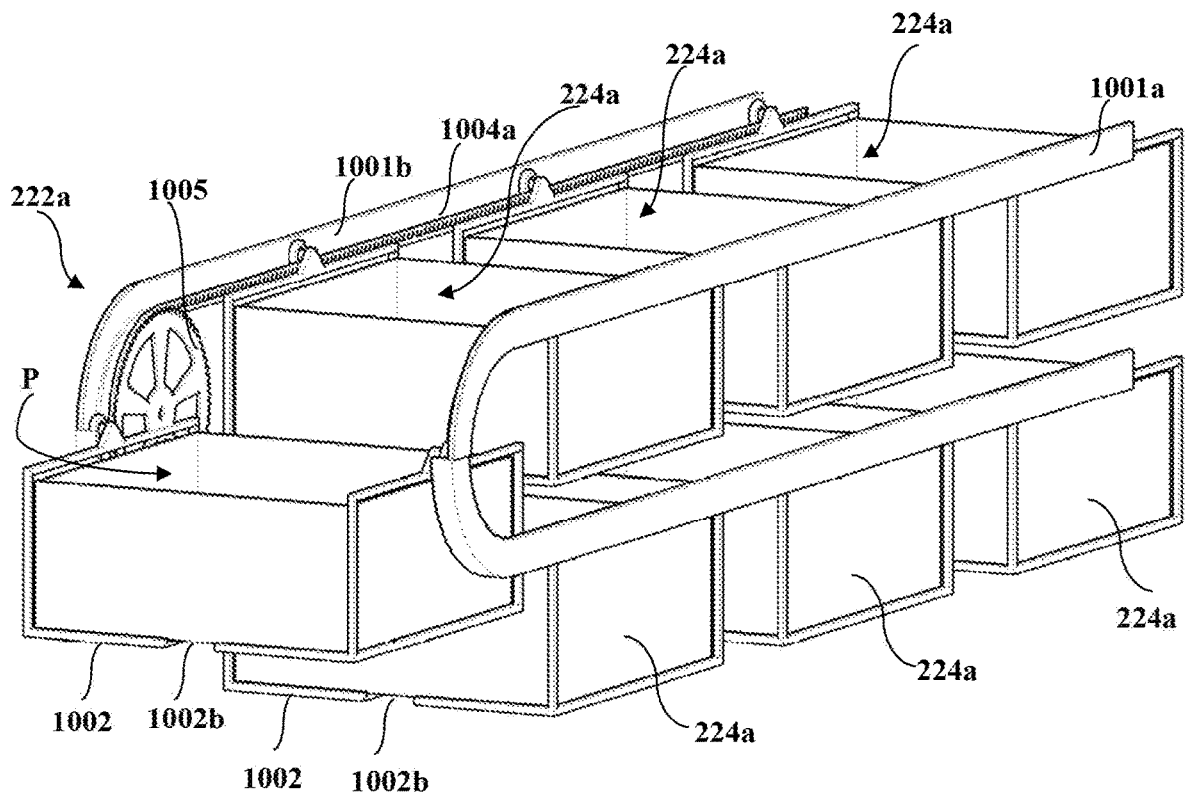
FIGS. 11A-11C illustrate partial rear perspective, side elevation and top plan views of a bin carousel respectively, for indexed holding of storage bins and order bins in the large-scale transport vehicle, according to an embodiment herein.
Figure 11B:
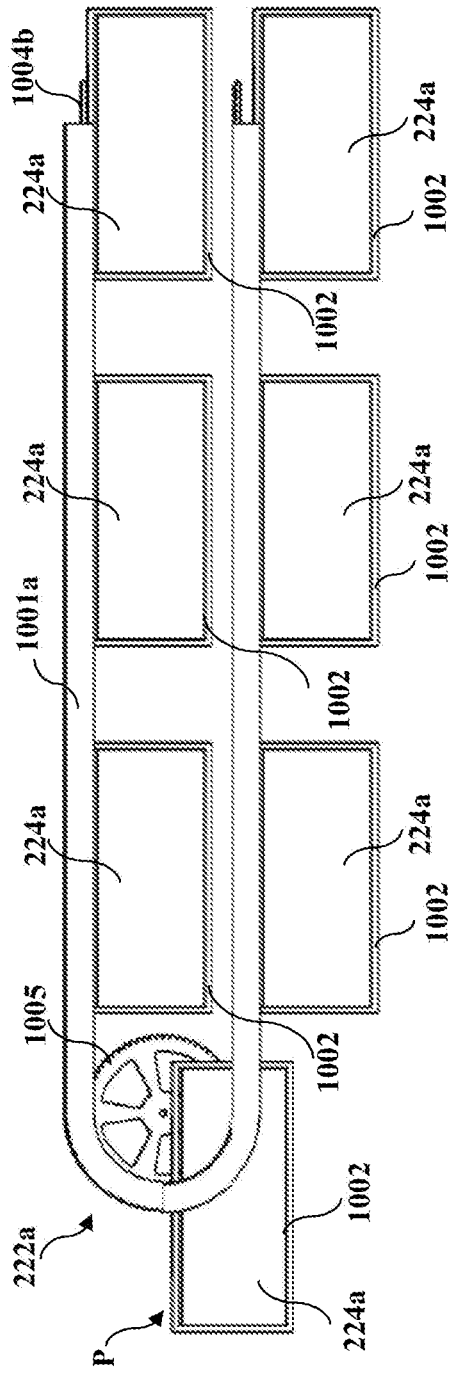
Figure 11C:
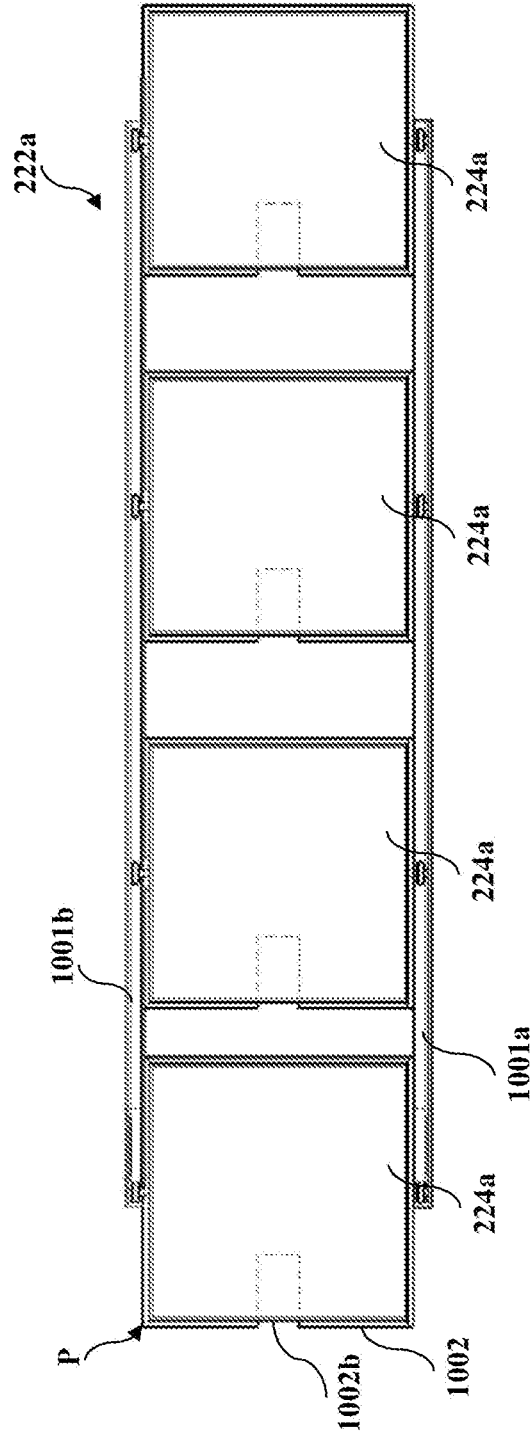

In an embodiment, one or more bin carousels 222a as illustrated in FIGS. 11A-11C, are installed in the trailer 1003 of the large transport vehicle 215a, 215b as illustrated in FIGS. 10A-10C. FIGS. 11A-11C illustrate partial rear perspective, side elevation and top plan views of a bin carousel 222a respectively, for indexed holding of storage bins 224a, 224b and order bins 224c in the large-scale transport vehicle 215a, 215b, according to an embodiment herein. Each bin carousel 222a comprises a pair of closed-loop belts or chains 1004a, 1004b that run longitudinally of the trailer 1003 in laterally spaced apart relation to one another within a respective pair of C-channel guide tracks 1001a, 1001b, and are each entrained around a pair of respective sheaves or sprockets 1005 that are respectively disposed adjacent to the longitudinally spaced front and rear ends of the guide track near front and rear ends 1003a, 1003b of the trailer 1003 illustrated in FIG. 10B. The sheaves or sprockets 1005 are rotatably operable to drive the belt or chain 1004a, 1004b around a continuous closed-loop path denoted by the respective guide track 1001a, 1001b, which has horizontally linear top and bottom segments that are joined together at each end by an arcuate connecting segment radially centered on the rotational axis of a respective one of the sheaves or sprockets 1005. A series of carousel platforms 1002 are suspended between the two closed-loop belts/chains 1004a, 1004b at regular intervals therealong for the purpose of seated support of a respective single-compartment storage (SCS) bin 224a on each carousel platform 1002. The footprint of each carousel platform 1002 is generally equal in size and shape to that of the SCS bins 224a, whereby the carousel platforms 1002 are configured to receive the SCS bins 224a in a 1:1 ratio. Driven operation of the pair of belts/chains 1004a, 1004b thus displaces the carousel platforms 1002 longitudinally with respect to the trailer 1003 in opposite directions in top and bottom halves of the closed-loop paths of the belts/chains 1004a, 1004b. Although this embodiment relates to particular transport of the SCS bins 224a between a mega facility 10 and a macro facility 12, the same transport vehicle and carousel type is inherently compatible with the multi-compartment storage (MCS) bins 224b and the picked-order (PO) bins 224c that are of equal footprint, size, and configuration, and therefore, similarly configured transport vehicles 215b are likewise used for transport of other storage bins between other facilities as disclosed below.

To load each bin carousel 222a of the transport vehicle 215a, 215b, an SCS bin 224a is placed on an empty one of the carousel platforms 1002 while the carousel platform 1002 resides at a loading/unloading position P at the rear end of the bin carousel 222a that resides just inside a loading door of the trailer 1003 at the rear end 1003b thereof. In an embodiment, the bin carousel 222a is advanced in an incremental manner by a short incremental distance equal to a uniform distance by which every two adjacent carousel platforms 1002 are spaced from each other along the closed-loop path of the belts/chains 1004a, 1004b of the bin carousel 222a. Accordingly, once an SCS bin 224a has been placed on the carousel platform 1002 at the loading/unloading position, such incremental movement of the bin carousel 222a not only moves that now-loaded carousel platform 1002 forwardly toward the opposing front end 1003b of the trailer 1003, but also serves to bring a sequentially-next one of the carousel platforms 1002 rearwardly to the door-adjacent loading/unloading position P so than another SCS bin 224a can be placed on this next carousel platform 1002. When starting with a fully-empty bin carousel 222a, this process of loading a carousel platform 1002 and advancing the bin carousel 222a in an incremental manner is repeated until either the bin carousel 222a is fully loaded, that is, when all carousel platforms 1002 are occupied by respective SCS bins 224a, or loaded to a partial capacity dictated by an overall quantity of SCS bins 224a intended for the current transport operation. The vehicle management subsystem 216 illustrated in FIGS. 2A-2B is connected to a motor drive of each conveyor to control and monitor a driven operation thereof, which together with the storage of a unique Location_ID of each carousel platform 1002 in the vehicle storage table 324 of the local vehicle database 220, enables the vehicle management subsystem 216 to determine and track which carousel platform 1002 is present at the loading/unloading position at any time. This determination and tracking together with the recordal of Bin_IDs against the Location_IDs in the onboard bins table 325 of the local vehicle database 220 enables tracking of which SCS bins 224a are loaded onto and unloaded off of any given carousel platform 1002 in any loading/unloading operation, and tracks where each loaded SCS bin 224a resides within the vehicle-based array at any given time.

In an embodiment, the SCS bins 224a are relatively small compared to the width and the height of the trailer 1003, and therefore, multiple bin carousels 222a can be installed in the trailer 1003 in an organized array. FIGS. 10A-10C illustrates three side-by-side rows of bin carousels 222a, each row being four bin carousels high, according to an embodiment herein. FIGS. 10A-10B also illustrate the loading grid structure 509 of the mega facility 10, according to an embodiment herein. The loading grid structure 509 is a multi-level structure comprising a number of levels 509a, 509b, 509c, 509d that is at least as great as the number of bin carousels 222a in each row of the vehicle-based array of the transport vehicle 215a, 215b. FIGS. 10A-10B illustrates a four-level loading grid structure 509 compatible with four bin carousels 222a in each row of the vehicle-based array of the transport vehicle 215a, 215b, according to an embodiment herein. Each level 509a, 509b, 509c, 509d of the loading grid structure 509 comprises a two-dimensional gridded track layout of the same type employed at the top and bottom levels of the gridded storage structure 507 of the indexed storage array of the mega facility 10, whereby each level 509a, 509b, 509c, 509d of the loading grid structure 509 comprises sets of crossing X-direction and Y-direction rails, of which one of these two perpendicular sets of rails, for example, the X-direction rails, lie parallel to the longitudinal direction L shared by the trailer 1003 of the transport vehicle 215a, 215b and the bin carousels 222a installed therein. Each level 509a, 509b, 509c, 509d of the loading grid structure 509 corresponds to a respective level in the corresponding vehicle-based array of bin carousels 222a, and has its respective gridded track layout situated a short distance below the respective level of bin carousels 222a. A width of each bin carousel 222a is approximately equal to the width of each spot in the loading grid structure 509, and each bin carousel 222a aligns with a respective row of spots delimited between a respective pair of the X-direction rails of the loading grid structure 509 in the respective level thereof.

A robotic handler 208 on any given level of the loading grid structure 509 can therefore travel in the X-direction into a terminal spot at a loading-dock end of any row in that level, and thereby achieve a neighbouring relation to a carousel platform 1002 situated at the loading/unloading position of the corresponding bin carousel 222a, thereby enabling loading or unloading of an SCS bin 224a onto or off of that carousel platform 1002 of that bin carousel 222a by the robotic handler 208 parked at the terminal spot of the corresponding row of the loading grid structure 509. In an embodiment, the robotic handlers 208 operating on the loading grid structure 509 are members of the same fleet of robotic handlers 208 that serve the gridded storage structure 507 of the indexed storage array of the mega facility 10, and are therefore operable under a wireless command by the facility management subsystem 204 to perform fully-automated loading and unloading of the transport vehicle 215a at the outbound loading docks 502 of the mega facility 10.

This automated loading/unloading operation is illustrated in FIGS. 10A-10B, where a first robotic handler 208a on an uppermost level 509a of the loading grid structure 509 is shown parked at the terminal spot of a first row of the uppermost level 509a. This robotic handler 208a is shown carrying an SCS bin 224a for loading onto an empty carousel platform 1002a at the loading/unloading position of a first bin carousel of the transport vehicle 215a, for example, a topmost bin carousel of a left-most row of bin carousels 222a. Moreover, a second robotic handler 208b on the second uppermost level 509b of the loading grid structure 509 is shown parked at the terminal spot of a second row of the second uppermost level 509b without any SCS bin 224a, after having offloaded its respective SCS bin 224a onto a previously empty, now-occupied carousel platform 1002 at the loading/unloading position of a second bin carousel of the transport vehicle 215a, for example, a second-topmost bin carousel in a middle row of bin carousels 222a. Furthermore, a third robotic handler 208c on the second lowermost level 509c of the loading grid structure 509 is shown parked at the terminal spot of a third row of the second lowermost level 509c during offloading of its respective SCS bin 224a onto a previously empty carousel platform 1002 at the loading/unloading position of a third bin carousel of the transport vehicle 215a, for example, a second bottom-most bin carousel in a right-most row of bin carousels 222a. Furthermore, a fourth robotic handler 208d on the lowermost level 509d of the loading grid structure 509 is shown approaching the terminal spot of a third row of the lowermost level 509d and carrying a respective SCS bin 224a for offloading thereof from the robotic handler 208d onto an empty carousel platform 1002 at the loading/unloading position of a fourth bin carousel of the transport vehicle 215a, for example, a bottom-most bin carousel in the right-most row of bin carousels 222a.

In summary, any robotic handler 208 parked at the terminal spot of any row of any level of the loading grid structure 509 can access the loading/unloading position of a respective bin carousel 222a of the transport vehicle 215a to load an SCS bin 224a thereon. Similarly, any robotic handler 208 parked at the terminal spot of any row of any level of the loading grid structure 509 can access the loading/unloading position of a respective bin carousel 222a of the transport vehicle 215a to unload an SCS bin 224a from any bin-carrying carousel platform 1002 driven to the loading/unloading position P of the bin carousel 222a, and to carry the SCS bin 224a into the connected gridded storage structure 507 of the mega facility 10, and deposit the SCS bin 224a into any available storage location in the gridded storage structure 507, or deliver the SCS bin 224a to any workstation connected to the gridded storage structure 507.

At intersections between the X-direction and Y-direction rails, the rails of each level 509a, 509b, 509c, 509d are vertically interconnected by rack-toothed upright frame members 510 of a similar type, but notably a shorter height, used in the gridded storage structures of the mega, macro and micro facilities 10, 12 and 14. These shorter upright frame members 510 comprise rack teeth vertically arrayed over a substantial majority height thereof, except at narrowed lower ends of the upright frame members 510. Accordingly, the four upright frame members 510 at the four corners of any set of aligned spots among the levels 509a-509d of the loading grid structure 509 define a respective shaft and serve as vertical tracks on which the robotic handlers 208 can ascend and descend through that shaft to travel between any two levels of the loading grid structure 509.

In the same manner as in the gridded storage structures, such ascent and descent are achieved through engagement of toothed pinion wheels of the robotic handlers 208 with the rack teeth on these upright frame members 510 while the robotic handlers 208 are in a shaft-travelling mode, in which track-riding conveyance wheels of the robotic handlers 208 are retracted inwardly relative to the toothed pinion wheels to minimize the footprint of the robotic handler 208 to a size less than a grid spot of the loading grid structure 509 to enable travel through the shaft. In an embodiment, toothless reduced-width lower necks of the upright frame members 510 provide clearance for the track-riding conveyance wheels of the robotic handlers 208 to ride on the rails of the gridded track layouts when the track-riding conveyance wheels are extended outwardly beyond the pinion wheels in a track-riding mode of a larger handler footprint. In an embodiment, the loading grid structure 509 employs such rack-toothed frame members at all rail intersections points of the loading grid structure 509, thereby allowing ascent and descent of the robotic handlers 208 at all spots of the loading grid structure 509, except perhaps at the terminal spots thereof from which the transport vehicles 215a are loaded and unloaded as illustrated in FIG. 10A, where these terminal spots lack frame members at the terminal ends of their X-direction rails that overhang from the rest of the loading grid structure 509.

In an embodiment where each robotic handler 208 comprises an upper platform on which the SCS bin 224a is carried, and a rotatable turret with an extendable/retractable arm by which the SCS bin 224a is pulled onto and pushed off of the upper platform of the robotic handler 208, each carousel platform 1002 of each bin carousel 222a on the transport vehicle 215a comprises may feature a central longitudinal slot or gap 1002b therein as illustrated in FIGS. 11A-11C. This central longitudinal slot or gap 1002b accommodates extension and retraction of the turret arm of the robotic handler 208 during loading and unloading of the storage bins to and from the carousel platform 1002 at the loading/unloading position P of the bin carousel 222a.

The bin carousels 222a of the transport vehicle 215a form a dynamic array of storage locations, herein referred to as a "dynamic storage array"", in which each carousel platform 1002 denotes a respective storage location having a unique Location_ID that is stored in the vehicle storage table 324 of the local vehicle database 220 and in the global storage locations table 310 of the central database 203. However, each storage location in the vehicle-based array is movable into different positions within the trailer 1003 of the transport vehicle 215a by operation of the bin carousel 222a. This differs from the static indexed storage arrays at the facilities 10, 12 and 14 of the multi-nodal supply chain system 200, where each storage location in the gridded storage structure is at a fixed static position and not a dynamically movable position. The use of a dynamic storage array in the transport vehicle 215a enables convenient loading of the storage bins from the rear door of the trailer 1003. In other embodiments, a different type of an indexed storage array is used in the transport vehicle 215a, for example, a miniaturized version of the robotically-served gridded storage structures used in the mega, macro and micro facilities 10, 12 and 14, or another human or robot-served storage array with discrete storage locations, for example, shelves, cubbies, etc., suitably sized to specifically fit the standardized size and shape of the storage bins 224a, 224b, where each storage location is indexed with a respective Location_ID in the local vehicle database 220 and the central database 203. In the embodiment where the dynamic storage locations, for example, the carousel platforms 1002, are loaded directly at the rear end 1003b of the trailer 1003, extension tracks from the gridded storage structure(s) in any of the mega, macro and micro facilities 10, 12 and 14 are run to loading docks for direct loading and unloading of the transport vehicle in an automated manner using the same fleet of robotic handlers 208 that serve the gridded storage structure, thereby avoiding any intermediary transfers of the storage bins to other automated handling equipment or personnel, whether those extension tracks are parts of a shared loading grid structure 509 that serve multiple loading docks as illustrated in FIGS. 10A-10B, or are distinctly separate track systems leading to different loading docks of the given facility.

In an embodiment, since the transport vehicle 215a contains multiple bin carousels 222a, the overall indexed storage array of the transport vehicle 215a collectively defined thereby, subdivides into isolated and environmentally distinct storage zones characterized by different environmental control parameters, similar to the different zones of the subdivided gridded storage structure 507 in the mega facility 10. Accordingly, in an embodiment, each transport vehicle 215a comprises any one or more of an ambient zone, a refrigeration zone, and a freezer zone, each comprising one or more bin carousels 222a. For example, one or more thermal barrier walls are erected between two adjacent rows of bin carousels 222a to thermally isolate an ambient zone on one side of the thermal barrier wall from a climate-controlled zone such as a refrigeration zone or a freezer zone on the opposing side, or to isolate one climate-controlled zone such as a refrigeration zone from another environmentally distinct climate-controlled zone such as a freezer zone. In an embodiment, the thermal barrier walls are vertically erected barrier walls configured to horizontally isolate multi-level carousel rows from one another, thereby enabling convenient personnel access to the bin carousels 222a of the isolated zones for service or repair of carousel equipment within each zone. In an embodiment, each zone comprises a respective carousel row therein with an available walkway space on either side of that row for such service and repair access. In another embodiment, the thermal barrier walls are horizontal barrier walls configured to isolate two vertically adjacent bin carousels 222a in any multi-level row from one another, or isolate entire levels from one another among multiple multi-level carousel rows.

Figure 17A:
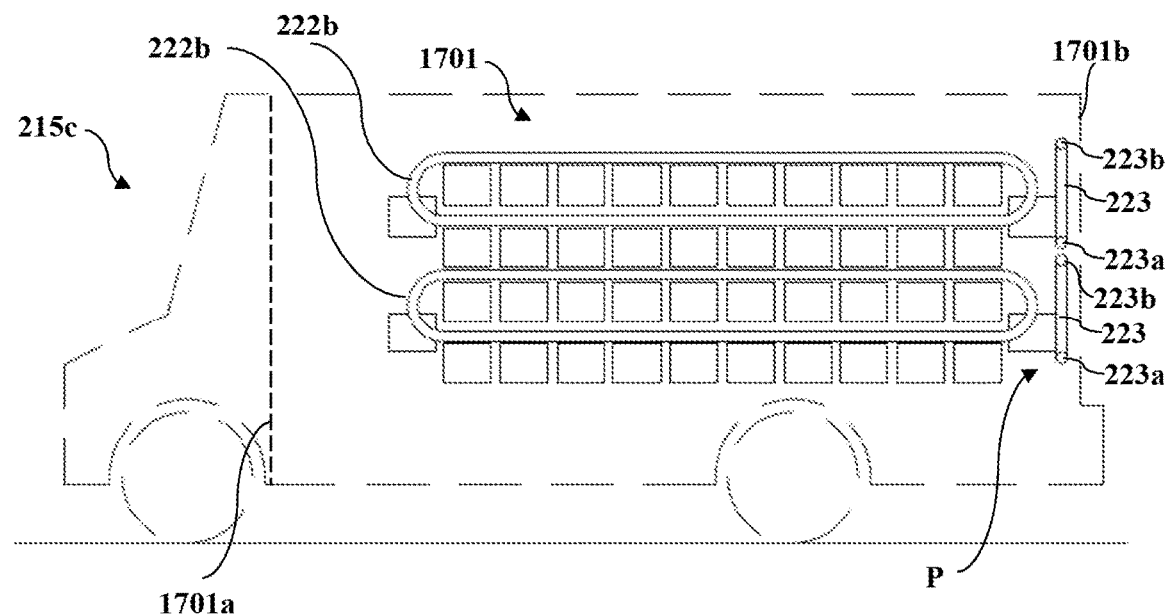
FIGS. 17A-17C illustrate a side elevation view, a top plan view, and a rear elevation view of a small-scale transport vehicle respectively, for transporting order bins between the micro and nano facilities of the multi-nodal supply chain system, according to an embodiment herein.
Figure 17B:
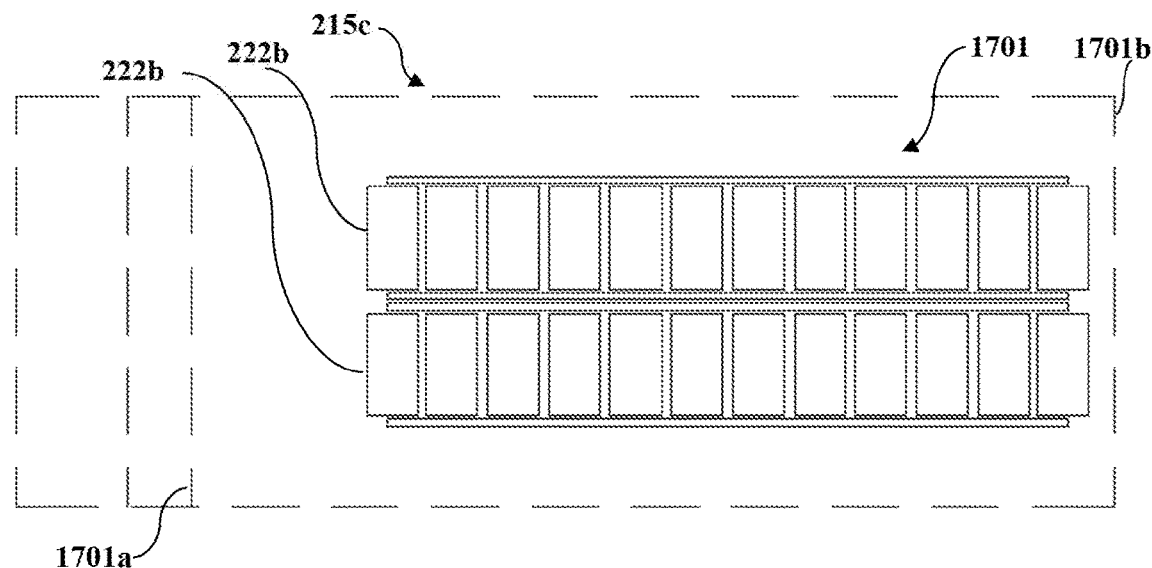
Figure 17C:
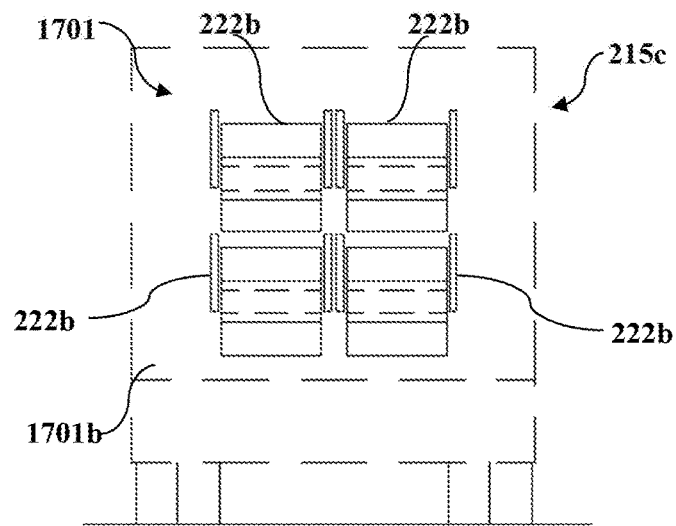

Such optional subdivision of the trailer 1003 of the transport vehicle 215a into separate environmentally distinct storage zones is disclosed in the detailed descriptions of FIGS. 17A-17C, with reference to a trailer 1701 of a transport vehicle 215c used for transport between micro and nano facilities 14, 16. The transport vehicle 215c is a smaller-scale variant of the transport vehicle 215a. In view of such possible compartmentalization of the trailer 1003 into environmentally distinct storage zones, the environmental status field in each record of the vehicle storage table 324 need not necessarily be identical to that of all other records in the vehicle storage table 324, since a singular transport vehicle 215a comprises multiple environmentally distinct storage zones. In an embodiment, if each transport vehicle 215a comprises only a singular environmental zone, for example, an ambient-only storage zone, a refrigeration-only storage zone, or a freezer-only storage zone, then the environmental status indicator is omitted from the vehicle storage table 324 since the environmental data in the vehicle information table 323 of the local vehicle database 220 will denote the common environmental status shared by all storage locations on the transport vehicle 215a.

As disclosed in the detailed description of FIG. 2A, each vehicle management subsystem 216 comprises a local wireless network 221 to which the wireless communications units 225 of the storage bins 224a, 224b, 224c, 224d connect. The vehicle management subsystem 216 of the transport vehicle 215a is, therefore, communicable with the wireless communications units 225 of the SCS bins 224a being loaded onto the transport vehicle 215a from the mega facility 10 for receiving the Bin_IDs of these SCS bins 224a from the mobile data storage devices 226 thereof, and for initiating recordal of the transfer of the identified SCS bins 224a from the mega facility 10 to the transport vehicle 215a in the central database 203, for example, by transmitting the Vehicle_ID of the transport vehicle 215a and the Bin_ID received from the loaded SCS bin 224a to the central computing system 201. Accordingly, the central database 203 is automatically updated to change the current location of that SCS bin 224a in the storage bins table 308, and optionally in the stocked inventory table 304 of the vendor whose product is in that SCS bin 224a, from the Facility_ID of the mega facility 10 the SCS bin 224a is departing, to the Vehicle_ID of the transport vehicle 215a the SCS bin 224a is now travelling on. In an embodiment, this automated recordal of the transfer of the SCS bin 224a from the mega facility 10 to the transport vehicle 215a is initiated by the facility management subsystem 204, rather than the vehicle management subsystem 216, for example, by reading and recording the Vehicle_ID of the transport vehicle 215a at the outbound loading dock 502 of the mega facility 10 illustrated in FIG. 5, and reading and recording the Bin_IDs of the SCS bins 224a being loaded onto the transport vehicle 215a, and updating the central database 203 accordingly. In another embodiment, this recordal of the transfer of the SCS bins 224a from the mega facility 10 to the transport vehicle 215a is a two-part procedure performed co-operably by both the facility management subsystem 204 and the vehicle management subsystem 216, with the facility management subsystem 204 reporting departure of the SCS bin 224a from the mega facility 10 to the central computing system 201 to cause erasure of the Facility_ID of the mega facility 10 from the SCS bin's 224a record in the storage bins table 308 and the stocked inventory table 304 and with the vehicle management subsystem 216 reporting its acceptance of the SCS bin 224a to replace the just-erased Facility_ID with its Vehicle_ID.

In an embodiment, at each point in the supply chain workflow where storage bins are transferred in a downstream direction from a facility to a departing transport vehicle, one or more storage bins are transferred in the reverse upstream direction. For example, when product-filled SCS bins 224a from the mega facility 10 are being offloaded from an arriving mega-macro transport vehicle 215a at an inbound loading dock 601 of a macro facility 12 illustrated in FIG. 6, empty SCS bins 224a from the macro facility 12 are loaded onto the same mega-macro transport vehicle 215a for transport back to the same mega facility 10 from which the incoming product-filled SCS bins 224a are arriving. On arrival back at the mega facility 10, the transport vehicle 215a can therefore drop off a set of empty SCS bins 224a from the macro facility 12, and pick up a next set of filled SCS bins 224a for transport back to the macro facility 12, or to another destination for which the transport vehicle 215a is next scheduled. While this embodiment refers to an upstream return of empty SCS bins 224a back to the same mega facility 10 from which the transport vehicle 215a previously travelled to the macro facility 12 whose empty SCS bins 224a are being picked up, in another embodiment, the transport vehicle 215a departs this macro facility 12 to a different upstream mega facility 10 than that from which the transport vehicle 215a originated. That is, the transport vehicle 215a takes empty SCS bins 224a from a macro facility 12 to a different mega facility 10 than that from which the same transport vehicle 215a just delivered filled SCS bins 224a to that macro facility 12. Accordingly, any transfer of SCS bins 224a between a facility and a transport vehicle involves a swap or an exchange of the SCS bins, where upstream-headed storage bins, for example, empty SCS bins, and downstream-headed storage bins, for example, filled SCS bins are exchanged with one another.

Figure 12A:
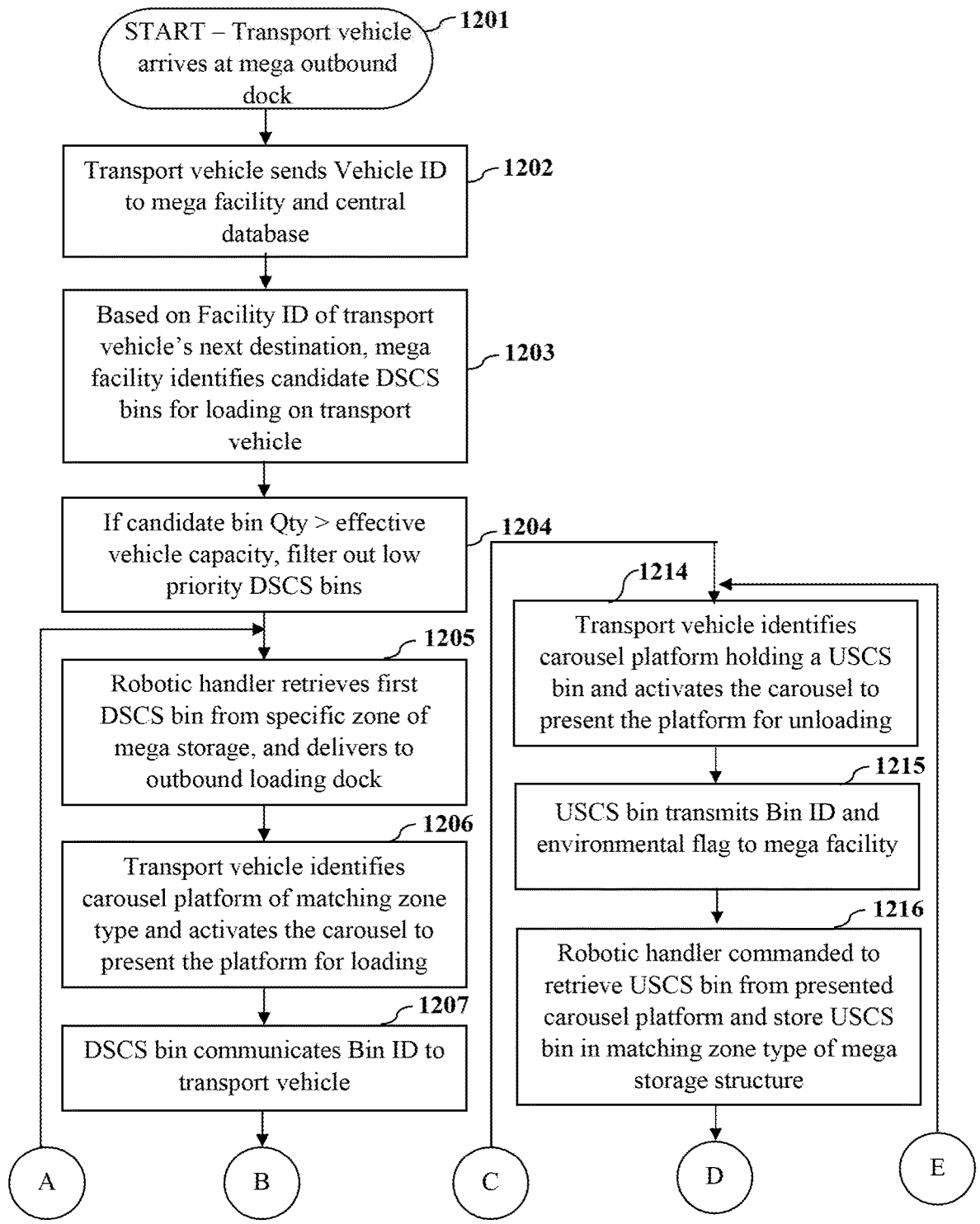
FIGS. 12A-12B illustrate a flowchart of a computer-implemented method for managing exchange of storage bins between the mega facility and a transport vehicle arriving at an outbound loading dock thereof from a downstream macro facility, according to an embodiment herein.
Figure 12B:
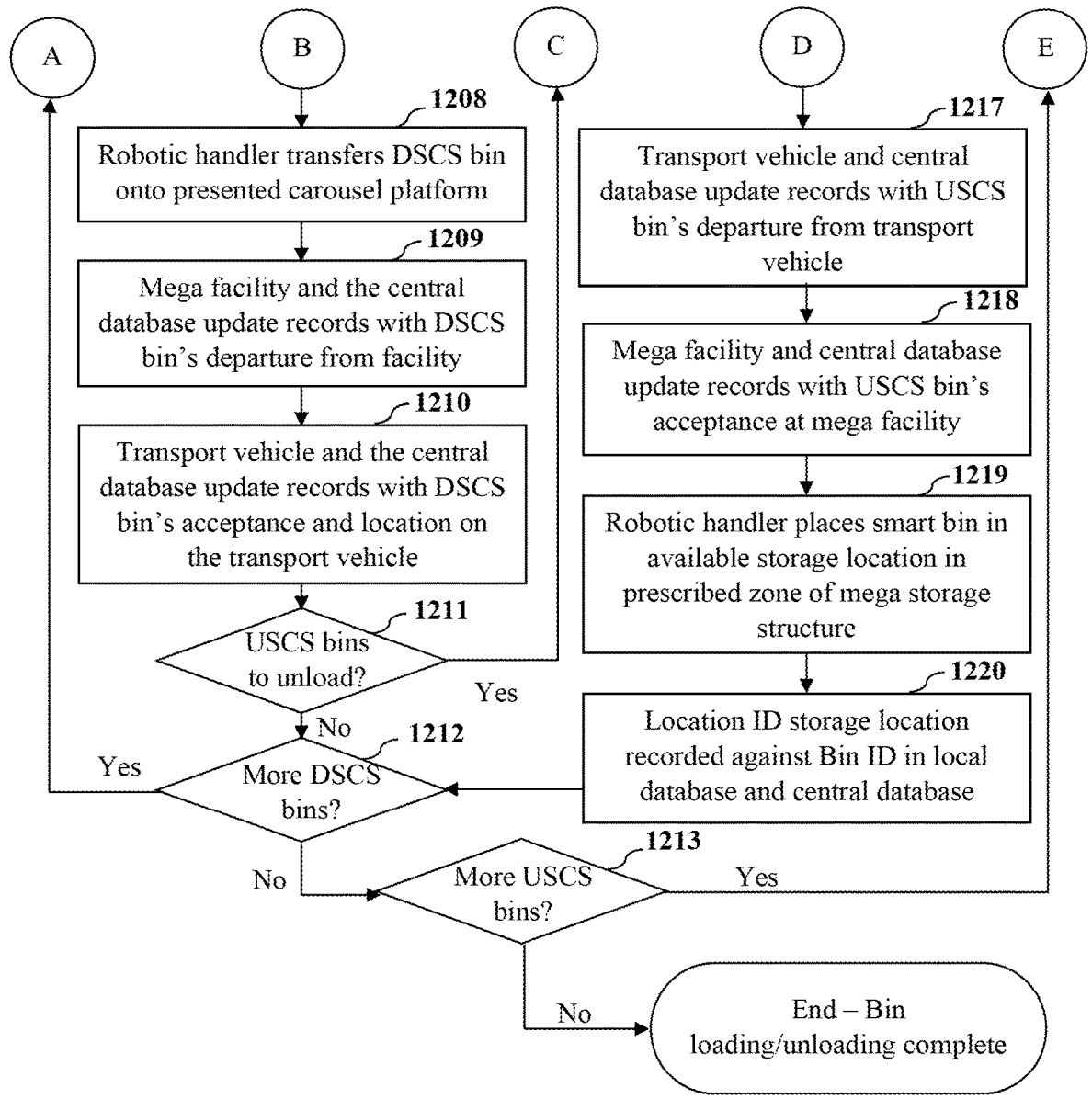

FIGS. 12A-12B illustrate a flowchart of a computer-implemented method for managing exchange of storage bins between a mega facility 10 and a transport vehicle 215a arriving at an outbound loading dock 502 thereof from a downstream macro facility 12 illustrated in FIGS. 5-6, according to an embodiment herein. In the method disclosed herein, filled downstream-heading single-compartment storage (SCS) bins 224a from the mega facility 10 are loaded onto an outbound transport vehicle 215a destined for a macro facility 12, and empty upstream-headed SCS bins 224a that arrived at the outbound loading dock 502 of the mega facility 10 are simultaneously unloaded on the same transport vehicle 215a as illustrated in FIGS. 4A-4B. Consider an example where this transport vehicle 215a may have arrived at the mega facility 10 from the same macro facility 12 to which the transport vehicle 215a will subsequently depart once more after loading/unloading. At step 1202, upon arrival 1201 of the transport vehicle 215a at the outbound loading dock 502 of the mega facility 10, the vehicle management subsystem 216 of the transport vehicle 215a transmits an arrival signal containing its Vehicle_ID to the central computing system 201 and the facility management subsystem 204 of the mega facility 10 at which the transport vehicle 215a is arriving. At step 1203, the central computing system 201 identifies the Facility_ID of the next destination for which the transport vehicle 215a is scheduled and forwards the Facility_ID to the facility management subsystem 204. In an embodiment, the transport vehicle 215*a* conveys the Facility_ID of the next destination to the facility management subsystem 204 in the arrival signal. That is, on arrival, the transport vehicle 215*a* first updates its destination Facility_ID in the vehicle information table 323 to the Facility_ID of the next facility to which the transport vehicle 215*a* will depart, from that at which the transport vehicle 215*a* has just arrived. Using the Facility_ID of this next destination, the facility management subsystem 204 queries the on-site bins table 322 of its local facility database 207 to identify product-filled SCS bins 224*a* therein that should be transported to the transport vehicle's 215*a* next destination, based on use of the destination Facility_IDs stored in relation to the Bin_IDs of the on-site storage bins. This query process is configured to return not only Facility_IDs that match that of the transport vehicle's 215*a* next destination, but also Facility_IDs of the facilities further downstream on a known travel route of which the transport vehicle's 215*a* next destination is a known intermediary relay point from the current mega facility 10. The product-filled SCS bins 224*a* returned by this query are referred to as downstream-headed SCS bins (DSCS bins) since these SCS bins 224*a* are destined to travel to another facility in a downstream direction of the multi-nodal supply chain system 200. At step 1204, if the query returns a quantity of DSCS bins exceeding a bin capacity of the transport vehicle 215*a*, the results list of the DSCS bins is filtered based on the timing data stored for those DSCS bins to retain those of greater priority and remove those of lesser priority.

At step 1205, the facility management subsystem 204 of the mega facility 10 commands a robotic handler 208 to retrieve one of the DSCS bins 224*a* from the gridded storage structure 507 and to deliver the retrieved DSCS bin 224*a* to the outbound loading dock 502 at which the transport vehicle 215*a* has arrived. Upon confirmed retrieval of the DSCS bin 224*a* from its storage location in the gridded storage structure 507, the Bin_ID of that DSCS bin 224*a* is erased from the facility storage table 320*a* of the mega facility 10 and from the storage locations table 310 of the central database 203, and the Location_ID of the storage location from which the DSCS bin 224*a* was removed is erased from the storage bins table 308 of the central database 203 and from the on-site bins table 322 of the mega facility 10. Furthermore, upon confirmed retrieval of the DSCS bin 224*a* from its storage location by the robotic handler 208, the Location_ID of the storage location of the DSCS bin 224*a* is updated with the Equipment_ID of the robotic handler 208, in the storage bins table 308 of the central database 203 and in the on-site bins table 322 of the mega facility 10, thereby allowing DSCS bin 224*a* to be associated with a Location_ID that is traceable in real time. As the facility management subsystem 204 can detect the locations of the robotic handlers 208 in respective facilities 10, 12, 14 at all times, recording the Equipment_ID of a particular robotic handler 208 as the location of a storage bin, upon retrieval of the storage bin by that particular robotic handler 208, allows the storage bin to be tracked within the respective facilities 10, 12, 14 at all times.

The facility management subsystem 204 communicates the environmental flag from the retrieved DSCS bin 224*a* to the vehicle management subsystem 216 of the arrived transport vehicle 215*a*, which at step 1206, uses this environmental flag to identify an unoccupied carousel platform 1002 of one of its bin carousels 222*a* illustrated in FIGS. 10A-10B, whose environmental status indicator in the vehicle storage table 324 matches the environmental flag, thus confirming that the respective storage location denoted by the unoccupied carousel platform 1002 is in an environmental zone of the transport vehicle 215*a* that is compatible with the environmental requirements of the products in the retrieved DSCS bin 224*a*. The vehicle management subsystem 216 activates that one of the bin carousels 222*a* to relocate the unoccupied carousel platform 1002 to the rear loading/unloading position P of the bin carousel 222*a*, if not already found at such position, and communicates a hand-off designation signal to the facility management subsystem 204 from which the facility management subsystem 204 identifies the particular terminal spot on the loading grid structure 509 to which the robotic handler 208 must be commanded to interface with the identified bin carousel 222*a*, and accordingly commands the robotic handler 208 to travel thereto. In an example where the transport vehicle 215*a* comprises an array of twelve bin carousels 222*a* and the loading grid structure 509 accordingly has an array of twelve corresponding terminal spots at each outbound loading dock 502, the hand-off designation signal contains one of twelve different unique indicators, each mapped to a respective member of each such array.

At step 1207, as or once the retrieved DSCS bin 224*a* arrives at this specified terminal spot of the loading grid structure 509 by the robotic handler 208, the wireless communications unit 225 of the retrieved DSCS bin 224*a* wirelessly connects to the transport vehicle's 215*a* local area network 221 and through the local area network 221 communicates its Bin_ID to the vehicle management subsystem 216 of the transport vehicle 215*a*, which records the Bin_ID against the Location_ID of the unoccupied carousel platform 1002 that was advanced to the loading/unloading position of the bin carousel 222*a*. In an embodiment, the connection of the DSCS bin 224*a* to and communication with the vehicle management subsystem 216 is initiated in response to a wireless instruction from the facility management subsystem 204 to disconnect from the mega facility's 10 local area network 206 and instead connect the transport vehicle's 215*a* local area network 221. In an embodiment, this instruction is initiated in response to the robotic handler's 208 confirmed arrival at the specified terminal spot of the loading grid structure 509 to which the robotic handler 208 was commanded by the facility management subsystem 204. With such a confirmed arrival at the specified terminal spot of the loading grid structure 509, then at step 1208, the robotic handler 208 places or transfers the retrieved DSCS bin 224*a* onto the presented empty carousel platform 1002 of the selected bin carousel 222*a*, as commanded by the facility management subsystem 204.

At step 1209, upon confirmed placement of the retrieved DSCS bin 224*a* onto the carousel platform 1002 presented at the loading/unloading position P by the robotic handler 208, the facility management subsystem 204 updates its records to reflect the transfer of the DSCS bin 224*a* from the mega facility 10 to the transport vehicle 215*a*, by removing the Bin_ID of that DSCS bin 224*a* from the mega facility's 10 on-site bins table 322 and decrementing the quantity of occupied storage bins in the facility information table 319, if such a count is tallied therein. At this step, in an embodiment, the facility management subsystem 204 also sends a bin departure signal with the Bin_ID of the DSCS bin 224*a* that was just offloaded from the mega facility 10 to the central computing system 201, in response to which the central computing system 201 erases the Facility_ID of the mega facility 10 from this DSCS bin's 224*a* record in the storage bins table 308, and also from the corresponding record in the vendor's stocked inventory table 304 if duplicated therein. At step 1210, the vehicle management subsystem 216 similarly updates its records to reflect the transfer of the DSCS bin 224*a* from the mega facility 10 to the transport vehicle 215*a*, by adding the Bin_ID of that DSCS bin 224*a* to the transport vehicle's 215*a* onboard bins table 325 and incrementing the quantity of occupied storage bins, that is, the non-empty, product-containing storage bins, in the vehicle information table 323, if such a count is tallied therein. The vehicle management subsystem 216 also records the Bin_ID of the DSCS bin 224*a* against the Location_ID of the carousel platform 1002 on which that DSCS bin 224*a* was placed, and/or records the Location_ID of that storage location against the Bin_ID in the onboard bins table 325 of the local vehicle database 220. At this step, in an embodiment, the vehicle management subsystem 216 also sends a bin-acceptance signal with the Bin_ID of the DSCS bin 224*a* just accepted onto the transport vehicle 215*a* to the central computing system 201, in response to which the central computing system 201 adds the Vehicle_ID of the transport vehicle 215*a* to this DSCS bin's 224*a* record in the storage bins table 308, and to the corresponding record in the vendor's stocked inventory table 304 if duplicated therein. The bin-acceptance signal also includes the Location_ID for recordal against the Bin_ID of the deposited DSCS bin 224*a* in the global storage bins table 308 and in the vendor's stocked inventory table 304 if duplicated therein.

The steps 1204 to 1210 relate to a DSCS bin 224*a*, that is, a product-filled SCS bin destined for a macro facility 12 situated downstream of the mega facility 10 in the supply chain workflow direction of the multi-nodal supply chain system 200 illustrated in FIG. 4A. Since the robotic handler 208 that dropped off the DSCS bin 224*a* is now unoccupied by any storage bin, a check is performed for the presence of any upstream-headed storage bin, for example, an empty SCS bin, on the transport vehicle 215*a* that is intended for drop-off at the mega facility 10, and thus can be offloaded and carried away by the available robotic handler 208. In this example, such an upstream-headed storage bin is referred to as an upstream-headed single-compartment storage (USCS) bin, although as disclosed below, upstream-headed storage bins need not be limited to SCS bins. At step 1211, the vehicle management subsystem 216 therefore queries its onboard bins table 325 for USCS bins whose destination Facility_ID matches the Facility_ID of the mega facility 10 at which the transport vehicle 215*a* arrived, thereby confirming whether any such USCS bins are onboard the transport vehicle 215*a*. If the query results are positive for the presence of one or more USCS bins destined for this mega facility 10, then steps 1214 through 1218 disclosed below are performed. If the query results are negative, denoting lack of any such USCS bins onboard the transport vehicle 215*a*, then the process jumps ahead to step 1212, where the vehicle management subsystem 216 informs the facility management subsystem 204 of the lack of USCS bins onboard, in response to which the facility management subsystem 204 checks whether there are additional DSCS bins 224*a* remaining in the list generated at step 1204, and if there are additional DSCS bins 224*a*, repeats steps 1205-1210 to deliver another such DSCS bin 224*a* to the outbound loading dock 502, and load the DSCS bin 224*a* onto the transport vehicle 215*a* as disclosed above.

When the query for USCS bins being onboard the transport vehicle 215*a* at step 1211 renders a positive result, the vehicle management subsystem 216, at step 1214, identifies one of the bin carousels 222*a* containing a USCS bin and activates the bin carousel 222*a* on which the USCS bin is carried to move the carousel platform 1002 carrying that USCS bin into the loading/unloading position of that bin carousel 222*a*, if not already present at the loading/unloading position. The vehicle management subsystem 216 sends another hand-off designation signal to the facility management subsystem 204 to identify the particular terminal spot of the loading grid structure 509 at which the robotic handler 208 is required to receive the USCS bin from the bin carousel 222*a* on which the USCS bin resides. If this hand-off designation signal designates the same terminal spot of the loading grid structure 509 from which the DSCS bin was previously loaded onto the transport vehicle 215*a* by the robotic handler 208, then the robotic handler 208 remains parked at this same terminal spot. If not, then the robotic handler 208 is commanded by the facility management subsystem 204 to relocate to another terminal spot of the loading grid structure 509 based on the hand-off designation signal from the vehicle management subsystem 216. In an embodiment, in the event of identification of USCS bins on multiple bin carousels 222*a*, the vehicle management subsystem 216 is configured to prioritize selection of any USCS bin on the same bin carousel 222*a* to which the DSCS bin was loaded, and prioritize USCS bins on the carousel platforms 1002 that are closest to the loading/unloading position of the bin carousel 222*a* to minimize bin carousel and robotic handler movements for optimal loading/unloading efficiency.

At step 1215, the wireless communications unit 225 of the USCS bin transmits at least its Bin_ID and the environmental flag to the facility management subsystem 204, for example, after being instructed by the vehicle management subsystem 216 to disconnect from the local area network 221, for example, a wireless network, of the transport vehicle 215*a* and instead connect to the local area network 206, for example, a wireless network, of the mega facility 10 to perform such communication therewith. Based on this received environmental flag, the facility management subsystem 204 queries its facility storage table 320*a* for the Location_ID of an available storage location in the gridded storage structure 507 whose environmental status matches the environmental flag of the USCS bin, and therefore confirms residence in the appropriate environmental zone of the gridded storage structure 507 for that USCS bin.

At step 1216, the facility management subsystem 204, therefore, commands the robotic handler 208 already parked at the appropriate terminal spot neighbouring the loading/unloading position of the USCS bin to retrieve that USCS bin from the carousel platform 1002, and to carry the USCS bin to the available environmentally suitable storage location in the appropriate environmental zone of the gridded storage structure 507. Upon confirmed retrieval of the USCS bin from the carousel platform 1002 by the robotic handler 208, the Location_ID of the storage location of the USCS bin is updated with the Equipment_ID of the robotic handler 208, in the storage bins table 308 of the central database 203 and the on-site bins table 322 of the mega facility 10, thereby allowing the USCS bin to be associated with a Location_ID that is traceable in real time. At step 1217, upon confirmed retrieval of the USCS bin from the carousel platform 1002 by the robotic handler 208, the vehicle management subsystem 216 updates its records to reflect the transfer of the USCS bin to the mega facility 10 from the transport vehicle 215*a*, by removing the Bin_ID of that USCS bin from the transport vehicle's 215*a* onboard bins table 325 and, if the USCS bin is an empty storage bin, decrementing the quantity of empty storage bins in the vehicle information table 323, if such a count is tallied therein. At this step, in an embodiment, the vehicle management subsystem 216 also sends a bin departure signal with the Bin_ID of the USCS bin just offloaded from the transport vehicle 215a to the central computing system 201, in response to which the central computing system 201 erases the Vehicle_ID of the transport vehicle 215a from this USCS bin's record in the storage bins table 308. At step 1218, the facility management subsystem 204 updates its records to reflect the transfer of the USCS bin to the mega facility 10 from the transport vehicle 215a, by adding the Bin_ID of that USCS bin to the on-site bins table 322 of the mega facility 10, and in this example where the USCS bin is an empty storage bin, incrementing the quantity of empty bins in the facility information table 319, if such a count is tallied therein. At this step, in an embodiment, the facility management subsystem 204 also sends a bin-acceptance signal with the Bin_ID of the USCS bin just accepted into the mega facility 10 to the central computing system 201, in response to which the central computing system 201 adds the Facility_ID of the mega facility 10 to this USCS bin's record in the storage bins table 308.

As previously commanded at step 1216, the robotic handler 208 places the USCS bin in the specified storage location in the gridded storage structure 507 at step 1219. At step 1220, upon confirmed placement of the USCS bin in the specified storage location in the environmentally compatible zone of the gridded storage structure 507, the facility management subsystem 204 records the Bin_ID of that USCS bin against the Location_ID of the storage location in the facility storage table 320a of the local facility database 207, and/or records the Location_ID of that storage location in the on-site bins table 322 of the local facility database 207. Furthermore, in step 1220, the facility management subsystem 204 forwards the same Location_ID and Bin_ID to the central computing system 201 for recordal of this Location_ID against the Bin_ID of the deposited USCS bin 224a in the global storage bins table 308, and in the vendor's stocked inventory table 304 if duplicated therein. The empty USCS bin now stored and locatable within the gridded storage structure 507 is now a candidate empty SCS bin for use in subsequent executions of the inventory induction process disclosed in the detailed description of FIGS. 9A-9B.

Steps 1205 through 1220, therefore, collectively perform a singular bin swap or bin exchange, where one downstream-headed SCS bin 224a departing the mega facility 10 on an outbound transport vehicle 215a is exchanged for one upstream-headed storage bin that arrives at the mega facility 10 on the same transport vehicle 215a. At step 1212, a check is then performed on whether there are additional DSCS bins 224a remaining in the list generated at step 1204, and if there are additional DSCS bins 224a, repeats steps 1205-1211. If there are no additional DSCS bins 224a, then at step 1213, the same check previously performed at step 1211 is repeated to identify whether there are more USCS bins to unload, and in the event of a positive determination, steps 1214-1212 are repeated until the check at step 1213 results in a negative finding, thus confirming that all upstream-headed SCS bins have been unloaded from the transport vehicle 215a, accepted into the mega facility 10, and inducted into the gridded storage structure 507 thereof; and that all downstream-headed SCS bins have been loaded onto the transport vehicle 215a for travel onward to the macro facility 12 for which the transport vehicle 215a is next destined.

The method disclosed in FIGS. 12A-12B presumes that at step 1206, there is already at least one unoccupied carousel platform 1002 on the transport vehicle 215a onto which the DSCS bin 224a carried on the first robotic handler 208 to reach the outbound loading dock 502 can be deposited; however, other embodiments may require pre-emptive performance of steps 1214 to 1220 by a different bin-less robotic hander to unload a first USCS bin from a fully loaded transport vehicle 215a with no empty carousel platforms, before any DSCS bin can be loaded onto the transport vehicle 215a. In an embodiment, the loading/unloading processes at the different facilities are configured not to load a bin carousel 222a to its full capacity, so that at least one carousel platform 1002 is left open during transport to accommodate the first storage bin loaded onto the transport vehicle 215a at its next destination. To ensure at least one carousel platform 1002 of the transport vehicle 215a is always left open, an effective maximum vehicle capacity is used at step 1204 instead of the true maximum vehicle capacity, where the effective vehicle capacity is the true capacity, that is, (total number of carousel platforms onboard the transport vehicle) minus one. In this manner, the maximum number of DSCS bins designated for loading onto the transport vehicle 215a at step 1204 will be one less than the true bin capacity of the transport vehicle 215a so as to leave one open carousel platform on the transport vehicle 215a after loading.

As mentioned above, each transport vehicle 215a, 215b, 215c illustrated in FIGS. 4A-4B, is equipped with a global positioning system (GPS) device 219 that tracks the movement and the location of the transport vehicle 215a, 215b, 215c, and a wide area communications device 218 that communicates the current location of the transport vehicle 215a, 215b, 215c to the central computing system 201. Querying of the stocked inventory table 304 in the central database 203 for a product currently stored in any storage bin 224a, 224b currently travelling on a transport vehicle 215a, 215b, therefore, reports the current GPS location of that storage bin 224a, 224b based on the GPS coordinates of the transport vehicle 215a, 215b on which the storage bin 224a, 224b travels. Similarly, querying of the central database 203 for any customer order whose order number is recorded in the FO bins table 313 for an FO bin 224d currently travelling on a transport vehicle 215c as illustrated in FIGS. 4A-4B, therefore, reports the current GPS location of that FO bin 224d based on the GPS coordinates of the transport vehicle 215c on which the FO bin 224d travels. As a result, comprehensive monitoring and tracking of storage and order bins 224 throughout the multi-nodal supply chain system 200 is accomplished.

Figure 13A:
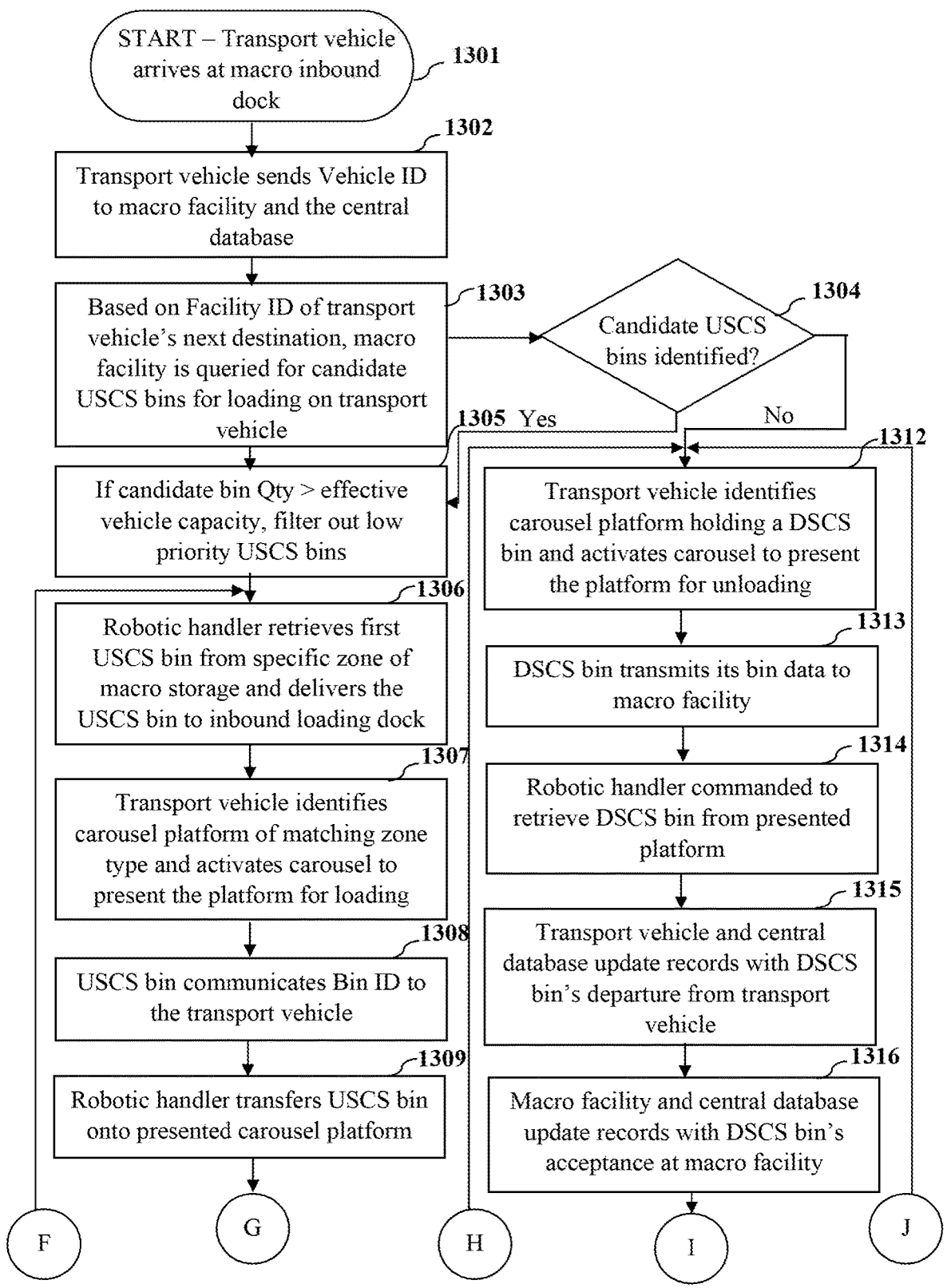
FIGS. 13A-13B illustrate a flowchart of a computer-implemented method for managing exchange of storage bins between a macro facility and a transport vehicle arriving at an inbound loading dock thereof from an upstream mega facility, according to an embodiment herein.
Figure 13B:
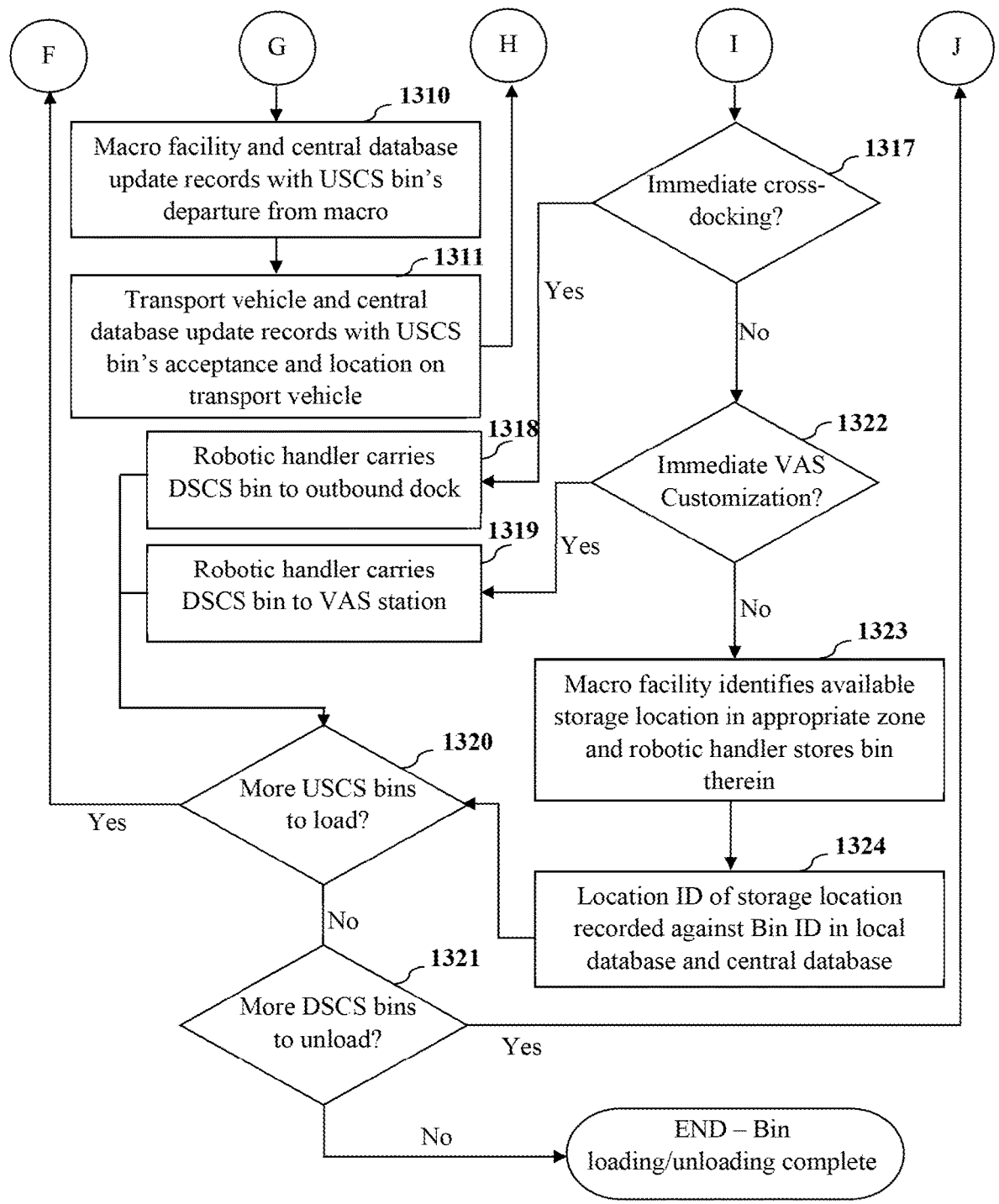

FIGS. 13A-13B illustrate a flowchart of a computer-implemented method for managing exchange of storage bins 224a between a macro facility 12 and a transport vehicle 215a arriving at an inbound loading dock 601 of the macro facility 12 shown in FIG. 6, from an upstream mega facility 10, as illustrated in FIGS. 4A-4B, according to an embodiment herein. The large transport vehicle 215a loaded with the SCS bins 224a from the mega facility 10 travels to one of the macro facilities 12 as illustrated in FIG. 4A. The transport vehicle 215a from the mega facility 10 arrives at the inbound loading docks 601 of the macro facility 12, where the DSCS bins 224a arriving from the mega facility 10 are offloaded from the arriving transport vehicle 215a, and empty USCS bins, and/or other upstream-headed storage bins, destined for the mega facility 10 are loaded into the same transport vehicle 215a, in reverse to the loading/unloading process performed at the outbound loading docks 502 of the mega facility 10 as disclosed in the detailed description of FIGS. 12A-12B. The bin carousels 222a of the large transport vehicle 215a illustrated in FIGS. 10A-

10C, in instances where they are substantially full of DSCS bins, are each driven in an incremental manner to move adjacent bin-carrying carousel platforms 1002 one by one to the rear end of the bin carousel 222a, where the respective DSCS bin 224a is pulled from the carousel platform 1002, for example, by a human worker or a robotic handler 208, and in an embodiment, as part of a bin swap or exchange process in which the human worker or the robotic handler 208 that unloads a DSCS bin 224a from the arrived inbound transport vehicle 215a is also tasked with placement of a USCS bin thereon. During this unloading process, the facility management subsystem 204 of the macro facility 12 reads the Bin_IDs and at least some of the data contents of the contents table 327 and the product information table 328 from the mobile data storage devices 226 of the arriving DSCS bins 224a, and then sends a bin-acceptance signal to the central database 203 to update each DSCS bin's 224a location according to the Facility_ID of the macro facility 12 at which the DSCS bin 224a has arrived. Upon confirmed retrieval of the DSCS bin 224a from the arrived inbound transport vehicle 215a by the robotic handler 208, the Location_ID of the storage location of the DSCS bin 224a is updated with the Equipment_ID of the robotic handler 208, in the storage bins table 308 of the central database 203 and the on-site bins table 322 of the macro facility 12, thereby allowing the DSCS bin 224a to be associated with a Location_ID that is traceable in real time. The product information received by the facility management subsystem 204 over the local area network 206, for example, a wireless network, of the macro facility 12 comprises the handling and customization data, which are used to determine appropriate handling and routing of the arriving DSCS bin 224a in the macro facility 12, and to control the robotic handlers 208 of the gridded storage structure 603 and/or other automated handling equipment, and/or to instruct human workers accordingly. At the same time, in an embodiment, the information read from the mobile data storage device 226 of the DSCS bin 224a comprises the Product_IDs and quantities from the contents table 327 to indicate the amount of product being inducted into the macro facility 12, for example, for use by the facility management subsystem 204 to automatically and accurately track on-hand inventory, even in the event of a communication outage with the central computing system 201 that would prevent access to the storage bin contents table 309 of the central database 203. When proper communication with the central computing system 201 is available, the aforementioned transmission of the Facility_ID and the Bin_ID of each arrived DSCS bin 224a in the acceptance signal is operable to update the central database 203 on the on-hand inventory count at that macro facility 12 for each catalogued product in the arrived DSCS bin 224a.

FIGS. 13A-13B discloses the process of unloading DSCS bins 224a arriving at the macro facility 12 on the transport vehicle 215a from the mega facility 10, and simultaneously loading USCS bins from the macro facility 12 onto the same transport vehicle 215a for transport to the mega facility 10, which in an embodiment, is the same mega facility 10 from which the transport vehicle 215a arrived. Upon arrival 1301 of the transport vehicle 215a at the inbound loading dock 601 of the macro facility 12, at step 1302, the vehicle management subsystem 216 of the transport vehicle 215a illustrated in FIGS. 2A-2B, transmits an arrival signal containing its Vehicle_ID to the central computing system 201 and the facility management subsystem 204 of the macro facility 12 at which the transport vehicle 215a is arriving. Next, at step 1303, the central computing system 201 identifies the Facility_ID of the next destination for which the transport vehicle 215a is scheduled, and forwards the Facility_ID to the facility management subsystem 204. In an embodiment, the Facility_ID is conveyed to the facility management subsystem 204 of the macro facility 12 in the arrival signal from the transport vehicle 215a itself. Using the Facility_ID of this next destination, the facility management subsystem 204 queries the on-site bins table 322 of its local facility database 207 to identify USCS bins therein that are slated for transfer to the transport vehicle's 215a next destination, based on the use of the destination Facility_IDs stored in relation to the Bin_IDs of the on-site bins. This query may return Facility_IDs that match that of the transport vehicle's 215a next destination, and/or Facility_IDs of other facilities that are on a known travel route in which the transport vehicle's 215a next destination is known to be an intermediary relay point. At step 1305, if the query returns a quantity of candidate USCS bins exceeding a bin capacity of the transport vehicle 215a, the list of identified USCS bins is filtered based on the timing data stored for those identified USCS bin to retain those of a greater priority and remove those of a lesser priority. In an embodiment, this step may use an effective vehicle capacity calculated as the true capacity minus one, thereby ensuring the number of USCS bins designated for loading onto the transport vehicle 215a will be one less than the true bin capacity of the vehicle so as to leave one open carousel platform 1002 on the transport vehicle 215a illustrated in FIGS. 10A-10C, after loading.

If one or more USCS bins were identified at step 1303, then at step 1306, the facility management subsystem 204 of the macro facility 12 commands a robotic handler 208 to retrieve one of the identified USCS bins from the gridded storage structure 603 and to deliver the retrieved USCS bin to the inbound loading dock 601 at which the transport vehicle 215a has arrived. Upon confirmed retrieval of the USCS bin from its storage location in the gridded storage structure 603, the Bin_ID of that USCS bin is erased from the facility storage table 320a of the macro facility 12 and from the storage locations table 310 of the central database 203, and the Location_ID of the storage location from which the USCS bin was retrieved is erased from the storage bins table 308 of the central database 203 and from the on-site bins table 322 of the macro facility 12. Furthermore, upon confirmed retrieval of the USCS bin from the gridded storage structure 603 by the robotic handler 208, the Location_ID of the storage location of the USCS bin is updated with the Equipment_ID of the robotic handler 208, in the storage bins table 308 of the central database 203 and the on-site bins table 322 of the macro facility 12, thereby allowing the USCS bin to be associated with a Location_ID that is traceable in real time.

The facility management subsystem 204 communicates the environmental flag for the USCS bin to the vehicle management subsystem 216 of the arrived transport vehicle 215a, which at step 1307, uses this environmental flag to identify an unoccupied platform carousel 1002 of one of its bin carousels 222a whose environmental status indicator in the vehicle storage table 324 matches the environmental flag, thus confirming that the respective storage location denoted by the unoccupied carousel platform 1002 is in an environmental zone of the transport vehicle 215a that is compatible with the environmental flag of the USCS bin, and any contents thereof in instances where the USCS bin is not an empty bin. The vehicle management subsystem 216 activates one of the bin carousels 222a of the transport vehicle 215a to relocate the unoccupied carousel platform 1002 to the rear loading/unloading position P of the bin carousel 222a illustrated in FIGS. 11A-11C, if not already found at such position, and communicates a hand-off designation signal to the facility management subsystem 204 to enable command of a robotic handler 208 to the appropriate terminal spot of the loading grid structure 604 for that bin carousel 222a of the transport vehicle 215a. At step 1308, as or once the retrieved USCS bin arrives at this specified terminal spot of the loading grid structure 604, the wireless communications unit 225 of the USCS bin connects and communicates its Bin_ID to the vehicle management subsystem 216 to enable recordal of the Bin_ID against the Location_ID of the carousel platform 1002 as disclosed in the detailed description of FIGS. 12A-12B. At step 1309, upon confirmed arrival of the robotic handler 208 at the specified terminal spot, the robotic handler 208 places the retrieved USCS bin 224a onto the presented empty carousel platform 1002 of the selected bin carousel 222a, as commanded by the facility management subsystem 204.

At step 1310, upon confirmed placement of the USCS bin onto the carousel platform 1002 presented at the loading/unloading position P, the facility management subsystem 204 updates its records to reflect the transfer of the USCS bin from the macro facility 12 to the transport vehicle 215a, by removing the Bin_ID of that USCS bin from the on-site bins table 322 of the macro facility 12 and, in an embodiment where the USCS bin is an empty storage bin 224a, decrementing the quantity of empty storage bins in the facility information table 319, if such a count is tallied therein. At this step, in an embodiment, the facility management subsystem 204 also sends a bin departure signal with the Bin_ID of the USCS bin just offloaded from the macro facility 12 to the central computing system 201, in response to which the central computing system 201 erases the Facility_ID of the macro facility 12 from this USCS bin's record in the storage bins table 308. Meanwhile, at step 1311, the vehicle management subsystem 216 updates its records to reflect the transfer of the USCS bin from the macro facility 12 to the transport vehicle 215a, by adding the Bin_ID of that USCS bin to the transport vehicle's 215a onboard bins table 325 and, in an embodiment where the USCS bin is an empty storage bin 224a, incrementing the quantity of empty storage bins in the vehicle information table 323, if such a count is tallied therein. The vehicle management subsystem 216 also records the Bin_ID of the USCS bin 224a against the Location_ID of the carousel platform 1002 on which that USCS bin 224a was placed, and/or records the Location_ID of that storage location against the Bin_ID of that USCS bin 224a in the onboard bins table 325 of the local vehicle database 220. At this step, in an embodiment, the vehicle management subsystem 216 also sends a bin-acceptance signal with the Bin_ID of the USCS bin just accepted onto the transport vehicle 215a to the central computing system 201, in response to which the central computing system 201 adds the Vehicle_ID of the transport vehicle 215a to this USCS bin's record in the storage bins table 308 of the central database 203. The bin-acceptance signal further comprises the Location_ID for recordal against the Bin_ID of the deposited USCS bin in the global storage bins table 308.

As disclosed above, steps 1303 to 1311 deal with an USCS bin destined for a mega facility 10 situated upstream of the macro facility 12 relative to the supply chain workflow direction of the multi-nodal supply chain system 200. Once the USCS bin has been transferred onto the transport vehicle 215a, the steps 1312 onward are performed for transferring an arriving DSCS bin 224a from the transport vehicle 215a into the macro facility 12. In this example, there is at least one DSCS bin 224a to unload from the transport vehicle 215a, as travel of the transport vehicle 215a to the macro facility 12 is defined by a need to transport storage bins downstream from the mega facility 10, and that transport vehicles 215a are not scheduled to travel in an empty state to a macro facility 12 solely to pick up storage bins, for example, USCS bins for upstream return to the mega facility 10. In an embodiment, an additional decision step is performed between steps 1311 and 1312 to first query the onboard bins table 325 of the local vehicle database 220 of the transport vehicle 215a to first confirm whether there are any DSCS bins 224a onboard for unloading to the macro facility 12.

The vehicle management subsystem 216, at step 1312, identifies one of the bin carousels 222a containing a DSCS bin and activates the bin carousel 222a on which the DSCS bin is carried to move the carousel platform 1002 carrying that DSCS bin into the loading/unloading position of that bin carousel 222a, if not already present at the loading/unloading position. Meanwhile, the vehicle management subsystem 216 sends another hand-off designation signal to the facility management subsystem 204 to identify the particular terminal spot of the loading grid structure 604 at which the robotic handler 208 is required to receive the DSCS bin 224a from the bin carousel 222a on which the DSCS bin 224a resides. If this hand-off designation signal designates the same terminal spot of the loading grid structure 604 from which the USCS bin was previously loaded onto the transport vehicle 215a by the robotic handler 208, then the robotic handler 208 remains parked at this same terminal spot. If not, the robotic handler 208 is commanded by the facility management subsystem 204 to relocate to another terminal spot of the loading grid structure 604 based on the hand-off designation signal from the vehicle management subsystem 216. In an embodiment, in the event of identification of DSCS bins 224a on multiple bin carousels 222a, the vehicle management subsystem 216 is configured to prioritize selection of any DSCS bin 224a on the same bin carousel 222a to which the USCS bin was just loaded, and prioritize DSCS bins on carousel platforms 1002 closest to the loading/unloading position of the bin carousel 222a to minimize carousel and robotic handler movements for optimal loading/unloading efficiency.

At step 1313, the wireless communications unit 225 of the DSCS bin 224a transmits its Bin_ID, environmental flag, and at least some of its bin data comprising including at least its handling data, customization data, destination data, and timing data to the facility management subsystem 204, for example, after being instructed by the vehicle management subsystem 216 to disconnect from the local area network 221, for example, a wireless network of the transport vehicle 215a, and instead connect to the local area network 206, for example, a wireless network of the macro facility 12, to perform such communication therewith. Based on the received environmental flag, the facility management subsystem 204 queries its facility storage table 320a for the Location_ID of an available storage location in the gridded storage structure 603 whose environmental status matches the environmental flag of the DSCS bin 224a, and therefore confirms residence in the appropriate environmental zone of the gridded storage structure 603 for the product contents of that DSCS bin 224a.

At step 1314, the facility management subsystem 204 commands the robotic handler 208 already parked at the appropriate terminal spot neighbouring the loading/unloading position of the bin carousel 222a to retrieve the DSCS bin 224a from the carousel platform 1002 at the loading/ unloading position. At step 1315, upon confirmed retrieval of the DSCS bin 224a from the carousel platform 1002 by the robotic handler 208, the vehicle management subsystem 216 updates its records to reflect the transfer of the DSCS bin 224a to the macro facility 12 from the transport vehicle 215a, by removing the Bin_ID of that DSCS bin 224a from the transport vehicle's 215a onboard bins table 325 and decrementing the quantity of occupied storage bins in the vehicle information table 323 if such a count is tallied therein. At this step, in an embodiment, the vehicle management subsystem 216 also sends a bin departure signal with the Bin_ID of the DSCS bin 224a just offloaded from the transport vehicle 215a to the central computing system 201, in response to which the central computing system 201 erases the Vehicle_ID of the transport vehicle 215a from this DSCS bin's record in the storage bins table 308. Meanwhile, at step 1316, the facility management subsystem 204 updates its records to reflect the transfer of the DSCS bin 224a to the macro facility 12 from the transport vehicle 215a, by adding the Bin_ID of that DSCS bin 224a to the on-site bins table 322 of the macro facility 12, and incrementing the quantity of occupied bins in the facility information table 319 if such a count is tallied therein. At this step, in an embodiment, the facility management subsystem 204 also sends a bin-acceptance signal with the Bin_ID of the DSCS bin 224a just accepted into the macro facility 12 to the central computing system 201, in response to which the central computing system 201 adds the Facility_ID of the macro facility 12 to this DSCS bin's 224a record in the storage bins table 308.

Upon confirmed receipt of the DSCS bin 224a from the transport vehicle 215a by the robotic handler 208, the Location_ID of the storage location of the DSCS bin 224a is updated with the Equipment_ID of the robotic handler 208, in the storage bins table 308 of the central database 203 and the on-site bins table 322 of the macro facility 12, thereby allowing the DSCS bin 224a to be associated with a Location_ID that is traceable in real time. With a confirmed receipt of the DSCS bin 224a by a robotic handler 208 of the macro facility 12, the facility management subsystem 204 of the macro facility 12 now assesses how to route the DSCS bin 224a within the macro facility 12 in accordance with the environmental flag and handling and customization data read from the DSCS bin 224a at step 1313, and commands travel of the robotic handler 208 to an appropriate destination in the macro facility 12 based thereon. At step 1317, the facility management subsystem 204 checks the destination data and the timing data received at step 1313, assesses whether the destination data and the timing data indicate immediate cross-docking of the DSCS bin 224a for prompt transport to another facility, for example, based on a comparison of the destination data and the timing data against the presence of a transport vehicle 215b or a scheduled imminent arrival thereof, at the outbound loading docks 602 of the macro facility 12 illustrated in FIG. 6. If the destination data is indicative that the intended destination facility of the DSCS bin 224a is not the current macro facility 12 at which the DSCS bin 224a just arrived, then the facility management subsystem 204 of the current macro facility 12 generates routing commands or instructions for use in automated equipment control and/or human worker guidance to cause or instruct the cross-docking of the DSCS bin 224a at the current macro facility 12 if a transport vehicle 215b is already present or imminently expected, or to cause or instruct temporary storage of the DSCS bin 224a in the indexed storage array of the current macro facility 12 for future transport to another facility if a transport vehicle 215b is not already present or imminently expected.

This other facility to which the DSCS bin 224a will be transported by such transport vehicle 215b is either the intended destination facility for that DSCS bin 224a or an intermediate facility closer to the intended destination facility. That is, the current facility at which a DSCS bin 224a arrives may serve as an intermediary relay point through which the DSCS bin 224a is transferred onward toward another facility, whether the intended destination facility or another intermediary relay point, without any processing or transferring of the DSCS bin's contents, for example, related to value-added service (VAS) customization, kitting to a multi-compartment storage (MCS) bin, etc. In this manner, an SCS bin 224a packed at a mega facility 10 at one extreme of the geographic expanse of the multi-nodal supply chain system 200 is not transported directly to a far-off macro facility 12 at another extremity of the multi-nodal supply chain system 200, and instead is relayed through a plurality of intermediary facilities situated between the originating mega facility 10 and the final destination macro facility 12. In various embodiments, this same relaying of bins through facilities can occur at transport stages other than the particular mega-to-macro transport stage currently contemplated, both as part of inter-class transport stages from one class of facility to another, for example, mega-macro, macro-micro, and micro-nano, and as part of intra-class transport stages, for example, mega-mega, macro-macro, and micro-micro. In an embodiment, some or all of the transport vehicles have dedicated transport legs between two specific facilities, or dedicated services areas within which they travel between a limited group of facilities. In the case of dedicated transport legs, the vehicle management subsystem 216 of each transport vehicle stores two default Facility_IDs, an upstream Facility_ID and a downstream Facility_ID, and is configured to automatically switch the value of a respective destination Facility_ID field between these two values upon the arrival of the transport vehicle at either of these two facilities before initiating a standardized data exchange with the facility management subsystem 204 through which the facility identifies the transport vehicle's next destination in order to query the on-site bins table 322 of the facility for those slated for delivery to the transport vehicle's next destination.

If a need for cross docking is identified at step 1317, then in an embodiment, at step 1318, fully automated cross-docking of the DSCS bin 224a is executed, in which case the facility management subsystem 204 commands the robotic handler 208 already carrying that DSCS bin 224a to carry that DSCS bin 224a directly to the outbound loading docks 602, for example, by traveling across the gridded storage structure 603 on the lower track layout thereof from the inbound loading grid 604 to the outbound loading grid structure 605, where the robotic handler 208 loads the DSCS bin 224a onto a waiting or arriving transport vehicle 215b at the outbound loading docks 602.

If no immediate cross-docking is required, then at step 1322, the facility management subsystem 204 checks the customization data received from the DSCS bin 224a at step 1313, and uses the customization data in assessment of whether the DSCS bin 224a should be sent directly to a VAS/Returns workstation 606, rather than to an indexed storage location in the gridded storage structure 603. In an embodiment, this assessment comprises querying of the workstation information table 321 of the macro facility 12 for a VAS/Returns workstation 606 that is appropriately supplied to fulfill the VAS requirements of the DSCS bin's 224a contents, and that has immediate or imminent capacity to accommodate that DSCS bin 224a. If the VAS query at step 1322 is answered in the positive, then at step 1319, the facility management subsystem 204 commands the robotic handler 208 to carry the DSCS bin 224a toward, or fully to, the available VAS/Returns workstation 606. In an embodiment, the robotic handler 208 handles full delivery of the DSCS bin 224a from its point of pick up at the carousel-adjacent terminal spot of the loading grid structure 604 to the VAS/Returns workstation 606 via the gridded lower track layout of the gridded storage structure 603.

If no immediate VAS processing of the DSCS bin 224a is required at step 1322, then at step 1323, the facility management subsystem 204 uses the environmental flag received from the DSCS bin 224a at step 1313 to query the facility storage table 320a for the Location_ID of an available storage location in the gridded storage structure 603 whose environmental status matches the environmental flag of the DSCS bin 224a, and commands the robotic handler 208 to carry the DSCS bin 224a to, and deposit the DSCS bin 224a into, this available and environmentally compatible storage location in the gridded storage structure 603. At step 1324, upon confirmed placement of the DSCS bin 224a in the environmentally compatible storage location, the same communications and database updates as the bin induction process in the mega facility 10 disclosed in the detailed description of FIG. 12A-12B, are performed, for the same purpose and beneficial result described above in relation thereto.

In an embodiment, the routing decisions steps 1317 and 1322 made by the facility management subsystem 204 upon arrival of a DSCS bin 224a are configured to command delivery of the DSCS bin 224a to the VAS/Returns workstation 606 by default for any DSCS bin 224a whose read bin data comprises customization data, and to only bypass such routing to a VAS/Returns workstation 606 for processing if the bin data does not comprise customization data, in which case storage of the DSCS bin 224a in the gridded storage structure 603 is instead commanded, specifically in the prescribed environmental zone thereof indicated by the environmental flag from the read bin data. In an embodiment, the routing decisions performed by the facility management subsystem 204 further comprise a decision on whether to bypass storage in the indexed storage array and direct the DSCS bin 224a, for example, a single-SKU bin, directly to a kitting workstation 607 by checking whether the facility management subsystem 204 has received a product request for the product type contained in the arriving DSCS bin 224a and is awaiting that DSCS bin's 224a arrival because the on-site SCS bins in the on-site bins table 322 of the facility does not have any, or sufficient quantity, of that product type to fulfill the product request. The workflow associated with such product requests at the kitting workstations 607 is disclosed below.

Steps 1306 to 1324 in FIGS. 13A-13B, therefore, collectively perform a singular bin swap, where one DSCS bin 224a arriving at the macro facility 12 on an inbound transport vehicle 215a is exchanged for one USCS bin, for example, an empty SCS bin that subsequently departs the macro facility 12 on the same transport vehicle 215a. After completion of such a bin swap, at step 1320, the facility management subsystem 204 performs a check on whether there are additional USCS bins remaining in the list from steps 1303-1305, and if there are additional USCS bins, repeats steps 1306-1324. If not, then at step 1321, the facility management subsystem 204 and the vehicle management subsystem 216 co-operably check for the presence of remaining DSCS bins 224a still on the transport vehicle 215a and awaiting for offloading by a robotic handler 208, thereby accounting for situations in which the number of arriving DSCS bins 224a exceeds the number of USCS bins currently on-hand at the macro facility 12 and slated for travel to the mega facility 10 for which the transport vehicle 215a is next destined. In the event of a positive determination at step 1321, steps 1312 onward are repeated until the check at step 1321 is in the negative, thereby confirming that all DSCS bins 224a have been unloaded from the transport vehicle 215a and accepted into the macro facility 12.

In the method disclosed in FIGS. 13A-13B, it is presumed that at step 1307, there is already at least one unoccupied carousel platform 1002 on the transport vehicle 215a onto which the USCS bin carried on the first robotic handler 208 to reach the inbound loading dock 601 can be deposited; however, other instances may require pre-emptive performance of steps 1312 to 1316 by a different bin-less robotic handler tasked to unload a first DSCS bin 224a from a fully loaded transport vehicle 215a with no empty carousel platforms, before any USCS bin can be loaded onto the transport vehicle 215a. In various embodiments, the loading/unloading processes at the different facilities are configured not to load a bin carousel 222a to its full capacity, so that at least one carousel platform 1002 is always left open during transport to accommodate the first storage bin loaded onto the transport vehicle 215a at its next destination.

As disclosed above, each macro facility 12 comprises one or more VAS/Returns workstations 606 illustrated in FIG. 6, where value-added services are performed on the products contained in the DSCS bins 224a received from the mega facility 10. Though some or all DSCS bins 224a are inducted straight into the gridded storage structure 603 of the macro facility 12, and buffered therein for later extraction and direction to the VAS/Returns workstation(s) 606 when called for, in an embodiment, the VAS services are optionally performed prior to induction of the DSCS bins 224a into the gridded storage structure 603 of the indexed storage array of the macro facility 12 if the capacity of the VAS/Returns workstations 606 allows, in accordance with the inclusion of optional steps 1322 and 1319 illustrated in FIGS. 13A-13B, where if the bin data read from the mobile data storage device 226 of an arriving DSCS bin 224a comprises VAS customization data and a suitably equipped VAS workstation 606 is immediately or imminently available, then the DSCS bin 224a is routed directly to one of the VAS/Returns workstations 606. Whether pulled from the indexed storage array or routed directly to a VAS/Returns workstation 606 upon arrival at the macro facility 12, on receipt of a DSCS bin 224a at a VAS/Returns workstation 606, a data exchange is performed in which the Bin_ID and at least some of the product information read from the product information table 328 of the DSCS bin's 224a mobile data storage device 226 is read by the facility management subsystem 204, and appropriate VAS actions are performed on the contents of the DSCS bin 224a according to the customization data contained in the read product information. If the VAS/Returns workstation 606 is attended by a human worker, then in an embodiment, the appropriate VAS instructions derived from the read customization data are displayed by a human-machine interface (HMI) at the VAS/Returns workstation 606 to guide the human worker. For example, the VAS instructions are displayed on a display monitor of a human-machine interface installed in the VAS/Returns workstation 606, or on a head-mounted display of a human-machine interface borne by the human worker. In an embodiment, if the VAS/Returns workstation 606 is fully automated, then an automated robotic worker, under the command of the facility management subsystem 204, executes the actions defined by the read customization data.

Examples of VAS actions/instructions comprise: removal of the product from original packaging such as a plastic bag; addition of a security tag, a price tag, an expiration label, a warning label, for example, in cases where refrigeration is required, and/or a branding label such as the name and/or logo of an owner vendor; and/or repackaging of the product in non-original packaging such as the owner vendor's branded packaging. In an embodiment, different VAS/Returns workstations 606 are equipped with vendor-specific supplies of different vendors, in which case the facility management subsystem 204 also reads the owner Vendor_ID from the mobile data storage device 226 of the SCS bin 224*a* during the aforementioned data exchange, and compares the owner Vendor_ID against the workstation information table 321 stored in the local facility database 207 of the facility management subsystem 204 or in an embodiment, as alternatively or additionally stored in the central database 203, to identify which among the VAS/Returns workstations 606 of the macro facility 12 is equipped with that vendor's specific supplies, and thereby determine to which of the VAS/Returns workstations 606 each SCS bin 224*a* should be routed.

Figure 14:
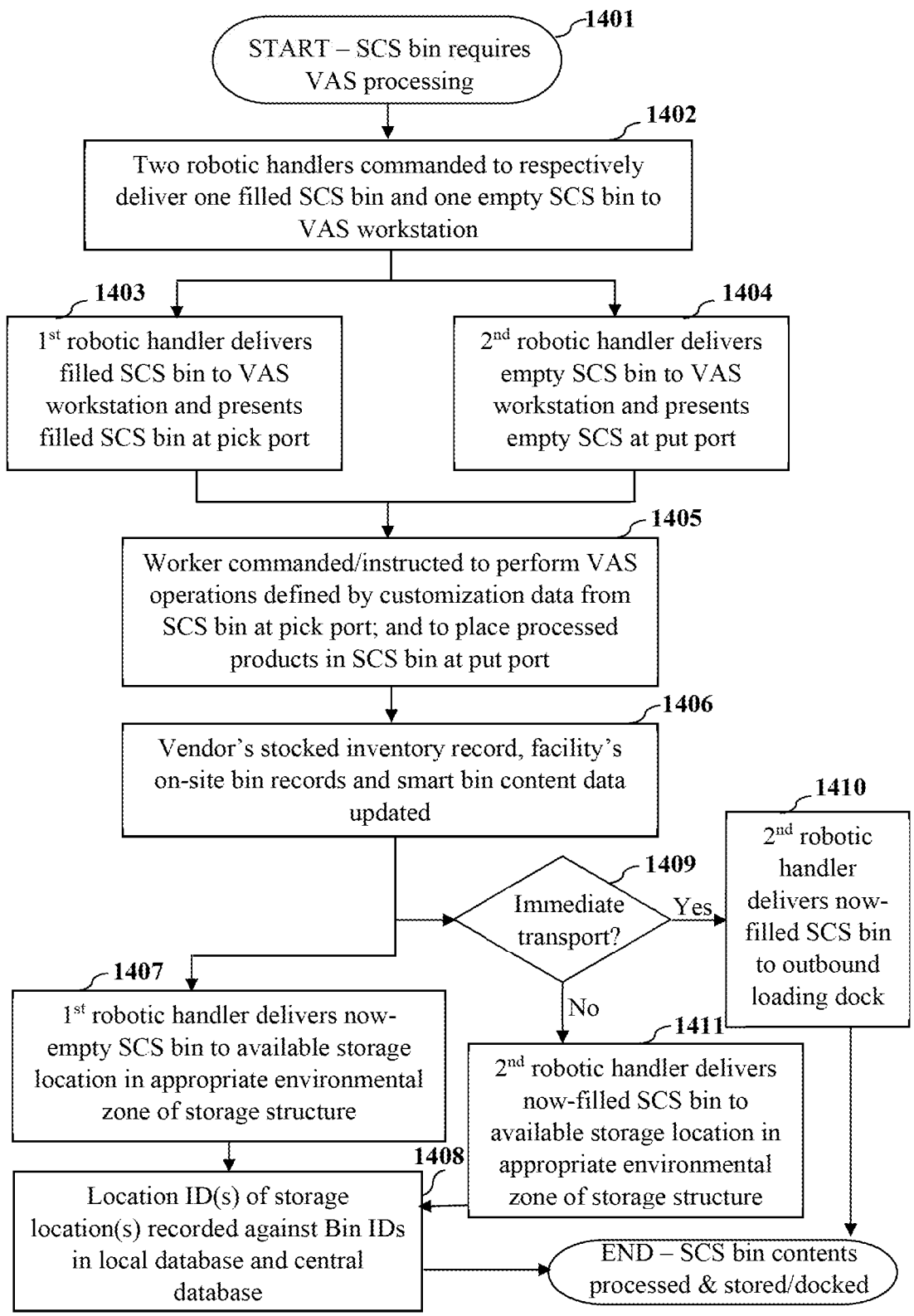
FIG. 14 illustrates a flowchart of a computer-implemented method for managing performance of value-added services on contents of the storage bins at the macro facility, according to an embodiment herein.

FIG. 14 illustrates a flowchart of a computer-implemented method for managing performance of value-added services (VAS) on contents of the storage bins 224*a* at the macro facility 12 shown in FIG. 6, according to an embodiment herein. The method disclosed herein comprises VAS customization of a single-compartment storage (SCS) bin 224*a* at one of the VAS/Returns workstations 606 of the macro facility 12 shown in FIG. 6. When an SCS bin 224*a* requires VAS processing 1401, at step 1402, the facility management subsystem 204 commands one robotic handler 208 to deliver to the VAS/Returns workstation 606, a product-filled SCS bin 224*a* that has been identified as requiring VAS processing of its contents at one of the VAS/Returns workstations 606, and commands another robotic handler 208 of the gridded storage structure 603 of the macro facility 12 to retrieve an empty SCS bin 224*a* therefrom and deliver the empty SCS bin 224*a* to the same VAS/Returns workstation 606. The empty SCS bin 224*a* is selected based on criteria indicating that its environmental flag matches that of the product-filled SCS bin 224*a*. The empty SCS bin 224*a* is, therefore, retrieved from a particular environmental zone of the gridded storage structure 603 to which the products from the product-filled SCS bin 224*a* will later be returned after they have been processed at the VAS/Returns workstation 606. In an embodiment, the identification of the product-filled SCS bin 224*a* is based, for example, on the aforementioned comparison of the customization data stored for the SCS bin 224*a* against data of vendor-specific VAS supplies stored in the workstation information table 321 illustrated in FIG. 3C, whether such comparison and commanded bin delivery are being performed at step 1322 of that SCS bin's induction into the macro facility 12 disclosed in the detailed description of FIGS. 13A-13B, in which case the product-filled SCS bin 224*a* is delivered to the VAS/Returns workstation 606 directly from the inbound loading grid structure 604; or being performed as a separate later query after the SCS bin 224*a* was already stored in the gridded storage structure 603, in which case the product-filled SCS bin 224*a* is retrieved therefrom by the commanded robotic handler 208. In an embodiment, rather than comparing different supply and equipment information for differently supplied/equipped workstations against the customization data of the on-site SCS bins, if all VAS/Returns workstations 606 have equivalent supplies and equipment, then the identification of the VAS-requiring SCS bin is based on an assessment comprising an identified distinction between SCS bins with a customization data field populated with any one or more customization requirements regardless of their specifics, versus those lacking any such customization requirements.

In a parallel execution of travel command steps 1403 and 1404, the facility management subsystem 204 commands the first robotic handler 208 to particularly deliver the product-filled SCS bin 224*a* to a pick port 606*b* of the VAS/Returns workstation 606 illustrated in FIG. 6, and commands the second robotic handler 208 to particularly deliver the empty SCS bin 224*a* to a put port 606*a* of the VAS/Returns workstation 606 illustrated in FIG. 6. On arrival of the product-filled SCS bin 224*a* to the VAS/Returns workstation 606, the customization data from the mobile data storage device 226 of the product-filled SCS bin 224*a* is communicated to the facility management subsystem 204, for example, over the local area network 206, for example, the wireless network of the macro facility 12. Once both SCS bins 224*a* are successfully delivered to their respective ports 606*a*, 606*b* of the VAS/Returns workstation 606 by the respective robotic handlers 208, at step 1405, the contents of the product-filled SCS bin 224*a* are picked therefrom through the pick port 606*b* and are processed in accordance with the VAS requirements defined by the received customization data from that product-filled SCS bin 224*a*, whether based on the use of the customization data by the facility management subsystem 204 to guide automated control of a robotic worker of the VAS/Returns workstation 606, or to guide instruction of a human worker at the VAS/Returns workstation 606 via visual and/or audible instructions conveyed via the human-machine interface (HMI) installed at the VAS/Returns workstation 606 or borne by the human worker. The processed products are then placed into the initially empty SCS bin 224*a* at the put port 606*a* of the VAS/Returns workstation 606.

With a confirmation that all contents from the SCS bin 224*a* parked at the pick port 606*b* having been picked therefrom, processed, and placed in the now product-filled SCS bin 224*a* parked at the put port 606*a*, then at step 1406, the facility management subsystem 204 copies the Product_ID(s), owner Vendor_ID, product quantity, destination data, timing data, and all or some product information from the product information table 328 of the mobile data storage device 226 illustrated in FIG. 3E, of the now-empty SCS bin 224*a* parked at the pick port 606*b*; and transfers this copied bin data to the mobile data storage device 226 of the now product-filled SCS bin 224*a* parked at the put port 606*a*, and then erases both the copied bin data and any optionally uncopied remnants thereof from the mobile data storage device 226 of the now-empty SCS bin 224*a* parked at the pick port 606*b*, thereby wiping the mobile data storage device 226 clean of any variable data that varies depending on the contents of the SCS bin 224*a*, thereby rendering the SCS bin 224*a* recognizably empty to the facility management subsystem 204 upon any future reading of its mobile data storage device 226. In an embodiment, the facility management subsystem 204 optionally omits the no longer required customization data from being copied into the mobile data storage device 226 of the now product-filled SCS bin 224*a* after the VAS customization has already been performed. In an embodiment, the facility management subsystem 204 records the empty status of the now-empty SCS bin 224a in the local facility database 207 by switching an empty/occupied status flag in the on-site bins table 322 to "empty" in the respective record for this now-empty SCS bin 224a.

In connection with this transfer of products and the bin data from the first originally-filled, now empty SCS bin 224a to the second originally-empty, now filled SCS bin 224a, the facility management subsystem 204, at step 1406, also communicates with the central computing system 201 to locate, in the stocked inventory table 304 of the vendor whose products were transferred from bin-to-bin, the record that contains the Bin_ID of the SCS bin 224a from which the products were transferred, and to rewrite the Bin_ID and Compartment_ID fields of this record with the Bin_ID and Compartment_ID of the SCS bin 224a to which the products were transferred. Accordingly, subsequent querying of the vendor's stocked inventory table 304 for the product type that was just transferred from bin-to-bin properly returns the Bin_ID of the newly filled SCS bin 224a to which the products were transferred. In an embodiment where the on-site bins table 322 of the local facility database 207 illustrated in FIG. 3C, comprises a filled/empty status identifier for each Bin_ID, filled/empty status identifiers for the SCS bin from which the products were transferred and the SCS bin to which the products were transferred are switched from filled to empty and empty to filled respectively.

Next, at parallel steps 1407 and 1411, two robotic handlers 208 are commanded to respectively stow the two SCS bins in the gridded storage structure 603. In step 1407, the first robotic handler 208 is commanded to return the now-empty SCS bin carried thereon to any available storage location in the gridded storage structure 603, for example, in the environmental zone thereof that matches the environmental flag of that now-empty SCS bin, which, in cases where this originally-filled, now empty SCS bin was retrieved from the gridded storage structure 603 rather than redirected from the inbound loading dock 601 during induction into the macro facility 12, will typically be the same environmental zone from where this now-empty SCS bin was previously retrieved in its prior product-filled state. Now that this SCS bin on the first robotic handler 208 is empty, if the SCS bin is a refrigeration-capable storage bin or a freezer-capable storage bin, in an embodiment, the SCS bin is optionally stored in an ambient zone when empty; though the reverse will not be true of an ambient-only storage bin that is not storable in refrigeration or freezer zones. Accordingly, there examples of scenarios where an empty storage bin is installed in an environmental zone that is different from that from which the empty storage bin was previously retrieved, and also does not match the environmental flag of that empty storage bin. In step 1411, the second robotic handler 208 is commanded to return the now-filled SCS bin to any available storage location in the gridded storage structure 603, specifically in the environmental zone thereof that matches the environmental flag of that now-filled SCS bin, which in cases where this now-filled SCS bin was previously retrieved from the gridded storage structure 603 when in its prior empty state, will typically be the same environmental zone from where this now-filled SCS bin was retrieved in its originally empty state. In an embodiment, there could be situations where an empty storage bin is not specifically stored in a zone that matches its environmental flag. In an embodiment, the two robotic handlers 208 that bring the two SCS bins to the VAS/Returns workstation 606 illustrated in FIG. 6, are the same two robotic handlers 208 that carry them away, but this need not necessarily be the case, particularly in scenarios where one or both of the workstation ports, that is, the pick port 606b and the put port 606a is/are not served on a drive-through basis by robotic handlers 208 carrying the SCS bins fully through the VAS/Returns workstation 606.

At step 1408, upon confirmed placement of the SCS bins in available storage locations, the facility management subsystem 204 records the Bin_IDs of the two SCS bins against the two Location_IDs of the two storage locations in which the SCS bins were placed in the facility storage table 320a of the local facility database 207, and/or records the two Location_IDs of those storage locations in the on-site bins table 322 of the local facility database 207. Furthermore, at step 1408, the facility management subsystem 204 forwards the Location_IDs and Bin_IDs of the two SCS bins to the central computing system 201 for recordal of each Location_ID against the Bin_ID of the respective SCS bin in the global storage bins table 308, and optionally also for the recordal of the Location_ID at which the now-filled SCS bin was placed in the stocked inventory table 304 of the vendor if the Location_ID field is duplicated therein. Accordingly, querying of the vendor's stocked inventory table 304 for the product that was just transferred from bin-to-bin will return the Bin_ID of the newly filled SCS bin, and not the Bin_ID of the now-empty SCS bin from which the product was transferred. From this updated Bin_ID, the Location_ID of the storage location at which the newly filled SCS bin is currently stored is also retrievable from the storage bins table 308 or in an embodiment, directly from the stocked inventory table 304, if duplicated therein, from which the Facility_ID of the macro facility 12 at which that storage location resides is also retrievable from the global storage locations table 310 or directly from the stocked inventory table 304 or the storage bins table 308, if duplicated therein. Accordingly, querying of the vendor's stocked inventory table 304 will retain the ability to identify the Bin_ID of each SCS bin in which the product type is found, the quantity of the product type in the SCS bin, the Facility_ID of the facility at which the SCS bin is found, and the particular storage location in which the SCS bin resides in the macro facility 12 if currently stowed in the indexed storage array thereof.

At the VAS/Returns workstation 606, once the product contents of the SCS bin 224a have been labeled, tagged, repackaged, or otherwise customized according to the vendor's specific VAS requirements defined by the customization data of the SCS bin 224a, the customized products are typically inducted into the indexed storage array of the macro facility 12. In an embodiment as shown at optional steps 1409 and 1410, the facility management subsystem 204 checks whether the destination data and the timing data as read from the originally-filled, now empty SCS bin and subsequently copied to the originally-empty, now-filled SCS bin, denotes an urgent priority or a short delivery deadline that demands immediate outbound docking, instead of indexed storage, after completion of the VAS processing. If yes, then the second robotic handler 208 is commanded to carry the now-filled SCS bin to an outbound loading dock 602 of the macro facility 12 via the outbound loading grid structure 605 for urgent loading of the now-filled SCS bin to a transport vehicle 215b designated for departure to a facility that either matches the Facility_ID of the SCS bin's destination facility, or is a known relay-point between the current macro facility 12 and the destination facility.

In the illustrated example, where the indexed storage array is distributed across environmentally distinct storage zones of a shared gridded storage structure 603 to which the VAS/Returns workstations 606 are connected so that all environmental zones and workstations are served by a singular shared fleet of robotic handlers 208, it will be appreciated that in other embodiments, where environmentally distinct storage areas contain one separate storage structures robotically isolated from one another, direction by the facility management subsystem 204 of the processed SCS bin to the particular environmental storage area of the macro facility 12 defined by the environmental flag of the SCS bin and corresponding environmental data of the products contained therein involves steps other than commanded travel of robotic handlers 208, such as computer-automated control of conveyors and associated routing equipment to convey the SCS bin to an isolated storage environment, or visually and/or audibly instructing a human worker via one or more human-machine interfaces to perform such transfers, whether using one or more stationary human-machine interfaces or mobile worker borne human-machine interface devices, for example, smartphones, tablets, wrist-mounted displays, head-mounted displays, headphones, etc.

While the illustrated embodiment uses a two-port VAS/ Returns workstation 606 for the VAS processing and involves transferring of the products from one SCS bin 224a to another as the products are processed, it will be appreciated that in other embodiments, a single SCS bin and a single-port workstation is used, in which case the product is picked from the SCS bin, processed according to the specified VAS requirements defined by the customization data, and then placed back into the same SCS bin, which is then returned to the gridded storage structure 603, whether to the same storage location therein from which that SCS bin was retrieved, or a different available storage location within the same environmental zone of the gridded storage structure 603, which is then recorded in in the same manner described for step 1408 of the two-bin process.

In addition to receiving SCS bins transported from one or more mega facilities 10 by the large transport vehicles 215a as illustrated in FIG. 4A, in an embodiment, each macro facility 12 optionally also receives SCS bins 224a from other facilities inside or outside the multi-nodal supply chain system 200, for example, including pre-binned supply shipments 401b from outside distribution centers, owned and operated, or contracted, by one or more vendors; and/or outside suppliers. In an embodiment, the SCS bins 224a received from such sources other than a mega facility 10 are received at the inbound loading docks 601 and unloaded therefrom in the same manner disclosed above with reference to FIGS. 13A-13B, whether or not this simultaneous loading of empty SCS bins or other outgoing storage bins is performed in the same manner disclosed for the USCS bins in the detailed description of FIGS. 13A-13B.

In addition to the presence of VAS/Returns workstations 606 disclosed in the detailed description of FIG. 6, the macro facilities 12 comprise one or more kitting workstations 607 to which the product-filled SCS bins 224a are taken, typically after having been inducted into the gridded storage structure 603 and stored therein for some time, before downstream needs at one or more micro facilities 14 for the single-SKU products stored in these SCS bins 224a warrants extraction thereof from the indexed storage array to fulfill those downstream needs. In an embodiment, the SCS bins 224a are served to these kitting workstations 607 by the same automated robotic handlers 208 responsible for extraction of the SCS bins 224a from the gridded storage structure 603, for example, by extension tracks leading out from the lower track layout of the gridded storage structure 603 to and/or into such kitting workstations 607. Each kitting workstation 607 is also served with a supply of multi-compartment storage (MCS) bins 224b, which in an embodiment, have the same footprint, external size, and configuration as the SCS bins 224a to be likewise compatible with the type of indexed storage arrays used in the mega, macro and micro facilities 10, 12 and 14 and in the transport vehicles 215a, 215b that convey storage bins between those facilities 10, 12 and 14. The internal space of each of the MCS bins 224b is divided into multiple smaller compartments, whereby different products loaded into the MCS bins 224b are physically separated from one another.

While in the detailed embodiment, the two categories of storage bins 224a, 224b are distinguished from one another by both the degree of compartmentalization, that is, non-compartmentalized SCS bins versus compartmentalized MCS bins, and by the mixed or unmixed character of products placed therein, that is, unmixed products of a single-product type of matching Product_ID placed in single-SKU SCS bins versus mixed products of multi-product types of non-matching Product_ID placed in multi-SKU MCS bins, it will be appreciated that in other embodiments, the two categories both comprise compartmentalized bins, in which case the distinction between the two categories is based on any one or more of: the quantity of compartments possessed by the storage bins in each category; the mixed/unmixed character of the contents received in the storage bins of each category; and the order in which these storage bins in each category are filled in a product's workflow through the multi-nodal supply chain system 200 illustrated in FIGS. 2A-2B and FIGS. 4A-4B, that is, the first category storage bins 224a are filled with "supplier products" entering the multi-nodal supply chain system 200 in supply shipments to fulfil vendor inventory needs, and the second category storage bins 224b are filled with already-inventoried "vendor products" previously inducted into the multi-nodal supply chain system 200 in the first category storage bins 224a and ready for picking during order fulfillment. In an embodiment, the first category storage bins 224a are also compartmentalized bins with subdivided interiors having multiple compartments, but have a smaller quantity of compartments compared to the second category storage bins 224b, thereby retaining the same relationship as the detailed embodiment, where the second category MCS bins 224b have a greater compartment quantity than the first category SCS bins 224a.

Figure 15A:
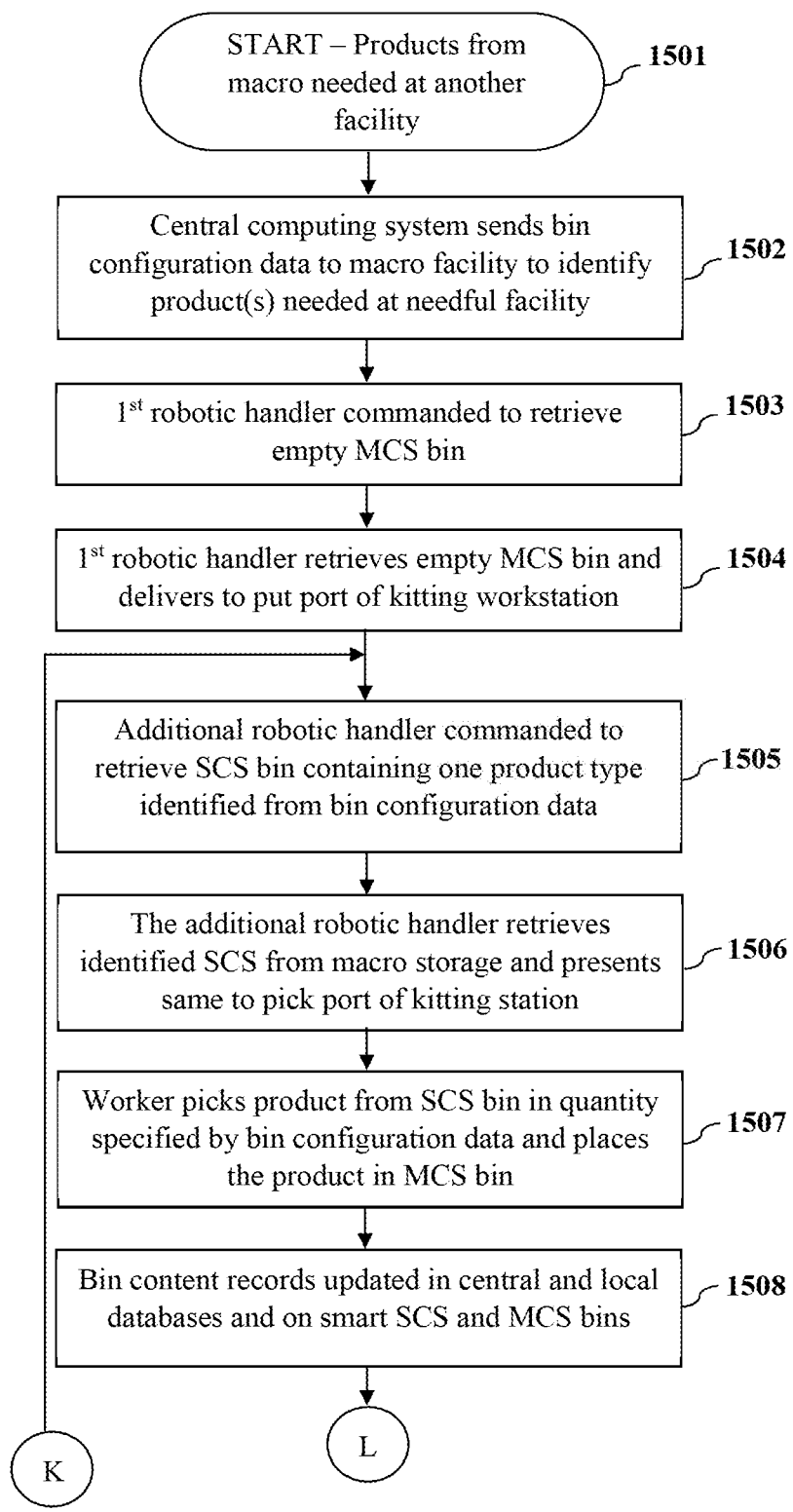
FIGS. 15A-15B illustrate a flowchart of a computer-implemented method for managing compilation of smart-binned products at the macro facility into smart-binned kits to fulfill downstream product demand at other facilities, according to an embodiment herein.
Figure 15B:
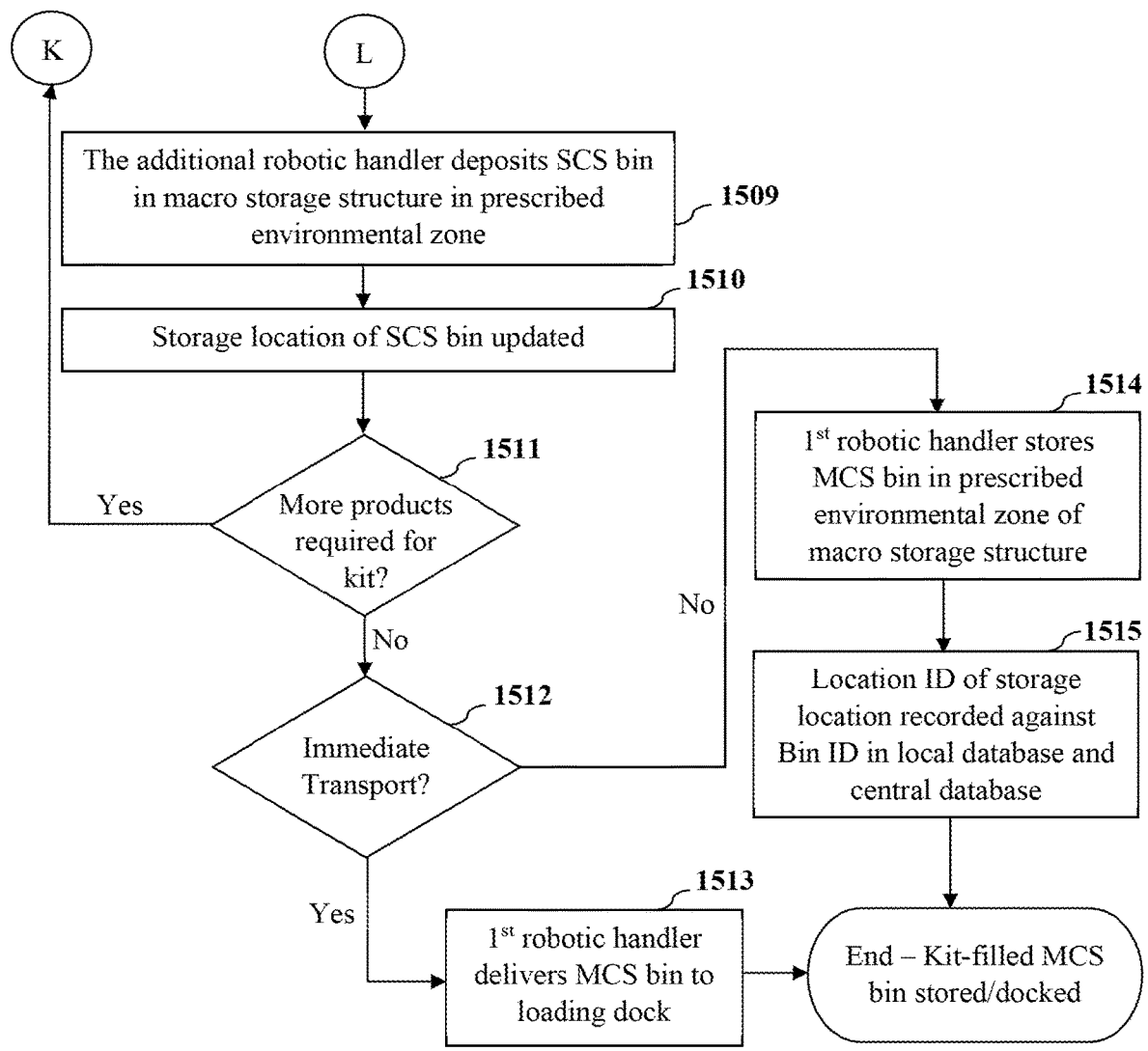

FIGS. 15A-15B illustrate a flowchart of a computer-implemented method for managing compilation of smart-binned products at the macro facility 12 illustrated in FIG. 6 and FIGS. 4A-4B, into smart-binned kits to fulfill downstream product demand at other facilities, according to an embodiment herein. At any given macro facility 12, the facility management subsystem 204 communicates with the central computing system 201 illustrated in FIGS. 2A-2B, which on an ongoing basis identifies forecasted or current inventory needs of the various vendors at the various facilities of the multi-nodal supply chain system 200, and thereby identifies inventory needs at the micro facilities 14 situated downstream of the given macro facility 12, and optionally at other macro facilities 12, that can be fulfilled by product on hand at the given macro facility 12. This method is initiated 1501 upon identification of such product-fulfillment needs. The process compiles the needed product types into a multi-compartment storage (MCS) bin and directs that MCS bin to the outbound loading dock 602 of the macro facility 12 for transport onward toward the other facility where the product types are needed, herein referred to as a "needful facility".

At step 1502, the central computing system 201 sends the facility management subsystem 204 of the macro facility 12 a product-request message containing at least one set of bin configuration data. Each bin configuration data set comprises: the Vendor_ID of a needful vendor who requires one or more product types at the needful facility; the Product_ID(s) of each of those product types; the quantity of each of the product types required at the needful facility; the Bin_ID(s) of the SCS bin(s) 224a that contain(s) the required quantity/quantities of the product type(s) at the macro facility 12; the Facility_ID of the needful facility; and timing information concerning delivery timeline constraints or urgency for fulfillment of the product need. In having selected the given macro facility 12 to fulfill the inventory need of the needful facility, the central computing system 201 has already, through query of the needful vendor's stocked inventory table 304 illustrated in FIG. 3A, identified that the vendor has sufficient on-hand inventory at the given macro facility 12 to fulfill the needed product type(s) in the needed quantities, and has retrieved the Bin_ID(s) from such query.

In an embodiment, if each local facility database 207 maintains therein a local accounting of on-hand inventory in the storage bins of its on-site bins table 322 illustrated in FIG. 3C, the Bin_ID(s) of the particular SCS bin(s) 224a is omitted from the bin configuration data set sent by the central computing system 201, and the determination of which particular SCS bin(s) to pull from storage is left to the facility management subsystem 204 based on a query of its local on-hand inventory record(s) for the Product_ID(s) of the needed product type(s). Similarly, in an embodiment, the bin configuration data set comprises the environmental flag(s) recorded for the Bin_ID(s) in the storage bins table 308 illustrated in FIG. 3A, or the environmental data recorded for the needed product type(s) in the vendor's products table 303. In another embodiment, such environmental flag/data is pulled from the local facility database 207 by the facility management subsystem 204 after the bin configuration data set is received.

Having received the bin configuration data and having identified the Bin_ID(s) of the SCS bin(s) containing the needed product type(s) therein and the environmental flag/data associated with the bin(s)/product type(s) if not specified in the bin configuration data, then at step 1503, the facility management subsystem 204 of the macro facility 12 queries its on-site bins table 322 for an empty MCS bin of matching environmental flag and commands a first robotic handler 208 of the gridded storage structure 603 to retrieve the empty MCS bin 224b, typically from an environmental zone thereof corresponding to the matching environmental flag, and to deliver the empty MCS bin 224b to a kitting workstation 607 illustrated in FIG. 6. In an embodiment with a two-port kitting workstation 607, at step 1504, the first robotic handler 208 is specifically commanded to deliver the retrieved empty MCS bin 224b to the put port 607a of the kitting workstation 607. In another embodiment, if empty MCS bins 224b are stored elsewhere outside the gridded storage structure 603, the facility management subsystem 204 directs retrieval and delivery of a specified empty MCS bin 224b or an unspecified MCS bin 224b of the prescribed environmental flag, by a human worker, for example, by visual and/or audible instructions conveyed by a human-machine interface (HMI) installed at the kitting workstation 607 or borne by such worker; or triggers an automated delivery of such a specified or non-specified empty MCS bin 224b to the kitting workstation 607 by automated conveyor and associated routing equipment.

Meanwhile, at step 1505, the facility management subsystem 204 of the macro facility 12 commands extraction by a second robotic handler 208 of a first one of the SCS bins 224a identified by the Bin_ID(s) from their storage locations in the gridded storage structure 603, as identified by the Location_ID(s) stored in the on-site bins table 322 for the Bin_ID(s), and commands delivery of the first SCS bin 224a by the second robotic handler 208 to the same one of the kitting workstations 607 to which the empty MCS bin 224b has been, or is being, delivered by the first robotic handler 208. Upon confirmed retrieval of the first SCS bin 224a from the gridded storage structure 603 by the second robotic handler 208, the Location_ID of the storage location of the first SCS bin 224a is updated with the Equipment_ID of the robotic handler 208, in the storage bins table 308 of the central database 203 and the on-site bins table 322 of the macro facility 12, thereby allowing the first SCS bin 224a to be associated with a Location_ID that is traceable in real time. In the illustrated embodiment, with a two-port kitting workstation 607, at step 1506, the second robotic handler 208 is specifically commanded to deliver the first SCS bin 224a to the pick port 607b of the kitting workstation 607.

Next, at step 1507, the facility management subsystem 204 instructs or commands a human or robotic worker at the kitting workstation 607 to pick a quantity of product from the first SCS bin 224a at the pick port 607b according to the quantity specified for that SCS bin's 224a product type in the bin configuration data set, and to place the picked quantity of the product type into a respective compartment of the MCS bin 224b at the put port 607a. At step 1508, upon confirmed completion of such a transfer of the specified quantity of product from the first SCS bin 224a at the pick port 607b to the MCS bin 224b at the put port 607a, the facility management subsystem 204 signals the central computing system 201 to update the inventory records in the central database 203 by decrementing the recorded product quantity in the storage bin contents table 309 for the first SCS bin 224a by the quantity that was transferred to the MCS bin 224b; and recording in the storage bin contents table 309 for the MCS bin compartment to which the product was transferred, while writing the Product_ID of the transferred product type and the transferred quantity thereof. Accordingly, the vendor's stocked inventory table 304 and the storage bin contents table 309 are properly updated to record therein the reduced quantity (if any) of product remaining in the SCS bin 224a and the transferred quantity of product newly found in the MCS bin 224b. If the decremented quantity for the SCS bin 224a is zero, then, in an embodiment, the central computing system 201 erases the Product_IDs and owner Vendor_ID in the corresponding record of the storage bin contents table 309, thereby reflecting the empty status of this first SCS bin 224a, which the facility management subsystem 204 likewise records in the local facility database 207 by switching the empty/occupied status flag in the on-site bins table 322 to "empty".

Furthermore, at step 1508, the updating of data at this point further comprises updating the mobile data storage devices 226 of both the first SCS bin 224a and the MCS bin 224b by the facility management subsystem 204. The product information table 328 of the MCS bin 224b has a new record copied thereto for the product type transferred into the MCS bin 224b, whether copied from the product information table 328 on the mobile data storage device 226 of the SCS bin 224a or from the vendor's product table 303 in the central database 203. The storage bin contents table 309 on the mobile data storage device 226 of the MCS bin 224b is likewise updated to write the Product_ID and the transferred quantity of the transferred product type to the bin contents record for the particular compartment of the MCS bin 224*b* in which the transferred product was placed, and in an embodiment, also the Vendor_ID that enables multi-vendor kitting of vendor-shared MCS bins as disclosed further below. The data written to the mobile data storage device 226 of the MCS bin 224*b* further comprises a subset of the bin configuration data set received from the central computing system 201, for example, the Facility_ID of the needful facility, which is written to the destination data field of the MCS bin 224*b*, and the timing information, which is written to the timing data field of the MCS bin 224*b*.

Meanwhile, the facility management subsystem 204 also decrements the quantity field in the storage bin contents table 327 of the SCS bin 224*a* by the transferred quantity, and if this decremented quantity becomes zero, erases the product information table 328 and also erases the owner Vendor_ID and Product_ID from the storage bin contents table 327, thereby reflecting the empty status of this first SCS bin 224*a*, which the facility management subsystem 204, in an embodiment, records in the local facility database 207 by switching the empty/occupied status flag in the on-site bins table 322 to "empty" for this SCS bin 224*a*. In such instances where the first SCS bin 224*a* is empty, in an embodiment, the local facility management subsystem 204 also increments the quantity of empty SCS 224*a* bins in the facility information table 319, if such a count is tallied therein. Similarly, during the first instance of step 1508, the facility management subsystem 204 increments the quantity of occupied MCS bins 224*b* in the facility information table 319, if such a count is tallied therein.

With data concerning its new contents having been populated onto the mobile data storage device 226 of the MCS bin 224*b*, the MCS bin 224*b* contains not only the static Bin_ID of the MCS bin 224*b* and the static environmental flag thereof, but also contains the Vendor_ID of the owner of the MCS bin's 224*b* content, up to date destination and timing data for the contents of the MCS bin 224*b*, and the product information concerning the content. In copying over of the product information from the SCS bin 224*a*, in an embodiment, the customization data is optionally omitted, where the transfer of product from SCS bins 224*a* to MCS bins 224*b* takes place after completion of any VAS processing, which was particularly performed during the single-SKU context of the SCS bins 224*a*, rather than at the potentially multi-SKU context of the MCS bins 224*b*. In such a multi-SKU context, where the MCS bin 224*b* ends up containing a plurality of different products in its different compartments, the mobile data storage device 226 ends up having multiple records written to its storage bin contents table 327 and product information table 328, each for a different respective one of the products contained therein as disclosed below with the described repetition of steps 1505 to 1510. Similar to the loading of bin data onto the SCS bins 224*a* at the induction workstations 506 of the mega facilities 10 and copying of some or all bin data from one SCS bin to another at the VAS/Returns workstation 606 of the macro facilities 12, the same or similar copying of some or all bin data to the MCS bins 224*b* is performed at the kitting workstations 607 of the macro facilities 12, except with a greater number of records in the storage bin contents table 327 and the product information table 328 optionally being written due to the multi-compartment nature and potentially multi-SKU filling of the MCS bin 224*b*.

In summary of step 1508, the removal of product from the SCS bin 224*a* triggers recording of a change in the recorded quantity of the respective product type left in that SCS bin 224*a*, thereby updating the vendor's catalogued product entry in the stocked inventory table 304 of the central database 203, including removal of the Bin_ID of that SCS bin 224*a* if now empty, in which case the facility management subsystem 204 also assigns an "empty bin" status flag to that empty SCS bin 224*a* and wipes the previously stored bin data therefrom. In an embodiment, a Facility_ID of one of the mega facilities 10 is then written to the mobile data storage device 226 of that empty SCS bin 224*a* in the destination field, thereby designating this empty SCS bin 224*a* as a recognizable upstream-headed single-compartment storage (USCS) bin for the purpose of triggering instruction to a robotic handler 208, other automated handling equipment, for example, one or more conveyors, or human worker personnel to deliver that USCS bin to a loading dock 601 for loading onto a transport vehicle 215*a* destined for such mega facility 10, for example, loading the USCS bin onto an arriving large-scale transport vehicle 215*a* delivering filled DSCS bins to the macro facility 12 and scheduled for return back to the mega facility 10 from which the transport vehicle 215*a* originated as disclosed in the detailed description of FIGS. 13A-13B. If the SCS bin 224*a* still has remaining product therein, then the vendor's respective catalogued product entry in the central database 203 is updated to change the quantity associated with the Bin_ID of that SCS bin 224*a* accordingly. At the same time, the product quantity recorded on the mobile data storage device 226 of the SCS bin 224*a* is likewise updated in a decremental manner by the facility management subsystem 204 according to the quantity removed therefrom, before the SCS bin 224*a* is deposited back into the macro facility's 12 indexed storage array.

Next, at step 1509, the facility management subsystem 204 commands the second robotic handler 208 to return the first SCS bin 224*a* to any available and environmentally compatible storage location in the gridded storage structure 603, typically in the same environmental zone thereof from which this first SCS bin 224*a* was retrieved from the gridded storage structure 603. In an embodiment, if this first SCS bin 224*a* is empty, there could be instances in which an emptied SCS bin is not specifically stored in the same environmental zone from which the SCS bin is retrieved. At step 1510, upon confirmed placement of the first SCS bin 224*a* in an available storage location in the appropriate environmental zone for its environmental flag, the facility management subsystem 204 records the Bin_ID of the first SCS bin 224*a* against the Location_ID of the storage location in which the first SCS bin 224*a* was placed in the facility storage table 320*a* of the local facility database 207, and/or records the Location_ID of that storage location in the on-site bins table 322 of the local facility database 207. Furthermore, at step 1510, the facility management subsystem 204 forwards the Location_ID and the Bin_ID of the first SCS bin 224*a* to the central computing system 201 for recordal of the Location_ID against the Bin_ID in the global storage bins table 308, and optionally also for the recordal of the Location_ID in the stocked inventory table 304 of the vendor if the Location_ID field is duplicated therein. The whereabouts of the first SCS bin 224*a*, whether empty or still occupied by a remaining product, is thus fully updated throughout the computerized supply chain management system.

At step 1511, the facility management subsystem 204 checks whether there are additional product types specified in the bin configuration data set other than those which have been fulfilled by the first SCS bin 224*a*. If yes, then steps 1505 to 1510 are repeated for one or more additional SCS bins 224*a*, with the different product type in each repetition being placed into a different compartment of the MCS bin 224b, until all of the needed products specified in the bin configuration data set for the current MCS bin 224b have been fulfilled from two or more retrieved SCS bins. The resulting compilation of different product types in the MCS bin 224b are referred to as a mixed "kit" of products to be delivered to the needful facility, and hence the workstation is referred to as a "kitting" workstation for compiling such "kitted" bins. Through this repetition of steps, filling an MCS bin 224b from a set of multiple SCS bins 224a, the facility management subsystem 204 of the macro facility 12 transfers the bin data from each of those SCS bins 224a to the MCS bin 224b and ties each such copied set of bin data with a respective one of the MCS bin's 224b Compartment_IDs, for example, by populating the contents table 327 with a respective record for each compartment that contains the Product_ID(s), the Vendor_ID, and quantity for the product type placed in that compartment. In an embodiment, the facility management subsystem 204 optionally transfers the bin data from each of those SCS bins 224a to the MCS bin 224b without any value-added service (VAS) customization data no longer required at this stage due to the downstream relation of this kitting process from the VAS customization process previously performed at the VAS/Returns workstation(s)) 606. Meanwhile, the central database 203 is updated to record the Bin_ID of this newly filled MCS bin 224b directly or indirectly against the respective vendor's stocked inventory record for each product contained in this MCS bin 224b, and to record the quantity of each product type contained in this MCS bin 224b, to thereby retain accurate tracking of the vendor's currently stocked inventory in the multi-nodal supply chain system 200. In an embodiment where the kits are placed in MCS bins 224b, the respective Compartment_ID for each product type placed in the MCS bin 224b is also recorded in connection with the vendor's catalogue entry for that product, as denoted by inclusion of Compartment_ID fields in the stocked inventory table 304, the storage bins table 308, and the storage bin contents table 309 in the central database 203 as illustrated in FIG. 3A.

In an embodiment, after sufficient repetition of steps 1505-1511 to populate the MCS bin 224b with the full kit of mixed products prescribed by the bin configuration data set, the filled MCS bin 224b is redeposited back into the indexed storage array of the macro facility 12 to await future transport to the needful micro facility 14 or other needful destination for which the kit was compiled. In an embodiment, at optional steps 1512 and 1513, the facility management subsystem 204 first checks whether the destination and timing data recorded on the kit-filled MCS bin 224b denotes an urgent priority or a short delivery deadline that demands immediate outbound docking, instead of indexed storage, in which case, the first robotic handler 208 is commanded to carry the kit-filled MCS bin 224b to an outbound loading dock 602 via the outbound loading grid structure 605 for urgent loading of the kit-filled MCS bin 224b to a transport vehicle 215b for transport onward to the needful facility.

At any storage versus docking decision node in the various processes disclosed and charted herein, even if the timing data does denote an urgent priority or a short delivery deadline, a selection to move the storage bin in question to a loading dock rather than to the indexed storage is made based on the destination data alone, for example, by checking for the presence or imminently expected arrival of a transport vehicle 215b whose next destination matches or is a known relay point toward the destination facility specified by the destination data of the storage bin.

If the destination and timing data recorded on the kit-filled MCS bin 224b do not trigger an immediate transfer thereof to an outbound loading dock 602 at step 1513, then at step 1514, the first robotic handler 208 is commanded to carry the kit-filled MCS bin 224b to any available storage location in the gridded storage structure 603 whose environmental status matches the environmental flag of that kit-filled MCS bin 224b. In cases where this originally-empty, now-filled MCS bin 224b was retrieved from the gridded storage structure 603, as opposed to from a separate empty bin reserve outside the gridded storage structure 603, the storage location for depositing the kit-filled MCS bin 224b will typically be in the same environmental zone from which this MCS bin 224b was previously retrieved in its prior empty state, though as disclosed above, there could be situations where an empty bin was not specifically stored in a zone that matches its environmental flag.

At step 1515, upon confirmed placement of the kit-filled MCS bin 224b in an available storage location in the appropriate environmental zone for its environmental flag, the facility management subsystem 204 records the Bin_ID of the kit-filled MCS bin 224b against the Location_ID of the storage location in the facility storage table 320a of the local facility database 207, and/or records the Location_ID of that storage location in the on-site bins table 322 of the local facility database 207. Furthermore, at step 1515, the facility management subsystem 204 forwards the Location_ID and the Bin_ID of the kit-filled MCS bin 224b to the central computing system 201 for recordal of the Location_ID against the Bin_ID in the global storage bins table 308, and optionally also for the recordal of the Location_ID in the stocked inventory table 304 of the vendor if the Location_ID field is duplicated therein. Accordingly, querying of the vendor's stocked inventory table 304 for any of the products that were just transferred into the MCS bin 224b will return the Bin_ID of this newly kit-filled MCS bin 224b and not that of the SCS bin 224a from which the product was kitted. From this updated Bin_ID in the central database 203, the Location_ID of the storage location at which the newly kit-filled MCS bin 224b is currently stored is also retrieved from the storage bins table 308 or directly from the stocked inventory table 304, if duplicated therein, from which the Facility_ID of the macro facility 12 at which that storage location resides is also retrieved from the global storage locations table 310 or directly from the stocked inventory table 304 or the storage bins table 308, if duplicated therein. Accordingly, querying of the vendor's stocked inventory table 304 retains the ability to identify the Bin_ID of each storage bin in which the product type is found, whether an SCS bin 224a or an MCS bin 224b, the quantity of the product type found in the storage bin, the Facility_ID of the facility at which the storage bin is found, and the particular storage location in which the storage bin resides in the facility if currently stowed in the indexed storage array thereof.

While the forgoing example disclosed in the detailed description of FIGS. 15A-15B involves packing of the MCS bins 224b with multiple products from a singular vendor's product catalogue 305 based on inventory needs of that particular vendor at one or more other facilities, the multi-compartment nature of the MCS bin 224b also enables multi-vendor packing of the MCS bin 224b, where each Compartment_ID of the MCS bin 224b is assigned the VendorID of a different vendor whose catalogued product item(s) is/are being placed in that compartment. Therefore, in an embodiment, if multiple vendors both require a transfer of inventory from a current given facility to another, different SCS bins 224*a* whose respective contents belong to those different vendors are delivered to the kitting workstation 607 for transfer of products from these vendor-specific SCS bins 224*a* into different compartments of a vendor-shared MCS bin 224*b*. To accommodate for such bin sharing, each record in the bin contents table 327 on the mobile data storage device 226 of the MCS bin 224*b* comprises the Vendor_ID of the respective vendor to whom the product in that compartment belongs. During transfer of the products from the different vendors' SCS bins 224*a* to the MCS bin 224*b*, the facility management subsystem 204 thus reads the Vendor_ID from the mobile data storage device 226 of the SCS bin 224*a*, and records this Vendor_ID on the mobile data storage device 226 of the MCS bin 224*b* in association with the respective Compartment_ID of the compartment into which the product from that SCS bin 224*a* is being placed. In the instance of such a vendor-shared MCS bin 224*b*, the bin configuration data set transmitted by the central computing system 201 to the macro facility 12 for that vendor-shared MCS bin 224*b* comprises multiple Vendor_IDs, each associated with one or more Product_IDs, each to be placed in a respective one of the compartments of the MCS bin 224*b*.

In various embodiments, each mega facility 10 incorporates some or all of the above disclosed components of the macro facility 12, including the VAS/Returns stations 606 and the kitting workstations 607, which may share the same gridded storage structure 507 as the induction workstations 506. In other words, one or more mega facilities 10 comprise an embedded macro facility 12 therein. While induction of supply shipments 401*a*, 401*b* into the overall supply chain system 200 focussed on incoming supply shipments received in or packed-into SCS bins 224*a* at the mega facilities 10, in an embodiment, incoming supply shipments may by-pass placement into SCS bins 224*a* at the induction workstations 506, and instead either arrive in or be packed into MCS bins 224*b* at the induction workstations 506, from which the MCS bins 224*b* can then be transported to macro facilities 12 for storage in the indexed storage arrays thereof along with the other MCS bins 224*b* that were loaded at the kitting workstations 607 of such macro facilities 12 as disclosed in the detailed description of FIGS. 15A-15B.

The process carried out at the outbound loading grid structure 605 at the outbound loading docks 602 of each macro facility 12 to load downstream-headed storage bins onto transport vehicles 215*b* and unload upstream-headed storage bins from those transport vehicles 215*b* is the same as disclosed in the detailed description of FIGS. 12A-12B, for the outbound loading docks 502 of a mega facility 10, the only difference being that the downstream-headed storage bins from the macro facility 12 typically comprise downstream-headed MCS (DMCS) bins containing mixed product kits, rather than SCS bins containing unmixed products; and the upstream headed bins typically comprise empty upstream-headed MCS (UMCS) bins being returned from a micro facility 14. Accordingly, as illustrated in FIG. 4A or FIG. 4B, the transport vehicles 215*b* intended primarily, if not exclusively, for transport between the macro and micro facilities 12, 14 may be the same large-scale vehicles 215*a* used to transport storage bins between the mega and macro facilities 10, 12. The transport vehicle 215*b* is, therefore, equipped with a vehicle-based indexed storage array and a vehicle management subsystem 216, with a GPS device 219 and a mobile wide area wireless communications device 218, for example, a cellular communications device, and in an embodiment, a local area network 221, for example, a wireless network, as illustrated in FIGS. 2A-2B, for communicating with the wireless communications units 225 on the MCS bins 224*b*. In an embodiment, the vehicle-based storage array comprises one or more bin carousels 222*a* of the type disclosed in the detailed descriptions of FIGS. 10A-10C and FIGS. 11A-11C. The same data exchange steps disclosed above during loading and unloading of DSCS bins onto and USCS bins off of the transport vehicles 215*a* departing the mega facilities 10, therefore, takes place during loading and unloading of the DMCS bins onto and UMCS bins off of the transport vehicles 215*b* departing the macro facilities 12, thereby updating the central database 203 on the whereabouts of each storage bin by Facility_ID or Vehicle_ID and Location_ID, and enabling GPS tracking of the loaded DMCS bins during transport between the facilities 12, 14. The terms "mega-macro transport vehicle" 215*a* and "macro-micro transport vehicle" 215*b* are used herein to distinguish the transport vehicles travelling between the mega and macro facilities 10, 12 from those travelling between the macro and micro facilities 12, 14. In an embodiment, these transport vehicles are of an identical or similar configuration to one another, and different primarily or exclusively in terms of the particular facilities they service.

Figure 16A:
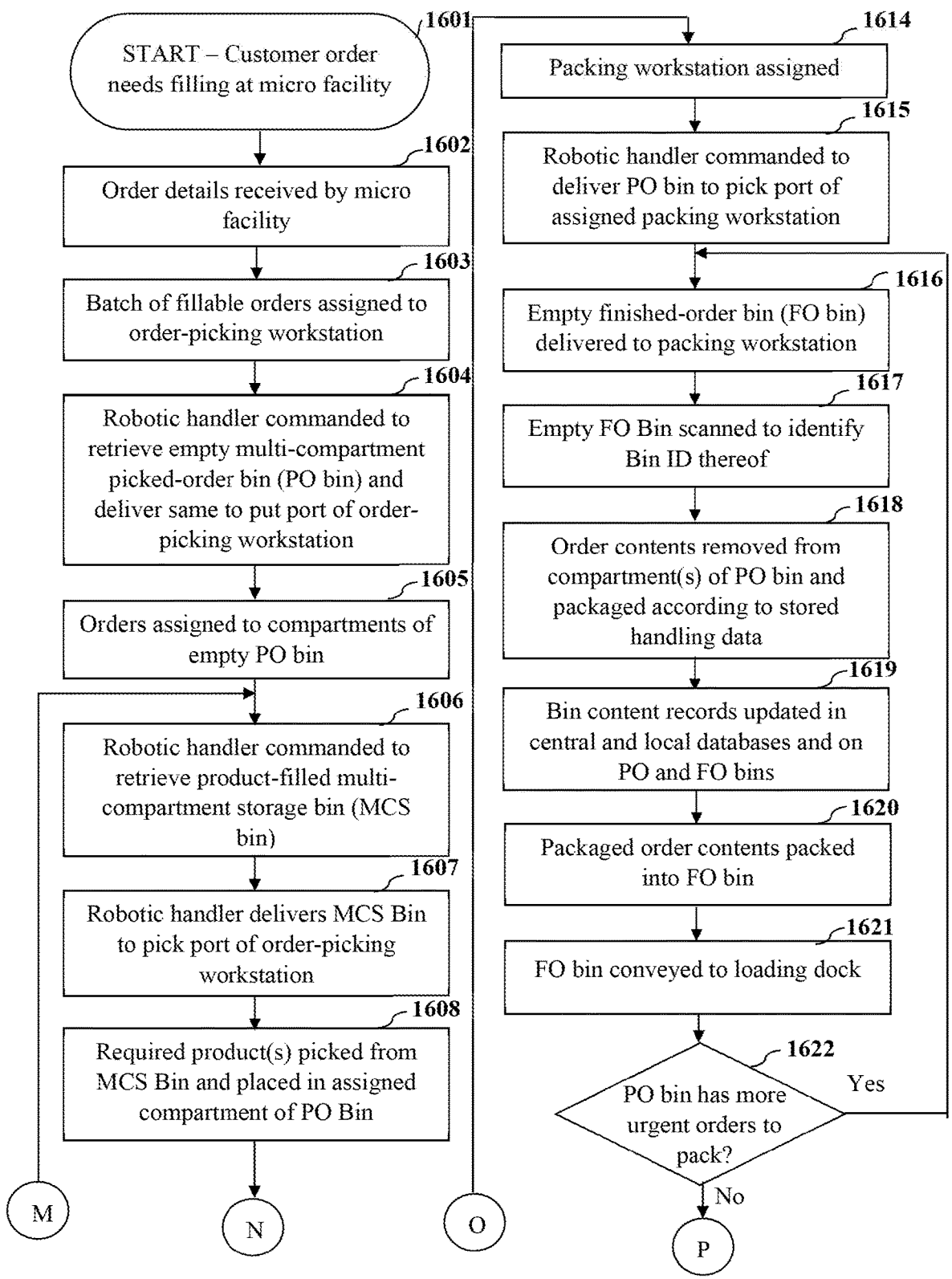
FIGS. 16A-16B illustrate a flowchart of a computer-implemented method for managing picking of multiple customer orders from smart-binned kits into a picked-order bin at a micro facility, and packing of the customer orders individually into finished-order bins for transport to one or more nano facilities, according to an embodiment herein.
Figure 16B:
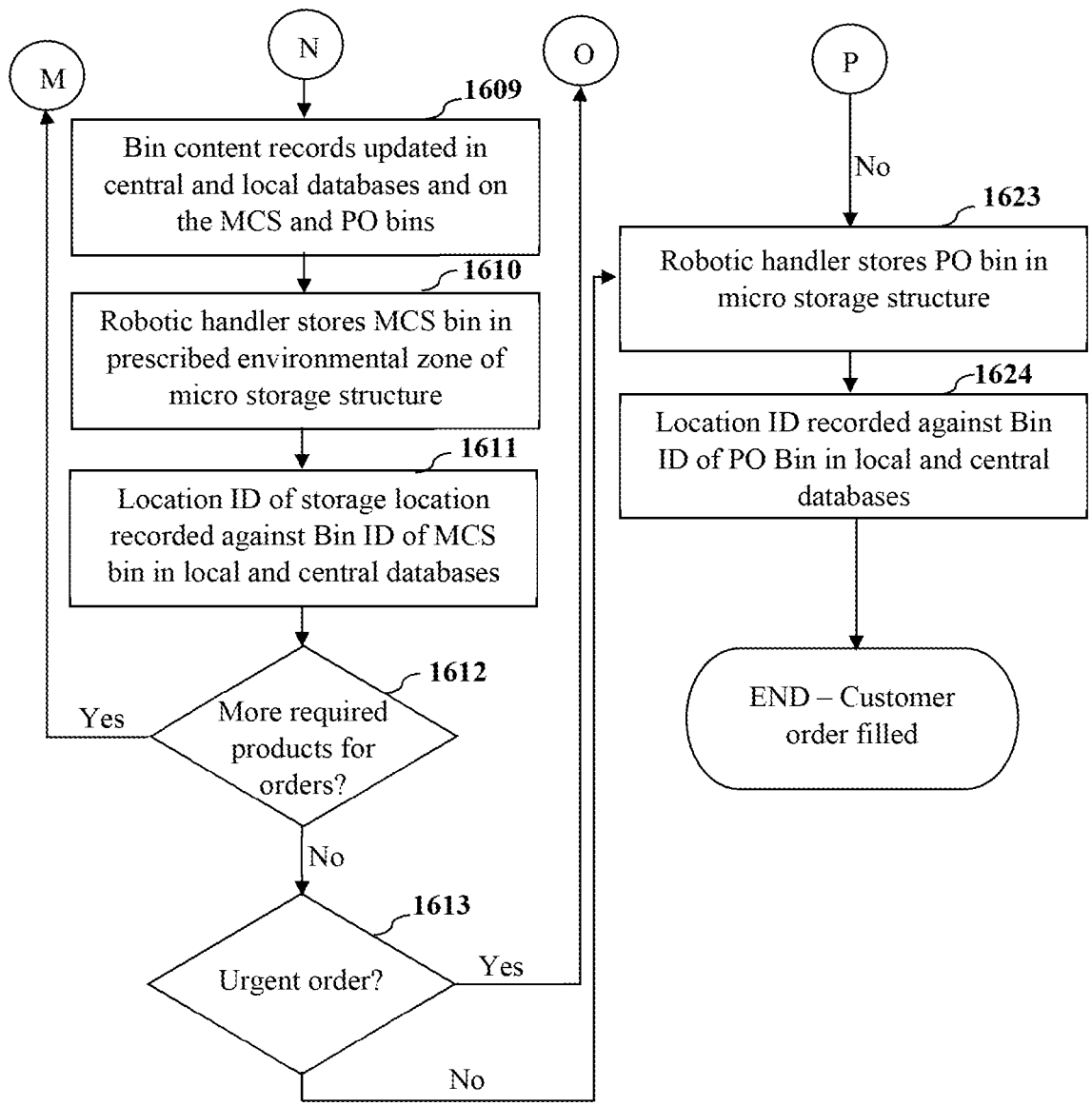

FIGS. 16A-16B illustrate a flowchart of a computer-implemented method for managing picking of multiple customer orders from smart-binned kits into a picked-order (PO) bin 224*c* at a micro facility 14, and packing of the customer orders individually into finished-order (FO) bins 224*d* for transport to one or more nano facilities 16, according to an embodiment herein. As illustrated in FIG. 4A, the kit-filled downstream-headed multi-compartment storage (DMCS) bins 224*b* travelling on the macro-micro transport vehicle 215*b* from the macro facility 12 arrive at the micro facility 14, where these DMCS bins 224*b* are offloaded from the macro-micro transport vehicle 215*b* and upstream-headed storage bins, for example, empty multi-compartment storage (MCS) bins, are loaded onto the same macro-micro transport vehicle 215*b* for transport to the same macro facility 12 from where the incoming DMCS bins 224*b* are arriving. This exchange of upstream-headed and downstream-headed storage bins is performed in substantially the same manner disclosed above and illustrated in FIGS. 13A-13B, for vehicle loading/unloading at the inbound loading docks 601 of the macro facility 12 illustrated in FIG. 6, except that at step 1322, instead of assessing whether to transfer an incoming DSCS bin 224*a* directly to a VAS/Returns workstation 606 of the macro facility 12, the decision node is used to assess whether to transfer an incoming DMCS bin 224*b* to an order-picking workstation 705 of the micro facility 14 illustrated in FIG. 7. Otherwise, during this loading/unloading process, the data exchange that takes place is substantially the same as that disclosed in the detailed description of FIGS. 13A-13B, whereby each DMCS bin's 224*b* location is updated in the central database 203 illustrated in FIG. 2A, according to the Facility_ID of the micro facility 14 or the Vehicle_ID of the macro-micro transport vehicle 215*b* to which the DMCS bin 224*b* has been transferred, and the bin data read from the received DMCS bin 224*b* is used by the facility management subsystem 204 of the micro facility 14 illustrated in FIGS. 2A-2B, to determine appropriate routing of the arriving DMCS bin 224*b* in the micro facility 14 and to either control automated handling equipment, for example, robotic handlers 208, conveyors, etc., accordingly or visually and/or audibly instruct facility personnel accordingly via one or more human-machine interfaces (HMIs). In an embodiment as illustrated in FIG. 4A, preloaded MCS bins 224*b* are also received from other facilities inside or outside the multi-nodal supply chain system 200, for example, including pre-binned supply shipments 401c from external distribution centers, owned and operated, or contracted by, one or more of the vendors and/or external suppliers.

In an embodiment, each micro facility 14 comprises workstation equipment for performing two different stages of order preparation, for example, an initial multi-order picking stage and a downstream single-order packing stage. In addition to the incoming MCS bins 224b received from the macro facilities 12, the storage bins at the micro facilities 14 comprise the PO bins 224c of the same standardized size, footprint, and configuration as the single-compartment storage (SCS) bins 224a and the MCS bins 224b that were previously filled at the mega and macro facilities 10, 12. Similar to the MCS bins 224b, the PO bins 224c are subdivided into multiple compartments, which in an embodiment, are each typically dedicated to receiving the necessary product(s) to fulfill a respective customer order rather than receiving multiple eaches of a singular product type owned by a singular vendor. The storage bins at the micro facility 14 further comprise FO bins 224d that are of a different smaller standardized size and footprint than the other storage bins 224a, 224b, 224c. In an embodiment, these FO bins 224d are about half the size and footprint of the other storage bins 224a, 224b, 224c, and are each intended to contain only a singular customer order, and accordingly need not have their interiors subdivided like the MCS bins 224b and the PO bins 224c. In an embodiment, the smaller FO bins 224d are not compatible with the indexed storage arrays and robotic handlers 208 of the mega, macro and micro facilities 10, 12 and 14 or with the bin carousels 222a of the mega-macro and macro-micro transport vehicles 215a, 215b illustrated in FIGS. 10A-10B and FIGS. 11A-11C, and are instead specifically sized and configured for a different type of indexed storage array used at the nano facilities 16 and on the micro-nano transport vehicles 215c as illustrated in FIGS. 17A-17C and FIGS. 18A-18C. Similar to the SCS bins 224a and the MCS bins 224b, the PO bins 224c and the FO bins 224d are smart bins, each having a mobile data storage device 226 and a wireless communications unit 225, and in an embodiment, also an indoor positioning device 229 as illustrated in FIG. 2B.

As illustrated by inclusion of the customer orders table 315 in FIG. 3B, each vendor's customer orders are received in the central computing system 201, whether directly from the customer when the vendor's electronic commerce (e-commerce) sales platform is integrated into the central computing system 201, or from the vendor when the vendor's sales platform is not integrated into the central computing system 201. For facilitating environmentally appropriate storage and transport of environmentally sensitive products within the multi-nodal supply chain system 200, the original population of the customer orders table 315 and the order line items table 316 in the central database 203 involves an automatic division of a customer's ordered line items into a plurality of separate customer orders, each assigned its own order number, specifically in instances where different ordered line items specify product types of non-matching environmental data in the vendors product table 3103. In response to creation of each customer order, the central computing system 201 queries the stocked inventory table 304 of the respective vendor in the central database 203 for the Product_ID(s) specified in the line items of the customer order and identifies an appropriate micro facility 14 from which to fulfill the customer order, for example, based on proximity of the micro facility 14 to the customer's address or another delivery destination or pickup point specified in the customer order, or based on an identification of a nano facility 16 closest thereto, from which a particular micro facility 14 is responsible for supplying that nano facility 16 with fulfilled customer orders. The customer order details from the order line items table 316 are then forwarded to the facility management subsystem 204 of the identified micro facility 14.

If the stocked inventory query reveals that the vendor already has sufficient on-hand inventory to fulfill the customer order at the identified micro facility 14, then forwarding the order details to the facility management subsystem 204 of that micro facility 14 is sufficient to enable fulfillment of the customer order via the process disclosed further below. If any of the ordered products are not on-hand at the singular micro facility 14, but are on-hand in one or more SCS bins 224a at a nearby macro facility 12, in an embodiment, the order details are still forwarded to the facility management subsystem 204 of the micro facility 14, stored in the local facility database 207, and flagged as an "open order" still awaiting arrival of one or more products at the macro facility 12 before the customer order becomes a "fillable order" ready for fulfillment. Meanwhile, the central computing system 201 sends a product-request message of the type disclosed in step 1502 illustrated in FIGS. 15A-15B, to the facility management subsystem 204 of that macro facility 12 to trigger filling of one or more MCS bins 224b at that macro facility 12 with the required products in the required quantities for the customer order. In that product-request message, the needful vendor Facility_ID specified for the MCS bin(s) 224b is the Facility_ID of the identified micro facility 14, whereby the required products from that macro facility 12 will be transported to the micro facility 14 in the required quantities within the MCS bin(s) 224b. During the unloading of incoming DMCS bins 224b at the inbound loading docks 701 of the micro facility 14 illustrated in FIG. 7, the data transaction at the equivalent of step 1322 illustrated in FIG. 13B, therefore comprises checking the bin data of the incoming DMCS bins 224b against the order details of any open orders to determine whether the content of an incoming DMCS bin 224b contains required product(s) for an open order.

Through such procedure, once all required product is on hand at the micro facility 14, the facility management subsystem 204 changes the status of the order from "open" to "fillable". Accordingly, in an embodiment, the process of unloading the arriving DMCS bins 224b from the transport vehicle 215b arriving at the inbound loading docks 701 of the micro facility 14 from a macro facility 12, and loading UMCS bins 224b onto that transport vehicle 215b for transport back to that macro facility 12, or to another facility, is substantially the same as that illustrated in FIGS. 13A-13B, for the inbound loading docks 601 of the macro facility 12, except that the incoming downstream-headed storage bins are DMCS bins 224b, the upstream-headed storage bins will typically be UMCS bins 224b, and the decision to bypass induction of the DMCS bins 224b into the gridded storage structure 703 of the micro facility 14 at the equivalent of steps 1322 and 1319 is not based on determination on whether the DMCS bin 224b requires immediate VAS customization, but rather on whether the DMCS bin 224b is immediately needed to fulfill an open order, in which case at equivalent step 1319, the robotic handler 208 is commanded to carry the DMCS bin 224b to an order-picking workstation 705. In an embodiment, "open" orders are held by the central computing system 201 and not forwarded to the facility management subsystem 204 of micro facility 14 until a "fillable" status is achieved, as confirmed by monitored tracking of the required product(s) via the Bin_ID(s) of the storage bin(s) in which they reside from the facility at which the required product(s) was originally determined to be available to the particular micro facility 14 at which the customer order is to be fulfilled. That is, each time a DMCS bin 224b arrives at a micro facility 14 and the central computing system 201 is informed of the arrival at the equivalent of step 1316, the central computing system 201 checks whether the Bin_ID of this DMCS bin 224b is stored as an anticipated bin in an "open order" record for a customer order awaiting that DMCS bin 224b. Once arrival of all such anticipated DMCS bins 224b at the micro facility 14 is confirmed by the central computing system 201, the customer order is now fillable, and the order details are forwarded to the facility management subsystem 204 of the micro facility 14.

FIGS. 16A-16B illustrates a process performed in relation to a two-stage fulfillment of fillable customer orders at the micro facility 14 illustrated in FIG. 7. When a customer order needs filling at a micro facility 14, at step 1602, the micro facility 14 receives the order details. Provided that all ordered products of a received order are already on hand at an identified micro facility 14, or once all ordered products arrive from a nearest macro facility 12 or micro facility 14 with on-hand inventory, the aforementioned fillable status of the customer order qualifies the customer order as a candidate for batch-picking of customer orders. At step 1603, a batch of fillable orders in a quantity equal to or at least not exceeding the number of compartments possessed by each subdivided PO bin 224c, is assigned by the facility management subsystem 204 of the micro facility 14 to one of the picking workstations 705 identified in the workstation information table 321 of the local facility database 207 of the micro facility 14. The customer orders are batched in groups whose product types are of matching environmental data, so that the customer orders with refrigeration-requiring products are grouped together and not with those having freezer-requiring or ambient-compatible products, and similarly, customer orders with freezer-requiring products are grouped together and not with those having freezer-requiring or ambient-compatible products.

Next, at step 1604, the facility management subsystem 204 queries the on-site bins table 322 of the micro facility 14 for identification of an empty PO bin 224c currently residing in the gridded storage structure 703 of the micro facility 14 and having an environmental flag matching the environmental data shared by the products of the batched orders, and commands one of the robotic handlers 208 of the indexed storage array to retrieve the empty PO bin 224c from the gridded storage structure 703 and deliver the empty PO bin 224c to the put port 705a of the assigned order-picking workstation 705. Upon confirmed retrieval of the empty PO bin 224c from the gridded storage structure 703 by the robotic handler 208, the Location_ID of the storage location of the empty PO bin 224c is updated with the Equipment_ID of the robotic handler 208, in the storage bins table 308 of the central database 203 and the on-site bins table 322 of the micro facility 14, thereby allowing the empty PO bin 224c to be associated with a Location_ID that is traceable in real time.

In an embodiment, if empty PO bins 224c are stored outside the gridded storage structure 703, the facility management subsystem 204 commands delivery of the empty PO bin 224c by a human worker through a human-machine interface (HMI), or by computer control of automated handling equipment, for example, one or more conveyors other than the robotic handlers 208 of the gridded storage structure 703. If no fully empty PO bins 224c are available, or if the number of customer orders in the current batch is less than the quantity of compartments in each PO bin 224c, in an embodiment, a partially filled PO bin 224c previously stored in the indexed storage array of the micro facility 14 and having at least one unoccupied compartment available to accept at least one of the current batched customer orders, is instead retrieved and delivered by the robotic hander 208 to the order-picking workstation 705. Upon confirmed retrieval of the partially filled PO bin 224c from the indexed storage array by the robotic handler 208, the Location_ID of the storage location of the partially filled PO bin 224c is updated with the Equipment_ID of the robotic handler 208, in the storage bins table 308 of the central database 203 and the on-site bins table 322 of the micro facility 14, thereby allowing the partially filled PO bin 224c to be associated with a Location_ID that is traceable in real time.

In connection with this selection of an empty or partially empty PO bin 224c to receive the batch of customer orders, the facility management subsystem 204, at step 1605, identifies the Compartment_IDs of that PO bin 224c and assigns the order numbers, line item numbers, and ordered product quantities of the batched customer orders to the identified compartments of the empty PO bin 224c. In an embodiment, the facility management subsystem 204 randomly selects the compartment of the PO bin 224c for placing each customer order if more than one compartment is unoccupied. In an embodiment, larger customer orders occupy more than one compartment of the PO bin 224c. Meanwhile, at step 1606, the facility management subsystem 204 commands another robotic handler 208 to retrieve a product-filled MCS bin 224b containing one or more required products of one or more of the batched customer orders assigned to the selected empty PO bin 224c from the gridded storage structure 703 and at step 1607, to deliver the retrieved MCS bin 224b to the pick port 705b of the order-picking workstation 705. At step 1608, with both the empty PO bin 224c and the MCS bin 224b at the order-picking workstation 705, the facility management subsystem 204 either commands a robotic worker of the order-picking workstation 705 to pick one or more products required from that MCS bin 224b at the pick port 705b for one or more of the batched customer orders, and place the picked product(s) into the assigned compartment(s) of the PO bin 224c at the put port 705a, or guides such picking and placement of the required product(s) by a human worker using a human-machine interface borne by the human worker or installed at the order-picking workstation 705. In the case of a human worker, in an embodiment, the human-machine interface employs pick-to-light guidance at the pick port 705b for each arriving MCS bin 224b and put-to-light guidance at the put port 705a where the PO bin 224c being filled resides, to visually instruct the human worker to pick the proper product(s) from the respective product-specific compartment(s) of the MCS bin 224b and place the picked product(s) in the respective order-specific compartment of the PO bin 224c. In an embodiment, on-screen pick and placement instructions are displayed on a display monitor or a head-mounted display of the human-machine interface. In the event of robotic automation of the order-picking workstation 705, the robotic worker picks and places the products to and from the appropriate compartment(s) of the MCS bin(s) 224b and the PO bin 224c automatically, under the command of the facility management subsystem 204.

At step 1609, during or after completion of such picking and placement of the product(s), the facility management subsystem 204 signals the central computing system 201 to update the inventory and order records in the central database 203, for example, by decrementing the recorded product quantity in the storage bin contents table 309 for each compartment of the MCS bin 224b from which product was removed by the quantity that was removed from that compartment and transferred to the PO bin 224c, and to write to the record in the PO bin contents table 312 for each PO bin compartment to which product was transferred, the Product_ID of the transferred product type and the transferred quantity thereof. At this step, if not performed previously, the central computing system 201 also writes to the record in the PO bin contents table 312 for any compartment in which product(s) was/were placed, the order number of the customer order for which the product(s) was/were placed into that assigned compartment and the line number of the customer order that is fulfilled by the product(s) placed in the compartment. If the decremented quantity for any compartment of the MCS bin 224b is zero, then the central computing system 201 erases the Product_IDs and the owner Vendor_ID in the corresponding record of the storage bin contents table 309, thereby reflecting the empty status of this compartment. If all compartments of the MCS bin 224b are now empty, in an embodiment, the facility management subsystem 204 records an empty status of the entire MCS bin 224b in the local facility database 207 by switching the empty/occupied status flag in the on-site bins table 322 to "empty", whereupon this empty MCS bin 224b now becomes a candidate UMCS bin returnable to a macro facility 12 on a transport vehicle 215b, and optionally incrementing the quantity of empty MCS bins 224b in the facility information table 319, if such a count is tallied therein. Similarly, during the first instance of step 1609, in an embodiment, the facility management subsystem 204 increments the quantity of occupied PO bins 224c in the facility information table 319, if such a count is tallied therein.

Furthermore, at step 1609, the updating of data at this point further comprises updating the content of the mobile data storage devices 226 of both the MCS bin 224b and the PO bin 224c by the facility management subsystem 204. The product information table 328 of the PO bin 224c has a new record copied thereto for the product type transferred into the PO bin 224c, for example, copied from the product information table 328 on the mobile data storage device 226 of the MCS bin 224b, or in an embodiment, copied from the fulfilling vendor's product table 303 in the central database 203. The contents table 327 on the mobile data storage device 226 of the PO bin 224c is updated to write to the respective record for the particular compartment of the PO bin 224c in which the transferred product was placed, some or all of the Produc_ID and transferred quantity of the transferred product type, the Vendor_ID of the fulfilling vendor from whose inventory the transferred product type was sourced, and the order number and line item number being fulfilled by the transferred product type and quantity. Meanwhile, the facility management subsystem 204 also decrements the quantity field in the appropriate compartment record of the bin contents table 327 of the MCS bin 224b by the transferred quantity, and if this decremented quantity is now zero, erases the owner Vendor_ID and the Product_ID from this record. If no other compartment of the MCS bin 224b contains the same product type as the now-empty compartment, the corresponding record in the product information table 328 can also be erased. In an embodiment, the data written to each record in the PO bin's contents table 327 also includes destination data specifying the Facility_ID of the nano facility 16 to which the customer order fully or partially contained in the subject bin compartment of that record is to be delivered, and associated timing data based, for example, on the priority status or the targeted delivery date of the customer order concerned.

The process thus far accounts for automatic updating of the PO bin's mobile data storage device 226 by the facility management subsystem 204 to reflect the newly added contents of the PO bin 224c, for example, by at least writing a unique identifier such as an order number of the respective customer order to the mobile data storage device 226 in association with the Compartment_ID(s) of the compartment(s) in which part or all of that customer order was placed. The facility management subsystem 204 also copies the product information 328 for each of the products of that customer order from the mobile data storage device 226 of the MCS bin 224b from which the product was picked to the mobile data storage device 226 of the PO bin 224c in which the product was placed, thereby retaining relevant handling data, environmental data, and product-level timing data as opposed to order-level timing data, when included among the product information stored in the product information 328, for example, for products with short expiry dates. The facility management subsystem 204 also decrements the product quantity recorded on the mobile data storage device 226 of the MCS bin 224a from which the ordered product(s) was/were pulled, and optionally wipes clean the record stored for any compartment that is now empty after pulling of the ordered product(s) therefrom to reflect an empty status of that compartment. The facility management subsystem 204 also communicates with the central computing system 201 to update the catalogued product entries in the stocked inventory table 304 for the products withdrawn from the MCS bin 224b, for example, to decrement the product quantity remaining in any compartment from which an ordered product was pulled or to erase the Bin_ID and/or Compartment_ID from a vendor's catalogue entry in the stocked inventory table 304 if the MCS bin 224b or a compartment thereof is now empty of that catalogued product.

Next, at step 1610, a robotic handler 208 is commanded by the local facility management subsystem 204 to return the MCS bin 224b to any available storage location in the gridded storage structure 703 compatible with the environmental flag of the MCS bin 224b, typically in the same environmental zone thereof from which this MCS bin 224b was retrieved from the gridded storage structure 703, though as previously disclosed, if this MCS bin 224b is now empty, there could be instances in which an emptied MCS bin 224b is not specifically stored in the same environmental zone from which the MCS bin 224b was previously retrieved. If the order-picking workstation 705 is of a type where its pick port 705b is served on a drive-through basis by the robotic handlers 208 of the indexed storage array, then this will be the same robotic handler 208 that previously delivered the MCS bin 224b to the order-picking workstation 705, and on which the MCS bin 224b therefore remains. If the pick port 705b of the order-picking workstation 705 is not served on a drive-through basis, then in an embodiment, this will be the same or a different robotic handler 208 than that which previously dropped off the MCS bin 224b to the order-picking workstation 705. At step 1611, upon confirmed placement of the MCS bin 224b in an available storage location of an appropriate environmental zone for its environmental flag, the facility management subsystem 204 records the Bin_ID of the MCS bin 224b against the Location_ID of the storage location in which the MCS bin 224b was placed in the facility storage table 320a of the local facility database 207, and/or records the Location_ID of that storage location in the on-site bins table 322 of the local facility database 207. Furthermore, at step 1611, the facility management subsystem 204 forwards the Location_ID and the Bin_ID of the MCS bin 224b to the central computing system 201 for recordal of the Location_ID against the Bin_ID in the global storage bins table 308, and optionally also for the recordal of the Location_ID in the stocked inventory table 304 of the vendor if the Location_ID field is duplicated therein. The whereabouts of the MCS bin 224b, whether empty or still occupied by remaining product, is thus fully updated throughout the multi-nodal supply chain system 200.

At step 1612, the facility management subsystem 204 checks whether, for the batched customer orders assigned to the current PO bin 224c, additional products are still required beyond those already fulfilled by the first MCS bin 224b. If yes, then steps 1606 to 1611 are repeated for one or more additional MCS bins 224b until all of the required products for all of the batched customer orders assigned to the current PO bin 224c have been fulfilled. Once all ordered products of the batched customer orders have been placed in the PO bin 224c, in an embodiment, that PO bin 224c is deposited, for example, by one of the robotic handlers 208 into the indexed storage array of the micro facility 14 for temporary storage therein until later finalization and transport to a nano facility 16, for example, in favor of higher priority customer orders that need be finalized and transported in the meantime. In an embodiment, the PO bin 224c is advanced to the single-order packing stage without delay for immediate finalization. Such a decision is illustrated at step 1613, where the facility management subsystem 204 checks the timing data for each of the customer orders compiled into the PO bin 224c and assesses whether any one or more of these customer orders warrants urgent second stage order processing at the order-packing workstations 706.

If not, then the process continues to step 1623, where a robotic handler 208 is commanded to store the PO bin 224c in the gridded storage structure 703 in the appropriate environmental zone indicated by the PO bin's 224c environmental flag and matching environmental data of the products contained in the PO bin 224c, which will typically be the environmental zone from which the PO bin 224c was retrieved, unless originally retrieved in a fully empty state, in which case there again may be circumstances where PO bin 224c may not have been originally stored in the prescribed environmental zone in which the PO bin 224c is now placed in its order-filled state. After such stowage of the order-filled PO bin 224c in the indexed storage array, the records concerning the PO bin's 224c whereabouts are updated, at step 1624, by having the facility management subsystem 204 record the Bin_ID of the order-filled PO bin 224c against the Location_ID of the storage location in the facility storage table 320a of the local facility database 207, and/or record the Location_ID of that storage location lll in the on-site bins table 322 of the local facility database 207. Furthermore, at step 1624, the facility management subsystem 204 forwards the Location_ID and the Bin_ID of the order-filled PO bin 224c to the central computing system 201 for recordal of the Location_ID against the Bin_ID in the global PO bins table 311. When time comes for outbound transport of a customer order found in an order-filled PO bin 224c that was stowed in this manner, extraction of the PO bin 224c from the indexed storage array by one of the robotic handlers 208 is commanded by the facility management subsystem 204, along with delivery of the extracted PO bin 224c to an assigned order-packing workstation 706, whether directly by that the robotic handler 208 where the order-packing workstation 706 is served directly by the robotic handler 208 via an extension track that runs through the order-packing workstation 706 in connection with the gridded lower track of the gridded storage structure 703, or through some intermediary conveyance means, for example, another robotic handler, human worker, or conveyor. Upon confirmed retrieval of the PO bin 224c from the indexed storage array by the robotic handler 208, the Location_ID of the storage location of the PO bin 224c is updated with the Equipment_ID of the robotic handler 208, in the storage bins table 308 of the central database 203 and the on-site bins table 322 of the micro facility 14, thereby allowing the PO bin 224c to be associated with a Location_ID that is traceable in real time.

If the automated decision at step 1613 is that urgent second stage order processing of one or more of the batch-picked customer orders is required, then the facility management subsystem 204, at step 1614, assigns a particular order-packing workstation 706 to which to deliver the PO bin 224c for such second stage order processing, at least in instances where there are multiple order-packing workstations 706 identified in the workstation information table 321 of the micro facility 14, whereas in other instances with only one order-packing workstation 706, selection of a particular order-packing workstation 706 is unnecessary. Next, at step 1615, a robotic handler 208 is commanded to deliver the PO bin 224c to the assigned order-packing workstation 706, for example, to a pick port 706a thereof, at which a human or robotic worker of the order-packing workstation 706 can access and interact with the contents of the order-filled PO bin 224c. Unlike the dual-port order-picking workstations 705 where each has both a pick port 705b and a put port 705a, in an embodiment, the order-packing workstation 706 is a single-port workstation of which only a pick port 706a has PO bins 224c served thereto from the gridded storage structure 703, for example, on a drive-through basis where the PO bin 224c is carried right to the pick port 706a by a robotic handler 208 of the gridded storage structure 703 and remains on the robotic handler 208 while the human or robotic worker interacts with the PO bin 224c.

Meanwhile, at step 1616, if not already on-hand at the order-packing workstation 706, a supply of one or more empty FO bins 224d is delivered to the order-packing workstation 706, for example, arriving thereat on the feed conveyor 708. One such FO bin 224d is selected for receipt of a respective customer order from the PO bin 224c, and at step 1617, the Bin_ID of the selected FO bin 224d is communicated to the facility management subsystem 204, whether by manual or automated scanning of a barcode or other scannable code on the FO bin 224d in which the Bin_ID is encoded, or by a human input of a code visually read off the FO bin 224d via a keyboard or another input device of a human-machine interface installed at the order-packing workstation 706 or borne by the human worker. A human or robotic worker at the order-packing workstation 706 is commanded by the facility management subsystem 204 or instructed thereby via the human-machine interface to pick an urgent customer order from one or more compartments of the PO bin 224c in which the urgent customer order resides. The facility management subsystem 204 retrieves the handling data for the products removed from the compartment(s), for example, by reading the handling data in the product information table 328 for the product types recorded against the Compartment_ID(s) of the compartment(s) in the contents table 327 of the PO bin 224c, thereby deriving the handling data entirely locally via the mobile data storage device 226 of the PO bin 224c, though the handling data is, in an embodiment, looked up in the vendor's product table 303 in the central database 203. The facility management subsystem 204 uses this handling data to derive the handling actions, for example, packing and packaging actions to be taken upon the products, for use at steps 1618 and 1620.

At step 1618, under command of the facility management subsystem 204, either a robotic worker of the order-packing workstation 706 automatically removes the urgent customer order from the respective compartment(s) of the PO bin 224c, or a human worker is guided or instructed to remove the urgent customer order from the compartment, for example, by visual pick-to-light or on-screen guidance and/or audible instructions, conveyed by a human-machine interface installed at the order-packing workstation 706 or borne by the human worker to guide the human worker to remove the urgent customer order from the appropriate compartment(s) via the pick port 706a. If a human worker attends the order-packing workstation 706, this step includes having the facility management subsystem 204 visually display and/or audibly convey the handling instructions for the product(s) of that compartment using the human-machine interface to guide the human worker's performance of packaging actions on the product(s) in accordance with the vendor-specified handling instructions derived from the handling data. In the event of a robotically equipped, rather than a human attended, order-packing workstation 706, the facility management subsystem 204 instead commands automated performance of such packaging actions by the robotic worker of the order-packing workstation 706 based on the handling instructions derived from the read handling data.

Meanwhile, at step 1619, the facility management subsystem 204 triggers updating of the various records associated with the urgent customer order being transferred from the PO bin 224c to the FO bin 224d. The updating of the various records comprises signalling of the central computing system 201 to update its records in the central database 203 by writing the order number of the urgent customer order against the Bin_ID of the FO bin 224d in the FO bins table 313; and erasing the variable order-related fields, for example, order number, line item and quantity fields, of the record in the PO bin contents table 312 for the PO bin compartment(s) from which the customer order is being picked. In addition to this recordal of the customer order's transfer from the PO bin 224c to the FO bin 224d in the central database 203, at the same time, the facility management subsystem 204 also updates the mobile data storage devices 226 of the PO bin 224c and the FO bin 224d to reflect their revised contents. This step of updating comprises copying a new record into the product information table 328 of the FO bin 224d for each product type transferred into the FO bin 224d, for example, copied from the product information table 328 on the mobile data storage device 226 of the PO bin 224c, or in an embodiment, copied from the vendor's product table 303 in the central database 203. The contents table 327 on the mobile data storage device 226 of the FO bin 224d is updated to write the Product_ID(s), the transferred quantity/quantities of the transferred product type(s), and the order number, line item number and fulfilling Vendor ID of the customer order being fully or partially fulfilled by the transferred products, as copied from the compartment-specific record(s) in the contents table 327 of the PO bin 224c for the compartment(s) from which the products were transferred, or from the PO bin contents table 312 of the central database 203. In an embodiment, the contents table 327 or the bin information table 326 of each FO bin 224d comprises a variable field for a fulfillment/return status indicator used to distinguish between a fulfilled customer order versus a customer return, which in an embodiment as disclosed further below, is handled via these same FO bins 224d. Step 1619 of the two-stage order fulfillment process therefore comprises assigning a fulfillment status to this fulfillment/return status indicator. In an embodiment, a fulfillment/return status field is maintained in the PO bin contents table 312 of the central database 203, and thus is also assigned a fulfillment status at this step.

Furthermore, at step 1619, the contents table 327 of the PO bin 224c is also updated by the facility management subsystem 204 by erasing all the variable fields, for example, the order number, Customer_ID, line item number, Product_ID(s), quantity, fulfilling Vendor_ID, and timing data, in the compartment record of the contents table 327 for each compartment that was emptied into the current FO bin 224d. If the same transferred product type does not remain in any other compartment of the PO bin 224c, the facility management subsystem 204 also erases the corresponding product record in the product information table 328 of the PO bin 224c. The data written to the mobile data storage device 226 of the FO bin 224d at this step further comprises the timing data from the respective compartment record of the PO bin's contents table 327, which in an embodiment, is copied over to the contents table 327 of the FO bin 224d or to the bin information table 326 since this timing data applies to the entire contents of the FO bin 224d, and not just to the contents of one particular compartment of the FO bin 224d, like the timing data applied to the PO bin 224c. In an embodiment, the product information from the product information table 328 copied over to the FO bin 224d still includes the handling data for each product type, even though packing/packaging of the customer order has already been carried out accordingly at the order-packing workstation 706, as retention of this handling data is beneficial for the purpose of handling customer returns within the multi-nodal supply chain system 200. In other embodiments where customer returns are handled externally of the multi-nodal supply chain system 200, the handling data is omitted at this stage.

At step 1620, in the event of a human worker attending the order-packing workstation 706, the facility management subsystem 204 continues to visually display and or audibly convey the handling instructions for the product(s) of that compartment using the human-machine interface, which at this step includes displaying packing instructions derived from the read handling data, whether in addition or alternative to the packaging instructions displayed/conveyed at step 1618, so that the human worker can appropriately pack the optionally now-packaged product(s) of the customer order into the FO bin 224d in a manner complying with the vendor's packing specifications. In the event of a robotically equipped, rather than human attended, order-packing workstation 706, the facility management subsystem 204 instead commands automated performance of such packing actions by the robotic worker of the order-packing workstation 706 based on the packing instructions derived from the read handling data.

Few examples differentiating between packaging and packing activities are disclosed herein. The packaging actions comprise, for example, wrapping of products in tissue, bubble wrap, gift wrap, or other wrapping material; placement of products in bags, boxes, or other containers;

etc. The packing activities comprise, for example, grouping together of like products and separation of distinct products by category such as dry versus liquid goods, ambient versus chilled/frozen goods, durable versus consumable goods, clothing versus food in which clothing items are packed together and separated from food items and liquids, and/or layered/sequenced placement of products in a shared storage bin or a shared container of a multi-product customer order, for example, where heavier and/or leak-prone products such as liquids, meat, frozen goods, etc., are placed at the bottom of a multi-product customer order, and/or lighter, delicate or fragile items are placed at the top of a multi-product customer order, etc. As disclosed above for the VAS/Returns workstations 606 illustrated in FIG. 6, in an embodiment, the order-packing workstations 706 are equipped with vendor-specific supplies of different vendors. In this embodiment, prior to delivery of the PO bin 224c to the order-packing workstation 706, the facility management subsystem 204 reads the unique vendor identifier (Vendor_ID) recorded against the respective compartment(s) of the PO bin 224c occupied by the customer order to be packed, whether from the mobile data storage device 226 of the PO bin 224c or the central database 203, and compares the Vendor_ID against the workstation information table 321 in the local facility database 207 of the facility management subsystem 204, or in an embodiment, in a subsection of the cloud-based central database 203, if also or alternatively stored therein, and thereby identifies which order-packing workstations 706 are equipped with that vendor's vendor-specific supplies, and selects therefrom an appropriate order-packing workstation 706 to which to route the PO bin 224c.

In addition to different order-packing workstations 706 having different packing supplies, in an embodiment, there are different order-packing workstation categories intended for specific specialized handling of, or exclusion of, particular product classes, for example, food-grade packing workstations where meat or other food products are specifically directed to address particular sanitary requirements to avoid risk of food contamination; allergen-safe workstations at which allergenic products are prohibited, optionally organized by subcategory; hazardous-goods packing workstations where particular safety requirements must be fulfilled; and general-goods packing workstations where all other product types can be directed, regardless of possible allergen content. As disclosed above, in an embodiment, the handling data stored on the mobile data storage devices 226 of the various storage bins and in the product tables 303 of the various vendors' product catalogues 305 comprises workstation-related handling instructions dictating particular categories of workstations to which the storage bins must be routed at the various facilities.

Accordingly, in an embodiment, the above disclosed decision node performed by the facility management subsystem 204 at step 1614 to select an appropriate order-packing workstation 706 to which to route the PO bin 224c further comprises checking of the handling data recorded against the respective compartment(s) of the customer order, whether retrieved from the mobile data storage device 226 or the central database 203, and comparing this handling data against the workstation information table 321 in the local facility database 207 of the facility management subsystem 204 to identify and select therefrom a workstation whose type, on-hand supplies, and category are compliant with the handling data. In an embodiment, such optional categorization of workstations is also applied to the VAS/Returns workstations 606 of the macro facility 12, the kitting workstations 607 of the macro facility 12, and the order-picking workstations 705 of the micro facility 14 illustrated in FIGS. 6-7, and is used in a similar manner to select appropriate workstations to which to route the SCS bins 224a and the MCS storage bins 224b based on the handling data recorded on the mobile data storage devices 226 thereof, and/or recorded thereagainst in the central database 203.

Furthermore, in FIGS. 16A-16B, each FO bin 224d into which a respective customer order is packed at step 1620 is then transferred, at step 1621, from the order-packing workstation 706 to an outbound loading dock 702 of the micro facility 14 or to an accumulation area adjacent to the outbound loading dock 702, for loading onto a micro-nano transport vehicle 215c. As illustrated in FIG. 7, this transfer of the packed FO bin 224d to the outbound loading dock 702 or the adjacent accumulation area is performed by placement of the packed FO bin 224d onto the feed conveyor 708, from which the FO bin 224d is fed onto the outbound conveyor run 709 and conveyed thereby to the respective accumulation area, or optionally directly to one of the loading/unloading conveyors 710a-710d of the outbound loading dock 702. Upon transfer of the packed FO bin 224d onto the feed conveyor 708 or one of the loading/unloading conveyors 710a-710d of the outbound loading dock 702, the Location_ID of the storage location of the packed FO bin 224d is updated with the Equipment_ID assigned to the respective conveyor, in the storage bins table 308 of the central database 203 and the on-site bins table 322 of the micro facility 14, thereby allowing the packed FO bin 224d to be associated with a Location_ID that is traceable in real time. As the conveyor in the micro facility 14 is a fixed asset and its location is known in the micro facility 14 at all times, recording the Equipment_ID of a particular conveyor as the location of the packed FO bin 224d, upon transfer of the packed FO bin 224d onto that particular conveyor, allows the packed FO bin 224d to be tracked at all times. At step 1622, the facility management subsystem 204 of the micro facility 14 checks whether the PO bin 224c contains one or more additional urgent customer orders to be packed. If yes, then steps 1616 to 1621 are repeated until the PO bin 224c contains no more urgent orders.

In instances where all customer orders in the PO bin 224c are urgent orders, then in the final repetition of steps 1616-1621, the last record in the contents table 327 on the mobile data storage device 226 of the PO bin 224c has its variable fields erased, at step 1619, along with the last record(s) of its product information table 328, thereby reflecting the now-empty status of this PO bin 224c. In an embodiment, the facility management subsystem 204 then records this empty bin status in the local facility database 207 by switching the empty/occupied status flag in the on-site bins table 322 to "empty", incrementing the empty PO bin count, and decrementing the occupied PO bin count in the facility information table 319 of the micro facility 14, if such a count is tallied therein. The empty bin PO bin 224c will thus become a candidate bin for selection at step 1604 in a subsequent execution of the order picking and packing process illustrated in FIGS. 16-16B.

After the last repetition of step 1622, when the "more urgent orders?" decision node thereof is answered in the negative, then at step 1623, a robotic handler 208, particularly that which already holds the now partially or fully depleted PO bin 224c at the pick port 706a of the order-packing workstation 706 in the instance of a drive-through workstation, is commanded by the local facility management subsystem 204 to return the depleted PO bin 224c to any available storage location in the gridded storage structure 703, typically in the same environmental zone thereof from which this first PO bin 224c was retrieved, though if now fully empty, there could be instances in which an emptied PO bin 224c is not specifically stored in the same environmental zone from which the PO bin 224c is retrieved, as disclosed above. At step 1624, upon confirmed placement of the depleted PO bin 224c in an available storage location of an appropriate environmental zone for its environmental flag, the facility management subsystem 204 records the Bin_ID of the PO bin 224c against the Location_ID of this storage location in the facility storage table 320a of the local facility database 207 and/or records the Location_ID of this storage location in the on-site bins table 322 of the local facility database 207. Also included this step 1624, the facility management subsystem 204 forwards the Location_ID and the Bin_ID of the depleted PO bin 224c to the central computing system 201 for recordal of the Location_ID against the Bin_ID in the PO bins table 311, whereby the stored whereabouts of this depleted PO bin 224c has been recorded.

If the depleted PO bin 224c is not fully empty and thus not yet a candidate empty bin for step 1604 of a subsequent execution of the picking and packing process, the depleted PO bin 224c will later be recalled to the order-packing workstation 706 for packing of the remaining order(s) therein in a packing-only process carrying out the same sequence of steps 1614 to 1624, differing primarily or only in the step 1615 which involves commanding a robotic handler 208 to retrieve the depleted PO bin 224c from the gridded storage structure 703 from the location previously stored for this PO bin 224c at step 1624. Similarly, a PO bin 224c that was deemed non-urgent and pre-emptively stored in favor of more urgent customer orders via the negative result branch from step 1613 will later be called to the order-packing workstation 706 to undergo such a packing-only process. In an embodiment of the picking and packing process illustrated in FIGS. 16A-16B, instead of assessing only the presence of "urgent" orders, step 1622 instead assesses the presence of "any" orders in the PO bin 224c, regardless of urgency, in which case the process will inherently repeat steps 1614 to 1624 until all compartments of the PO bin 224c are empty.

It will be appreciated that while the illustrated embodiment employs a two-stage process in FIGS. 16A-16B, where orders are batch-picked from MCS bins 224b into multi-compartment PO bins 224c at an order-picking workstation 705, and then separately singulated into single-compartment FO bins 224d at a separate order-packing workstation 706, in another embodiment, order fulfillment is performed in a single-stage process, where single customer orders are individually picked from the MCS bins 224b and then placed directly into single-compartment order bins. In an embodiment, the individually picked customer orders are placed directly into the smaller FO bins 224d incompatible with the gridded storage structure 703 of the micro facility 14, in which case, vendor-prescribed packaging and packing defined by the handling data is performed directly at the same order-picking workstation 705 where the ordered products are being transferred from the MCS bins 224b into the FO bins 224d. In another embodiment, the individually picked customer orders are placed into single-compartment mid-order bins (MO bins) of equal size and footprint to the multi-compartment PO bins 224c so that the picked customer orders can optionally be deposited into the gridded storage structure 703 from the order-picking workstation 705 in this intermediary MO bin, and then later pulled from the gridded storage structure 703 to a separate order-packing workstation 706 where the packaging and packing are performed during transfer of the individual customer orders from the intermediary MO bin to the final FO bin 224d for transport onward to a nano facility 16.

FIGS. 17A-17C illustrate a side elevation view, a top plan view, and a rear elevation view of a small-scale transport vehicle 215c respectively, for transporting order bins between the micro and nano facilities 14, 16 of the multi-nodal supply chain system 200 shown in FIGS. 2A-2B and FIGS. 4A-4B, according to an embodiment herein. In an embodiment, the micro-nano transport vehicle 215c that transports the order-filled finished-order (FO) bins 224d to a nano facility 16 from the outbound loading docks 702 of a micro facility 14 is a smaller vehicle of a different class from the large-scale mega-macro and macro-micro transport vehicles 215a, 215b illustrated in FIGS. 10A-10C. The micro-nano transport vehicle 215c is, for example, a box truck or a van. Despite such a difference in scale, the micro-nano transport vehicle 215c is equipped similar to the other transport vehicles 215a, 215b. In an embodiment, each of these smaller micro-nano transport vehicles 215c comprises a vehicle-based indexed storage array with one or more bin carousels 222b, for example, shorter bin carousels 222b than the bin carousels 222a illustrated in FIGS. 11A-11C, which may be provided in lesser quantity. Each of the smaller micro-nano transport vehicles 215c further comprises a vehicle management subsystem 216 with a wide area wireless communications device 218 for communicating with the central computing system 201, a global positioning system (GPS) device 219 for tracking the location of the transport vehicle 215c, and a local area network 221, for example, a wireless network, communicable with the wireless communications units 225 of the FO bins 224d onboard the transport vehicle 215c as illustrated in FIGS. 2A-2B. At the outbound loading dock 702 of the micro facility 14, similar data exchange as that performed at the outbound loading docks 502, 602 of the mega and macro facilities 10, 12 respectively, is performed to read and transfer data from the mobile data storage devices 226 of the FO bins 224d as they are loaded onto the transport vehicle 215c, except that instead of updating the storage bins table 308 with a Vehicle_ID of the transport vehicle 215c onto which the FO bins 224d are being loaded, the FO bins table 313 in the central database 203 illustrated in FIG. 3B, is updated with that Vehicle_ID to enable GPS tracking of the finished order in the FO bin 224d when the FO bin 224d departs from the micro facility 14 on the transport vehicle 215c. The process performed at an outbound loading dock 702 of the micro facility 14 to exchange downstream-headed finished-order (DFO) bins 224d containing fulfilled customer orders for upstream-headed finished-order (UFO) bins 224d. In an embodiment, the UFO bins 224d comprise both empty FO bins 224d having no products therein and return FO bins containing customer returns therein.

Figure 18A:
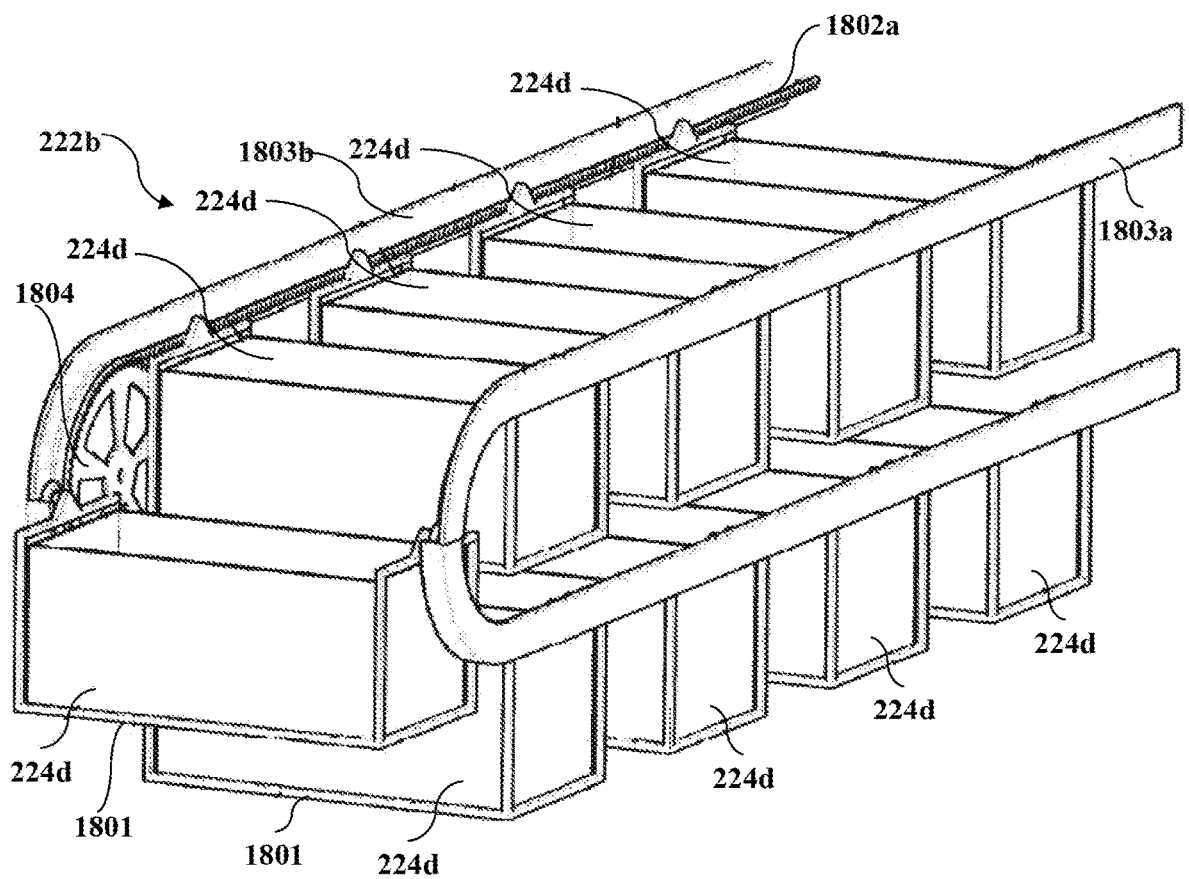
FIGS. 18A-18C illustrate partial rear perspective, side elevation and top plan views of a bin carousel respectively, for indexed holding of the order bins in the small-scale transport vehicle and in the nano facilities, according to an embodiment herein.
Figure 18B:
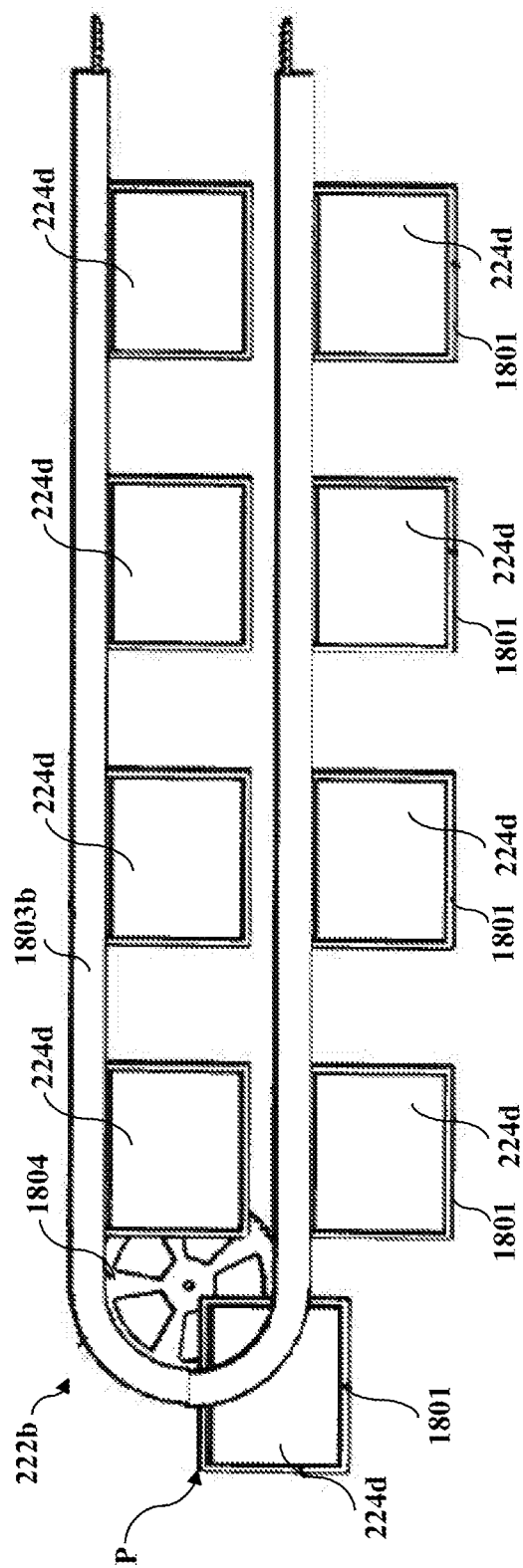
Figure 18C:
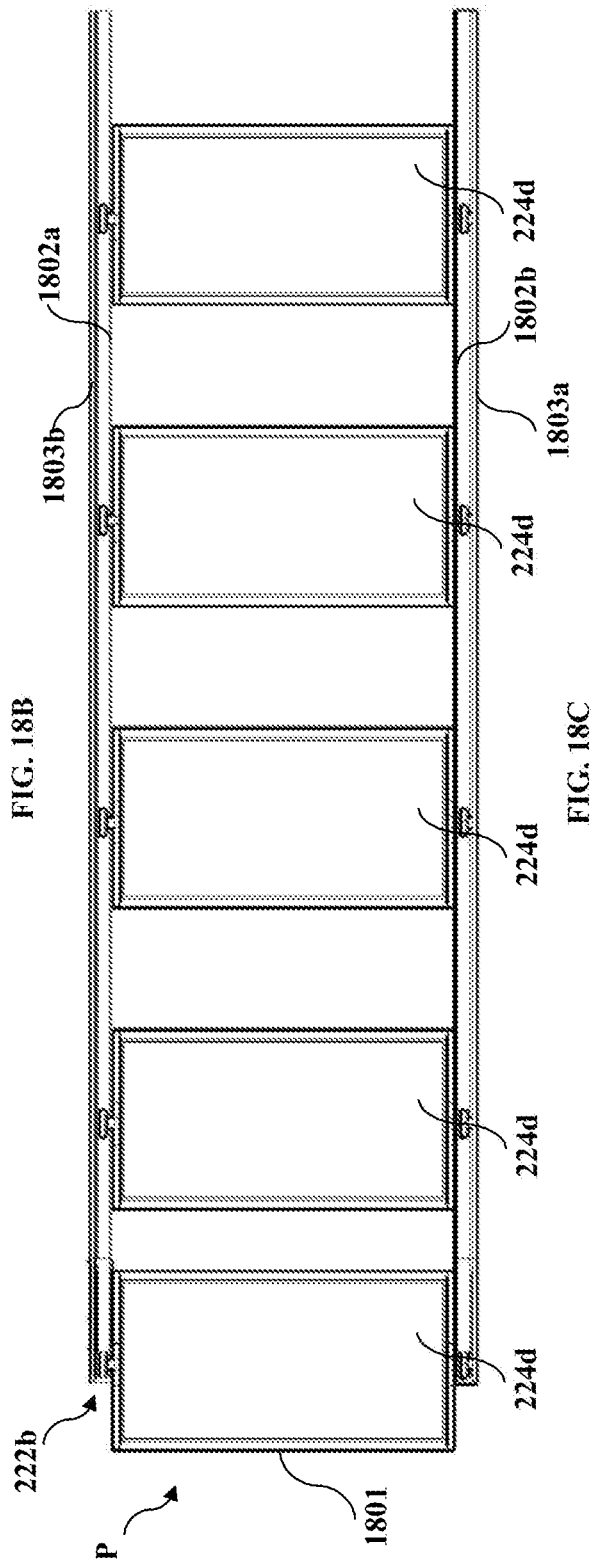

FIGS. 18A-18C illustrate partial rear perspective, side elevation and top plan views of a bin carousel 222b respectively, for indexed holding of the order bins in the small-scale transport vehicle 215c illustrated in FIGS. 17A-17C, and in the nano facilities 16, according to an embodiment herein. As illustrated in FIGS. 18A-18C, the smaller bin carousel 222b of the micro-nano transport vehicle 215c is of the same general configuration as the larger bin carousels 222a of the larger transport vehicles 215a, 215b illustrated in FIGS. 10A-10C and FIGS. 11A-11C, but with smaller carousel platforms 1801, each having a depth measured in the longitudinal direction of the bin carousel 222b that is approximately half that of the carousel platforms 1002 of the larger bin carousels 222a. Accordingly, the footprint of each carousel platform 1801 of the micro-nano transport vehicle 215c is particularly sized to conformingly accommodate the smaller half-size footprint of the FO bins 224d, rather than the larger full-size footprint of the single-compartment storage (SCS) bin 224a, the multi-compartment storage (MCS) bin 224b, and the picked-order (PO) bin 224c. In an embodiment, the carousel platforms 1801 of the smaller bin carousels 222b lacks the slot or gap 1002b found in the center of the larger carousel platforms 1002 of the larger transport vehicles 215a, 215b illustrated in FIGS. 10A-10C and FIGS. 11A-11C, where loading and unloading of FO bins 224d to and from the carousel platforms 1801 of the smaller bin carousels 222b of the micro-nano transport vehicles 215c are not performed by the robotic handlers 208 of the indexed storage array of the micro facility 14, and therefore, such a slot or gap 1002b is not required to accommodate the extendable/retractable turret arms of such robotic handlers 208. Similar to the larger transport vehicles 215a, 215b, each bin carousel 222b is driven by one or more electric motors controlled, for example, synchronously in the case of multiple motors, by the one or more local computers of the vehicle management subsystem 216. Since the carousel platforms 1801 are supported on the belts/chains 1802a, 1802b at equally spaced increments therealong, driving of the carousel motor(s) in an incremental manner by this incremental distance is used to advance the carousel platforms 1801 one-by-one to the loading/unloading position P, which together with the unique Location_IDs stored in the vehicle storage table 324 and the storage of the Bin_IDs of the FO bins 224d currently onboard the transport vehicle 215c in the onboard bins table 325 allows the vehicle management subsystem 216 to track and control the physical position of any FO bin 224d carried on the bin carousel 222b, and therefore, track loading of the FO bins 224d onto the bin carousel 222b and offloading of the FO bins 224d therefrom at the loading position P by tracking and controlling which carousel platform 1801, and therefore, which FO bin 224d is placed at the loading position P at any time. The sheaves or sprockets 1804 are rotatably operable to drive the belt or chain 1802a, 1802b around a continuous closed-loop path denoted by the respective guide track 1803a, 1803b, which has horizontally linear top and bottom segments that are joined together at each end by an arcuate connecting segment radially centered on the rotational axis of a respective one of the sheaves or sprockets 1804.

Figure 22A:
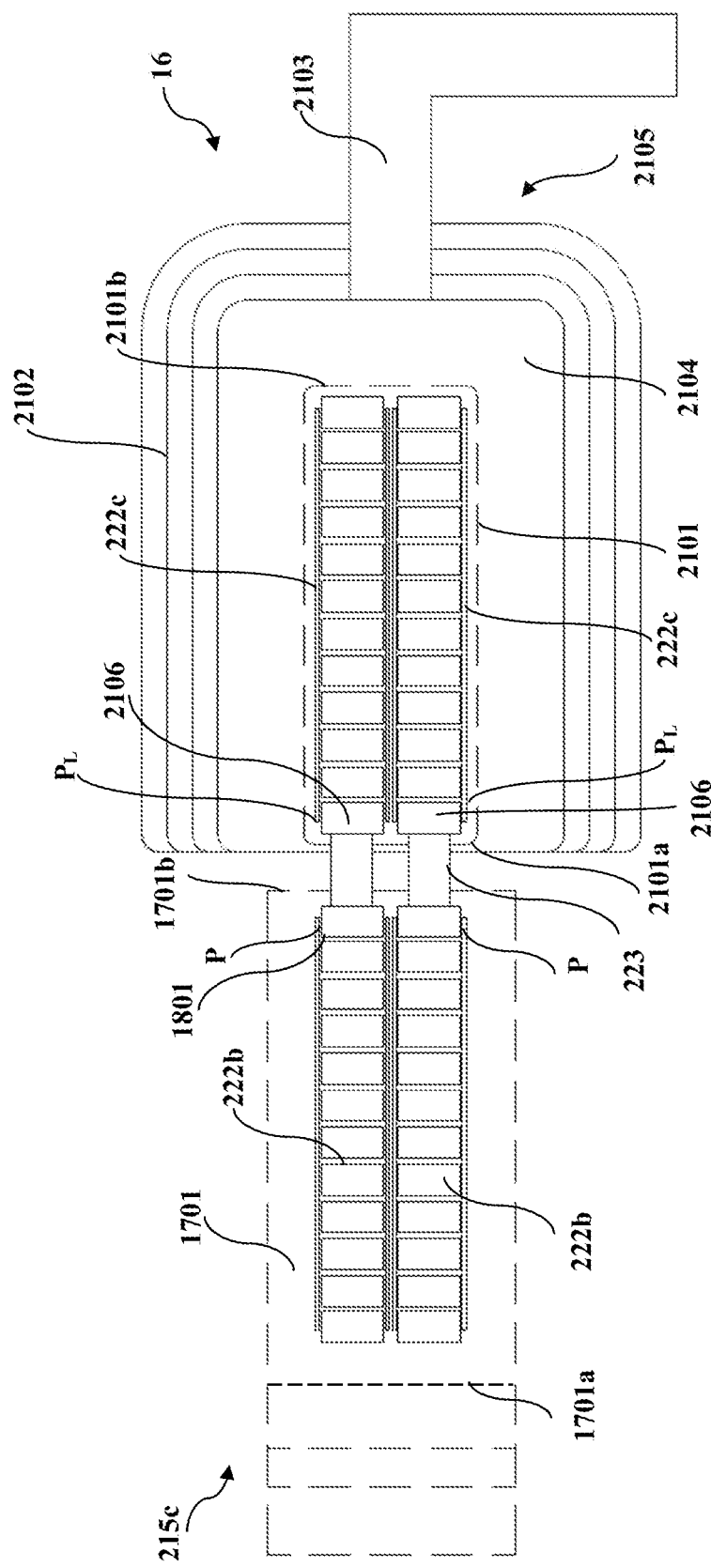
FIGS. 22A-22B illustrate a top plan view and a side elevation view respectively, showing the small-scale transport vehicle of FIGS. 17A-17C docked at a nano facility to deliver finished-order bins thereto from a micro facility, and to collect empty or return order bins from the nano facility for transport back to the micro facility, according to an embodiment herein.
Figure 22B:
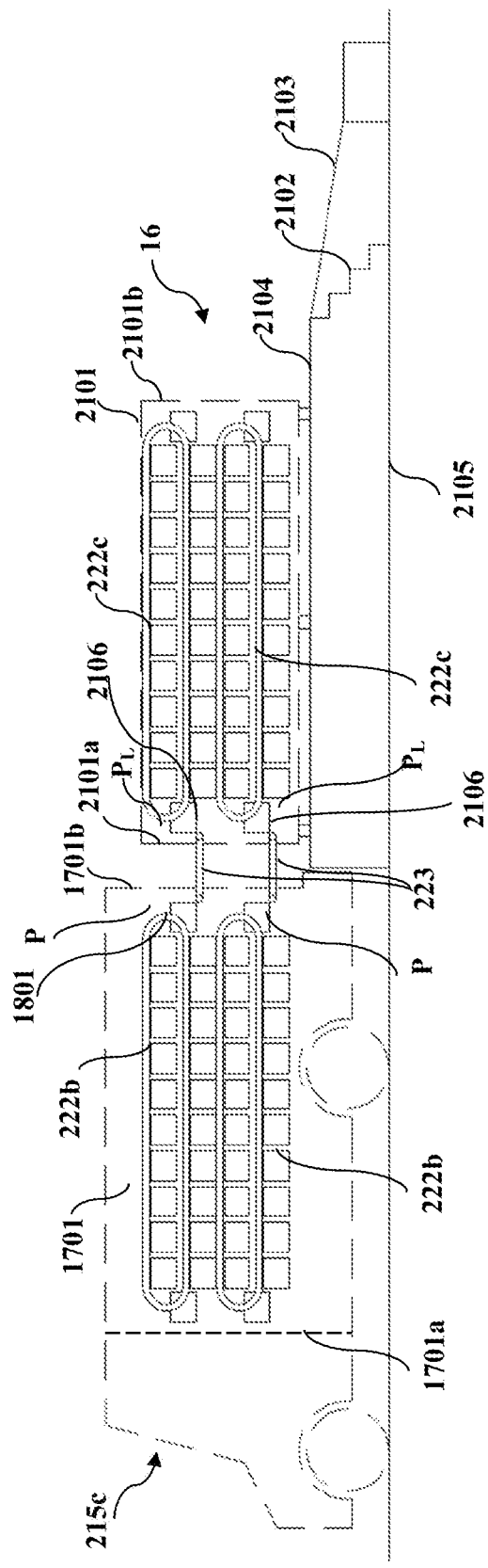

Since the micro-nano transport vehicles 215c illustrated in FIG. 17A do not rely on the robotic handlers 208 for loading and unloading of their bin carousels 222b, the transport vehicle 215c comprises its own dedicated set of automated bin handlers, for example, in the form of a set of small repositionable transfer conveyors 223, each corresponding to a respective one of the bin carousels 222b. In an embodiment, the transport vehicle 215c comprises four bin carousels 222b as illustrated in FIGS. 17A-17C. Each transfer conveyor 223 is pivotally supported in the trailer 1701 of the transport vehicle 215c at a position adjacent to the rear end 1701b of the trailer 1701, and therefore, just inside a rear loading door of the transport vehicle 215c as illustrated in FIG. 17A. Each transfer conveyor 223 is supported for selective movement between a storage position secured in a generally upright manner behind the rear loading door of the transport vehicle 215c as illustrated in FIGS. 17A-17C, and a deployed working position extending rearwardly outward from the trailer 1701 of the transport vehicle 215c when the rear loading door thereof is opened as illustrated in FIGS. 22A-22B. A proximal end 223a of each transfer conveyor 223, which is used herein to refer to the pivotally mounted end thereof, resides at an elevation roughly equal to that occupied by any carousel platform 1801 of the respective bin carousel 222b when the carousel platform 1801 is at the loading position P at the rear end of the bin carousel 222b as illustrated in FIG. 17A. Accordingly, when each transfer conveyor 223 is folded down into the deployed position spanning rearwardly from the trailer 1701 of the transport vehicle 215c, the transfer conveyor 223 is suitable positioned to load and unload FO bins 224d onto or off the carousel platform 1801 currently at the loading position P of that respective bin carousel 222b.

Figure 19A:
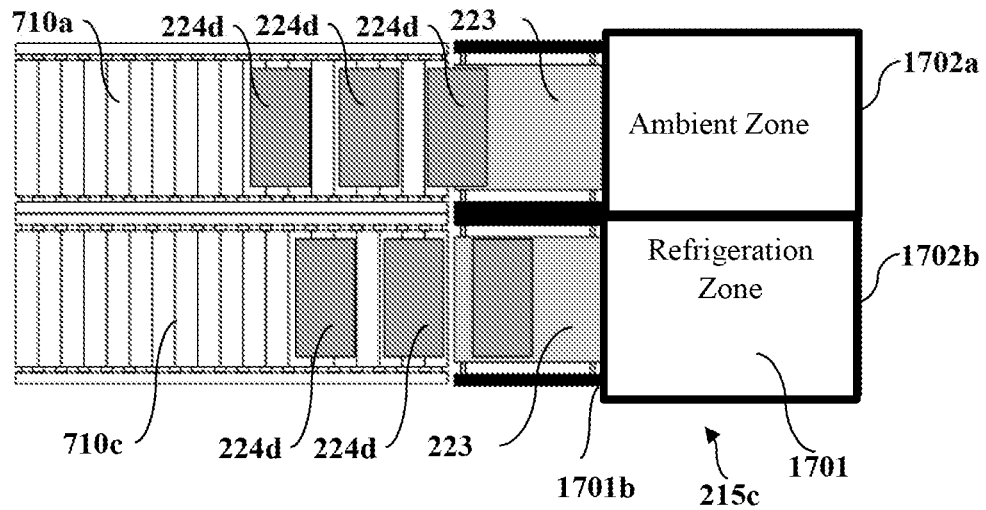
FIGS. 19A-19C illustrate a top plan view, a side elevation view, and a rear elevation view respectively, showing loading or unloading of order bins to or from different environmental zones of the small-scale transport vehicle at an outbound loading dock of the micro facility shown in FIG. 7, according to an embodiment herein.
Figure 19B:
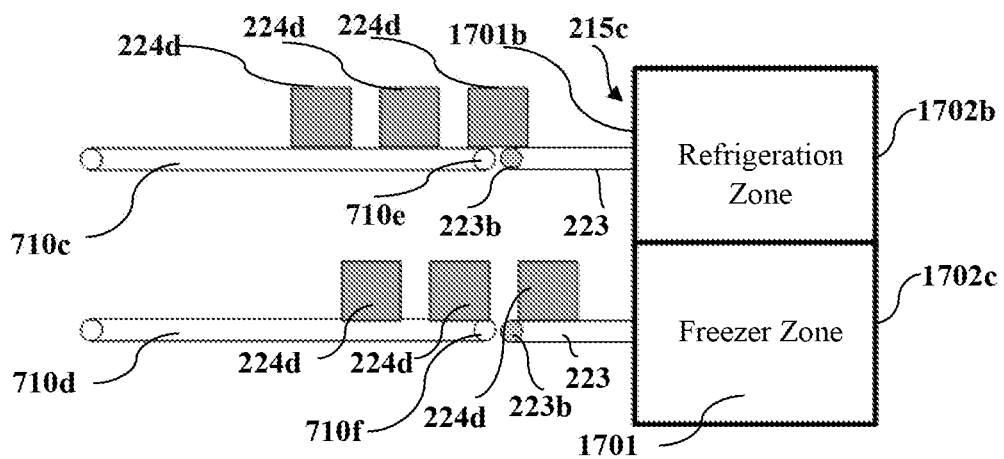
Figure 19C:
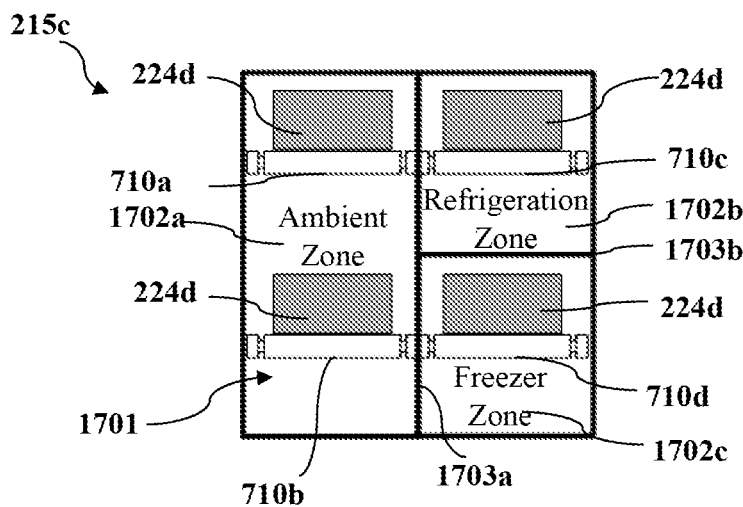

FIGS. 19A-19C illustrate a top plan view, a side elevation view, and a rear elevation view respectively, showing loading or unloading of order bins to or from different environmental zones 1702a, 1702b, 1702c of the small-scale transport vehicle 215c at an outbound loading dock 702 of the micro facility 14 of FIG. 7, according to an embodiment herein. FIG. 19C illustrates the subdivision of the trailer 1701 and the carousel-based indexed storage array of the transport vehicle 215c into multiple environmentally distinct storage zones 1702a, 1702b, 1702c. Each zone contains a respective subset of the overall quantity of bin carousels 222b of the trailer 1701 of the transport vehicle 215c. As illustrated in FIGS. 19A-19C, the indexed storage array is subdivided into three zones, for example, an ambient zone 1702a, a refrigeration zone 1702b, and a freezer zone 1702c similar to the gridded storage structures 507, 603, 703 in the mega, macro and micro facilities 10, 12 and 14 respectively. Of these three zones in the trailer 1701, the first main ambient zone 1702a contains two bin carousels 222b, while the second refrigeration zone 1702b and the third freezer zone 1702c, each contain a respective individual bin carousel 222b as illustrated in FIG. 19C. An upright barrier wall 1703a made of a thermally insulative material stands vertically upright between the two bin carousels 222b of the larger ambient zone 1702a and the bin carousels 222b of the two cold-storage zones 1702b, 1702c. For example, the upright barrier wall 1703a resides in a central longitudinal midplane of the transport vehicle's 215c storage space and spans a full or nearly full length of the trailer 1701 in this longitudinal direction from the front end 1701a of the trailer 1701 to the rear end 1701b of the trailer 1701 as illustrated in FIGS. 17A-17B. The upright barrier wall 1703a, therefore, physically and thermally isolates the ambient zone 1702a from the two cold-storage zones 1702b, 1702c. A smaller horizontal barrier wall 1703b made of a thermally insulative material spans the full or nearly full length of the trailer 1701 at an elevation between the two bin carousels 222b of the cold-storage zones 1702b, 1702c to thereby physically and thermally isolate the two cold-storage zones 1702b, 1702c from one another. While FIGS. 19A-19C illustrate a typical scenario where more ambient storage capacity than refrigerated or frozen storage capacity is required, it will be appreciated that the relative sizing and selected subdivision of the trailer 1701 and the bin carousels 222b is varied in different embodiments, as is the number of environmentally distinct storage zones. In an embodiment, the trailer 1701 is subdivided into only two environmentally distinct storage zones, for example, an ambient zone and a refrigeration zone, or an ambient zone and a freezer zone, or a refrigeration zone and a freezer zone, the relative sizes of which are equal or non-equal to each other. In embodiments where some or all of the transport vehicles 215c have less than three environmental zones, the environmental flag of an FO bin 224d or the environmental data recorded against the FO bin's 224d contents is used together with the destination Facility_ID of that FO bin 224d to determine whether or not the FO bin 224d should be loaded on a given transport vehicle 215c based on the Facility_ID of that transport vehicle's 215c next destination and the environmental data stored concerning that transport vehicle 215c to denote the environmental zone(s) thereof.

FIGS. 19A-19C also illustrates the use of the respective loading/unloading conveyors 710a-710d at an outbound loading dock 702 of the micro facility 14 shown in FIG. 7 to load and unload FO bins 224d to and from one of the micro-nano transport vehicles 215c, according to an embodiment herein. In an embodiment, the loading/unloading conveyors 710a-710d of the micro facility 14 are provided in equal quantity to the number of bin carousels 222b in the transport vehicle 215c. Therefore, four loading/unloading conveyors 710a-710d corresponding to four bin carousels 222b are provided in the illustrated embodiment. The four loading/unloading conveyors 710a-710d comprise two ambient-zone loading/unloading conveyors 710a and 710b positioned in aligned relation one over the other to respectively load/unload the two bin carousels 222b of the ambient zone 1702a of the transport vehicle 215c; a refrigeration-zone loading/unloading conveyor 710c positioned alongside the upper one 710a of the two ambient-zone loading/unloading conveyors 710a. 710b; and a freezer-zone loading/unloading conveyor 710d positioned alongside the lower one 710b of the two ambient-zone loading/unloading conveyors 710a, 710b and in aligned relation beneath the refrigeration-zone loading/unloading conveyor 710c as illustrated in FIG. 19C.

On arrival of the micro-nano transport vehicle 215c at an outbound loading dock 702 of the micro facility 14, the rear loading door of the micro-nano transport vehicle 215c is opened, for example, by a driver of the transport vehicle 215c or on an automated basis by the vehicle management subsystem 216 illustrated in FIGS. 2A-2B. The four transfer conveyors 223 are moved into their deployed positions, for example, manually or under automated control of the vehicle management subsystem 216. The layout and quantity of the transfer conveyors 223 in the transport vehicle 215c match the layout and quantity of the loading/unloading conveyors 710a-710d of the outbound loading dock 702, and therefore, this deployment of the transfer conveyors 223 places the distal end 223b of each transfer conveyor 223 into adjacent relation to a terminal end 710e, 710f of a respective one of the loading/unloading conveyors 710a-710d as illustrated in FIG. 19B. As used herein, "terminal end" of a loading/unloading conveyor refers to the end thereof furthest from the shared outbound and return conveyors runs 709, 711 of the micro facility 14, and nearest to the doorway of the outbound loading dock 702. Accordingly, as illustrated in FIGS. 19A-19B, the deployed transfer conveyors 223 of the transport vehicle 215c lie end-to-end with the loading/unloading conveyors 710a-710d and therefore allow transfer of FO bins 224d between the loading/unloading conveyors 710a-710d of the micro facility 14 and the loading positions P of the bin carousels 222b of the micro-nano transport vehicle 215c.

Having disclosed one conveyor-based example of bin handling equipment by which order-containing downstream-headed finished-order (DFO) bins 224d are automatically transferred to the outbound loading docks 702 from the order-packing workstation(s) 706 of the micro facility 14, and by which empty upstream-headed finished-order (UFO) bins 224d and returns-containing UFO bins 224d are automatically transferred from the outbound loading docks 702 to the order-packing workstation(s) 706 and the returns workstation(s) 704 respectively, the process of exchanging such DFO bins for such UFO bins at the outbound loading dock 702 is disclosed below.

Figure 20:
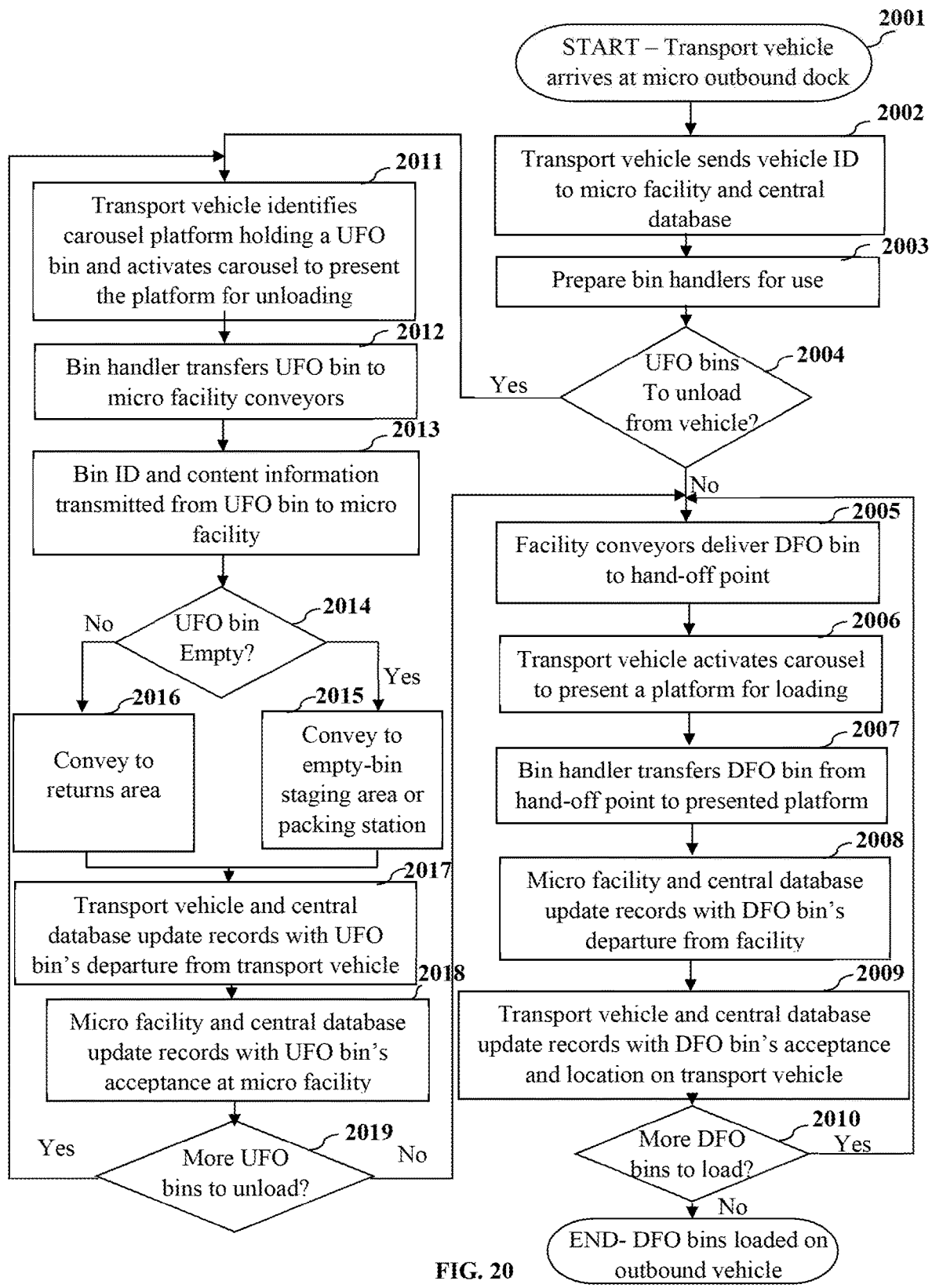
FIG. 20 illustrates a flowchart of a computer-implemented method for managing exchange of storage bins between the micro facility and a transport vehicle arriving at an outbound loading dock thereof from a downstream nano facility, according to an embodiment herein.

FIG. 20 illustrates a flowchart of a computer-implemented method for managing exchange of storage bins between the micro facility 14 and a transport vehicle 215c arriving at an outbound loading dock 702 thereof shown in FIG. 7, from a downstream nano facility 16 as shown in FIGS. 4A-4B, according to an embodiment herein. In an embodiment, this transport vehicle 215c arrives at the micro facility 14 from the same nano facility 16 for which the transport vehicle 215c will subsequently depart again. Upon arrival 2001 of the transport vehicle 215c at the outbound loading dock 702 of the micro facility 14, at step 2002, the vehicle management subsystem 216 of the transport vehicle 215c illustrated in FIGS. 2A-2B, transmits an arrival signal containing its Vehicle_ID and the Facility_ID of the nano facility 16 for which the transport vehicle 215c is next destined, to the facility management subsystem 204 of the micro facility 14 at which the transport vehicle 215c is arriving, and optionally also to the central computing system 201. In an embodiment where transfer conveyors 223 on the transport vehicle 215c illustrated in FIGS. 19A-19B, are used as automated bin handlers for transferring the storage bins onto and off of the bin carousels 222b of the transport vehicle 215c illustrated in FIGS. 18A-18C, that is, into and out of the indexed storage array of the transport vehicle 215c, then at this preparation stage, these automated bin handlers are initialized at step 2003 by lowering the transfer conveyors 223 into their deployed positions during or after docking of the transport vehicle 215c at the outbound loading dock 702.

At step 2004, the vehicle management subsystem 216 of the transport vehicle 215c queries its onboard bins table 325 for the presence of any upstream-headed finished-order (UFO) bins 224d onboard, thereby assessing whether it is necessary to unload storage bins from the transport vehicle 215c or whether the transport vehicle 215c is already empty, and therefore, capable of accepting loading of downstream-headed finished-order (DFO) bins 224d thereon for delivery to the nano facility 16 to which the transport vehicle 215c is next destined. If there are no UFO bins 224d onboard the vehicle 215c, the process continues to step 2005 disclosed below.

If there is a UFO bin 224d onboard the transport vehicle 215c, then at step 2011, the vehicle management subsystem 216 of the transport vehicle 215c activates the bin carousel 222b on which the UFO bin 224d is carried, and thereby moves the carousel platform 1801 carrying that UFO bin 224d into the loading/unloading position P of that bin carousel 222b, unless the carousel platform 1801 was already found to be present at the loading/unloading position P. At step 2012, the bin handler associated with that bin carousel 222b is activated to unload the UFO bin 224d from the carousel platform 1801 of the bin carousel 222b. In an embodiment where the bin handler is a respective transfer conveyor 223 extending rearwardly from the bin carousel 222b, this step involves activation by the vehicle management subsystem 216 of the respective transfer conveyor 223 for that bin carousel 222b to convey the UFO bin 224d to the respective one of the loading/unloading conveyors 710a-710d of the outbound loading dock 702 of the micro facility 14. In an embodiment, this conveyor activation is accompanied by aided displacement of the UFO bin 224d off the carousel platform 1801 of the bin carousel 222b by a human or robotic worker attending the outbound loading dock 702 or by automated activation by the vehicle management subsystem 216 of an actuator or another unload-assist device (not shown) installed in the trailer 1701 of the transport vehicle 215*c* at a location near the rear end 1701*b* thereof and co-operable with the loading position of the carousel platform 1801 to either push the UFO bin 224*d* from the carousel platform 1801 onto the transfer conveyor 223 or tilt the carousel platform 1801 rearwardly downward to gravitationally unload the UFO bin 224*d* onto the transfer conveyor 223. In an embodiment, each carousel platform 1801 comprises its own unloading actuator thereon to urge a UFO bin 224*d* rearwardly off the carousel platform 1801 when activated at the loading/unloading position P of the carousel platform 1801. Upon transfer of the UFO bin 224*d* from the transport vehicle 215*c* to the micro facility 14 via the transfer conveyor 223, the Location_ID of the storage location of the UFO bin 224*d* is updated with the Equipment_ID of the transfer conveyor 223, in the storage bins table 308 of the central database 203 and the on-site bins table 322 of the micro facility 14, thereby allowing the UFO bin 224*d* to be associated with a Location_ID that is traceable in real time. Meanwhile, at steps 2013 and 2014, the facility management subsystem 204 and the wireless communications unit 225 of the UFO bin 224*d* communicate with each another to identify the UFO bin 224*d* to the facility management subsystem 204 by its Bin_ID and assess from its fulfillment/return status indicator whether the UFO bin 224*d* is empty or contains a customer return. In an embodiment, such communication by the wireless communications unit 225 of the UFO bin 224*d* is initiated in response to an instructive signal issued thereto from the vehicle management subsystem 216 upon the bin carousel's 222*b* confirmed placement of the UFO bin 224*d* at the loading/unloading position. The instructive signal commands the wireless communications unit 225 to disconnect from the local area network 221 of the transport vehicle 215*c* and to connect to the local area network 206 of the facility management subsystem 204 to perform the communication.

If, at step 2014, the facility management subsystem 204 determines from the received status indicator that the UFO bin 224*d* is empty, then at step 2015, the facility management subsystem 204 commands automated control of the return conveyor run 711 in a manner causing delivery of the empty UFO bin 224*d* to either an order-packing workstation 706 or a nearby empty-bin accumulation area 707 illustrated in FIG. 7. In an embodiment, this step 2015 comprises operation of the respective loading/unloading conveyor 710*a*-710*d* on which the UFO bin 224*d* was received from the respective transfer conveyor 223 of the transfer vehicle 215*c*, thereby conveying the UFO bin 224*d* onto either the upper or lower return conveyor 711*a*, 711*b*. If the respective loading/unloading conveyor was an upper one thereof 710*a*, 710*c* feeding onto the upper return conveyor 711*a*, the facility management subsystem 204 automatically operates the vertical conveyor 711*c* of the return conveyor run 711 upon arrival of the UFO bin 224*d* thereat to carry the empty UFO bin 224*d* down onto the lower return conveyor 711*b*, which then conveys the empty UFO bin 224*d* onward to the empty-bin accumulation area 707 or directly onward therefrom to an order-packing workstation 706 via the feed conveyor 708. If the respective loading/unloading conveyor was a lower upper one thereof 710*b*, 710*d* feeding onto the lower return conveyor 711*b*, then the facility management subsystem 204 conveys the empty UFO bin 224*d* on the lower return conveyor 711*b*, thus bypassing the vertical conveyor 711*c*.

If, at step 2014, the facility management subsystem 204 determines from the received status indicator that the UFO bin 224*d* is a return UFO bin containing a customer return, then at step 2016, the facility management subsystem 204 commands automated control of the return conveyor run 711 in a different manner causing delivery of the return UFO bin 224*d* to one of the returns workstations 704. In an embodiment, the initial conveyor-based routing is the same for either an empty UFO bin or a return UFO bin, differing only in that the return UFO bins are diverted off of the lower return conveyor 711*b* before reaching the empty-bin accumulation area 707 and the connected feed conveyor 708 that leads onward to the order-packing workstation(s) 706. In other embodiments, the particular layout of the different workstation types and the configuration of one or more conveyor runs for delivering empty and return UFO bins to those workstations or associated accumulation areas are varied.

Meanwhile, at step 2017, the vehicle management subsystem 216 updates its records to reflect the transfer of the UFO bin 224*d* to the micro facility 14 from the transport vehicle 215*c*, by removing the Bin_ID of that UFO bin 224*d* from the onboard bins table 325 and decrementing the quantity of occupied or empty FO bins 224*d* in the vehicle information table 323, if such a count is tallied therein. At this step, in an embodiment, the vehicle management subsystem 216 also sends a bin departure signal with the Bin_ID of the UFO bin 224*d* just offloaded from the transport vehicle 215*c* to the central computing system 201, in response to which the central computing system 201 erases the Vehicle_ID of the transport vehicle 215*c* from this UFO bin's 224*d* record in the FO bins table 313. Furthermore, at step 2018, the facility management subsystem 204 updates its records to reflect the transfer of the UFO bin 224*d* to the micro facility 14 from the transport vehicle 215*c*, by adding the Bin_ID of that UFO bin 224*d* to the on-site bins table 322 of the micro facility 14, and incrementing the quantity of empty or occupied FO bins in the facility information table 319 if such a count is tallied therein. At this step, in an embodiment, the facility management subsystem 204 also sends a bin-acceptance signal with the Bin_ID of the UFO bin 224*d* just accepted into the micro facility 14 to the central computing system 201, in response to which the central computing system 201 adds the Facility_ID of the micro facility 14 to this UFO bin's record in the FO bins table 313. Steps 2011 through 2018, therefore, collectively perform a singular upstream transfer of one UFO bin 224*d* to the micro facility 14 from a micro-nano transport vehicle 215*c* arriving at an outbound loading dock 702 of that micro facility 14.

Meanwhile, at step 2019, the vehicle management subsystem 216 performs a check on whether there are additional UFO bins 224*d* remaining on the transport vehicle 215*c*, and if there are additional UFO bins 224*d*, steps 2011 to 2019 are repeated. It will be appreciated that for embodiments in which the transport vehicle 215*c* comprises multiple bin carousels 222*b*, multiple instances of the sequence referenced by steps 2011 to 2019 may be executed in parallel, one for each bin carousel 222*b* of the transport vehicle 215*c* so that all bin carousels 222*b* thereof are unloaded simultaneously. If, at step 2019, no additional UFO bins are identified, then the vehicle management subsystem 216 signals the facility management subsystem 204 to initiate the loading of DFO bins 224*d* onto the transport vehicle 215*c*, starting at step 2005. At step 2005, the facility management subsystem 204 causes automated delivery of a DFO bin 224*d* to the loading docks 702, and in the instance of a transport vehicle 215*c* with multiple environmentally distinct storage zones, to a particular hand-off position at the outbound loading dock 702 according to the particular environmental zone of the transport vehicle 215c to which the DFO bin 224d is destined, as prescribed by the environmental flag or environmental data recorded on or against the DFO bin 224d. In an embodiment, this routing of the DFO bin 224d to the appropriate hand-off position is executed by automated control of the outbound conveyor run 709 and the respective set of loading/unloading conveyors 710a-710d at the loading dock 702. At some point where the DFO bin 224d resides still upstream from the loading/unloading conveyors 710a-710d of the loading dock 702 for which the DFO bin 224d is to be delivered, the facility management subsystem 204 queries the recorded environmental flag or data of that DFO bin 224d, for example, from the mobile data storage device 226 thereof, or in an embodiment, from the central database 203 or from locally duplicated records if saved in the local facility database 207, and based thereon, identifies the prescribed environmental zone 1702a-1702c of the transport vehicle 215c illustrated in FIGS. 19A-19C, in which the DFO bin 224d should be placed. The facility management subsystem 204 operates the outbound conveyor run 709 to deliver the DFO bin 224d to an appropriate hand-off point from which the DFO bin 224d is directed into the prescribed environmental zone of the transport vehicle 215c. In various embodiments, these different hand-off points to different environmental zones of the transport vehicle 215c are the terminal ends of the different loading/unloading conveyors 710a, 710b installed out at the outbound loading dock 702 in a matching layout to the environmental zone layout of the transport vehicle 215c.

Meanwhile, at step 2006, during such conveyor based-routing of the DFO bin 224d to the appropriate hand-offpoint at the loading dock 702, the environmental flag/data of the DFO bin 224d is communicated to the vehicle management subsystem 216, whether from the facility management subsystem 204 or from the wireless communications unit 225 of the DFO bin 224d itself. In response, the vehicle management subsystem 216 uses this environmental flag/data to identify an empty one of its carousel platforms 1801 whose environmental status indicator in the vehicle storage table 324 matches the environmental flag/data, thus confirming that the empty carousel platform 1801 is in an environmental zone of the transport vehicle 215c compatible with the environmental requirements of the expected DFO bin 224d. The vehicle management subsystem 216 activates the bin carousel 222b to which the compatible empty carousel platform 1801 belongs to relocate the compatible empty carousel platform 1801 to the rear loading/unloading position P of its bin carousel 222b, if the compatible empty carousel platform 1801 is not already found at such position.

In embodiments where at least one zone of the transport vehicle 215c has more than one bin carousel 222b, ensuring that the particular hand-off point to which the facility management subsystem 204 is delivering the DFO bin 224d matches the bin carousel 222b at which the transport vehicle 215c is preparing to receive the DFO bin 224d is handled in different ways. In an embodiment, the facility management subsystem 204 is programmed to initially deliver all DFO bins 224d destined for a particular multi-carousel zone 1702a of the transport vehicle 215c to a particular first one of that zone's multiple hand-off points, until the quantity of DFO bins 224d commanded thereto reaches a known capacity of the particular bin carousel 222b that is fed from that hand-off point, and only then switch over to the next hand-off point feeding a next bin carousel 222b of the same zone and deliver the DFO bins 224d to that second hand-off point until the capacity of the corresponding second bin carousel 222b of that zone is reached. Such procedure is repeated for any third and subsequent bin carousel 222b until all bin carousels 222b of the zone are full. In such instance, the vehicle management subsystem 216 is programmed to control loading of the multiple bin carousels 222b in its multi-carousel zone one at a time in a predetermined sequence matching the hand-offpoint sequence followed by the facility management subsystem 204. In another embodiment, multiple bin carousels 222b of a multi-carousel zone are loaded simultaneously for improved time efficiency.

In an embodiment, the facility management subsystem 204 reports the hand-off point to which the micro facility 14 is sending each DFO bin 224d to the vehicle management subsystem 216 to allow the correct matching bin carousel 222b to be activated accordingly to serve an available empty carousel platform 1801 to the loading position, with the facility management subsystem 204 once again tracking how many DFO bins 224d the micro facility 14 is sending to each hand-off point to ensure the capacity of the respective bin carousel 222b fed therefrom is not exceeded. In another embodiment, the facility management subsystem 204 sends the environmental data of the DFO bin 224d to the vehicle management subsystem 216, and allows the vehicle management subsystem 216 to first select an empty environmentally compatible carousel platform 1801 among its environmentally compatible bin carousels 222b, which is then reported back to the facility management subsystem 204 for selection of the appropriate hand-off point based on the transport vehicle's 215c particular selection of the bin carousel 222b from among those in the appropriate multi-carousel zone. In this embodiment, it is the vehicle management subsystem 216, rather than the facility management subsystem 204, that tracks the quantity of DFO bins 224d being loaded to each bin carousel 222b, up to the maximum allowable capacity of each. As disclosed herein, in an embodiment, the measure of maximum capacity of a bin carousel 222b reflects a true maximum capacity equal to the actual number of carousel platforms 1801 on that bin carousel 222b, or an effective capacity of a non-equal relation to the true maximum capacity, for example, the true capacity minus one.

Next, at step 2007, on confirmed arrival of the DFO bin 224d at the hand-off point, for example, at the terminal end of the appropriately selected one of the loading/unloading conveyors 710a-710d of the loading dock 702, the automated bin handler 223 transfers the DFO bin 224d from the hand-off point onto the presented carousel platform 1801 of the transport vehicle's 215c bin carousel 222b. In the illustrated embodiment, this step involves activation of the respective transfer conveyor 223 at the terminal end of the appropriate loading/unloading conveyor 710a-710d by the vehicle management subsystem 216 to convey the DFO bin 224d onto the presented carousel platform 1801. In other embodiments, the particular bin handling equipment used for this final transfer step between the micro facility 14 and the transport vehicle 215c, and whether the particular bin handling equipment is part of the micro facility 14 or the transport vehicle 215c and accordingly controlled by the facility management subsystem 204 or the vehicle management subsystem 216, varies from that of the illustrated conveyor-based handler 223 controlled by the vehicle management subsystem 216. In other embodiments, part of all of the conveyance-based routing of the DFO bins 224d to the outbound loading dock 702, and final transfer onto the transport vehicle 215c, is performed by human workers based on visual and/or audible instructions conveyed thereto by human-machine interfaces of the facility management subsystem 204. In another embodiment, part or all of the routing is performed by robotic handlers of similar or varying design to those used in the gridded storage structure 703 of the micro facility 14, but modified for compatibility with the smaller FO bins 224*d*, unless full-size, final-order bins are alternatively used.

At step 2008, upon confirmed hand-off of the DFO bin 224*d* from the micro facility 14 to the transport vehicle 215*c*, the facility management subsystem 204 updates its records to reflect the transfer of the DFO bin 224*d* from the micro facility 14 to the transport vehicle 215*c*, by removing the Bin_ID of that DFO bin 224*d* from the on-site bins table 322 of the micro facility 14 and decrementing the quantity of occupied DFO bins 224*d* in the facility information table 319, if such a count is tallied therein. At this step, in an embodiment, the facility management subsystem 204 also sends a bin departure signal with the Bin_ID of the DFO bin 224*d* just offloaded from the micro facility 14 to the central computing system 201, in response to which the central computing system 201 erases the Facility_ID of the micro facility 14 from this DFO bin's record in the FO bins table 313.

Furthermore, at step 2009, the vehicle management subsystem 216 receives the Bin_ID of the DFO bin 224*d*, if not previously received with the environmental data thereof, for example, from the facility management subsystem 204 or from the wireless communications unit 225 of the DFO bin 224*d* itself, and the vehicle management subsystem 216 updates its records to reflect the transfer of the DFO bin 224*d* from the micro facility 14 to the transport vehicle 215*c*, by adding the Bin_ID of that DFO bin 224*d* to the transport vehicle's 215*c* onboard bins table 325, and incrementing the quantity of occupied DFO bins in the vehicle information table 323 if such a count is tallied therein. The vehicle management subsystem 216 also records the Bin_ID of the DFO bin 224*d* against the Location_ID of the carousel platform 1801 on which that DFO bin 224*d* was placed in the vehicle storage table 324 and/or records the Location_ID of that storage location against the Bin_ID of that DFO bin 224*d* in the onboard bins table 325. At this step, in an embodiment, the vehicle management subsystem 216 also sends a bin-acceptance signal with the Bin_ID of the DFO bin 224*d* just accepted onto the transport vehicle 215*c* to the central computing system 201, in response to which the central computing system 201 writes the Vehicle_ID of the transport vehicle 215*c* to this DFO bin's 224*d* record in the FO bins table 313. The bin-acceptance signal further comprises the Location_ID for recordal thereof against the Bin_ID of the deposited DFO bin 224*d* in the FO bins table 313 of the central database 203. Accordingly, all records concerning the whereabouts of the DFO bin 224*d*, at both the facility/vehicle level and specific storage location level, is therefore fully updated throughout the multi-nodal supply chain system 200.

Meanwhile, at step 2010, a check is performed by the facility management subsystem 204 as to whether there are more DFO bins 224*d* to load onto the transport vehicle 215*c*, for example, by querying of the on-site bins table 322 for filled DFO bins whose destination Facility_ID matches the Facility_ID of the nano facility 16 for which the transport vehicle 215*c* is scheduled to depart, subject to confirmation of remaining capacity on the transport vehicle 215*c* for such additional DFO bins 224*d*, for example, by the facility management subsystem's 204 own tallied count of the DFO bins 224*d* already loaded onto the transport vehicle 215*c* or by communication with the vehicle management subsystem 216 to confirm the remaining capacity thereof. Such capacity check would be performed on an environmental zone-basis for transport vehicles 215*c* with multiple environmental zones. In embodiments or instances where a transport vehicle 215*c* having less than all possible zone types is employed, for example, having one or two, but not all three of ambient, refrigeration and freezer zones, then the check for additional DFO bins 224*d* to be loaded onto the transport vehicle 215*c* involves not only checking the destination Facility_ID of the DFO bin 224*d* against the next scheduled destination of the transport vehicle 215*c*, but also checking the environmental flag or data stored on or against that DFO bin 224*d* against the environmental zones possessed by that transport vehicle 215*c*. In an embodiment, this is based on querying the environmental status fields in the vehicle storage table 324, or more conveniently, querying the vehicle information table 323 of the local vehicle database 220 or the transport vehicle table 307 of the central database 203 for environmental data stored therein to denote the environmental zone type(s) possessed by that particular transport vehicle 215*c*. If no more DFO bins 224*d* require loading to the transport vehicle 215*c* at step 2010, then the loading/unloading process is completed, whereupon the transfer conveyors 223 on the transport vehicle 215*c* are returned to their storage positions and the rear loading door of the transport vehicle 215*c* is closed, for example, under automated control by the vehicle management subsystem 216 or by human performance/assistance from a vehicle driver or a facility worker, and the transport vehicle 215*c* is ready for travel onward to the destination nano facility 16.

It will be appreciated that in embodiments in which the transport vehicle 215*c* comprises multiple bin carousels 222*b*, multiple instances of the sequence referenced by steps 2005 to 2010 are executed in parallel with each other and/or in parallel to any as-yet uncompleted instances of sequence 2011-2019, whereby loading of one or more bin carousels 222*b* is performed simultaneously with loading or unloading of one or more other bin carousels 222*b*.

Figure 21A:
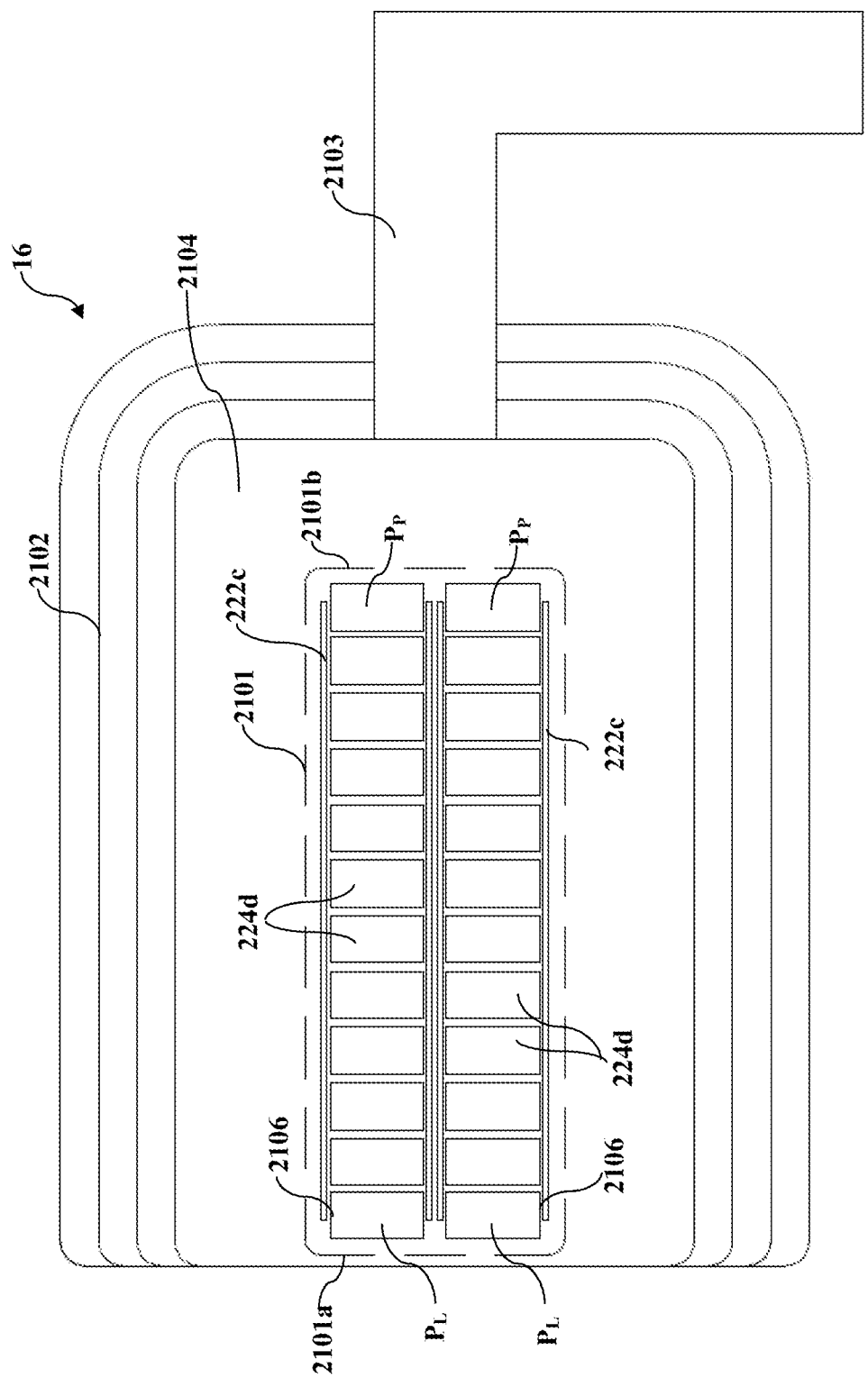

FIGS. 21A-21C illustrate a top plan view, a side elevation view, and a rear elevation view of a nano facility 16 of the multi-nodal supply chain system 200 respectively, according to an embodiment herein. In an embodiment, instead of robotically served, static, gridded storage structures 507, 603, 703 used in the mega, macro and micro facilities 10, 12 and 14 respectively, illustrated in FIGS. 2A-2B and FIGS. 4A-4B, an unmanned nano facility 16 uses one or more dynamic storage bin carousels 222*c* of an identical or similar construction and equal quantity to those found on the micro-nano transport vehicle 215*c*. In an embodiment, the unmanned nano facility 16 comprises, for example, four bin carousels 222*c* as illustrated in FIGS. 21A-21C.

In an embodiment, the nano facility 16 comprises a small elongated shelter 2101 with one or more openable delivery doors at a first vehicle-delivery end 2101*a* thereof through which finished-order (FO) bins 224*d* are exchanged to and from the small-scale micro-nano transport vehicle 215*c*, and one or more openable pickup doors at a second longitudinally opposing pickup end 2101*b* of the elongated shelter 2101 for access by customers and delivery personnel who pick up customer orders. Each bin carousel 222*c* is, therefore, operable to drive each of its carousel platforms 2106 between a bin loading/unloading position $P_L$ adjacent to the delivery door(s) at the first vehicle-delivery end 2101*a* and an order pickup position $P_P$ adjacent to the pickup door(s) at the second pickup end 2101*b*. In this embodiment, the number of pickup doors is equal to the number of the bin carousels 222*c*, where each pickup door gains access to the pickup position $P_P$ of only one respective bin carousel 222*c*.

It will be appreciated, however, that the pickup door(s) need not be positioned at the second pickup end 2101b of the elongated shelter 2101, and the pickup position $P_P$, therefore, need not be positioned at the second pickup end 2101b of the elongated shelter 2101. In an embodiment, the pickup door is positioned on a side of the elongated shelter 2101 to enable side access to a carousel platform 2106 of the respective bin carousel 222c when the carousel platform 2106 is parked stationary at a predetermined pickup position aligned with that side-access pickup door.

In another embodiment, the nano facility 16 is a small elongated shelter 2101 with one or more openable delivery doors at the first delivery end 2101a through which order bins are exchanged to and from the small-scale transport vehicle 215c; however, instead of a set of pickup doors provided at the longitudinally opposing end 2101b in a 1:1 relation to the number of bin carousels 222c, one or more carousel-specific sets of pickup doors are arrayed along one or both elongated sides of the shelter 2101. Each pickup door of each carousel-specific set aligns with a different carousel platform 2106 of the respective bin carousel 222c when the bin carousel 222c is in a static non-moving state. In an embodiment, all carousel platforms 2106 are individually and independently accessible at any time such that the bin carousel 222c does not have a predetermined singular pickup position Pr to which each carousel platform 2106 must be advanced for access by a customer or a delivery person. In examples where at least two bin carousels 222c reside side-by-side, then both sides of the elongated shelter 2101 comprises at least one set of pickup doors to provide access to a respective one of those side-by-side bin carousels 222c. Where two or more bin carousels 222c are arranged in a rowed fashion, with each row containing at least two bin carousels 222c disposed one above another, then multiple sets of doors at different elevations are provided, each at a respective elevation matching a respective one of the bin carousels 222c whose carousel platforms 2106 are accessible from that set of doors.

In an embodiment as illustrated in FIGS. 21A-21C, the elongated shelter 2101 is disposed atop an elevated mounting pad 2104 for positioning in spaced relation above ground level 2105, with the height of the elevated mounting pad 2104 being selected to place the bin carousels 222c of the elongated shelter 2101 at an equal or near-equal elevation to those of the micro-nano transport vehicles 215c. For access by customers and delivery personnel to the pickup doors of the elongated shelter 2101, an access ramp 2103 and optional stairs 2102 are provided to reach the elevated mounting pad 2104 from the ground level 2105. In an embodiment, the stairs 2102 and/or the ramp 2103 are integrally incorporated with the elevated mounting pad 2104 as part of a monolithic structure, for example, of concrete construction. The stairs 2102 and the ramp 2103 are positioned at perimeter areas of the elevated mounting pad 2104 other than that at which the delivery end 2101a of the elongated shelter 2101 is disposed. Beneath the delivery end 2101a of the elongated shelter 2101, the elevated mounting pad 2104 comprises a sharp drop-off down to the ground level 2105, whereby the transport vehicle 215c can back up into close proximity with this dropped-off perimeter edge of the elevated mounting pad 2104 to properly dock with the delivery end 2101a of the nano facility 16.

Similar to the other facilities 10, 12, 14 whose facility management subsystems 204 are responsible for not only monitoring and tracking incoming storage bins and bin content, but also operating the robotic handlers 208 of their respective indexed storage arrays and any other automated handling equipment, for example, conveyors, in the facilities 10, 12, 14, in an embodiment, each nano facility 16 comprises a facility management subsystem 204 that is integrated into the overall supply chain system 200. This facility management subsystem 204 of the nano facility 16 is responsible for controlling the automated bin handling equipment of the nano facility 16, for example, in the carousel-based embodiment, driving the electric motor(s) of the bin carousel(s) 222c and monitoring the positions of the indexed carousel platforms 2106 thereof whose Location_IDs are stored in the facility storage table 320a of the local facility database 207, and reading the stored data on the incoming FO bins 224d and updating the central database 203 to reflect the arrival thereof at the nano facility 16 such that customers or delivery personnel are automatically informed by the central computing system 201, for example, via electronic mail (email), short message service (SMS) messages, or other communication, that the customer orders are ready for pickup at that particular nano facility 16.

FIGS. 22A-22B illustrate a top plan view and a side elevation view respectively, showing the small-scale transport vehicle 215c of FIGS. 17A-17C docked at a nano facility 16 to deliver finished-order (FO) bins thereto from a micro facility 14 shown in FIGS. 4A-4B, and to collect empty or return order bins from the nano facility 16 for transport back to the micro facility 14, according to an embodiment herein. The micro-nano transport vehicle 215c is docked to the nano facility 16 through the opened delivery door(s) at the first delivery end 2101a of the elongated shelter 2101 as illustrated in FIGS. 22A-22B, where the transfer conveyors 223 of the transport vehicle 215c are deployed to reach rearwardly from the rear end 1701b of the trailer 1701 through the open loading door of the transport vehicle 215c and open delivery door(s) of the nano facility 16. The distal end of each deployed transfer conveyor 223 is, therefore, positioned inside the nano facility 16 in closely adjacent and generally equal elevation to the loading/unloading position $P_L$ of a respective one of the bin carousels 222c of the nano facility 16, thereby forming a bridge between this loading/unloading position $P_L$ of the bin carousel 222c of the nano facility 16 and the respective bin carousel 222b of the transport vehicle 215c. In the illustrated example where the bin carousels 222c of the nano facility 16 are installed at elevations selected to generally match those of the bin carousels 222b of the transport vehicle 215c, the deployed positions of the transfer conveyors 223 span horizontally between the two sets of bin carousels 222c, 222b and thereby form horizontally level bridges therebetween.

Similar to the loading/unloading procedures disclosed for the other facility classes, that is, mega, macro, and micro, when filled downstream-headed finished-order (DFO) bins 224d from a micro facility 14 are being offloaded from an arriving micro-nano transport vehicle 215c at a nano facility 16, empty upstream-headed finished-order (UFO) bins from the nano facility 16 are loaded onto the same micro-nano transport vehicle 215c for transport to a micro facility 14, for example, the same micro facility 14 from which the incoming filled DFO bins 224d are arriving. Similar to the other facilities 10, 12, 14, while the detailed examples refer to an upstream return of empty storage bins back to the same facility from where the transport vehicle arrived, in other examples, the transport vehicle departs to a different upstream facility than that from which the transport vehicle arrived.

Figure 23A:
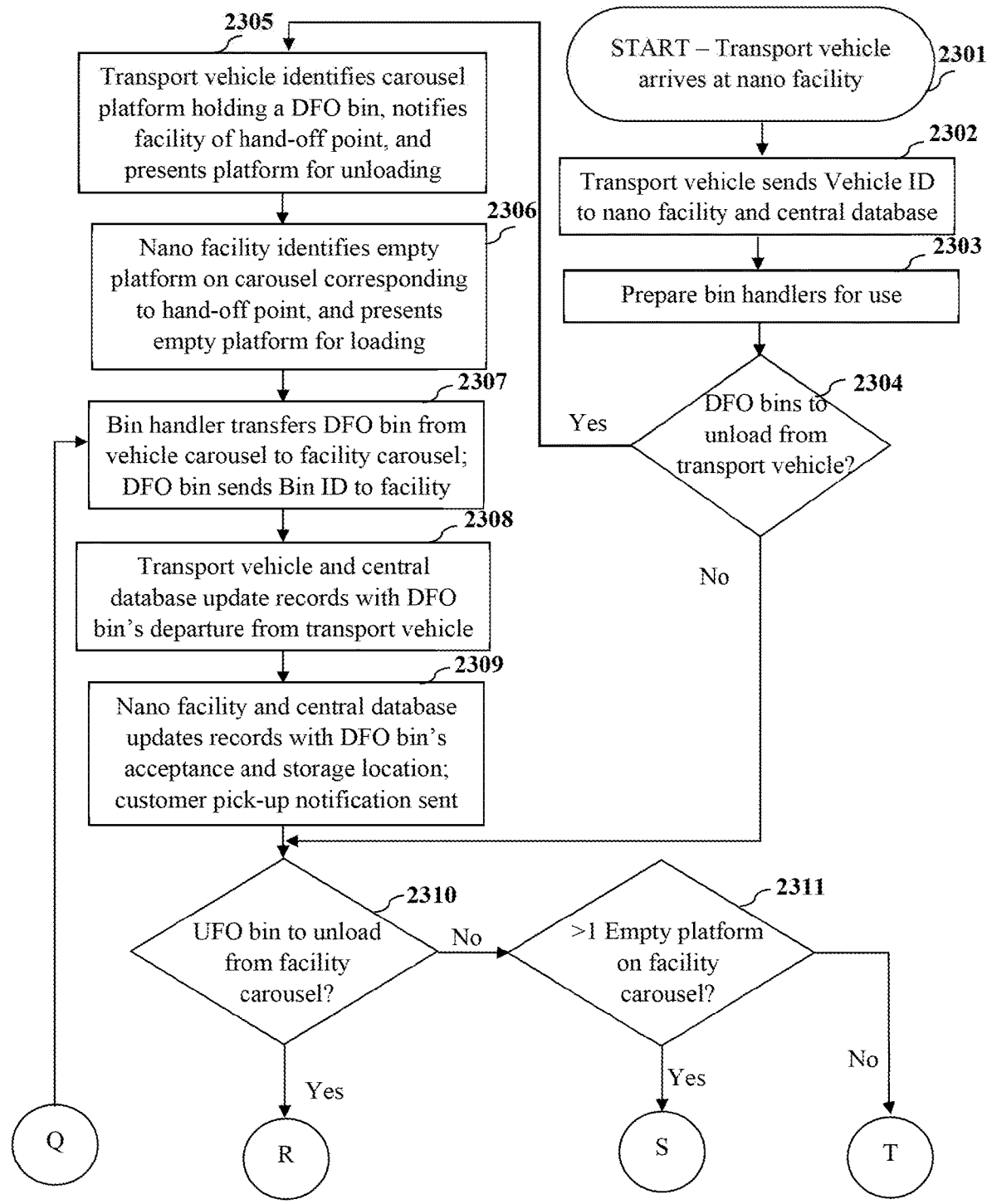
FIGS. 23A-23B illustrate a flowchart of a computer-implemented method for managing exchange of order bins between the nano facility and a transport vehicle arriving thereat from a micro facility, according to an embodiment herein.
Figure 23B:
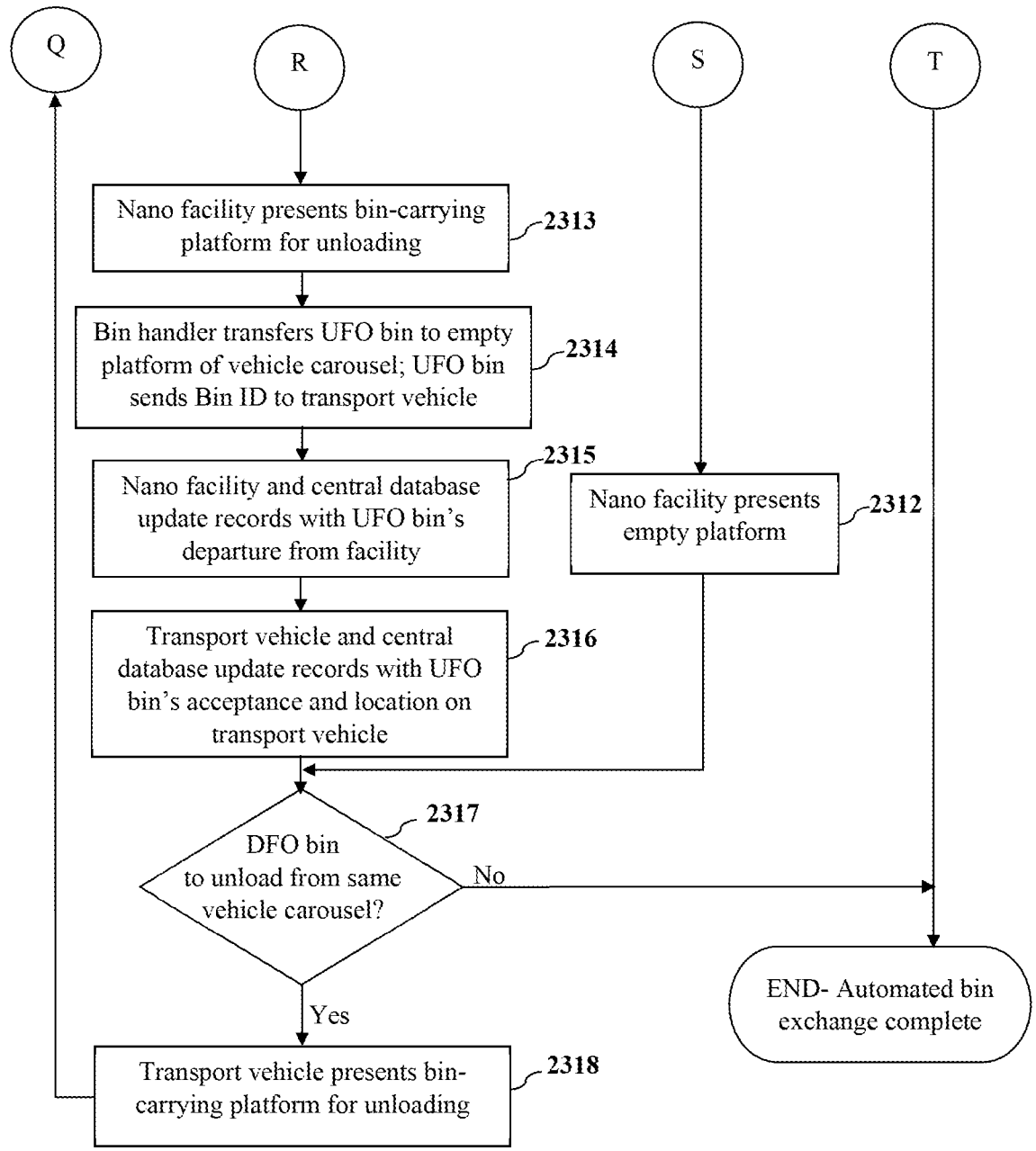

FIGS. 23A-23B illustrate a flowchart of a computer-implemented method for managing an exchange of order bins between the nano facility 16 and a transport vehicle 215c arriving thereat from a micro facility 14 shown in FIGS. 4A-4B and FIGS. 22A-22B, according to an embodiment herein. The process of exchanging order-filled downstream-headed finished-order (DFO) bins 224d from the transport vehicle 215c with empty or returns-containing upstream-headed finished-order (UFO) bins 224d from the nano facility 16 upon arrival of the transport vehicle 215c at the nano facility 16 is illustrated FIGS. 23A-23B. In an example, this transport vehicle 215c may have arrived 2301 at the nano facility 16 from the same micro facility 14 for which the transport vehicle 215c will subsequently depart again. At step 2302, upon arrival of the transport vehicle 215c at the nano facility 16, the vehicle management subsystem 216 of the vehicle 215c illustrated in FIGS. 2A-2B, transmits an arrival signal containing its Vehicle_ID and the Facility_ID of the micro facility 14 for which the transport vehicle 215c is next destined, to the facility management subsystem 204 of the nano facility 16 at which the transport vehicle 215c is arriving, and in an embodiment, optionally to the central computing system 201. The rear loading door of the transport vehicle 215c and delivery door(s) of the nano facility 16 are opened, whether by a driver of the transport vehicle 215c or on an automated basis by the vehicle management subsystem 216 and the facility management subsystem 204 respectively, and the transport vehicle 215c is backed into docking relation to the nano facility 16. In an embodiment where transfer conveyors 223 on the transport vehicle 215c are used as automated bin handlers for transferring the DFO bins 224d onto and off of the bin carousels 222b, that is, into and out of the indexed storage array of the transport vehicle 215c, then at this preparation stage, these automated bin handlers are initialized, at step 2303, by lowering the transfer conveyors 223 into their deployed positions during or after docking of the transport vehicle 215c at the delivery door(s) of the nano facility 16, either manually or under automated control of the vehicle management subsystem 216. In an embodiment, opening of the rear loading door and deployment of the transfer conveyors 223 optionally precedes backing of the transport vehicle 215c into the docking position to ensure backing of the transport vehicle 215c into a properly aligned position.

At step 2304, the vehicle management subsystem 216 of the transport vehicle 215c queries its onboard bins table 325 for the presence of any DFO bins 224d onboard, thereby assessing whether to unload the DFO bins 224d from the transport vehicle 215c or whether the transport vehicle 215c is already empty and thus capable of accepting loading thereon of UFO bins 224d slated for transport to the micro facility 14 to which the transport vehicle 215c is next destined. If there are no DFO bins onboard the vehicle 215c, the process proceeds to step 2310 disclosed below.

If there is a DFO bin 224d onboard the transport vehicle 215c, then at step 2305, the vehicle management subsystem 216 of the transport vehicle 215c sends a hand-off designation signal indicative of which bin carousel 222b of the transport vehicle 215c the DFO bin 224d is being handed off from, to the facility management subsystem 204 of the nano facility 16, thus signifying which of the bin carousels 222c of the nano facility 16 should be prepared to receive that DFO bin 224d based on a 1:1 carousel ratio and a matching carousel layout shared by the transport vehicle 215c and the nano facility 16. Meanwhile, the vehicle management subsystem 216 of the transport vehicle 215c activates the bin carousel 222b on which the DFO bin 224d is carried to thereby move the carousel platform 1801 illustrated in FIGS. 18A-18C and FIGS. 22A-22B, carrying that DFO bin 224d into the loading/unloading position P, if not already present in the loading/unloading position. Meanwhile, at step 2306, the facility management subsystem 204 of the nano facility 16 queries its facility storage table 320a to identify an empty carousel platform 2106 on the corresponding bin carousel 222c specified by the hand-off designation signal, and activates the corresponding bin carousel 222c to move the identified empty carousel platform 2106 of the corresponding bin carousel 222c to the loading/unloading position $P_L$, if not already present in the loading/unloading position.

At step 2307, the facility management subsystem 204 signals the vehicle management subsystem 216 of the readied presence of the empty bin carousel 222c at the loading/unloading position $P_L$, in response to which the vehicle management subsystem 216 activates the automated bin handler, for example, the respective transfer conveyor 223, to unload the DFO bin 224d from the presented carousel platform 1801 of the bin carousel 222b of the transport vehicle 215c onto the presented empty carousel platform 2106 of the corresponding bin carousel 222c of the nano facility 16, optionally with aided displacement of the DFO bin 224d from the carousel platform 1801 of the bin carousel 222b, for example, by an automated actuator or other unload-assist device. Meanwhile, a local computer of the facility management subsystem 204 of the nano facility 16 wirelessly communicates with the mobile data storage device 226 of the incoming DFO bin 224d to receive the Bin_ID thereof, and optionally the order number of the customer order situated therein, for example, while the DFO bin 224d is being placed in a respective storage location of the indexed storage array by the automated bin handler, for example, during placement of the DFO bin 224d onto the empty carousel platform 2106 of the bin carousel 222c of the nano facility 16 by the transfer conveyor 223. In an embodiment, the DFO bin's 224d connection to and communication with the facility management subsystem 204 to share this information, for example, the Bin_ID and the order number, is initiated in response to a wireless instructive signal from the vehicle management subsystem 216 that commands the wireless communications unit 225 of the DFO bin 224d to disconnect from the transport vehicle's 215c local area network 221, for example, a wireless network, and instead connect to the local area network 206, for example, a wireless network 206 of the nano facility 16, and thereupon issue such communication thereto. In an embodiment, this instructive signal from the vehicle management subsystem 216 and resulting communication of the DFO bin 224d with the facility management subsystem 204 are initiated in association with the automated operation of the automated bin handler, for example, the transfer conveyor 223 of the transport vehicle 215c, since this denotes the DFO bin's 224d final point of hand-off from the transport vehicle 215c to the nano facility 16.

At step 2308, upon confirmed offloading of the DFO bin 224d from the carousel platform 1801 of the transport vehicle 215c, the vehicle management subsystem 216 updates its records to reflect the transfer of the DFO bin 224d to the nano facility 16 from the transport vehicle 215c, by removing the Bin_ID of that DFO bin 224d from the onboard bins table 325 of the transport vehicle 215c and decrementing the quantity of occupied FO bins in the vehicle information table 323, if such a count is tallied therein. At this step, in an embodiment, the vehicle management subsystem 216 also sends a bin departure signal with the Bin_ID of the DFO bin 224d just offloaded from the transport vehicle 215c, to the central computing system 201, in response to which the central computing system 201 erases the Vehicle_ID of the transport vehicle 215c from this DFO bin record in the FO bins table 313.

At step 2309, the facility management subsystem 204 of the nano facility 16 records the order number and/or the Bin_ID in association with the Location_ID of the respective storage location at which the DFO bin 224d is being placed in the indexed storage array of the nano facility 16, for example, the Location_ID assigned to the carousel platform 2106 of the bin carousel 222c on which the received DFO bin 224d is seated. In an embodiment, the facility management subsystem 204 also records the Bin_ID of the DFO bin 224d against the Location_ID of the carousel platform 2106 on which that DFO bin 224d was placed in the facility storage table 320a of the local facility database 207, and/or records the Location_ID of that storage location against the Bin_ID of that DFO bin 224d in the on-site bins table 322 of the local facility database 207. The facility management subsystem 204 also updates the order-related records in the central database 203, for example, by sending a bin-acceptance signal with its Facility_ID, the Bin_ID of the received DFO bin 224d, and the Location_ID of the storage location, for example, the carousel platform 2106 of the bin carousel 222c at which the DFO bin 224d was placed, to the central computing system 201, in response to which the central computing system 201 writes the Facility_ID and Location_ID to this DFO bin's 224d record in the FO bins table 313.

Furthermore, at step 2309, in response to this bin-acceptance signal from the nano facility 16, the central computing system 201 uses the order number associated with that DFO bin 224d, whether received as part of the bin-acceptance signal or retrieved from the FO bins table 313 using the received Bin_ID, to look up electronic contact information, for example, an email address, a phone number, etc., from the customer table 314 or the customer orders table 315 for the customer of that order, or to look up such electronic content information for a last mile delivery service assigned to that order in the customer orders table 315. Using this contact information, the central computing system 201 sends an electronic pickup notification, for example, an email, an SMS message, etc., to the customer or the delivery personnel that the order is ready for pickup at the identified nano facility 16. The electronic pickup notification comprises, for example, the location details of that nano facility 16 as stored in the facilities table 306 or sent as a link to an online resource such as an online map resource, with such location information. The electronic pickup notification further comprises, for example, an order-pickup access code that was generated either by the facility management subsystem 204 of the nano facility 16 and forwarded to the central computing system 201 or by the central computing system 201 and forwarded to the facility management subsystem 204 for storage therein together with the order number or Bin_ID, for example, in the on-site bins table 322. The electronic pickup notification allows a subsequent pickup of the customer order contained in the facility-held FO bin 224d by the customer or the delivery personnel. In response to the bin-acceptance signal, in an embodiment, the central computing system 201 queries the FO bins table 313 on whether the FO bin 224d whose Bin_ID was received is the only FO bin 224d holding fulfilled products of that order, and if other FO bins for the same order are identified, then delays sending the electronic pickup notification until bin-acceptance signals for all such other FO bins of the same order are received from the nano facility 16.

Next, at step 2310, the facility management subsystem 204 queries its on-site bins table 322 for the presence of any UFO bins 224d on the same bin carousel 222c onto which the DFO bin 224d was just loaded, since the carousel platform 1801 from which that DFO bin 224d was offloaded from the transport vehicle 215c now sits empty at the loading/unloading position of its bin carousel 222b, and is thus ready to accept any available UFO bin 224d on the corresponding bin carousel 222c of the nano facility 16. If a UFO bin 224d is identified on the bin carousel 222c of the nano facility 16, then at step 2313, the facility management subsystem 204 activates the bin carousel 222c on which the UFO bin 224d is carried to thereby move the carousel platform 2106 carrying that UFO bin 224d into the loading/unloading position $P_L$ of the bin carousel 222c of the nano facility 16, if not already present in that position. Upon completion of such relocation of the UFO bin 224d into the loading/unloading position $P_L$, the respective automated bin handler is activated, at step 2314, to transfer the UFO bin 224d from the bin carousel 222c of the nano facility 16 to the awaiting empty platform 1801 of the corresponding bin carousel 222b of the transport vehicle 215c. In the illustrated example, this step involves activation of the appropriate transfer conveyor 223 by the vehicle management subsystem 216, for example, in response to a transfer-ready signal issued from the facility management subsystem 204 of the nano facility 16 upon the completed relocation of the UFO bin 224d into the loading/unloading position $P_L$ by the bin carousel 222c of the nano facility 16. In an embodiment, this activation is accompanied by activation, by the facility management subsystem 204, of an automated actuator or other unload-assist device optionally installed in the nano facility 16, in the same manner disclosed above for the transport vehicle 215c, to encourage unloading of the UFO bin 224d from its carousel platform 2106.

Furthermore, at step 2314, the UFO bin 224d communicates its Bin_ID to the vehicle management subsystem 216, for example, having been commanded via a wireless instruction from the facility management subsystem 204 to disconnect from the local area network 206, for example, a wireless network of the nano facility 16, and instead connect to the transport vehicle's 215c local area network 221, for example, a wireless network, and issue such communication of the Bin_ID thereto. In an embodiment, this wireless instruction from the facility management subsystem 204 and resulting communication of the UFO bin 224d with the facility management subsystem 204 is initiated by arrival of the bin-carrying carousel platform 2106 of the nano facility 16 at the loading/unloading position $P_L$ thereof, or activation of the optional automated unload-assist device that aids the unloading of the UFO bin 224d from that carousel platform 2106, since this denotes the UFO bin's 224d final point of hand-off from the nano facility 16 to the transport vehicle 215c.

Meanwhile, at step 2315, the facility management subsystem 204 updates its records to reflect the transfer of the UFO bin 224d from the nano facility 16 to the transport vehicle 215c, by removing the Bin_ID of that UFO bin 224d from the on-site bins table 322 of the nano facility 16 and decrementing the quantity of on-site FO bins in the facility information table 319, if such a count is tallied therein. At this step, in an embodiment, the facility management subsystem 204 also sends a bin departure signal with the Bin_ID of the UFO bin 224d just offloaded from the nano facility 16 to the central computing system 201, in response to which the central computing system 201 erases the Facility_ID of the nano facility 16 from this UFO bin's 224*d* record in the FO bins table 313.

Meanwhile, at step 2316, the vehicle management subsystem 216 updates its records to reflect the transfer of the UFO bin 224*d* from the nano facility 16 to the transport vehicle 215*c*, by adding the Bin_ID of that UFO bin 224*d* to the transport vehicle's 215*c* onboard bins table 325 and incrementing the quantity of FO bins in the vehicle information table 323 if such a count is tallied therein. The vehicle management subsystem 216 also records the Bin_ID of the UFO bin 224*d* against the Location_ID of the carousel platform 1801 of the bin carousel 222*b* on which that UFO bin 224*d* was placed in the vehicle storage table 324, and/or records the Location_ID of that storage location against the Bin_ID of that UFO bin 224*d* in the onboard bins table 325. At this step, in an embodiment, the vehicle management subsystem 216 also sends a bin-acceptance signal with the Bin_ID of the UFO bin 224*d* just accepted onto the transport vehicle 215*c* to the central computing system 201, in response to which the central computing system 201 writes the Vehicle_ID of the transport vehicle 215*c* to this UFO bin's record in the FO bins table 313. The bin-acceptance signal also comprises the Location_ID for recordal thereof against the Bin_ID of the deposited UFO bin 224*d* in the FO bins table 313 of the central database 203. Accordingly, all records concerning the whereabouts of the UFO bin 224*d* are thus fully updated throughout the multi-nodal supply chain system 200.

Next, at step 2317, the vehicle management subsystem 216 of the transport vehicle 215*c* queries its onboard bins table 325 for the presence of any DFO bins 224*d* remaining on the same bin carousel 222*b* onto which the UFO bin 224*d* was just loaded, since the carousel platform 2106 from which that UFO bin 224*d* was offloaded from the nano facility 16 now sits empty at the loading/unloading position $P_L$ of its bin carousel 222*c*, and is thus ready to accept any available DFO bin 224*d* that currently remains on the corresponding bin carousel 222*b* of the transport vehicle 215*c*. If a DFO bin 224*d* is identified on the transport vehicle's 215*c* bin carousel 222*b*, then at step 2318, the vehicle management subsystem 216 activates the bin carousel 222*b* on which the DFO bin 224*d* is carried to thereby move the carousel platform 1801 carrying that DFO bin 224*d* into the loading/unloading position P of the bin carousel 222*b*, if not already present in the loading/unloading position. The process then returns to step 2307 to complete the transfer of this DFO bin 224*d* to the nano facility 16 and to record such transfer and the DFO bin's 224*d* newly stored location in both the central database 203 and the local facility database 207 as disclosed above.

Turning back to step 2310, if no UFO bin 224*d* is identified as residing on the same bin carousel 222*c* of the nano facility 16 to which a DFO bin 224*d* had been loaded at step 2307, then at step 2311, the facility management subsystem 204 checks whether there is more than one empty carousel platform 2106 on the same bin carousel 222*c* to which that DFO bin 224*d* was transferred. If yes, indicating that the bin carousel 222*c* of the nano facility 16 has capacity for at least one more DFO bin 224*d*, then the facility management subsystem 204 signals the vehicle management 216 of such remaining carousel capacity, in response to which the vehicle management subsystem 216 repeats step 2317 of checking for any remaining DFO bins 224*d* on the corresponding bin carousel 222*b*. In step 2312, an identified empty carousel platform 2106 of the bin carousel 222*c* of the nano facility 16 is proactively advanced to the loading/unloading position $P_L$ between steps 2311 and 2317, though it will be appreciated that this may be deferred until a positive confirmation of a remaining DFO bin 224*d* on the bin carousel 222*b* of the transport vehicle 215*c* at step 2317 indicates such need for advancement of an empty carousel platform 2106 on the bin carousel 222*c* of the nano facility 16.

Turning back to step 2304, if no DFO bin 224*d* is identified as residing on the subject bin carousel 222*b* of the transport vehicle 215*c* being queried at this step, then the process continues to step 2310 to check for presence of a UFO bin 224*d* on the corresponding bin carousel 222*c* of the nano facility 16, in which case the process starts with unloading of the UFO bin 224*d* from the nano facility 16 rather than unloading of a DFO bin 224*d* from the transport vehicle 215*c*. If a negative result is returned in response to either the check for DFO bins at step 2317, or the check for an effective carousel capacity of two or more empty carousel platforms 2106 on the bin carousel 222*c* of the nano facility 16 at step 2311, then the bin exchange process for the given pair of matching bin carousels 222*b*, 222*c* of the transport vehicle 215*c* and the nano facility 16 is complete. It will be appreciated that for embodiments in which the transport vehicle 215*c* comprises multiple bin carousels 222*b* and the nano facility 16 likewise comprises multiple bin carousels 222*c* of matching quantity, multiple instances of the sequence denoted by steps 2304 to 2312 are executed in parallel, one for each pair of matching bin carousels 222*b*, 222*c* between the transport vehicle 215*c* and the nano facility 16, so that all bin carousels 222*b*, 222*c* are loaded/unloaded simultaneously.

In an embodiment, the fully-automated bin exchange process illustrated in FIGS. 23A-23B starts with unloading of a DFO bin 224*d* by default, if the arriving transport vehicle 215*c* has a DFO bin 224*d* thereon, and hence relies on an implementation in which at least one carousel platform 2106 on each bin carousel 222*c* of the nano facility 16 is always kept empty to accommodate receipt of a first DFO bin 224*d* from an arriving transport vehicle 215*c* before any UFO bins are transferred to the transport vehicle 215*c*. Accordingly, in an embodiment, the check of the capacity of the bin carousel 222*c* of the nano facility 16 at step 2311 is configured to check for two or more, rather than at least one, empty carousel platforms 2106 to ensure that the very last empty carousel platform 2106 is not filled with an incoming DFO bin. In another embodiment, the process is reconfigured to start with unloading of UFO bins from the bin carousel 222*c* of the nano facility 16, and to instead rely on keeping at least one carousel platform 1801 always empty on the transport vehicle 215*c*. In another embodiment, human intervention by a driver of the transport vehicle 215*c* or a mechanized buffering solution is employed for stocking bin carousels 222*b*, 222*c* to their full capacity, and the human-performed, human-aided, or fully mechanized buffering solution is used to initially remove a first storage bin from one bin carousel of a pair to enable the exchange of storage bins to begin.

In the carousel-based embodiments of nano facilities 16 and transport vehicles 215*c*, in instances where a bin carousel 222*b* of the transport vehicle 215*c* has a plurality of DFO bins 224*d* on a sequential series of its carousel platforms 1801, and the corresponding bin carousel 222*c* of the nano facility 16 has a plurality of UFO bins 224*d* on a sequential series its carousel platforms 2106, the bin carousels can be driven incrementally in an indexed manner advancing their carousel platforms one-by-one past the loading/unloading position in an alternating manner, starting with an empty carousel platform on one bin carousel and a bin-occupied carousel platform on the other, and then transferring a storage bin from the transfer conveyor 223 being indexed in each subsequent repetition.

In the illustrated embodiment where both the micro-nano transport vehicle 215c and the nano facility 16 employ carousel-based indexed storage arrays and a set of transfer conveyors 223 are provided as automated bin handlers in a 1:1 ratio to the quantity of bin carousels 222b. 222c found in each indexed storage array such that each performs the physical hand-off and deposit of storage bins between the transport vehicle 215c and the nano facility 16 at one specific matching pair of bin carousels 222b, 222c, the data exchange performed between each FO bin 224d and the facility management subsystem 204 of the nano facility 16 or the vehicle management subsystem 216 of the transport vehicle 215c to which the FO bin 224d is being handed off thus need not include communication of the environmental flag or environmental data concerning that FO bin 224d, as the computerized supply chain management system instead relies on the matching environmental zone layout shared by the bin carousels 222b, 222c of both the transport vehicle 215c and the nano facility 16, so that any FO bin 224d being transferred between a matching pair of bin carousels 222b, 222c is inherently deposited into the same type of environmental zone from which the FO bin 224d is being transferred. It will be appreciated that in other embodiments that differ in terms of the storage array type used in one or both of the transport vehicle 215c and the nano facility 16, the relative environmental zone layouts in the transport vehicle 215c and the nano facility 16 and/or the type and configuration of the automated bin handler used to hand-off and/or deposit the storage bins from the transport vehicle 215c to the nano facility 16 and vice versa, the wireless communication from the wireless communications unit 225 of the FO bin 224d to the respective facility management subsystem 204 of the nano facility 16 or the vehicle management subsystem 216 of the transport vehicle 215c to which the FO bin 224d is being transferred, may include the environmental flag or environmental data from the FO bin 224d for use in automated control of one or more bin handlers in the transport vehicle 215c or the nano facility 16 to deposit the received FO bin 224d in an environmentally appropriate zone of the transport vehicle 215c or the nano facility 16. In an embodiment, if one or more bin handlers fully or partially responsible for the hand-off and/or deposit of the transferring FO bin 224d are positioned in the transport vehicle 215c or the nano facility 16 from which the FO bin 224d is being transferred, then the transport vehicle 215c or the nano facility 16 reads the environmental flag of the FO bin 224d or the environmental data of a customer order contained therein, and uses the same to appropriately control operation of the automated bin handlers to transfer the FO bin 224d to the appropriate environmental zone of the receiving transport vehicle 215c or the nano facility 16.

While the embodiments illustrated in FIGS. 21A-22B disclose a nano facility 16 with an indexed storage array comprising a plurality of horizontally oriented bin carousels 222c, other embodiments may have one or more bin carousels 222c arranged in other orientations. For example, in an embodiment, the nano facility 16 employs a vertically elongated, rather than a horizontally elongated shelter 2101 in which there are disposed one or more vertically upright bin carousels positioned side-by-side in the case of multiple bin carousels, and provided in equal quantity to one or more side-by-side bin carousels in a single-level carousel array in each micro-nano transport vehicle 215c. In this embodiment, the loading/unloading position of each bin carousel of the nano facility 16 refers to a position near the bottom end of the bin carousel on one side thereof where the delivery door(s) reside(s) at one side of the elongated shelter 2101, and with the pickup position referring to an opposing position also near the bottom end of the bin carousel, but on the opposing side thereof where the pickup door(s) reside(s) at an opposing side of the elongated shelter 2101. Such a vertical configuration of a carousel-based nano facility 16 is economically beneficial due to a reduced real estate footprint for a given volume of storage capacity.

Figure 24:
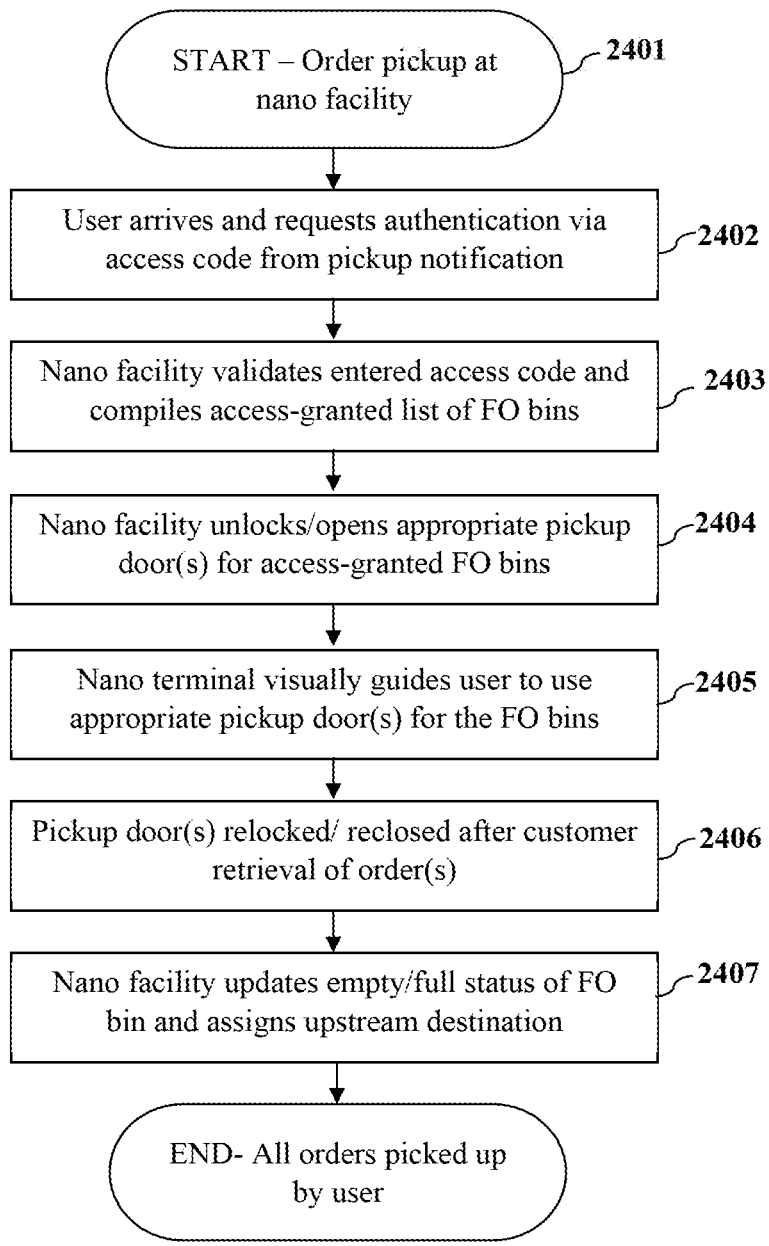
FIG. 24 illustrates a flowchart of a computer-implemented method for managing release of storage bins to customers or delivery personnel at the nano facility, according to an embodiment herein.

FIG. 24 illustrates a flowchart of a computer-implemented method for managing release of storage bins to customers or delivery personnel at the nano facility 16 shown in FIGS. 21A-21C and FIGS. 22A-22B, according to an embodiment herein. FIG. 24 illustrates one example of a process of controlling automated release of a received customer order at the nano facility 16 to a customer or last-leg/last mile delivery person. The customer or the last-leg/last mile delivery person is herein referred to as a "user". For an order pick up 2401 at the nano facility 16, when a user arrives at the nano facility 16 at step 2402, in an embodiment, the user must be authenticated by the facility management subsystem 204 of the nano facility 16 before being granted access to their order contained in one or more finished-order (FO) bins 224d inside the nano facility 16. In an embodiment of an authentication process, the user must enter a valid order-pickup access code at an electronic access device 212 of the facility management subsystem 204 illustrated in FIG. 2A. In an embodiment, the electronic access device 212 is mounted on or near the exterior of the elongated shelter 2101, for example, at the second end 2101b of the elongated shelter 2101 to reside near the pickup door(s) in embodiments where the pickup doors are situated at the second end 2101b, whereby the electronic access device 212 is accessible from the outside environment. The facility management subsystem 204 grants access of an order stored in the nano facility 16 to the user only if the user enters the correct order-pickup access code in the electronic access device 212 for the order. In an embodiment, the electronic access device 212 is a numeric or alphanumeric keypad into which the user enters a numeric or alphanumeric access code. In another embodiment, the electronic access device 212 is a scanner that reads a barcode that is displayed on a display screen of the user's mobile electronic device, for example, a smartphone, a tablet, etc., or that is found on a pickup ticket downloaded and printed by the user. In another embodiment, the access code is communicated wirelessly from the user's mobile electronic device to the electronic access device 212 of the nano facility 16, for example, by near field communication (NFC) or other short-range wireless communication technology.

At step 2403, the facility management subsystem 204 queries its on-site bins table 322 for any Bin_IDs having a recorded order-pickup access code matching the user-entered access code from the electronic access device 212. As part of this step, in an embodiment, the facility management subsystem 204 also queries its on-site bins table 322 for additional FO bins 224d found therein whose order has the same Customer_ID assigned thereto, for example, as enabled by storage of the Customer_ID in the on-site bins table 322 of the nano facility 16, by wireless polling of the mobile data storage devices 226 of the FO bins 224d listed in the on-site bins table 322, or by querying of the FO bins table 313 in the central database 203 for the Bin_IDs listed in the on-site bins table 322 of the nano facility 16 and checking the Customer_IDs recorded thereagainst. Any such identified FO bins 224d found linked to the same Customer_ID, but a different order number, can thus optionally be compiled together with those FO bins 224d whose recorded order-pickup access code matches the user-entered access code to provide the user access to all their on-site orders via a singular valid order-pickup access code for one of those orders, rather than having to enter a respective individual order-pickup access code for each and every order currently on-site at the nano facility 16. Accordingly, this step generates a list of access-granted FO bins that the user is entitled to access.

At step 2404, the facility management subsystem 204 looks up the Location_ID of each access-granted FO bin in the generated list, and therefrom identifies and unlocks or in an embodiment, optionally opens the appropriate one or more pickup doors of the nano facility 16 that need to be unlocked to reach the access-granted FO bin(s). In an embodiment where all the carousel platforms 2106 of a bin carousel 222c are accessed only from a singular door, then once a particular bin carousel 222c is identified as having an access-granted FO bin thereon, then the bin carousel 222c is activated to advance the carousel platform 2106 on which that access-granted FO bin is carried to the pickup position $P_P$ adjacent to that bin carousel's 222c pickup door before unlocking or opening that respective pickup door. If the facility management subsystem 204 is configured only to electronically unlock the pickup doors and not cause automatic opening thereof, then at step 2405, such unlocking is accompanied by a display of a visual guidance to the user on which pickup door they are to open, for example, via an on-screen guidance shown on a display screen or by activation of an illuminable "unlocked" indicator positioned respectively on or adjacent to the unlocked pickup door. In an embodiment, the on-screen guidance is incorporated into the same electronic access device 212 at which the order-pickup access code was entered. If more than one access-granted FO bin was identified on that bin carousel 222c, then after detected reclosure of the pickup door by the user after retrieving the ordered items from the FO bin, the facility management subsystem 204 advances the next access-granted FO bin to the pickup position, for example, only after automatically relocking of the pickup door for safety and security, and then once again unlocks the same pickup door to grant user access to that next access-granted FO bin, and repeats these steps until all access-granted FO bins on that bin carousel 222c have been accessed and their ordered products removed. The same process is repeated for any other bin carousel 222c having one or more access-granted FO bins thereon. In cases with multiple access-granted FO bins on a bin carousel 222c, in an embodiment, the user is instructed to wait for another FO bin at the same pickup door whenever necessary, for example, via the on-screen guidance or activation of an illuminable "wait" indicator.

In an embodiment where pickup access for each bin carousel 222c is instead made through a respective array of pickup doors at the side of the nano facility 16, rather than a singular pickup door at the end 2101b thereof, the facility management subsystem 204 of the nano facility 16, at step 2404, instead unlocks or opens a respective one or more of the arrayed pickup doors that align with the respective one or more carousel platforms on which one or more access-granted FO bins reside, and again visually informs the user at step 2405 of which pickup doors to use, whether this is achieved by automatic swinging open of such doors, on-screen guidance, or illuminable indicators. This embodiment with the array of pickup doors or access openings requires no activation of the bin carousels 222c or repeated opening and closing of any singular pickup door to reach multiple access-granted FO bins, and instead relies on a one-time opening and closing of one or more of the arrayed pickup doors.

At step 2406, as the facility management subsystem 204 of the nano facility 16 confirms the order contents of each access-granted FO bin 224d is picked up, for example, by detected closure of the pickup door after the initial unlocking/opening thereof by validation of the order-pickup access code; detected reduction of weight at the carousel platform 2106 or other indexed storage location at which the order was held, for example, by detection of a weight drop down to within a predetermined threshold of an expected weight of an empty FO bin 224d; and/or by other confirmation means, the facility management subsystem 204 recloses/relocks the pickup door.

Meanwhile, at step 2407, the facility management subsystem 204 also records a newly empty status of the FO bin 224d both locally and in the central database 203, for example, by locally communicating with the wireless communications unit 225 of the FO bin 224d to erase the contents table 327 and the product information table 328 thereof; communicating with the central computing system 201 to erase the variable fields in the FO bins table 313; and wiping similar records that may be duplicated in the local facility database 207. In an embodiment, this step further comprises an update to one or both of the central database 203 and the local facility database 207 to change a status identifier of the respective FO bin from a "filled" status denoting the presence of an order therein to an "empty" status denoting the absence of an order therein, if such status is tracked by such dedicated identifier, rather than by other means, such as querying of the order number field for the presence or absence of a valid order number. In an embodiment where the FO bin 224d is empty, the FO bin is designated for upstream transport to a micro facility 14, thereby becoming a candidate UFO bin 224d in the bin loading/unloading procedure illustrated in FIGS. 23A-23B, upon the next arrival of a micro-nano transport vehicle 215c. Accordingly, at step 2407 of FIG. 24, the facility management subsystem 204 also erases the previously recorded destination data in the bin information table 326 of the FO bin's 224d mobile data storage device 226, and replaces the same with the Facility_ID of the micro facility 14 to which the empty FO bin 224d should be next transported. In an embodiment, a nano facility 16 is served by a singular predetermined micro facility 14, and therefore, the Facility_ID of this nano facility 16 that is reassigned to the FO bin 224d upon emptying thereof by the user, is a static unchanging Facility_ID stored by the nano facility 16 and applied to all FO bins thereat, once emptied.

In other embodiments, other storage array types, dynamic or static, are used at the nano facilities 16 in place of the bin carousels 222c illustrated in FIGS. 21A-21C and FIGS. 22A-22B. For example, a miniaturized version of the gridded storage structure 507, 603, 703 used in the larger facilities 10, 12, 14 is employed, for example, with a singular robotic handler 208. In another embodiment, the nano facility 16 is an electronically operated locker facility with individual lockers or cubbies that each receive a singular respective order bin and can only be unlocked and opened using the correct order-pickup access code for that order. As disclosed above, in an embodiment, the elongated bin carousels 222c of the nano facility 16 are vertically oriented rather than horizontally oriented to reduce the footprint of the nano facility 16, in which case delivery and pickup at this upright nano facility 16 are executed via delivery and pickup doors at or near ground level at a bottom end of the upright bin carousels 222c.

The multi-nodal supply chain system disclosed herein allows multiple vendors to share a national or other large-scale infrastructure for order fulfillment and inventory management. The entire multi-nodal supply chain system comprising both the network of node facilities and the transport vehicles travelling therebetween, forms a singular storage environment throughout which inventory is accurately tracked and redistributed. Though the forgoing description describes a typical downstream flow path from a mega facility through to a nano facility, the compatibility of the standardized storage bins with the standardized storage array type used at each of the mega, macro and micro facilities and in each transport vehicle moving therebetween allows a storage bin from any of the mega, macro or micro facilities to be transported to any other such facility. Any vendor's inventory can, therefore, be distributed strategically to allow expedited delivery anywhere within the nation-wide or other geographic expanse of the multi-nodal supply chain system. In an embodiment, supply shipment singulation and mega-to-macro bin transfers are typically achieved within 24 hours, multi-SKU kitting and macro-to-micro bin transfers are typically achieved within 4-6 hours, and order kitting and packing and micro-to-nano transfers are typically achieved within 2 hours.

While the forgoing examples of loading/unloading procedures at the various facilities refer to the upstream flow of empty storage bins, other storage bins may also be transported upstream in the same manner. For example, storage bins comprising order bins containing customer returns dropped off at a nano facility are transported upstream for return to a vendor, a supplier, or a manufacturer situated near an upstream facility in the multi-nodal supply chain system, or to the operating entity if the operating entity has been contracted to handle customer returns on behalf of the vendor, the supplier, or the manufacturer. A customer with a product return, for example, one or more faulty, improperly sized or unsatisfactory products received in their customer order, sends a product return request to the vendor, or to the operating entity if the vendor's sales/return platform is integrated into the operating entity's platform, in response to which a product return entry is generated in the central database 203 illustrated in FIG. 2A, which includes the Facility_ID of a nano facility 16 closest to the customer, for example, based on the customer address stored in the customer orders table 315 of the central database 203 from the original order or identified in the later-generated return entry, or of any other nano facility specified by the customer in their return request.

The central computing system 201 illustrated in FIG. 2A, checks for the presence of an empty order bin in the selected nano facility 16, and upon detection of the empty order bin, updates the recorded status of that order bin in the central database 203 to a designated "return" bin, for example, by way of a fulfillment/return status field in the FO bins table 313 as illustrated in FIG. 3B. The central computing system 201 also signals the facility management subsystem 204 of this status change, which in turn, wirelessly updates the same fulfillment/return status field in the contents table 327 on the mobile data storage device 226 of the designated return bin illustrated in FIG. 3F, and in the local facility database 207 if such status is also stored therein. The central computing system 201 also sends the user an order-return drop-off code in the same manner disclosed above for an order-pickup access code. As disclosed for the order-pickup access code, the order-return drop-off code will give the user access to the indexed storage location of the designated return bin, in which the user places the product(s) to be returned to the vendor, the supplier, or the manufacturer. The next time that a micro-nano transport vehicle 215c with filled FO bins 224d arrives at the nano facility 16 and is scheduled to travel therefrom to a micro facility 14 to or through which the return product should be routed upstream toward a targeted returns workstation 704 illustrated in FIG. 7, the designated return bin is loaded onto that micro-nano transport vehicle 215c, optionally along with empty FO bins and/or other designated return bins, for example, as part of the above disclosed bin loading/unloading procedure illustrated in FIGS. 23A-23B.

Accordingly, whether at a nano facility 16 or any other facility, in an embodiment, any transfer of storage bins between a facility and a transport vehicle involves a bin swap or a bin exchange performed on an at least partially or fully automated basis, for example, a swap of only filled storage bins for only empty storage bins such as filled downstream-headed finished-order (DFO) bins for only empty upstream-headed finished-order (UFO) bins; a swap of only filled storage bins for only filled storage bins such as filled DFO bins for only return UFO bins; or a swap of only filled storage bins for a combination of filled storage bins and empty storage bins such as filled DFO bins for a combination of empty and return UFO bins. Each group of one or more storage bins, for example, empty storage bins, filled storage bins or a combination thereof, being dropped off at a first facility is, therefore, exchanged for a group of one or more storage bins, for example, empty storage bins, filled storage bins or a combination thereof, departing for a second facility, based on the fact that such departing storage bins are not currently required at the first facility, or based on a shortage of, or demand for, storage bins at the second facility.

Transport vehicles need not be dedicated to upstream/downstream inter-class transport from one class of facility to another, for example, mega-macro, macro-micro, and micro-nano, and in an embodiment, comprise lateral intra-class transport among different facilities within the same class. Accordingly, exchanging or swapping of storage bins at each transport vehicle/facility transfer phase is not limited to an exchange of downstream-headed storage bins for upstream-headed storage bins, as disclosed in the above embodiments where such designation of "downstream-headed" versus "upstream-headed" bins is used for the convenience of maintaining a distinction between the two sets of storage bins involved in the bin swap or exchange at a loading dock, and during transport of the storage bins from an outbound loading dock at one facility to an inbound loading dock of another facility. In this manner, "downstream-headed" storage bins can be continuously referred to as such from the time they depart the outbound loading dock of one facility and arrive at an inbound loading dock of another, as opposed to referring to "incoming bins" and "outgoing bins", where the same set of bins switch from one designation to another mid-travel. Accordingly, a similar swap or exchange of storage bins during loading and unloading of a transport vehicle, and the exchange of data between the facilities, the transport vehicles, and the storage bins, therefore, take place regardless of the particular facility at which such exchange is taking place and the particular next facility to which the transport vehicle will travel.

While the detailed embodiments disclosed above refer to a multi-nodal supply chain system implemented in the supply chain ecosystem that provides full service from initial supplier/manufacturer sourcing to final customer pickup or last leg/last mile delivery, for example, by the operating entity or outside delivery personnel such as a local courier, it will be appreciated that benefits of various aspects found among the foregoing embodiments may be employed in various contexts, including those that do not span fully from original product sourcing to final customer pickup or last leg/last mile delivery. Accordingly, some embodiments herein may relate to any subset of the various facilities disclosed above, which may be described as product distribution channels serving only partial segments of the full supply chain path, while others may relate to a singular distribution, warehousing or order fulfillment facility benefiting from any of the various embodiments disclosed herein.

In view of this appreciation that some embodiments do not include a full four-tier facility hierarchy of mega, macro, micro and nano facilities, the term "node facility" is used herein to refer to any of the facilities, for example, any of the mega, macro and micro facilities of the four-tier hierarchy, that share indexed storage arrays compatible with the same storage bins as one another, while the term "terminal facility" or "terminal" is used to denote any facility whose storage array is optionally incompatible with the larger storage bins, and is instead configured for use with smaller finished-order bins at downstream locations at or closer to the point of final release to the customer. While the illustrated embodiment discloses progressively smaller transport vehicles in the downstream direction from mega to nano, in an embodiment, and in accordance with the above "node" versus "terminal" facility naming convention, "inter-nodal transport vehicle" is used herein to refer to the transport vehicles that primarily or exclusively travel between "node facilities" and are therefore compatible with the storage bins handled therein, while "node-to-terminal transport vehicle" is used herein to refer to a transport vehicle that primarily or exclusively travels to and from the terminal facilities and is therefore compatible with the differently sized order bins rather than the larger storage bins.

In addition to direct-to-customer order fulfillment, the multi-nodal supply chain system implemented in the supply chain ecosystem disclosed herein is used for inter-business activities, for example, business to business (b2b) commerce, or intra-business activities such as inventory replenishment. In such embodiments, rather than transporting to nano facilities for customer or last leg/last mile delivery service pickup, the storage bins are delivered, for example, to retail stores, warehouses, distribution centers, or other locations owned or operated by vendors, manufacturers, suppliers, or corporate customers thereof. In an embodiment, such locations are each equipped with a respective indexed storage array compatible with the storage bins of the multi-nodal supply chain system, whereby in addition or alternative to the FO bins, other storage bins, for example, single-compartment storage (SCS) bins, multi-compartment storage (MCS) bins, and/or picked-order (PO) bins, transported to such locations from mega, macro or micro facilities using the mega-macro or macro-micro transport vehicles 215a, 215b, are additionally or alternatively received and stored at such locations, optionally in an at least partially automated manner, and in an embodiment, in a fully automated manner, using the components, structures, equipment, methods, and processes disclosed herein. Each such delivery comprises a bin exchange process including picking up empty storage bins for transport to a facility or other similarly equipped business location and/or picking up filled storage bins for transport to such similarly equipped business locations, in a similar or equivalent manner to any of the loading/unloading processes disclosed herein. In embodiments where the business locations are not equipped with compatible indexed storage arrays, the bin-compatible transport vehicles are used to deliver the storage bins to such locations, at which the products are removed from the storage bins. In an embodiment, any such storage bins emptied at a location before the transport vehicle departs the location are loaded back thereon for return to the facility from where they originated on that same transport vehicle. In another embodiment, the storage bins are left on site for later pickup, for example, during a subsequent delivery by the same or a different bin-compatible transport vehicle.

In the illustrated embodiments, at least one local computer in each facility management subsystem 204 and vehicle management subsystem 216 illustrated in FIGS. 2A-2B, instructs the reading and writing of data to and from the mobile data storages devices 226 of the storage bins through the respective local area networks 206, 221, for example, wireless networks, of the facility and the transport vehicle, and in doing so, forwards and retrieves data to and from both the central database 203 of the central computing system 201 and the local facility database 207 of the facility management subsystem 204 or the local vehicle database 220 of the vehicle management subsystem 216. In another embodiment, the facility management subsystem 204 and/or the vehicle management subsystem 216 optionally implement omission of or reduction of content in the local facility database 207 and the local vehicle database 220 respectively, and instead perform such data exchange exclusively between the storage bins and the central database 203, though the added redundancy of local data storage is beneficial to reduce traffic volume of wide area communication and to provide failsafe redundancy in case of communication or central system outages. Other further embodiments forgo data exchange between the storage bins and the local computers and instead allow the storage bins to communicate directly with the central computing system 201.

While most embodiments disclosed above include the mobile data storage devices 226 whose content is updated each time there is a change in bin contents or a transfer of a storage bin from a transport vehicle to a facility or vice versa, other embodiments may lack a dynamically updatable data storage device whose contents can be rewritten in such a manner, while still benefiting from other aspects of the overall multi-nodal supply chain system and various processes disclosed herein. In an embodiment, a radio frequency identification (RFID) tag that stores and transmits only the Bin_ID is used in place of the re-writable data storage device on the storage bin. In this embodiment, instead of reading and writing additional data from and to the storage bin, the facility management subsystem 204 records the Bin_ID against the product and order records in the central database 203 and in the local facility databases 207 if duplicated or supplemented therein, during inventory induction, for example, during product-placement in SCS bins; during an inventory bin transfer, for example, SCS bin to MCS bin product-kitting; and during order fulfilment, for example, MCS bin to PO bin order picking and PO bin to FO bin order packing; in which case later processes performed by the facility management subsystem 204 and the vehicle management subsystem 216 use the Bin_ID to subsequently look up and/or update the product and order details in the central database 203 and/or local database(s) 207, 220, and update the Facility_ID or the Vehicle_ID, whenever necessary. In another embodiment, a barcode is used to statically store only the Bin_ID, which in turn, allows locating the Bin_ID in the central database 203 and/or the local database (s) 207, 220 to record that Bin_ID and the Product_ID or order number against one another during inventory induction, inventory bin transfer, or order fulfillment, and to later look up or update the product or order data associated with that Bin_ID during the subsequent processes disclosed herein.

While the illustrated embodiments employ storage bins, that is, smart bins, that store data concerning their contents and intended destination, thereby enabling local short-range wireless communications of pertinent data during the transfer of storage bins between transport vehicles and facilities and during routing of the storage bins within the facilities, thereby reducing wide area network traffic with the central computing system 201 or server, by employing the storage bin as its own autonomous instructing agent for guiding its routing, transport, storage and worker interactions within the supply chain ecosystem, it will be appreciated that other embodiments rely on a direct data exchange between the facility management subsystem 204 and the vehicle management subsystem 216 at any or all points of bin transfer between the transport vehicles and the facilities, rather than bin-to-vehicle and bin-to-facility communication with the storage bin, even in instances where the storage bins are still used to enable onboard data storage thereon concerning their contents and intended destination, for example, in the interest of failsafe redundancy. Furthermore, data exchange performed at various workstations may not take place specifically between the storage bin and the facility management subsystem 204 on such a self-directed basis in various embodiments, as in another embodiment, the facility management subsystem 204 obtains the same bin data from the central computing system 201 or server or from redundant local records created and stored in the local facility database 207, for example, as created during the induction process of new inventory into the supply chain ecosystem from supply shipments or during the unloading of incoming storage bins from a transport vehicle to the facility.

At any step of any process or method disclosed herein where a robotic handler 208 is commanded to carry a storage bin from one location to another, that is, from an origin point A to a destination point B, in an embodiment, such process involves commandment of multiple robotic handlers 208 to complete such task, for example, by carrying of the storage bin from an origin point A to an intermediary point C by one robotic handler and carrying of the storage bin from intermediary point C to a destination point B by another robotic handler. Furthermore, at any step of the methods or processes disclosed herein where a robotic handler is commanded to carry a storage bin away from a workstation, whether into the indexed storage array, to another workstation, to a loading grid structure adjacent to a loading dock, or to another destination, the robotic handler may or may not be the same robotic handler that previously delivered that same storage bin to the workstation from which the storage bin is to be carried away. For example, if the workstation is of a type where the pick port or the put port from which the storage bin is to be taken away is served by a track-based, drive-through travel path on which the robotic handlers of the indexed storage array travel through the workstation, then the robotic handler commanded to carry away the storage bin will be the same robotic handler that previously brought the same storage bin to that port. If the pick port or the put port of the workstation is not served on such a drive-through basis, for example, instead being served by a conveyor-based bin travel path through the workstation, then the robotic handler picking up and carrying away the storage bin from the workstation may be either the same or a different robotic handler than that which previously dropped off the storage bin at the conveyor-based travel path of the workstation. Accordingly, in reference to processes involving multiple robotically-performed bin movements, in an embodiment, reference is made to performance of steps by different "subsets" of the overall robotic handler fleet, which are not limited to mutually exclusive subsets and may be overlapping or even identical subsets.

In an embodiment, command of a first subset of the robotic handlers to retrieve a storage bin from storage and deliver the storage bin to a workstation, followed by subsequent command of a second subset of the robotic handlers to deposit the same storage bin back into storage from the workstation encompasses any of the following example scenarios: (i) a first robotic handler retrieves the storage bin from storage and delivers the storage bin to the workstation, and the same robotic handler returns the storage bin to storage, that is, the subsets are equal in quantity and identical; (ii) a first robotic handler retrieves the storage bin from storage and delivers the storage bin to the workstation, and a different second robotic handler subsequently retrieves the storage bin from the workstation and deposits the storage bin back into storage, that is, the subsets are equal in quantity, but neither identical nor overlapping; (iii) a first robotic handler retrieves the storage bin from storage and hands off the storage bin to a different second robotic handler that delivers the storage bin to the workstation, and a third robotic handler subsequently picks up the storage bin from the workstation and returns the storage bin to storage, that is, the subsets are non-equal in quantity, and are neither identical nor overlapping; (iv) a first robotic handler retrieves the storage bin from storage and hands off the storage bin to a different second robotic handler that delivers the storage bin to the workstation, and the first robotic handler subsequently picks up the storage bin from the workstation and returns the storage bin to storage, that is, the subsets are neither equal in quantity, nor identical; but are overlapping; and (v) a first robotic handler retrieves the storage bin from storage and hands off the storage bin to a different second robotic handler that delivers the storage bin to the workstation, and a third robotic handler subsequently picks up the storage bin from the workstation and hands off the storage bin to the first robotic handler, which returns the storage bin to storage, that is, the subsets are equal in quantity and overlap one another, but are non-identical.

Figure 25:
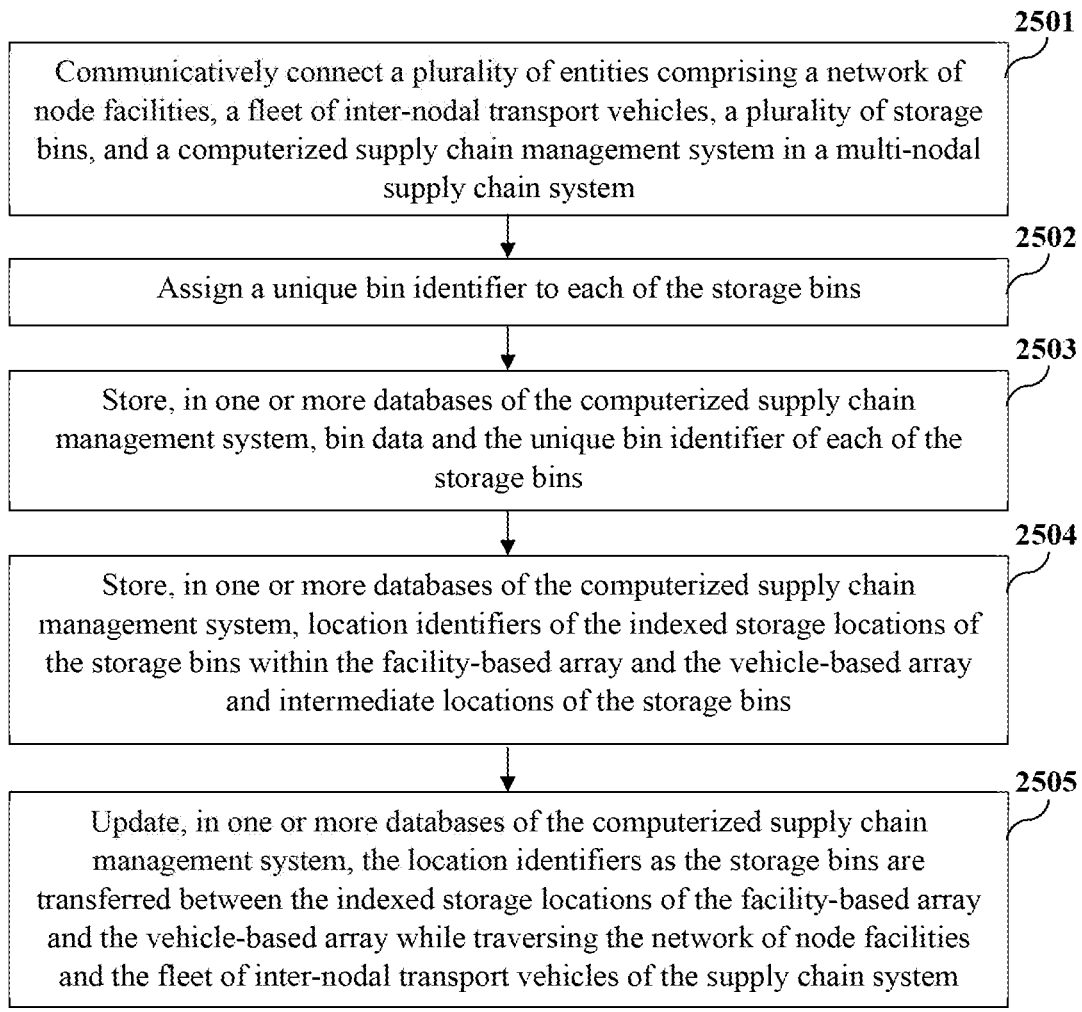
FIG. 25 illustrates a flowchart of a computer-implemented method for executing a supply chain workflow using transportable and continuously trackable storage bins, according to an embodiment herein.

FIG. 25 illustrates a flowchart of a computer-implemented method for executing a supply chain workflow using transportable and continuously trackable storage bins, according to an embodiment herein. In the method disclosed herein, multiple entities comprising a network of node facilities, a fleet of inter-nodal transport vehicles, a plurality of storage bins, and a computerized supply chain management system (CSCMS) are communicatively connected 2501 in a multi-nodal supply chain system as disclosed in the detailed descriptions of FIGS. 1A-1D, FIGS. 2A-2B, and FIGS. 4A-4B. The network of node facilities is distributed throughout a geographical region as illustrated in FIGS. 1A-1D. Each of the node facilities comprises a facility-based array of indexed storage locations as illustrated in FIGS. 5-7 and FIGS. 21A-21C. The fleet of inter-nodal transport vehicles transport multiple inventory items or products contained in storage bins between the node facilities. Each of the inter-nodal transport vehicles comprises a vehicle-based array of indexed storage locations as illustrated in FIGS. 10A-10C, FIGS. 11A-11C, FIGS. 17A-17C, and FIGS. 18A-18C. In an embodiment, the fleet of inter-nodal transport vehicles comprises dedicated-service transport vehicles, each respectively assigned to service a specific pair of the node facilities, and/or service a limited subset of the node facilities, and/or service a limited service area containing two or more of the node facilities. The fleet of inter-nodal transport vehicles loads and unloads the storage bins autonomously. In an example, at least one product in at least one of the storage bins is transferred from a first node facility to a third node facility through an intermediary second node facility by transporting at least one of the storage bins from the first node facility to the intermediary second node facility in a first dedicated-service transport vehicle assigned to service at least the first and second node facilities, and by transporting at least one of the storage bins from the intermediary second node facility to the third node facility in a second dedicated-service transport vehicle assigned to service at least the second and third node facilities. In an embodiment, the first dedicated-service transport vehicle is not assigned to service the third node facility, while the second dedicated-service transport vehicle is not assigned to service the first node facility.

The storage bins are storable within the network of node facilities and transportable between the node facilities by the inter-nodal transport vehicles. Each of the storage bins is of a standardized size and is configured to receive one or more of a plurality of eaches of the inventory items. After initial induction at a facility, in an embodiment, all transactions in the supply chain workflow execution are performed with respect to eaches. The ability of the storage bins to receive and handle eaches allows handling of inventory sold within the supply chain ecosystem at an "each" level and replenished with "just enough" inventory, rather than replenishing at a "case" level. For example, if a micro facility requires only seven units of a particular inventory item, the method disclosed herein allows transfer of only seven units of that inventory item to the micro facility using the transportable storage bins instead of transferring a whole case, thereby substantially reducing storage requirements at the micro facility. Moreover, each of the storage bins is of a configuration compatible with the facility-based array of indexed storage locations and the vehicle-based array of indexed storage locations for selective storage and continuous tracking of any one of the storage bins at any one of the node facilities, in any one of the inter-nodal transport vehicles, and between any one of the node facilities and any one of the inter-nodal transport vehicles. The storage bins communicate their status and location in the multi-nodal supply chain system to the CSCMS while they traverse the network of node facilities and the fleet of inter-nodal transport vehicles of the multi-nodal supply chain system in a forward direction and a reverse direction. In an embodiment, each of the storage bins is continuously trackable at any one of the node facilities, in any one of the inter-nodal transport vehicles, and between any one of the node facilities and any one of the inter-nodal transport vehicles in real time or near real time. In an embodiment, the storage bins are configured to contain one or more of a plurality of inventory items owned by one or more of a plurality of vendors.

In an embodiment, the storage bins are categorized into first category storage bins containing unmixed inventory items of a matching item type, second category storage bins containing mixed inventory items of a non-matching item type, and third category storage bins configured as order bins for fulfilling the orders. Moreover, in an embodiment, the network of node facilities is a hierarchical network comprising at least one mega facility, at least one macro facility, and at least one micro facility as illustrated in FIGS. 4A-4B. The mega facility is configured to store the first category storage bins. The macro facility is configured to receive one or more of the first category storage bins transported from the mega facility. The macro facility is further configured to fill a predefined number of the second category storage bins with different inventory items from the received first category storage bins to meet actual inventory needs and/or predictive inventory needs of another one or more of the node facilities. In an embodiment, the functions of the mega facility and the macro facility are combined in one facility. The micro facility is configured to receive one or more of the second category storage bins transported from at least one macro facility. The micro facility is further configured to fill a predefined number of the order bins with the different inventory items from the received second category storage bins to fulfill the orders. In an embodiment, the network of node facilities further comprises at least one nano facility as illustrated in FIGS. 4A-4B, configured to receive one or more of the order bins filled with the orders for pickup by customers and/or delivery personnel. In an embodiment, the macro facility is configured to distribute the inventory items, while the micro facility is configured to fulfil the orders. In an embodiment, the micro facility is configured to fulfill the orders based on proximity of the micro facility to at least one nano facility and/or a customer preference of at least one nano facility.

In an embodiment, the order bins comprise picked-order bins of the same standardized size and configuration as the storage bins. The picked-order bins are filled with one or more of the inventory items of multiple orders at the micro facility and inducted into the facility-based array of the micro facility. In another embodiment, the order bins comprise finished-order bins. The finished-order bins are of a different standardized size and configuration from the storage bins and are filled with one or more of the inventory items of individual orders after extraction thereof from the facility-based array of at least one micro facility. The finished-order bins of the different standardized size and configuration are configured to be compatible with the facility-based array of indexed storage locations of at least one nano facility and with the vehicle-based array of indexed storage locations in a node-to-terminal transport vehicle. In an embodiment, the inventory items owned by the vendors are packed into respective vendor-branded packages, for example, vendor-branded bags, and the respective vendor-branded packages are filled in the finished-order bins. This embodiment maintains vendor branding during the packing process using branded bags for a higher customer experience. The orders are fulfilled at the macro facility and/or the micro facility.

In an embodiment, the multi-nodal supply chain system further comprises one or more robotic handlers operable at each of the node facilities. Each of the robotic handlers is configured to be compatible with the storage bins and navigate any one of the storage bins through the facility-based array of indexed storage locations. Moreover, each of the robotic handlers is configured to selectively deposit any one of the storage bins thereto and extract any one of the storage bins therefrom. Furthermore, each of the robotic handlers is further configured to provide a dynamic storage location to each of the storage bins. In an embodiment, each of the robotic handlers is assigned a unique identifier, for example, Equipment_ID, configured to indicate one of the dynamic storage locations of the storage bins and to allow real-time tracking of the storage bins. In an embodiment, the facility management subsystem 204 illustrated in FIGS. 2A-2B, communicates with one or more sensors positioned on the robotic handlers to identify real-time locations of the robotic handlers and allow continuous tracking of the storage bins placed thereon. In an embodiment, the robotic handlers place the storage bins on bin carousels from outside the transport vehicles without entering the transport vehicles. The bin carousels allow direct access to the storage bins. In another embodiment, the storage bins are loaded onto cassettes within a facility. These cassettes are configured to slide into the transport vehicle. In an embodiment, at least one of the node facilities comprises a plurality of environmentally distinct storage zones among which the facility-based array of indexed storage locations is distributed as illustrated in FIGS. 5-7. The environmentally distinct storage zones vary in temperature, humidity, and/or other environmental conditions. The storage bins are selectively deposited into the facility-based array of indexed storage locations among the environmentally distinct storage zones based on environmental data. The environmental data is retrieved from respective mobile data storage devices of the storage bins and/or the CSCMS. In another embodiment, each of the transport vehicles comprises a plurality of environmentally distinct storage zones among which the vehicle-based array of indexed storage locations is distributed as illustrated in FIGS. 19A-19C. The storage bins are selectively deposited into the vehicle-based array of indexed storage locations among the environmentally distinct storage zones based on environmental data.

The CSCMS is communicatively coupled to the network of node facilities, the fleet of inter-nodal transport vehicles, and the storage bins. The CSCMS comprises at least one processor and non-transitory, computer-readable storage media communicatively coupled to the processor(s). In the computer-implemented method disclosed herein, the CSCMS assigns 2502 a unique bin identifier to each of the storage bins. The CSCMS stores 2503 the bin data and the unique bin identifier of each of the storage bins in one or more databases of the CSCMS. The CSCMS also stores 2504 location identifiers of the indexed storage locations of the storage bins within the facility-based array and the vehicle-based array and dynamic storage locations of the storage bins, in one or more databases of the CSCMS. As used herein, "dynamic storage locations" refer to locations of the storage bins during movement of the storage bins within a facility and during transfers of the storage bins between the facility and a transport vehicle and vice versa. For example, one of the dynamic storage locations is the location of the storage bin when the storage bin is placed on a robotic handler and moved within the facility by the robotic handler. In another example, the dynamic storage location is the location of the storage bin on a conveyor used to transfer the storage bin from the facility to the transport vehicle and vice versa. Furthermore, the CSCMS updates 2505 the location identifiers in the database(s) as the storage bins are transferred between the indexed storage locations of the facility-based array and the vehicle-based array while traversing the network of node facilities and the fleet of inter-nodal transport vehicles of the multi-nodal supply chain system. The network of node facilities, the fleet of inter-nodal transport vehicles, and the storage bins, in operable communication with the CSCMS, are configured to provide a complete traceability of one or more of the eaches from their input into the multi-nodal supply chain system to fulfillment of orders.

The CSCMS also automatically records and links the bin identifiers of the storage bins to the location identifiers of the indexed storage locations in the facility-based array and the vehicle-based array and the dynamic storage locations, to item identifiers of the inventory items contained in the storage bins, and to vendor identifiers of a plurality of vendors whose inventory items are contained in the storage bins in the database(s). In another embodiment, any one or more of the storage bins comprises a plurality of compartments configured to accommodate the inventory items of a plurality of vendors in any one or more of the storage bins. Each of the compartments is identified by a compartment identifier and configured to accommodate one or more of the inventory items owned by a corresponding one of the vendors. In an embodiment, each of the compartments is configured to accommodate inventory items from multiple vendors, for example, in cases where the inventory items have the same universal product code (UPC). The CSCMS automatically records and links the compartment identifier of a respective one of the compartments to the item identifiers of one or more of the inventory items contained in any one or more of the storage bins and to the vendor identifiers of the vendors whose inventory items are contained in any one or more of the storage bins. With these multi-compartment storage bins, the multi-nodal supply chain system combines multi-vendor inventory within the same storage bin while still tracking physical location and ownership.

The bin data associated with the storage bins comprises at least one of: an inventory catalogue, for example, a vendor's product catalogue; inventory item data comprising an item identifier, a quantity, and attributes of each of the inventory items contained in each of the storage bins; destination data associated with a destination of the contained inventory items; timing data associated with a timeline within which and an urgency with which the inventory items contained in each of the storage bins are to be conveyed through the multi-nodal supply chain system toward the destination; inventory customization data associated with value-added service actions to be performed on the inventory items contained in each of the storage bins; inventory handling data associated with routing, handling, and/or packing requirements for the inventory items contained in each of the storage bins; and environmental data associated with environmental requirements for the inventory items contained in each of the storage bins.

The CSCMS receives and processes the bin data and commands from each of the storage bins while each of the storage bins traverses the network of node facilities and the fleet of inter-nodal transport vehicles of the multi-nodal supply chain system in a forward direction and a reverse direction. The CSCMS also generates task-based instructions for facilitating filling actions and order fulfillment actions at one or more of the node facilities based on the bin data. Consider an example where a facility, for example, a macro facility, receives and stores multiple single-compartment storage (SCS) bins, each containing multiple eaches of a single product or inventory item therein, in an indexed storage array of the facility. At a kitting workstation of the facility, the CSCMS generates task-based instructions for filling multiple multi-compartment storage (MCS) bins as follows: for each of the MCS bins, the CSCMS generates task-based instructions for receiving a group of the SCS bins extracted from the indexed storage array and containing different products therein and pulling one or more of the eaches from each of the group of SCS storage bins and placing the pulled eaches into the MCS bin. During fulfillment of at least one customer order, for example, at another facility such as a micro facility, the CSCMS generates task-based instructions for receiving at least one of the MCS bins that contains one or more particular products required to fulfill the customer order and pulling one or more particular products from the MCS bins and placing the pulled product(s) into a respective compartment of an order bin comprising a multiple separate compartments, of which at least one other compartment is filled with one or more ordered products of another customer order. The CSCMS also generates task-based instructions for receiving the order bin at a packing workstation, where the particular products are pulled from the respective compartment of the order bin and packaged for delivery.

Furthermore, the CSCMS generates task-based instructions for triggering loading actions and unloading actions at one or more of the node facilities based on the bin data. In an embodiment, incoming storage bins are unloaded from any one of the inter-nodal transport vehicles into any one of the node facilities and outgoing storage bins are reloaded from any one of the node facilities to any one of the inter-nodal transport vehicles. The incoming storage bins and the outgoing storage bins are exchanged in a one-to-one correspondence between any one of the inter-nodal transport vehicles and any one of the node facilities to allow an equivalent flow of the storage bins in the forward direction and the reverse direction through the multi-nodal supply chain system. A unique bin identifier of each of the outgoing storage bins loaded from any one of the node facilities onto any one of the inter-nodal transport vehicles is read and one or more databases of the CSCMS are updated with the unique bin identifier to record a transfer of each of the outgoing storage bins to any one of the inter-nodal transport vehicles. The unique bin identifier of each of the incoming storage bins unloaded from any one of the inter-nodal transport vehicles into any one of the node facilities is read and one or more databases of the CSCMS is updated with the unique bin identifier to record a transfer of each of the incoming storage bins to any one of the node facilities. In an embodiment, at least one of the outgoing storage bins is an empty storage bin. In another embodiment, at least one of the outgoing storage bins is a non-empty storage bin containing at least one of the inventory items. In another embodiment, the non-empty storage bin contains required inventory items or customer returns. In another embodiment, the incoming storage bins and the outgoing storage bins are of the same standardized size and configuration as the storage bins.

In an embodiment, the CSCMS further comprises respective facility management subsystems at the node facilities communicatively coupled to each other. The respective facility management subsystems are configured to communicate with respective mobile data storage devices of the storage bins for at least one of: reading the bin data stored thereon; updating the bin data stored thereon; generating commands for actions to be performed on the storage bins based at least partly on the bin data; controlling handling equipment at the node facilities based at least partly on the generated commands; providing worker guidance instructions for directing performance of the actions; and executing transfer of the storage bins to environmentally distinct storage zones in the facility-based array based on environmental data read from the respective mobile data storage devices of the storage bins. The mobile data storage devices of the storage bins store the bin data related to the contents of the storage bins, for example, stock keeping unit, count, vendor owner, location, etc., thereby precluding the need to check in the storage bins at each facility and transport vehicle as the storage bins automatically report their status to each facility and transport vehicle as they flow through the multi-nodal supply chain system. In an embodiment, the CSCMS further comprises respective vehicle management subsystems at the inter-nodal transport vehicles. The respective vehicle management subsystems are configured to communicate with the respective facility management subsystems at the node facilities and the respective mobile data storage devices of the storage bins for recording transfers of the storage bins from the node facilities to the inter-nodal transport vehicles and vice versa.

Figure 26:
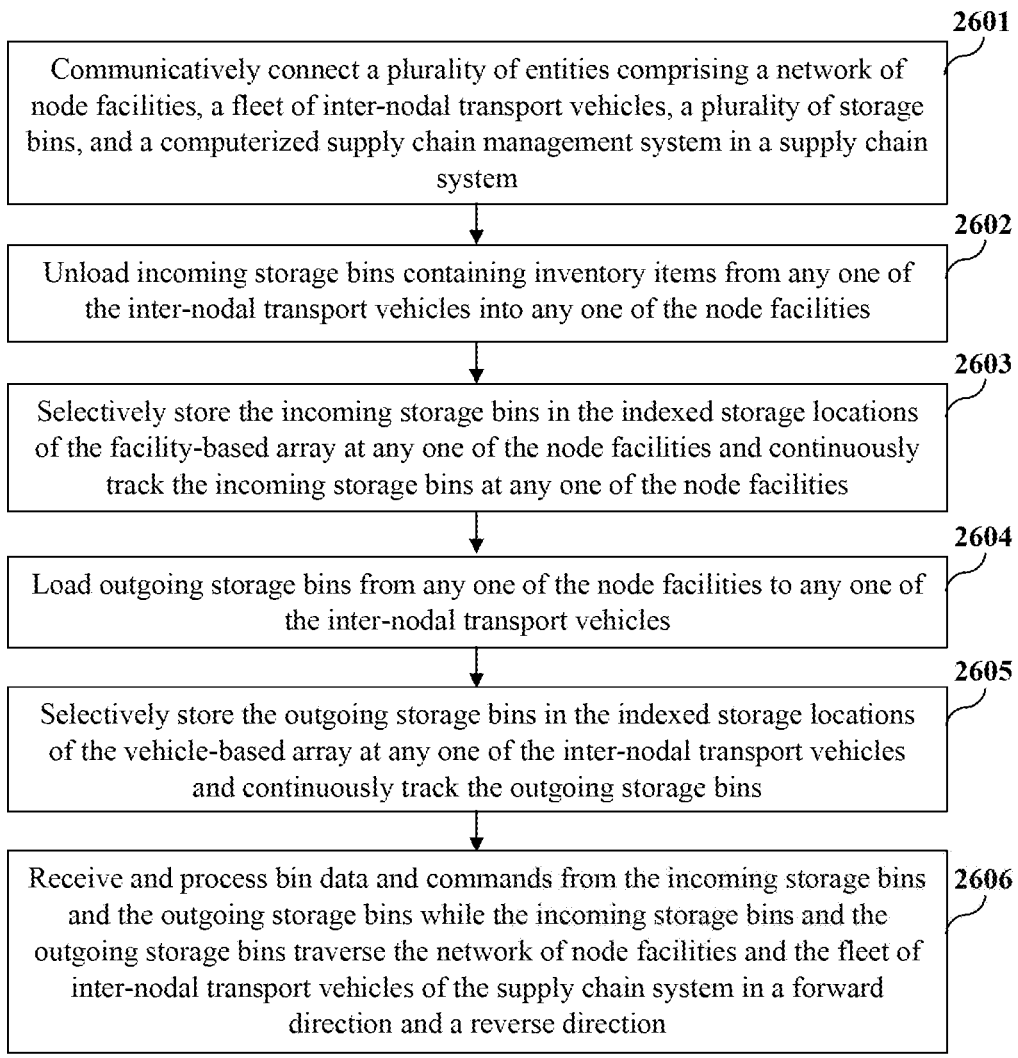
FIG. 26 illustrates a flowchart of a computer-implemented method for executing a supply chain workflow with two-way logistics using transportable and continuously trackable storage bins, according to an embodiment herein.

FIG. 26 illustrates a flowchart of a computer-implemented method for executing a supply chain workflow with two-way logistics using transportable and continuously trackable storage bins, according to an embodiment herein. In the method disclosed herein, multiple entities comprising a network of node facilities, a fleet of inter-nodal transport vehicles, a plurality of standardized storage bins, and a computerized supply chain management system (CSCMS) are communicatively connected 2601 in a multi-nodal supply chain system as disclosed in the detailed descriptions of FIGS. 1A-ID, FIGS. 2A-2B, and FIGS. 4A-4B. In the method disclosed herein, incoming storage bins containing inventory items are unloaded 2602 from any one of the inter-nodal transport vehicles into any one of the node facilities. The incoming storage bins are selectively stored 2603 in the indexed storage locations of the facility-based array at any one of the node facilities, and continuously tracked at any one of the node facilities. The outgoing storage bins are loaded 2604 from any one of the node facilities to any one of the inter-nodal transport vehicles. The outgoing storage bins are selectively stored 2605 in the indexed storage locations of the vehicle-based array at any one of the inter-nodal transport vehicles, and continuously tracked at any one of the inter-nodal transport vehicles. The CSCMS receives and processes 2606 bin data and commands from the incoming storage bins and the outgoing storage bins while the incoming storage bins and the outgoing storage bins traverse the network of node facilities and the fleet of inter-nodal transport vehicles of the multi-nodal supply chain system in a forward direction and a reverse direction.

The non-transitory, computer-readable storage media disclosed herein stores computer program instructions executable by the various processors of the CSCMS for executing a supply chain workflow with two-way logistics using transportable and continuously trackable storage bins. The computer program instructions implement the processes of various embodiments disclosed above and perform additional steps that may be required and contemplated for executing a supply chain workflow with two-way logistics using transportable and continuously trackable storage bins. When the computer program instructions are executed by various processors, the computer program instructions cause the processors to perform the steps of the method for executing a supply chain workflow with two-way logistics using transportable and continuously trackable storage bins as disclosed in the detailed description of FIGS. 25-26. In an embodiment, a single piece of computer program code comprising computer program instructions performs one or more steps of the computer-implemented method disclosed in the detailed description of FIG. 25-26. The processors retrieve these computer program instructions and execute them.

In the method disclosed herein, standardized order bins are used to deliver customer orders from a fulfillment center to the last mile pickup point, for example, the nano facility, thereby eliminating cardboard boxes and allowing inventory items to be shipped in bags rather than cardboard boxes. Moreover, using standardized storage bins throughout an entire supply chain ecosystem allows all entities within the multi-nodal supply chain system to be configured to specifically and effectively handle a single standard, which ensures complete compatibility between the entities. As a result, continuity and contiguity are ensured within the multi-nodal supply chain system, while making the multi-nodal supply chain system scalable geographically and over the course of time. That is, if all equipment within the multi-nodal supply chain system abides by the same set of material handling standards, each storage bin can flow through the entire multi-nodal supply chain system using direct physical transfer methods from entity to entity without intermediate steps of a conventional supply chain such as material staging, where custody of the storage bin is temporarily assigned to a buffer area during transfer between the entities. Direct physical transfer also precludes the need for identifying the storage bin, for example, by barcode scanning, radio frequency identification (RFID) scanning, etc., to complete the logical transfer of custody of the storage bin between the entities, thereby overcoming another drawback of conventional logistics.

Moreover, the indexed storage methods implemented by each entity in the multi-nodal supply chain system allow the location of each storage bin to be continuously tracked while the storage bin is in the custody of each entity. This coupled with the ability to directly transfer the physical and logical custody of each storage bin between entities allows the location of the storage bin to be continuously tracked anywhere within the multi-nodal supply chain system. Consequently, the multi-nodal supply chain system operates as a single connected organism, instead of a collection of discrete entities continuously picking up inventory items from an inbound accumulation area and releasing them to an outbound accumulation area. The storage bins disclosed herein are continuously tracked throughout the multi-nodal supply chain system and no staging areas are required to check the storage bins in and out of facilities or transport vehicles. The elimination of shipping and receiving processes and associated staging areas within the multi-nodal supply chain system substantially reduces labor, real estate and resource requirements while streamlining logistics, thereby making operations orderly and easier to monitor in real time over chaotic approaches used in conventional supply chains.

Furthermore, the status of the inventory items within the entire multi-nodal supply chain system is tracked in real time since the storage bins are handled autonomously with robotic handlers and mechanical means to have each storage bin indexed to a location. This allows continuous identification and tracking of the locations of the storage bins within the multi-nodal supply chain network, as the storage bins are moved by the robotic handlers whose actions can be traced by the CSCMS. Hence, location sensors on the storage bins themselves are not required since the location of the storage bins are tracked by mechanical means. The storage bins, therefore, do not need to be checked in and out of facilities; rather, instead of matching the storage bins to facilities and transport vehicles, the storage bins are matched to indexed storage locations in a continuous network.

Furthermore, the multi-nodal supply chain system implements a 1:1 exchange of storage bins flowing in a forward or downstream direction and a reverse or upstream direction through the multi-nodal supply chain system, between all entities. As the forward flow rate is identical to the reverse flow rate, the need to buffer overflow of materials in staging areas is eliminated, while further increasing the orderliness and predictability of the multi-nodal supply chain system. Storage bins flowing in the reverse direction can be loaded with inventory items to be transported up the hierarchy of facilities to support customer returns, making reverse logistics cost effective over conventional methods. Using the same indexed storage methods as the forward direction, returned inventory items can be tracked continuously on their way up the supply chain hierarchy.

In addition to logistics and processing data, the bin database structure outlines the stock keeping units (SKUs), quantities, owners, location, etc., and serves as an inventory master. As the storage bin is an active actor flowing through the organs of the multi-nodal supply chain system, the storage bin is the master served by the facilities and the transport vehicles. This arrangement precludes the need for scanning of barcodes or radio frequency identification (RFID) tags associated with the storage bins to allocate and register the storage bin as being received by the facility or the transport vehicle as if the storage bin now belongs to that single entity, or scanned/checked out of the entity during shipping. In the method disclosed herein, the storage bin travels through the multi-nodal supply chain system updating its own location and inventory status continuously.

In an embodiment, each facility within the multi-nodal supply chain system is assigned a class with a set prescribed tasks, with child nodes within the hierarchy only serviced by their designated parent nodes. Inventory to be transferred from a donor child node to a needful child node must be first returned to the parent node using the reverse flow of the multi-nodal supply chain system and then be transported to the needful child node using the forward direction. The multi-nodal supply chain system, therefore, fulfills product from the closest endpoint, for example, a micro facility to the destination address. That is, orders are not fulfilled from alternate micros. Any inventory items required from an alternate, similar class facility, for example, another micro facility, are transferred up the hierarchy to a macro facility, then down to the closest micro facility. This hierarchical arrangement further streamlines processes, further increases the predictability, and lowers transport costs within the multi-nodal supply chain system by eliminating unplanned shipments.

Due to the ability to monitor all actions within the multi-nodal supply chain system along with its predictable nature, cause and effect of actions performed by all entities in the multi-nodal supply chain system are carefully measured across the entire multi-nodal supply chain system. Consequently, scenario analysis and simulations are much easier to perform than with conventional supply chain methods with generated insights being more effective, thereby allowing the multi-nodal supply chain system to operate with increased precision, which lowers operating costs. Furthermore, the multi-tenant or multi-vendor aspects of the multi-nodal supply chain system lower costs while at the same time increase customer service.

The distributed, multi-nodal supply chain system supports a massive number of storage bins, each with their own journey within the multi-nodal supply chain system and allows dynamic sharing of the infrastructure between them. Multi-agent governance implemented by the computerized supply chain management system comprising the facility management subsystem at each of the facilities and the vehicle management subsystem in each of the transport vehicles allows an adaptive and agile layer to effectively govern the supply chain infrastructure to allow each storage bin to optimally flow through the supply chain ecosystem despite the constantly changing conditions in logistics.

It will be apparent in different embodiments that the various methods and computer-readable programs disclosed herein are implemented on non-transitory, computer-readable storage media appropriately programmed for computing devices. The non-transitory, computer-readable storage media participate in providing data, for example, instructions that are read by a computer, a processor or a similar device. In different embodiments, the "non-transitory, computer-readable storage media" also refer to a single medium or multiple media, for example, a centralized database, a distributed database, and/or associated caches and servers that store one or more sets of instructions that are read by a computer, a processor or a similar device. The "non-transitory, computer-readable storage media" also refer to any medium capable of storing or encoding a set of instructions for execution by a computer, a processor or a similar device and that causes a computer, a processor or a similar device to perform any one or more of the steps of the method disclosed herein. In an embodiment, the computer programs that implement the methods and algorithms disclosed herein are stored and transmitted using a variety of media, for example, the computer-readable media in various manners. In an embodiment, hard-wired circuitry or custom hardware is used in place of, or in combination with, software instructions for implementing the processes of various embodiments. Therefore, the embodiments are not limited to any specific combination of hardware and software. Various aspects of the embodiments disclosed herein are implemented as programmed elements, or non-programmed elements, or any suitable combination thereof.

Where databases are described such as the central database 203, the local facility database 207, and the local vehicle database 220 illustrated in FIGS. 2A-2B and FIGS. 3A-3D, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. In an embodiment, object methods or behaviors of a database are used to implement various processes such as those disclosed herein. In another embodiment, the databases are, in a known manner, stored locally or remotely from a device that accesses data in such a database. In embodiments where there are multiple databases, the databases are integrated to communicate with each other for enabling simultaneous updates of data linked across the databases, when there are any updates to the data in one of the databases.

The embodiments disclosed herein are configured to operate in a network environment comprising one or more computers that are in communication with one or more devices via a communication network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors that are adapted to communicate with the computers. In an embodiment, each of the computers is equipped with a network communication device, for example, a network interface card, a modem, or other network connection device suitable for connecting to a network. Each of the computers and the devices executes an operating system. While the operating system may differ depending on the type of computer, the operating system provides the appropriate communications protocols to establish communication links with the network. Any number and type of machines may be in communication with the computers.

The embodiments disclosed herein are not limited to a particular computer system platform, processor, operating system, or communication network. One or more of the embodiments disclosed herein are distributed among one or more computer systems, for example, servers configured to provide one or more services to one or more client computers, or to perform a complete task in a distributed system. For example, one or more of embodiments disclosed herein are performed on a client-server system that comprises components distributed among one or more server systems that perform multiple functions according to various embodiments. These components comprise, for example, executable, intermediate, or interpreted code, which communicate over a network using a communication protocol. The embodiments disclosed herein are not limited to be executable on any particular system or group of systems, and are not limited to any particular distributed architecture, network, or communication protocol.

The foregoing examples and illustrative implementations of various embodiments have been provided merely for explanation and are in no way to be construed as limiting of the embodiments disclosed herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims. It will be understood by those skilled in the art, having the benefit of the teachings of this specification, that the embodiments disclosed herein are capable of modifications and other embodiments may be effected and changes may be made thereto, without departing from the scope and spirit of the embodiments disclosed herein.

What is claimed is:

1. A supply chain system comprising a plurality of interconnected entities for executing a supply chain workflow using transportable and continuously trackable storage bins, the plurality of interconnected entities comprising:

a network of node facilities distributed throughout a geographical region, wherein each of the node facilities comprises a facility-based array of indexed storage locations;

a fleet of inter-nodal transport vehicles for transporting a plurality of inventory items contained in storage bins between the node facilities, wherein each of the inter-nodal transport vehicles comprises a vehicle-based array of indexed storage locations;

a plurality of storage bins storable within the network of node facilities and transportable between the node facilities by the inter-nodal transport vehicles, wherein each of the storage bins is of a standardized size and is configured to receive one or more of a plurality of eaches of the inventory items, and wherein the each of the storage bins is of a configuration compatible with the facility-based array of indexed storage locations and the vehicle-based array of indexed storage locations for selective storage and continuous tracking of any one of the storage bins at any one of the node facilities, in any one of the inter-nodal transport vehicles, and between the any one of the node facilities and the any one of the inter-nodal transport vehicles; and a computerized supply chain management system communicatively coupled to the network of node facilities, the fleet of inter-nodal transport vehicles, and the storage bins, the computerized supply chain management system comprising at least one processor and non-transitory, computer-readable storage media communicatively coupled to the at least one processor, wherein the non-transitory, computer-readable storage media comprise one or more databases configured to store bin data comprising bin identifiers assigned to the storage bins and to store location identifiers of the indexed storage locations of the storage bins within the facility-based array and the vehicle-based array and dynamic storage locations of the storage bins, and wherein the non-transitory, computer-readable storage media is configured to store computer program instructions, which when executed by the at least one processor, cause the at least one processor to update the location identifiers as the storage bins are transferred between the indexed storage locations of the facility-based array and the vehicle-based array while traversing the network of node facilities and the fleet of inter-nodal transport vehicles of the supply chain system, and wherein the network of node facilities, the fleet of inter-nodal transport vehicles, and the plurality of storage bins, in operable communication with the computerized supply chain management system, are configured to provide a complete traceability of the one or more of the eaches from their input into the supply chain system to fulfillment of orders.

2. The supply chain system according to claim 1, wherein the plurality of storage bins is further configured to contain one or more of the plurality of inventory items owned by one or more of a plurality of vendors.

3. The supply chain system according to claim 1, wherein the non-transitory, computer-readable storage media is further configured to store additional computer program instructions, which when executed by the at least one processor, cause the at least one processor to receive and process the bin data and commands from the each of the storage bins while the each of the storage bins traverses the network of node facilities and the fleet of inter-nodal transport vehicles of the supply chain system in a forward direction and a reverse direction.

4. The supply chain system according to claim 1, wherein the non-transitory, computer-readable storage media is further configured to store additional computer program instructions, which when executed by the at least one processor, cause the at least one processor to automatically record and link the bin identifiers of the storage bins to the location identifiers of the indexed storage locations in the facility-based array and the vehicle-based array and the dynamic storage locations, to item identifiers of the inventory items contained in the storage bins, and to vendor identifiers of a plurality of vendors whose inventory items are contained in the storage bins, in the one or more databases.

5. The supply chain system according to claim 1, wherein the non-transitory, computer-readable storage media is further configured to store additional computer program instructions, which when executed by the at least one processor, cause the at least one processor to generate task-based instructions for facilitating filling actions and order fulfillment actions at one or more of the node facilities based on the bin data.

6. The supply chain system according to claim 1, further comprising one or more robotic handlers operable at the each of the node facilities, wherein each of the one or more robotic handlers is configured to navigate any one of the storage bins through the facility-based array of indexed storage locations and selectively deposit the any one of the storage bins thereto and extract the any one of the storage bins therefrom, and wherein the each of the one or more robotic handlers is further configured to provide a dynamic storage location to the each of the storage bins, and wherein the each of the one or more robotic handlers is assigned a unique identifier configured to indicate one of the dynamic storage locations of the storage bins and to allow real-time tracking of the storage bins.

7. The supply chain system according to claim 1, wherein any one or more of the storage bins comprises a plurality of compartments configured to accommodate the inventory items of a plurality of vendors in the any one or more of the storage bins, wherein each of the compartments is identified by a compartment identifier and configured to accommodate one or more of the inventory items owned by a corresponding one of the vendors, and wherein the computerized supply chain management system is further configured to automatically record and link the compartment identifier of a respective one of the compartments to the item identifiers of the one or more of the inventory items contained in the any one or more of the storage bins and to the vendor identifiers of the vendors whose inventory items are contained in the any one or more of the storage bins.

8. The supply chain system according to claim 1, wherein the storage bins are categorized into first category storage bins containing unmixed inventory items of a matching item type, second category storage bins containing mixed inventory items of a non-matching item type, and third category storage bins configured as order bins for fulfilling the orders, and wherein the network of node facilities is a hierarchical network comprising:

at least one mega facility configured to store the first category storage bins;

at least one macro facility configured to receive one or more of the first category storage bins transported from the at least one mega facility, and fill a predefined number of the second category storage bins with different inventory items from the received one or more of the first category storage bins to meet one of actual inventory needs and predictive inventory needs of another one or more of the node facilities; and at least one micro facility configured to receive one or more of the second category storage bins transported from the at least one macro facility, and fill a predefined number of the order bins with the different inventory items from the received one or more of the second category storage bins to fulfill the orders.

9. The supply chain system according to claim 8, wherein the network of node facilities further comprises at least one nano facility configured to receive one or more of the order bins filled with the orders for pickup by one of customers and delivery personnel.

10. The supply chain system according to claim 8, wherein the at least one micro facility is configured to fulfill the orders based on one of: proximity of the at least one micro facility to at least one nano facility and a customer preference of at least one nano facility.

11. The supply chain system according to claim 8, wherein the order bins comprise finished-order bins, and wherein the finished-order bins are of a different standardized size and configuration from other of the storage bins and are filled with one or more of the inventory items of individual orders after extraction thereof from the facility-based array of the at least one micro facility, and wherein the finished-order bins of the different standardized size and configuration are configured to be compatible with the facility-based array of indexed storage locations of at least one nano facility and with the vehicle-based array of indexed storage locations in a node-to-terminal transport vehicle.

12. The supply chain system according to claim 11, wherein the inventory items owned by the vendors are packed into respective vendor-branded packages and the respective vendor-branded packages are filled in the finished-order bins.

13. The supply chain system according to claim 8, wherein the order bins comprise picked-order bins of the same standardized size and configuration as the storage bins and are filled with one or more of the inventory items of multiple orders at the at least one micro facility and inducted into the facility-based array of the at least one micro facility.

14. The supply chain system according to claim 8, wherein the orders are fulfilled at one or more of the at least one macro facility and the at least one micro facility.

15. The supply chain system according to claim 1, further comprising a mobile data storage device with a computer-readable memory operably coupled to the each of the storage bins, wherein the mobile data storage device is configured to store a unique bin identifier of a respective each of the storage bins and the bin data associated with the inventory items contained in the respective each of the storage bins.

16. The supply chain system according to claim 1, wherein the bin data comprises at least one of:
an inventory catalogue;
inventory item data comprising an item identifier, a quantity, and attributes of each of the inventory items contained in the each of the storage bins;
destination data associated with a destination of the contained inventory items;
timing data associated with a timeline within which and an urgency with which the inventory items contained in the each of the storage bins are to be conveyed through the supply chain system toward the destination;
inventory customization data associated with value-added service actions to be performed on the inventory items contained in the each of the storage bins;
inventory handling data associated with routing, handling, and/or packing requirements for the inventory items contained in the each of the storage bins; and
environmental data associated with environmental requirements for the inventory items contained in the each of the storage bins.

17. The supply chain system according to claim 1, wherein the non-transitory, computer-readable storage media is further configured to store additional computer program instructions, which when executed by the at least one processor, cause the at least one processor to generate task-based instructions for triggering loading actions and unloading actions at one or more of the node facilities based on the bin data, wherein the loading actions and the unloading actions comprise:
unloading incoming storage bins from any one of the inter-nodal transport vehicles into any one of the node facilities and reloading outgoing storage bins from the any one of the node facilities to the any one of the inter-nodal transport vehicles, wherein the incoming storage bins and the outgoing storage bins are exchanged in a one-to-one correspondence between the any one of the inter-nodal transport vehicles and the any one of the node facilities to allow an equivalent flow of the storage bins in a forward direction and a reverse direction through the supply chain system;
reading a unique bin identifier of each of the outgoing storage bins loaded from the any one of the node facilities onto the any one of the inter-nodal transport vehicles and updating the one or more databases of the computerized supply chain management system with the unique bin identifier to record a transfer of the each of the outgoing storage bins to the any one of the inter-nodal transport vehicles; and
reading a unique bin identifier of each of the incoming storage bins unloaded from the any one of the inter-nodal transport vehicles into the any one of the node facilities and updating the one or more databases with the unique bin identifier to record a transfer of the each of the incoming storage bins to the any one of the node facilities.

18. The supply chain system according to claim 17, wherein at least one of the outgoing storage bins is an empty storage bin.

19. The supply chain system according to claim 17, wherein at least one of the outgoing storage bins is a non-empty storage bin containing at least one of the inventory items.

20. The supply chain system according to claim 19, wherein the non-empty storage bin contains one of required inventory items and customer returns.

21. The supply chain system according to claim 17, wherein the incoming storage bins and the outgoing storage bins are of the same standardized size and configuration as the storage bins.

22. The supply chain system according to claim 1, further comprising at least one sensor operably coupled to the each of the storage bins, wherein the at least one sensor is configured to detect movement of the each of the storage bins, and in response to the detected movement, initiate positional tracking of the each of the storage bins through the supply chain system.

23. The supply chain system according to claim 1, further comprising a mobile indoor positioning device operably coupled to the each of the storage bins and an indoor positioning system installed at the each of the node facilities, wherein the mobile indoor positioning device is configured to operably communicate with the indoor positioning system to determine and report a position of the each of the storage bins within the each of the node facilities for real-time tracking of the each of the storage bins.

24. The supply chain system according to claim 1, further comprising a positioning unit and a wireless communications unit operably coupled to the each of the inter-nodal transport vehicles, wherein the positioning unit is configured to determine a location of the each of the inter-nodal transport vehicles and in turn determine a location of the any one of the storage bins being transported in the each of the inter-nodal transport vehicles, and wherein the wireless communications unit is configured to communicate the location of the each of the inter-nodal transport vehicles and the location of the any one of the storage bins to the computerized supply chain management system during transport of the storage bins between the node facilities.

25. The supply chain system according to claim 1, wherein at least one of the node facilities comprises a plurality of environmentally distinct storage zones among which the facility-based array of indexed storage locations is distributed, and wherein the storage bins are selectively deposited into the facility-based array of indexed storage locations among the environmentally distinct storage zones based on environmental data, wherein the environmental data is retrieved from one of respective mobile data storage devices of the storage bins and the computerized supply chain management system.

26. The supply chain system according to claim 1, wherein the computerized supply chain management system further comprises respective facility management subsystems at the node facilities communicatively coupled to each other, and wherein the respective facility management subsystems are configured to communicate with respective mobile data storage devices of the storage bins for at least one of:
  reading the bin data stored thereon;
  updating the bin data stored thereon;
  generating commands for actions to be performed on the storage bins based at least partly on the bin data;
  controlling handling equipment at the node facilities based at least partly on the generated commands;
  providing worker guidance instructions for directing performance of the actions; and
  executing transfer of the storage bins to environmentally distinct storage zones in the facility-based array based on environmental data read from the respective mobile data storage devices of the storage bins.

27. The supply chain system according to claim 26, wherein the computerized supply chain management system further comprises respective vehicle management subsystems at the inter-nodal transport vehicles, and wherein the respective vehicle management subsystems are configured to communicate with the respective facility management subsystems at the node facilities and the respective mobile data storage devices of the storage bins for recording transfers of the storage bins from the node facilities to the inter-nodal transport vehicles and vice versa.

28. The supply chain system according to claim 1, wherein the fleet of inter-nodal transport vehicles comprises dedicated-service transport vehicles, each respectively assigned to at least one of service a specific pair of the node facilities, service a limited subset of the node facilities, and service a limited service area containing two or more of the node facilities.

29. A method for executing a supply chain workflow using transportable and continuously trackable storage bins, the method comprising:
  communicatively connecting a plurality of entities in a supply chain system, the plurality of entities comprising:
    a network of node facilities distributed throughout a geographical region, wherein each of the node facilities comprises a facility-based array of indexed storage locations;
    a fleet of inter-nodal transport vehicles for transporting a plurality of inventory items contained in storage bins between the node facilities, wherein each of the inter-nodal transport vehicles comprises a vehicle-based array of indexed storage locations;
    a plurality of storage bins storable within the network of node facilities and transportable between the node facilities by the inter-nodal transport vehicles, wherein each of the storage bins is of a standardized size and is configured to receive one or more of a plurality of eaches of the inventory items; and
    a computerized supply chain management system communicatively coupled to the network of node facilities, the fleet of inter-nodal transport vehicles, and the storage bins:
  assigning a unique bin identifier to the each of the storage bins by the computerized supply chain management system;
  storing, in one or more databases of the computerized supply chain management system, bin data and the unique bin identifier of the each of the storage bins;
  storing, in the one or more databases of the computerized supply chain management system, location identifiers of the indexed storage locations of the storage bins within the facility-based array and the vehicle-based array and dynamic storage locations of the storage bins; and
  updating, in the one or more databases of the computerized supply chain management system, the location identifiers as the storage bins are transferred between the indexed storage locations of the facility-based array and the vehicle-based array while traversing the network of node facilities and the fleet of inter-nodal transport vehicles of the supply chain system, wherein the network of node facilities, the fleet of inter-nodal transport vehicles, and the plurality of storage bins, in operable communication with the computerized supply chain management system, are configured to provide a complete traceability of the one or more of the eaches from their input into the supply chain system to fulfillment of orders.

30. The method according to claim 29, wherein the plurality of storage bins is further configured to contain one or more of the plurality of inventory items owned by one or more of a plurality of vendors.

31. The method according to claim 29, further comprising receiving and processing the bin data and commands from the each of the storage bins while the each of the storage bins traverses the network of node facilities and the fleet of inter-nodal transport vehicles of the supply chain system in a forward direction and a reverse direction.

32. The method according to claim 29, further comprising automatically recording and linking, by the computerized supply chain management system, bin identifiers of the storage bins to the location identifiers of the indexed storage locations in the facility-based array and the vehicle-based array and the dynamic storage locations, to item identifiers of corresponding inventory items contained in the storage bins, and to vendor identifiers of a plurality of vendors whose inventory items are contained in the storage bins, in the one or more databases.

33. The method according to claim 29, further comprising generating task-based instructions by the computerized supply chain management system for facilitating filling actions and order fulfillment actions at one or more of the node facilities based on the bin data, wherein one or more of the task-based instructions are configured to activate one or more robotic handlers operable at the each of the node facilities, and wherein each of the one or more robotic handlers is configured to navigate any one of the storage bins through the facility-based array of indexed storage locations and selectively deposit the any one of the storage bins thereto and extract the any one of the storage bins therefrom, and wherein the each of the one or more robotic handlers is further configured to provide a dynamic storage location to the each of the storage bins, and wherein the each of the one or more robotic handlers is assigned a unique identifier configured to indicate one of the dynamic storage locations of the storage bins and to allow real-time tracking of the storage bins.

34. The method according to claim 29, wherein any one or more of the storage bins comprises a plurality of compartments configured to accommodate the inventory items of a plurality of vendors in the any one or more of the storage bins, wherein each of the compartments is identified by a compartment identifier and configured to accommodate one or more of the inventory items owned by a corresponding one of the vendors, and wherein the computerized supply chain management system is further configured to automatically record and link the compartment identifier of a respective one of the compartments to the item identifiers of the one or more of the inventory items contained in the any one or more of the storage bins and to the vendor identifiers of the vendors whose inventory items are contained in the any one or more of the storage bins, in the one or more databases.

35. The method according to claim 29, further comprising storing the unique bin identifier of the each of the storage bins and the bin data associated with the inventory items contained in the each of the storage bins in a mobile data storage device with a computer-readable memory operably coupled to the each of the storage bins.

36. The method according to claim 29, wherein the bin data comprises at least one of:
   an inventory catalogue;
   inventory item data comprising an item identifier, a quantity, and attributes of each of the inventory items contained in the each of the storage bins;
   destination data associated with a destination of the contained inventory items;
   timing data associated with a timeline within which and an urgency with which the inventory items contained in the each of the storage bins are to be conveyed through the supply chain system toward the destination;
   inventory customization data associated with value-added service actions to be performed on the inventory items contained in the each of the storage bins;
   inventory handling data associated with routing, handling, and/or packing requirements for the inventory items contained in the each of the storage bins; and
   environmental data associated with environmental requirements for the inventory items contained in the each of the storage bins.

37. The method according to claim 29, further comprising:
   unloading incoming storage bins from any one of the inter-nodal transport vehicles into any one of the node facilities and reloading outgoing storage bins from the any one of the node facilities to the any one of the inter-nodal transport vehicles, wherein the incoming storage bins and the outgoing storage bins are exchanged in a one-to-one correspondence between the any one of the inter-nodal transport vehicles and the any one of the node facilities to allow an equivalent flow of the storage bins in a forward direction and a reverse direction through the supply chain system;
   reading a unique bin identifier of each of the outgoing storage bins loaded from the any one of the node facilities onto the any one of the inter-nodal transport vehicles and updating the one or more databases of the computerized supply chain management system with the unique bin identifier to record a transfer of the each of the outgoing storage bins to the any one of the inter-nodal transport vehicles; and
   reading a unique bin identifier of each of the incoming storage bins unloaded from the any one of the inter-nodal transport vehicles into the any one of the node facilities and updating the one or more databases with the unique bin identifier to record a transfer of the each of the incoming storage bins to the any one of the node facilities.

38. The method according to claim 29, further comprising detecting movement of the each of the storage bins by at least one sensor operably coupled to the each of the storage bins, and in response to the detected movement, initiating positional tracking of the each of the storage bins through the supply chain system.

39. The method according to claim 29, further comprising determining and reporting a position of the each of the storage bins within the each of the node facilities by a mobile indoor positioning device operably coupled to the each of the storage bins, in operable communication with the indoor positioning system installed at the each of the node facilities, for real-time tracking of the each of the storage bins.

40. The method according to claim 29, further comprising:
   determining a location of the each of the inter-nodal transport vehicles and in turn determining a location of the storage bins being transported in the each of the inter-nodal transport vehicles by a positioning unit operably coupled to the each of the inter-nodal transport vehicles; and
   communicating the location of the each of the inter-nodal transport vehicles and the location of the any one of the storage bins to the computerized supply chain management system by a wireless communications unit operably coupled to the each of the inter-nodal transport vehicles during transport of the storage bins between the node facilities.

41. The method according to claim 29, wherein the computerized supply chain management system further comprises respective facility management subsystems at the node facilities communicatively coupled to each other, and wherein the respective facility management subsystems are configured to communicate with respective mobile data storage devices of the storage bins for at least one of:
   reading the bin data stored thereon;
   updating the bin data stored thereon;
   generating commands for actions to be performed on the storage bins based at least partly on the bin data;
   controlling handling equipment at the node facilities based at least partly on the generated commands;
   providing worker guidance instructions for directing performance of the actions; and
   executing transfer of the storage bins to environmentally distinct storage zones in the facility-based array based on environmental data read from the respective mobile data storage devices of the storage bins.

42. The method according to claim 41, wherein the computerized supply chain management system further comprises respective vehicle management subsystems at the inter-nodal transport vehicles, and wherein the respective vehicle management subsystems are configured to communicate with the respective facility management subsystems at the node facilities and the respective mobile data storage devices of the storage bins for recording transfers of the storage bins from the node facilities to the inter-nodal transport vehicles and vice versa.

* * * * *